United States Patent
Babaei et al.

(10) Patent No.: US 11,395,299 B2
(45) Date of Patent: *Jul. 19, 2022

(54) CHANNEL STATE INFORMATION REPORTS PER BANDWIDTH PART OF A CELL

(71) Applicant: Ofinno, LLC, Reston, VA (US)

(72) Inventors: Alireza Babaei, Fairfax, VA (US); Esmael Dinan, McLean, VA (US); Hyoungsuk Jeon, Centreville, VA (US); Kyungmin Park, Herndon, VA (US); Hua Zhou, Herndon, VA (US)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/896,354

(22) Filed: Jun. 9, 2020

(65) Prior Publication Data

US 2020/0305144 A1 Sep. 24, 2020

Related U.S. Application Data

(63) Continuation of application No. 16/185,917, filed on Nov. 9, 2018, now Pat. No. 10,687,339.

(Continued)

(51) Int. Cl.
*H04W 72/04* (2009.01)
*H04W 24/08* (2009.01)
(Continued)

(52) U.S. Cl.
CPC ............ *H04W 72/048* (2013.01); *H04B 7/02* (2013.01); *H04L 5/001* (2013.01); *H04L 5/005* (2013.01);
(Continued)

(58) Field of Classification Search
CPC ......... H04B 7/02; H04L 5/001; H04L 5/0048; H04L 5/005; H04L 5/0051; H04L 5/0057;
(Continued)

(56) References Cited

U.S. PATENT DOCUMENTS 9,184,941 B2 * 11/2015 Lee .................... H04L 25/0204
9,544,801 B2 *  1/2017 Han ...................... H04B 17/27
(Continued)

FOREIGN PATENT DOCUMENTS

AU    20200088406 A  * 11/2018
AU     2018237990 A1 * 10/2019  ............... H04L 5/00
(Continued)

OTHER PUBLICATIONS

R1-1717077; 3GPP TSG RAN WG1 Meeting #90bis; Prague, Czech Republic, Oct. 9-13, 2017; Agenda Item 7.3.4.1; Source: Huawei, HiSilicon; Title: Remaining issues on bandwidth part; Document for: Discussion and decision.

(Continued)

*Primary Examiner* — Eric Nowlin
(74) *Attorney, Agent, or Firm* — Arch & Lake LLP

(57) ABSTRACT

A wireless device transmits a capability message indicating that the wireless device supports a first number of channel state information (CSI) processes per bandwidth part of a cell. The wireless device receives, based on the wireless device supporting the first number of CSI processes per bandwidth part, CSI configuration parameters indicating a second number of CSI processes for a first bandwidth part. CSI reports for the second number of CSI processes are transmitted.

20 Claims, 53 Drawing Sheets

Related U.S. Application Data

(60) Provisional application No. 62/585,801, filed on Nov. 14, 2017, provisional application No. 62/583,654, filed on Nov. 9, 2017.

(51) Int. Cl.

| | |
|---|---|
| *H04L 5/00* | (2006.01) |
| *H04B 7/02* | (2018.01) |
| *H04W 24/00* | (2009.01) |
| *H04W 28/20* | (2009.01) |
| *H04W 74/08* | (2009.01) |

(52) U.S. Cl.
CPC .......... *H04L 5/0048* (2013.01); *H04L 5/0057* (2013.01); *H04L 5/0064* (2013.01); *H04L 5/0094* (2013.01); *H04L 5/0098* (2013.01); *H04W 24/00* (2013.01); *H04W 24/08* (2013.01); *H04W 28/20* (2013.01); *H04W 72/042* (2013.01); *H04W 72/0413* (2013.01); *H04W 74/085* (2013.01)

(58) Field of Classification Search
CPC ................. H04L 5/0064; H04L 5/0092; H04L 5/0094; H04L 5/0098; H04W 24/00; H04W 24/08; H04W 24/10; H04W 28/20; H04W 72/04; H04W 72/0413; H04W 72/042; H04W 72/0446; H04W 72/048; H04W 74/085
See application file for complete search history.

(56) References Cited

U.S. PATENT DOCUMENTS

| | | | | |
|---|---|---|---|---|
| 9,661,624 | B2* | 5/2017 | Awad | H04W 72/042 |
| 9,668,280 | B2 | 5/2017 | Wu et al. | |
| 9,787,504 | B2* | 10/2017 | Lee | H04B 7/024 |
| 9,900,788 | B2* | 2/2018 | Kim | H04W 72/06 |
| 10,154,490 | B2* | 12/2018 | Aiba | H04W 72/12 |
| 10,236,951 | B2* | 3/2019 | Park | H04B 7/04 |
| 10,484,973 | B2* | 11/2019 | Harrison | H04L 5/0082 |
| 10,602,389 | B2* | 3/2020 | Lee | H04W 24/10 |
| 10,708,802 | B2* | 7/2020 | Lunttila | H04L 5/0057 |
| 10,715,286 | B2* | 7/2020 | Chen | H04B 7/0413 |
| 10,757,566 | B2* | 8/2020 | He | H04W 8/24 |
| 10,771,207 | B2* | 9/2020 | Nishio | H04W 72/0473 |
| 10,879,985 | B2* | 12/2020 | Zhou | H04W 72/0453 |
| 11,109,358 | B2* | 8/2021 | Harrison | H04L 5/0082 |
| 11,190,255 | B2* | 11/2021 | Zhou | H04W 72/042 |
| 2009/0259910 | A1 | 10/2009 | Lee et al. | |
| 2011/0249578 | A1 | 10/2011 | Nayeb Nazar et al. | |
| 2013/0094410 | A1* | 4/2013 | Yang | H04L 5/001 370/280 |
| 2013/0195006 | A1* | 8/2013 | Kim | H04L 1/0026 370/315 |
| 2013/0310100 | A1* | 11/2013 | Lee | H04W 24/10 455/517 |
| 2014/0036664 | A1* | 2/2014 | Han | H04W 76/11 370/230 |
| 2014/0241319 | A1 | 8/2014 | Lee et al. | |
| 2015/0043458 | A1 | 2/2015 | Seo et al. | |
| 2015/0092698 | A1 | 4/2015 | Seo et al. | |
| 2015/0208387 | A1* | 7/2015 | Awad | H04W 72/042 370/329 |
| 2016/0007212 | A1* | 1/2016 | Kim | H04B 7/0486 370/254 |
| 2016/0065389 | A1* | 3/2016 | Lee | H04W 24/10 370/252 |
| 2016/0302224 | A1 | 10/2016 | Khairmode et al. | |
| 2016/0374069 | A1* | 12/2016 | Palm | H04L 5/0098 |
| 2017/0019163 | A1 | 1/2017 | Yoshimoto et al. | |
| 2017/0156152 | A1 | 6/2017 | Nazar et al. | |
| 2017/0164226 | A1* | 6/2017 | Wei | H04B 7/0478 |
| 2017/0366998 | A1 | 12/2017 | Lee et al. | |
| 2017/0374661 | A1* | 12/2017 | Aiba | H04W 24/10 |
| 2018/0049137 | A1* | 2/2018 | Li | H04B 17/309 |
| 2018/0102817 | A1* | 4/2018 | Park | H04B 7/06 |
| 2018/0160448 | A1 | 6/2018 | Blankenship et al. | |
| 2018/0219652 | A1* | 8/2018 | Chen | H04B 7/0626 |
| 2018/0234870 | A1* | 8/2018 | Lee | H04B 7/0626 |
| 2018/0359784 | A1 | 12/2018 | Agiwal et al. | |
| 2019/0007931 | A1* | 1/2019 | Harada | H04W 72/04 |
| 2019/0132080 | A1* | 5/2019 | Zheng | H04W 72/1284 |
| 2019/0132110 | A1* | 5/2019 | Zhou | H04W 76/38 |
| 2019/0141677 | A1* | 5/2019 | Harrison | H04L 5/0096 |
| 2019/0141722 | A1 | 5/2019 | Nayeb Nazar et al. | |
| 2019/0158155 | A1 | 5/2019 | Park et al. | |
| 2019/0159219 | A1* | 5/2019 | Hosseini | H04B 7/0628 |
| 2020/0045675 | A1* | 2/2020 | Harrison | H04W 72/04 |
| 2020/0228282 | A1* | 7/2020 | Kwak | H04L 1/00 |
| 2020/0245360 | A1* | 7/2020 | Xu | H04W 74/0833 |
| 2020/0280423 | A1* | 9/2020 | Tang | H04L 1/0027 |
| 2021/0385798 | A1* | 12/2021 | Harrison | H04L 5/0057 |

FOREIGN PATENT DOCUMENTS

| | | | | |
|---|---|---|---|---|
| AU | 2021204028 A1 * | 7/2021 | | H04L 5/00 |
| BR | 112019019691 A2 * | 4/2020 | | H04L 5/00 |
| CN | 102812658 A | 12/2012 | | |
| CN | 104350693 A * | 2/2015 | | H04B 17/24 |
| CN | 106063314 A | 10/2016 | | |
| CN | 106067845 A * | 11/2016 | | H04L 1/00 |
| CN | 107113045 A | 8/2017 | | |
| CN | 107409014 A * | 11/2017 | | H04L 1/0026 |
| CN | 107534540 A * | 1/2018 | | H04B 7/04 |
| CN | 104350693 B * | 4/2018 | | H04B 17/24 |
| CN | 108512786 A * | 9/2018 | | H04B 17/24 |
| CN | 108616346 A | 10/2018 | | |
| CN | 108737311 A | 11/2018 | | |
| CN | 110663214 A * | 1/2020 | | H04L 5/00 |
| CN | 107534540 B * | 10/2020 | | H04B 7/04 |
| CN | 111742514 A * | 10/2020 | | H04B 17/309 |
| CN | 107211305 B * | 11/2020 | | H04L 1/1812 |
| CN | 108512786 B * | 12/2020 | | H04B 17/24 |
| CN | 113708814 A * | 11/2021 | | H04B 17/309 |
| EP | 2665199 A1 * | 11/2013 | | H04B 17/24 |
| EP | 2763338 | 8/2014 | | |
| EP | 3240202 | 11/2017 | | |
| EP | 3253109 A1 * | 12/2017 | | H04L 1/1812 |
| EP | 2665199 B1 * | 8/2019 | | H04B 17/24 |
| EP | 3563511 A1 * | 11/2019 | | H04B 17/309 |
| EP | 3602933 A1 * | 2/2020 | | H04L 5/00 |
| EP | 3563511 B1 * | 6/2020 | | H04B 17/309 |
| EP | 3723321 A1 * | 10/2020 | | H04B 17/309 |
| JP | 2015520579 A * | 5/2013 | | |
| JP | WO2018012456 A1 * | 1/2015 | | |
| JP | 6203828 B2 * | 9/2017 | | H04B 17/24 |
| JP | 2020516140 A * | 3/2018 | | |
| JP | 2021503231 A * | 11/2018 | | |
| JP | 6901743 B2 * | 7/2021 | | H04B 17/309 |
| KR | 20030059073 A | 7/2003 | | |
| KR | 20100060031 A | 6/2010 | | |
| KR | 102055332 B1 * | 5/2013 | | |
| KR | 102147682 B1 * | 5/2013 | | |
| KR | 20150011354 A * | 5/2013 | | |
| KR | 20190139325 A * | 5/2013 | | |
| KR | 20140095543 A | 8/2014 | | |
| KR | 20150113928 A | 10/2015 | | |
| KR | 20160007686 A | 1/2016 | | |
| KR | 20160097226 A | 8/2016 | | |
| KR | 20160101183 A | 8/2016 | | |
| KR | 10-2017-0097702 A | 8/2017 | | |
| KR | 102343136 B1 * | 11/2018 | | |
| RU | 2729769 C1 * | 8/2020 | | H04L 5/00 |
| WO | 2011085230 | 7/2011 | | |
| WO | WO-2013172684 A1 * | 11/2013 | | H04B 17/24 |
| WO | 2015141619 A1 | 9/2015 | | |
| WO | WO-2016121440 A1 * | 8/2016 | | H04L 1/1812 |
| WO | WO-2016126063 A1 * | 8/2016 | | H04L 1/00 |
| WO | 2016163843 | 10/2016 | | |
| WO | WO-2016163843 A1 * | 10/2016 | | H04B 7/04 |
| WO | WO-2016163855 A1 * | 10/2016 | | H04L 1/00 |
| WO | 2017026873 | 2/2017 | | |

(56) References Cited

FOREIGN PATENT DOCUMENTS

| WO | WO-2017026873 A1 * | 2/2017 | ............ H04B 17/24 |
| WO | WO-2017027057 A1 * | 2/2017 | ............ H04W 8/24 |
| WO | WO-2018012456 A1 * | 1/2018 | ............ H04W 72/04 |
| WO | WO-2018173002 A1 * | 9/2018 | ............ H04L 5/00 |
| WO | 2018194352 A1 | 10/2018 | |
| WO | WO-2019099817 A1 * | 5/2019 | ............ H04B 17/309 |

OTHER PUBLICATIONS

R1-1717905; 3GPP TSG RAN WG1 Meeting #90bis; Prague, Czech Republic, Oct. 9-13, 2017; Agenda Item: 7.3.6 Source: Huawei, HiSilicon; Title: Bandwidth part activation and adaptation; Document for: Discussion and decision.
R2-1704158; 3GPP TSG-RAN WG2 Meeting #98; Hangzhou, China, May 15 -19, 2017; Agenda item: 10.3.1.4 Source: Samsung; Title: Random Access Procedure—Access Delay Minimisation; Document for: Discussion & Decision.
R2-1704783 (revision of R2-1703445); 3GPP TSG-RAN WG2 Meeting #98; Hangzhou, P.R. China, May 15-19, 2017; Agenda Item: 10.3.1.4; Source: Intel Corporation; Title: NR Random Access Multi-beam Aspects Document for: Discussion.
R2-1705441; 3GPP TSG-RAN WG2 Meeting #98; Hangzhou, China, May 15-19, 2017; Agenda item: 10.3.1.4; Source: Nokia, Alcatel-Lucent Shanghai Bell; Title: RACH in Multibeam System; WID/SID: NR_newRAT-Core—Release 15; Document for: Discussion and Decision.
Tdoc R2-1708585; 3GPP TSG-RAN WG2 #99; Berlin, Germany, Aug. 21-25, 2017; Agenda Item: 10.3.1.4.2; Source: Ericsson; Title: Beamforming impact on Random Access (and initial access); Document for: Discussion.
R2-1707681 ;3GPP TSG-RAN WG2 #99; Berlin, Germany, Aug. 21-25, 2017; Agenda item: 10.3.1.4.2; Source: Samsung; Title: Beamformed Random Access: RA Resources for SI Request; Document for: Discussion & Decision.
R2-1707782; 3GPP TSG-RAN2 #99; Berlin, Germany, Aug. 21-25, 2017; Agenda Item: 10.3.1.4.2; Source: OPPO; Title: Multiple preamble transmission related issue; Document for: Discussion and Decision.
R2-1708049; 3GPP TSG-RAN WG2 Meeting #99; Berlin, Germany, Aug. 21-25, 2017; Agenda Item: 10.3.1.4.2; Source: MediaTek Inc.; Title: RAR design supporting muiltiple preamble transmission; Document for: Discussion and Decision.
R2-1708143; 3GPP TSG-RAN WG2 Meeting #99; Berlin, Germany, Aug. 21-25, 2017; Source: ZTE; Title: Consideration on the RACH procedure; Agenda Item: 10.3.1.4.2; Document for Discussion and Decision.
R2-1708725; 3GPP TSG-RAN WG2 #99; Berlin, Germany, Aug. 21-25, 2017; Agenda Item: 10.3.1.4.2; Source: InterDigital Inc.; Title: PRACH Resource Configurations for Beamforming; Document for: Discussion, Decision.
R2-1708968; 3GPP TSG-RAN WG2 Meeting #99; Berlin, Germany, Aug. 21-25, 2017; Agenda item: 10.3.1.4.4; Source: Huawei, HiSilicon; Title: Calculation of RA-RNTI; Document for: Discussion and Decision.
R2-1709062; 3GPP TSG-RAN2 WG2 Meeting RAN2 #99; Berlin, Germany Aug. 21-25, 2017; Agenda Item : 10.3.1.4.2 (NR_newRAT-Core); Source : LG Electronics Inc.; Title : Random Access procedure for multi-beam operation; Document for: Discussion and Decision.
R2-179398; 3GPP TSG-RAN WG2 #99; Aug. 21-25, 2017; Berlin, Germany; Source: NTT Docomo, Inc.; Title: MAC impacts on RA procedure in multi-beam operation; Document for: Discussion and decision; Agenda Item: 10.3.1.4.2—RA in presence of multi-beam operation.
R2-1709422; 3GPP TSG-RAN WG2 #99; Berlin, Germany, Aug. 21-25, 2017; Agenda Item : 10.3.1.4.2; Title : Discussion on random access with multi-beam operations.
R2-1710357; 3GPP TSG-RAN WG2 Meeting #99bis; Prague, Czech Republic, Oct. 9-13, 2017; Agenda Item: 10.3.1.4.3; Source: Fujitsu; Title: RA-RNTI calculation; Document for: Decision.
R2-1711075; 3GPP TSG-RAN WG2 Meeting #99bis; Prague, Czech Republic, Oct. 9-13, 2017; Source: Ericsson; Title: Identify certification for drones; Agenda Item: 9.4.5; Document for: Discussion and Decision.
Tdoc R2-1711175; 3GPP TSG-RAN WG2 #99bis; Prague, Czech Republic, Oct. 9-13, 2017; Agenda Item: 10.3.1.4.3; Source: Ericsson; Title: RA-RNTI for NR; Document for: Discussion, Decision.
R2-1711609; 3GPP TSG-RAN WG2 Meeting #99bis; Prague, Czech Republic, Oct. 9-13, 2017; Agenda Item : 10.3.1.4.3 (NR_newRAT-Core); Source : LG Electronics Inc.; Title : Considerations for RA-RNTI calculation Document for : Discussion and Decision.
R2-1711835; 3GPP TSG-RAN WG2 Meeting #99bis; Prague, Czech Republic, Oct. 9-13, 2017; Agenda Item: 11.1.3; Source: Sesssion Chair (InterDigital); Title: Report from LTE and NR User Plane Break-Out Session.
3GPP TSG RAN WG1 Meeting 90bis; Prague, CZ, Oct. 9-13, 2017; Title: RAN1 Chairman's Notes.
3GPP TR 38.912 V14.0.0 (Mar. 2017); Technical Specification; 3rd Generation Partnership Project; Technical Specification Group Radio Access Network; Study on New Radio (NR) access technology (Release 14).
3GPP TR 38.802 V14.1.0 (Jun. 2017); Technical Report; 3rd Generation Partnership Project; Technical Specification Group Radio Access Network; Study on New Radio Access Technology; Physical Layer Aspects (Release 14).
3GPP TS 36.331 V14.3.0 (Jun. 2017); Technical Specification; 3rd Generation Partnership Project; Technical Specification Group Radio Access Network; Evolved Universal Terrestrial Radio Access (E-UTRA); Radio Resource Control (RRC); Protocol specification (Release 14).
3GPP TS 36.321 V14.3.0 (Jun. 2017); Technical Specification; 3rd Generation Partnership Project; Technical Specification Group Radio Access Network; Evolved Universal Terrestrial Radio Access (E-UTRA); Medium Access Control (MAC) protocol specification (Release 14).
3GPP TS 36.212 V14.3.0 (Jun. 2017); Technical Specification; 3rd Generation Partnership Project; Technical Specification Group Radio Access Network; Evolved Universal Terrestrial Radio Access (E-UTRA); Multiplexing and channel coding (Release 14).
3GPP TS 36.213 V14.3.0 (Jun. 2017); Technical Specification; 3rd Generation Partnership Project Technical Specification Group Radio Access Network; Evolved Universal Terrestrial Radio Access (E-UTRA); Physical layer procedures (Release 14).
3GPP TS 36.211 V14.3.0 (Jun. 2017); Technical Specification; 3rd Generation Partnership Project; Technical Specification Group Radio Access Network; Evolved Universal Terrestrial Radio Access (E-UTRA); Physical channels and modulation (Release 14).
International Search Report and Written Opinion dated Jun. 6, 2019, in PCT Application No. PCT/US2018/060114.
3GPP TS 36.306 V14.4.0 (Sep. 2017); 3rd Generation Partnership Project; Technical Specification Group Radio Access Network; Evolved Universal Terrestrial Radio Access (E-UTRA); User Equipment (UE) radio access capabilities (Release 14).
Extended European Search Report dated Nov. 26, 2019 in European Patent Application No. 19193577.4.
Guangdong OPPO Mobile Telecom, Bandwidth part based resource scheduling for carrier aggregation, Aug. 25, 2017, 3GPP, 3GPPTSG RAN WG1 Meeting #90, Tdoc: R1-1713265 (Year: 2017).
Huawei et al., On initial active bandwidth part, Oct. 13, 2017, 3GPP TSG RAN WG1 Meeting 90bis, Tdoc R1-1717057 (Year: 2017).
Intel Corporation Remaining details for bandwidth parts, Oct. 13, 2017, 3GPP, 3GPP TSG RAN WG1 Meeting 90bis, Tdoc: R1-1717400 (Year: 2017).
Vivo, Remaining details for bandwidth part operation, Oct. 13, 2017, 3GPP TSG RAN WG1 Meeting 90bis, Tdoc R1-1717504 (Year: 2017).
Samsung, On Bandwidth Part Operation, Oct. 13, 2017, 3GPP, 3GPP TSG RAN WG1 Nr 90bis, Tdoc: R1-1717675 (Year: 2017).

(56) References Cited

OTHER PUBLICATIONS

Huawei etal., Bandwidth part activation and adaptation, Oct. 13, 2017, 3GPP, 3GPP TSG RAN WG1 NR 90bis, Tdoc: R1-1717905 (Year: 2017).
LG Electronics, Remaining issues on bandwidth parts, Oct. 13, 2017, 3GPP, 3GPP TSG RAN WG1 NR 90bis, Tdoc: R1-1717972 (Year: 2017).
Oppo, Remaining issues on bandwidth part configuration and activation, Oct. 13, 2017, 3GPP, 3GPP TSG RAN WG1 NR 0bis, Tdoc: R1-1718050 (Year: 2017).
MediaTek Inc. "RRM Measurement Considering Bandwidth Part Operation" 3GPP TSG-RAN WG2 #99-bis R2-1710882, Prague, Czech, Oct. 9-13, 2017, (4p).
Interdigital, Inc. "Remaining details of BWP" 3GPP TSG RAN WG1 Meeting AH_NR#3 R1-1718365 Prague, CZ, Oct. 9-13, 2017, (6p).
First Office Action of Japanese Application No. 2020-519742, dated Oct. 16, 2020 with English translation, (6p).
Notice of Allowance of the U.S. Appl. No. 16/185,940, dated Apr. 22, 2020, (47p).
Notice of Allowance of the U.S. Appl. No. 16/185,917, dated Feb. 4, 2020, (29p).
Office Action, dated Nov. 26, 2020, in Chinese Patent Application No. 201880072598.1.
First Office Action of the Korean Application No. 10-2020-7016391, dated Jul. 24, 2021, (9p).
First Office Action of the U.S. Appl. No. 16/999,652, dated Aug. 9, 2021, (10p).

\* cited by examiner

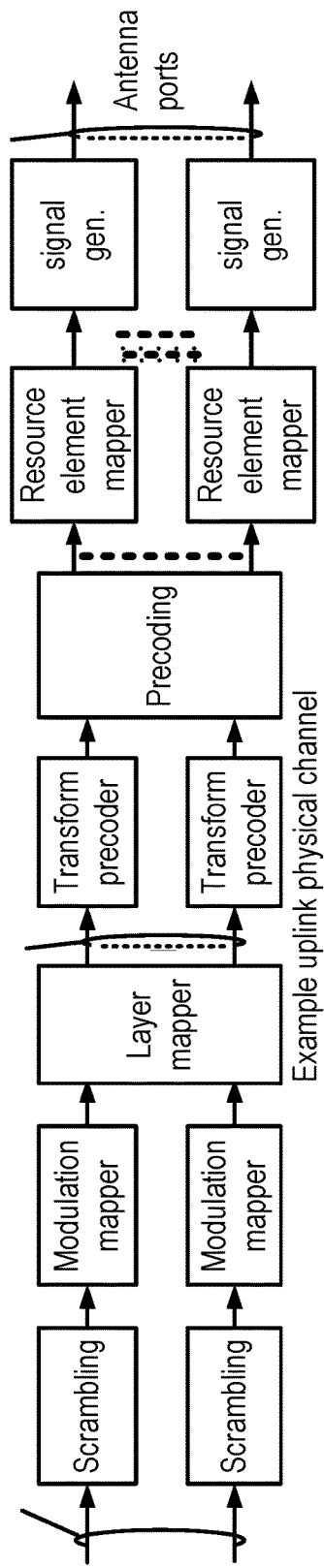
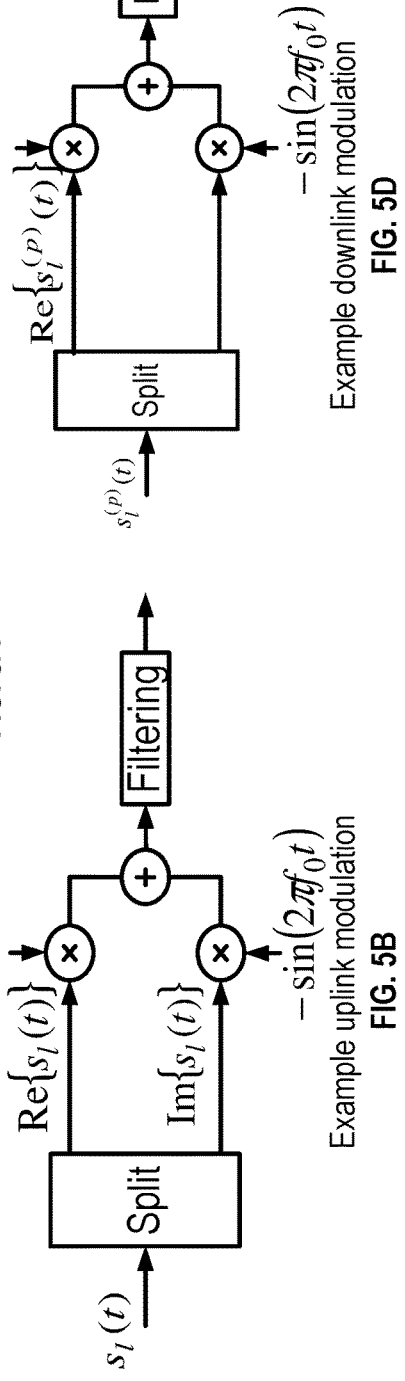
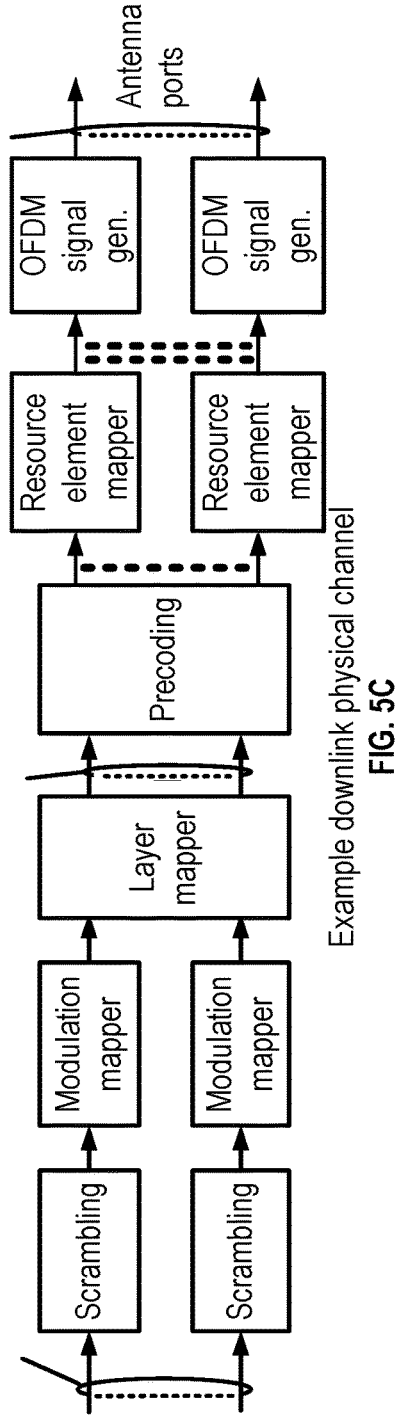
FIG. 5A Example uplink physical channel
FIG. 5B Example uplink modulation
FIG. 5D Example downlink modulation
FIG. 5C Example downlink physical channel gNB connected to NGC eLTE eNB connected to NGC

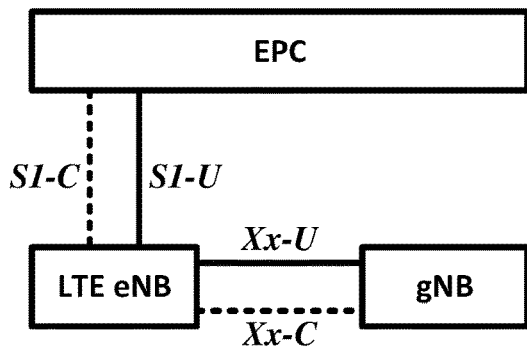

LTE eNB connected to EPC with non-standalone gNB. gNB user plane connected to EPC via LTE eNB.
FIG. 11A

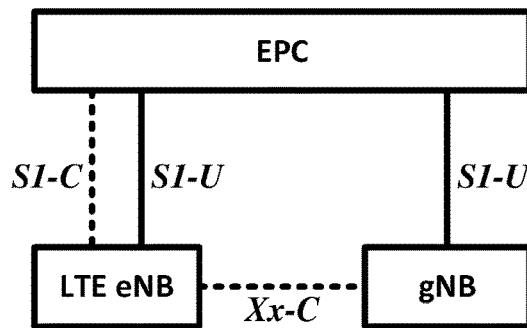

LTE eNB connected to EPC with non-standalone gNB. gNB user plane connected to EPC directly.
FIG. 11B

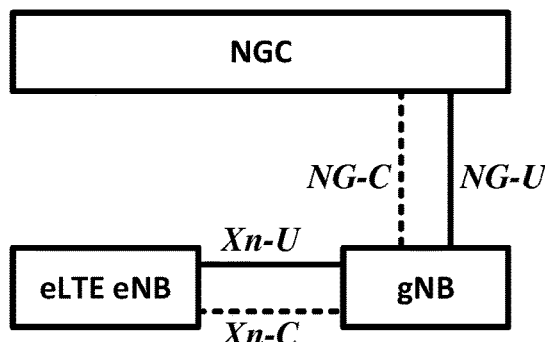

gNB connected to NGC with non-standalone eLTE eNB. eLTE eNB user plane connected to NGC via gNB.
FIG. 11C

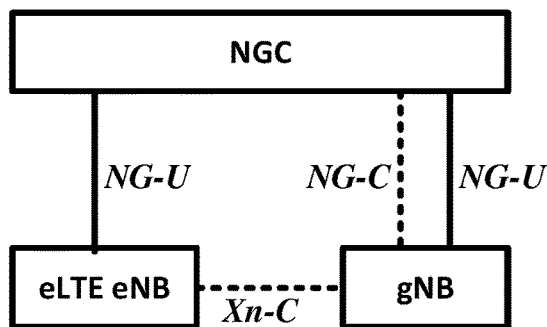

gNB connected to NGC with non-standalone eLTE eNB. eLTE eNB user plane connected to NGC directly.
FIG. 11D

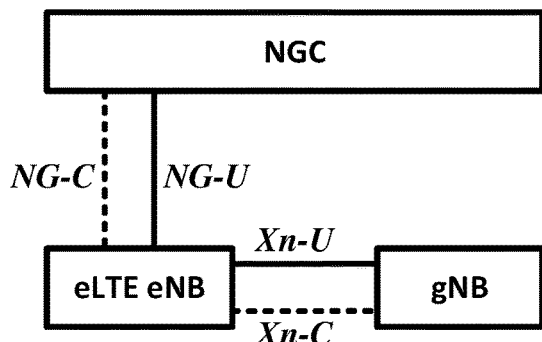

eLTE eNB connected to NGC with non-standalone gNB. gNB user plane connected to NGC via eLTE eNB.
FIG. 11E

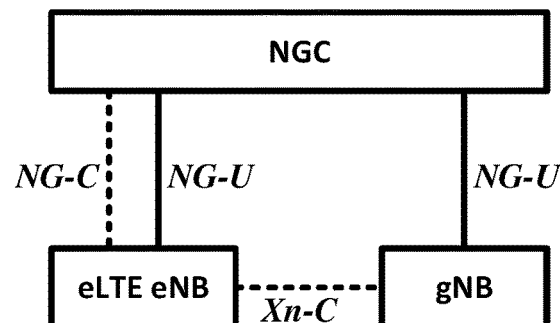

eLTE eNB connected to NGC with non-standalone gNB. gNB user plane connected to NGC directly.
FIG. 11F Radio protocol architecture for split bearer and SCG bearer. LTE eNB connected to EPC with non-standalone gNB.

Radio protocol architecture for split bearer and SCG bearer. gNB connected to NGC with non-standalone eLTE eNB.

Radio protocol architecture for split bearer and SCG bearer. eLTE eNB connected to NGC with non-standalone gNB.

Non-centralized deployment

Centralized deployment

Beam failure in one TRP

Beam failure in multiple TRPs

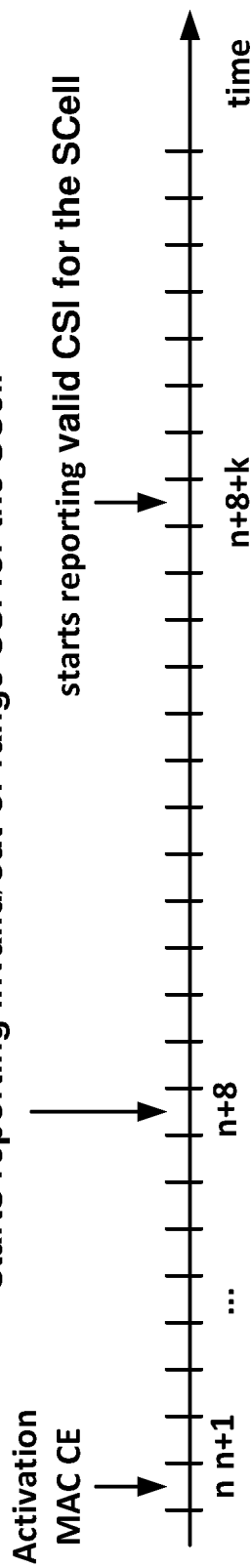
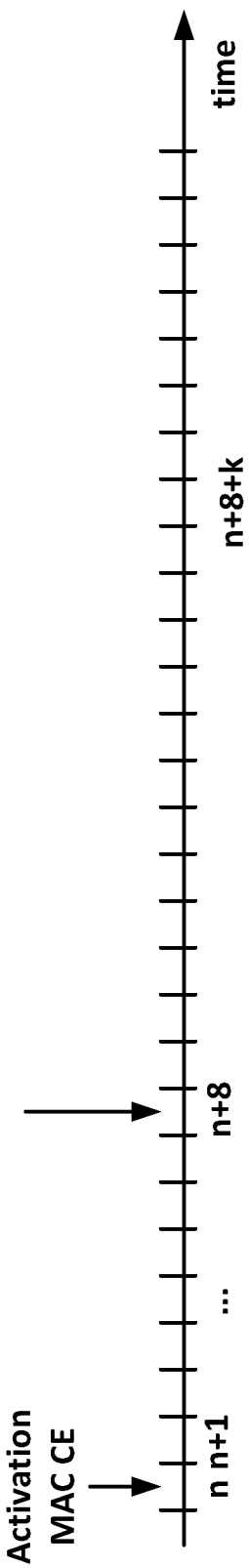
FIG. 25A
FIG. 25B

|  | DCI format | Example size (Bits) | Usage |
|---|---|---|---|
| Uplink | 0 | 45 | Uplink scheduling grant |
| | 4 | 53 | Uplink scheduling grant with spatial multiplexing |
| | 6-0A, 6-0B | 46, 36 | Uplink scheduling grant for eMTC devices |
| Downlink | 1C | 31 | Special purpose compact assignment |
| | 1A | 45 | Contiguous allocation only |
| | 1B | 46 | Codebook-based beamforming using CRS |
| | 1D | 46 | MU-MIMO using CRS |
| | 1 | 55 | Flexible allocations |
| | 2A | 64 | Open-loop spatial multiplexing using CRS |
| | 2B | 64 | Dual-layer transmission using DM-RS (TM8) |
| | 2C | 66 | Multi-layer transmission using DM-RS (TM9) |
| | 2D | 68 | Multi-layer transmission using DM-RS (TM9) |
| | 2 | 67 | Closed-loop spatial multiplexing using CRS |
| | 6-1A, 6-1B | 46, 36 | Downlink scheduling grants for eMTC devices |
| Special | 3, 3A | 45 | Power control commands |
| | 5 | | Sidelink operation |
| | 6-2 | | Paging/direct indication for eMTC devices |

FIG. 26

Transmit, by a wireless device to a base station, capability message(s) indicating that the wireless device supports a 1st number of CSI processes per bandwidth part of a cell
4010

Receive 2nd message(s) comprising: 1st configuration parameters of a 1st bandwidth parts of a 1st cell, the 1st plurality of bandwidth parts comprising a 1st bandwidth part; 2nd configuration parameters indicating a CSI reference signal resources; and 3rd configuration parameters of a 2nd number of CSI processes for the 1st bandwidth part, where the 2nd number is smaller than or equal to the 1st number
4020

Measure 1st reference signals received via the CSI reference signal resources
4030

Transmit CSI for the 2nd number of CSI processes based on the measuring
4040

FIG. 40

Transmit, by a wireless device, capability message(s) indicating that the wireless device supports a 1st number of CSI processes per bandwidth part of a cell
4110

Receive, based on the wireless device supporting the first number of CSI processes per bandwidth part, CSI configuration parameters indicating a 2nd number of CSI processes for a 1st bandwidth part, where the 2nd number is smaller than or equal to the 1st number
4120

Transmit CSI reports for the 2nd number of CSI processes
4130

FIG. 41

Transmit, by a wireless device to a base station, capability message(s) indicating that the wireless device supports reporting semi-CSI via an uplink channel
4310

Receive, based on the wireless device supporting the reporting semi-persistent CSI, 2nd message(s) comprising semi-persistent CSI configuration parameters
4320

Receive an activation command indicating activation of semi-persistent CSI reports via the uplink channel
4330

Transmit, via the uplink channel, the semi-persistent CSI reports in response to the activation and based on the semi-persistent CSI configuration parameters
4340

FIG. 43

CHANNEL STATE INFORMATION REPORTS PER BANDWIDTH PART OF A CELL

CROSS-REFERENCE TO RELATED APPLICATIONS

This application is a continuation of U.S. patent application Ser. No. 16/185,917, filed Nov. 9, 2018, which claims the benefit of U.S. Provisional Application No. 62/583,654, filed Nov. 9, 2017, and U.S. Provisional Application No. 62/585,801, filed Nov. 14, 2017, which are hereby incorporated by reference in its entirety.

BRIEF DESCRIPTION OF THE SEVERAL VIEWS OF THE DRAWINGS

Examples of several of the various embodiments of the present invention are described herein with reference to the drawings.

FIG. 5A, FIG. 5B, FIG. 5C and FIG. 5D are example diagrams for uplink and downlink signal transmission as per an aspect of an embodiment of the present disclosure.

FIG. 11A, FIG. 11B, FIG. 11C, FIG. 11D, FIG. 11E, and FIG. 11F are example diagrams for architectures of tight interworking between 5G RAN (e.g. gNB) and LTE RAN (e.g. (e)LTE eNB) as per an aspect of an embodiment of the present disclosure.

FIG. 25A is an example diagram for timing for CSI report when activation of a secondary cell as per an aspect of an embodiment of the present disclosure.

FIG. 25B is an example diagram for timing for CSI report when activation of a secondary cell as per an aspect of an embodiment of the present disclosure.

FIG. 26 is an example diagram for downlink control information (DCI) formats as per an aspect of an embodiment of the present disclosure.

FIG. 40 is a flow diagram of an aspect of an embodiment of the present disclosure.

FIG. 41 is a flow diagram of an aspect of an embodiment of the present disclosure.

FIG. 43 is a flow diagram of an aspect of an embodiment of the present disclosure.

DETAILED DESCRIPTION OF EMBODIMENTS

Figure 1:
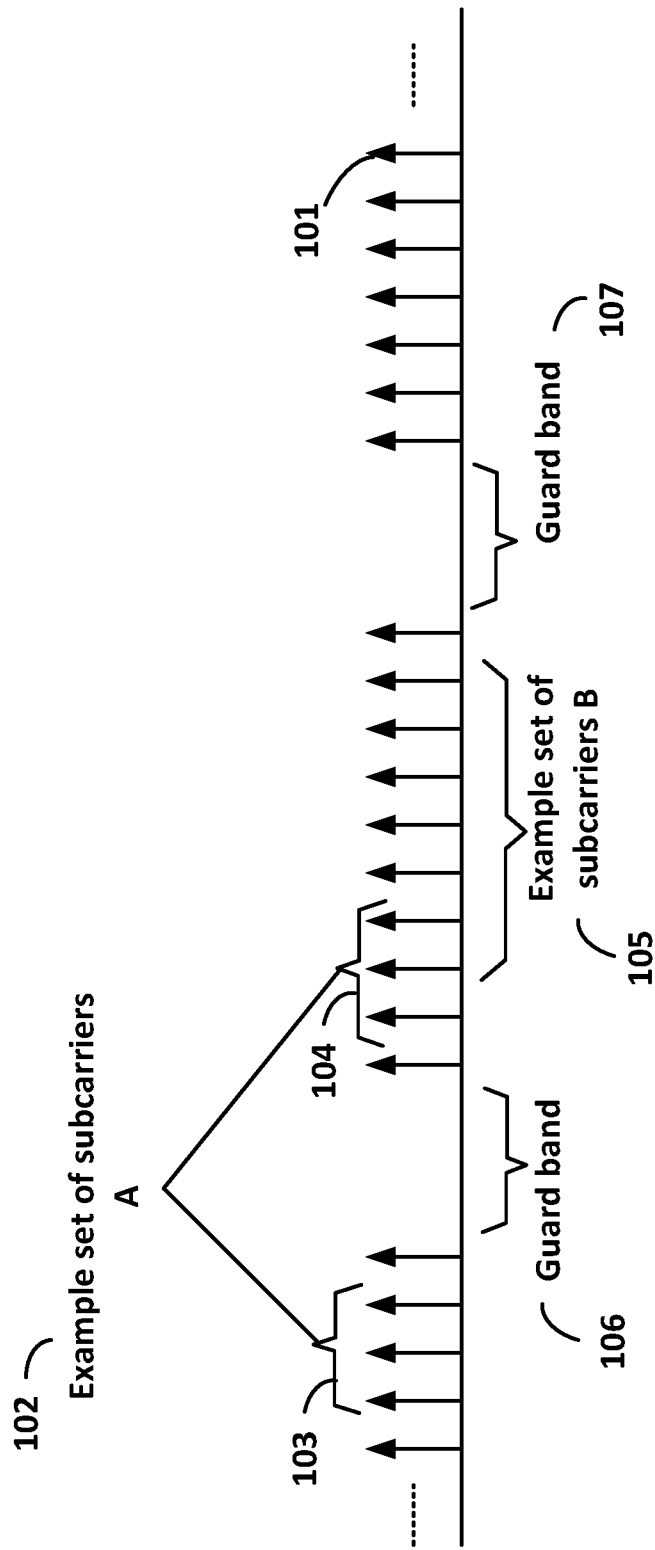
FIG. 1 is a diagram depicting example sets of OFDM subcarriers as per an aspect of an embodiment of the present disclosure.

Example embodiments of the present invention enable operation of carrier aggregation. Embodiments of the technology disclosed herein may be employed in the technical field of multicarrier communication systems. More particularly, the embodiments of the technology disclosed herein may relate to wireless device capability and random access in a multicarrier communication system.

The following Acronyms are used throughout the present disclosure:
ASIC application-specific integrated circuit
BPSK binary phase shift keying
CA carrier aggregation
CC component carrier
CDMA code division multiple access
CP cyclic prefix
CPLD complex programmable logic devices
CSI channel state information
CSS common search space
CU central unit
DC dual connectivity
DCI downlink control information
DL downlink
DU distributed unit
eMBB enhanced mobile broadband
EPC evolved packet core
E-UTRAN evolved-universal terrestrial radio access network
FDD frequency division multiplexing
FPGA field programmable gate arrays
Fs-C Fs-control plane
Fs-U Fs-user plane
gNB next generation node B
HDL hardware description languages
HARQ hybrid automatic repeat request
IE information element
LTE long term evolution
MAC media access control
MCG master cell group
MeNB master evolved node B
MIB master information block
MME mobility management entity
mMTC massive machine type communications
NAS non-access stratum
NGC next generation core
NG CP next generation control plane core
NG-C NG-control plane
NG-U NG-user plane
NR new radio
NR MAC new radio MAC
NR PHY new radio physical
NR PDCP new radio PDCP
NR RLC new radio RLC
NR RRC new radio RRC
NSSAI network slice selection assistance information
OFDM orthogonal frequency division multiplexing
PCC primary component carrier
PCell primary cell
PDCCH physical downlink control channel
PDCP packet data convergence protocol
PDU packet data unit
PHICH physical HARQ indicator channel
PHY physical
PLMN public land mobile network
PSCell primary secondary cell
pTAG primary timing advance group
PUCCH physical uplink control channel
PUSCH physical uplink shared channel
QAM quadrature amplitude modulation
QPSK quadrature phase shift keying
RA random access
RB resource blocks
RBG resource block groups
RLC radio link control
RRC radio resource control
SCC secondary component carrier
SCell secondary cell
SCG secondary cell group
SC-OFDM single carrier-OFDM
SDU service data unit
SeNB secondary evolved node B
SIB system information block
SFN system frame number
sTAGs secondary timing advance group
S-GW serving gateway
SRB signaling radio bearer TA timing advance
TAG timing advance group
TAI tracking area identifier
TAT time alignment timer
TB transport block
TDD time division duplexing
TDMA time division multiple access
TTI transmission time interval
UE user equipment
UL uplink
UPGW user plane gateway
URLLC ultra-reliable low-latency communications
VHDL VHSIC hardware description language
Xn-C Xn-control plane
Xn-U Xn-user plane
Xx-C Xx-control plane
Xx-U Xx-user plane Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, 1024-QAM and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present disclosure. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
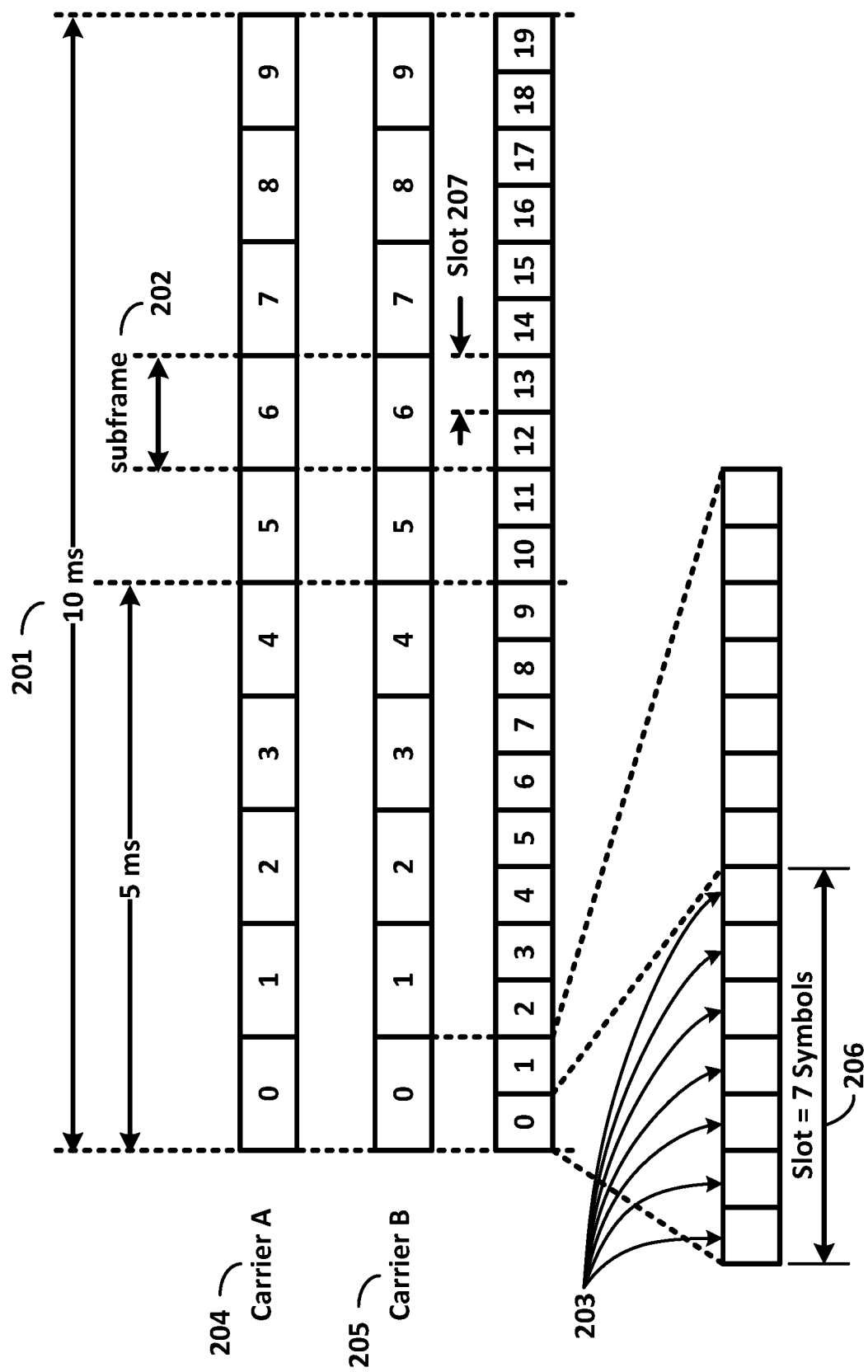
FIG. 2 is a diagram depicting an example transmission time and reception time for two carriers in a carrier group as per an aspect of an embodiment of the present disclosure.

FIG. 2 is a diagram depicting an example transmission time and reception time for two carriers as per an aspect of an embodiment of the present disclosure. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may comprise of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may contain all downlink, all uplink, or a downlink part and an uplink part and/or alike. Slot aggregation may be supported, e.g., data transmission may be scheduled to span one or multiple slots. In an example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
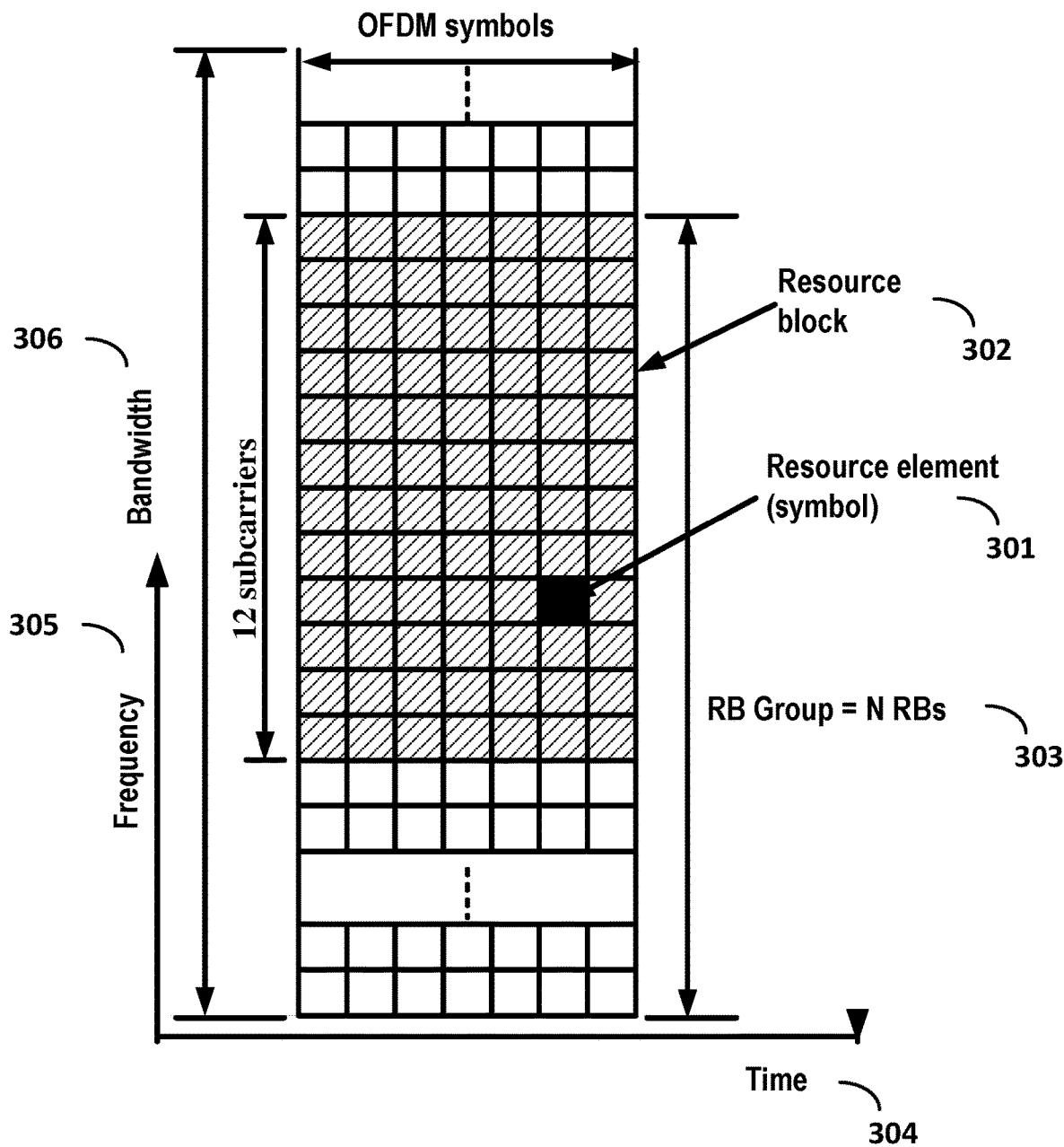
FIG. 3 is a diagram depicting OFDM radio resources as per an aspect of an embodiment of the present disclosure.

FIG. 3 is a diagram depicting OFDM radio resources as per an aspect of an embodiment of the present disclosure. The resource grid structure in time 304 and frequency 305 is illustrated in FIG. 3. The quantity of downlink subcarriers or RBs may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements.

Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

In an example embodiment, multiple numerologies may be supported. In an example, a numerology may be derived by scaling a basic subcarrier spacing by an integer N. In an example, scalable numerology may allow at least from 15 kHz to 480 kHz subcarrier spacing. The numerology with 15 kHz and scaled numerology with different subcarrier spacing with the same CP overhead may align at a symbol boundary every 1 ms in a NR carrier.

FIG. 5A, FIG. 5B, FIG. 5C and FIG. 5D are example diagrams for uplink and downlink signal transmission as per an aspect of an embodiment of the present disclosure. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for an antenna port, and/or the like.

Example modulation and up-conversion to the carrier frequency of the complex-valued DFTS-OFDM/SC-FDMA baseband signal for an antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in codewords to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port, and/or the like.

Example modulation and up-conversion to the carrier frequency of the complex-valued OFDM baseband signal for an antenna port is shown in FIG. 5D. Filtering may be employed prior to transmission.

Figure 4:
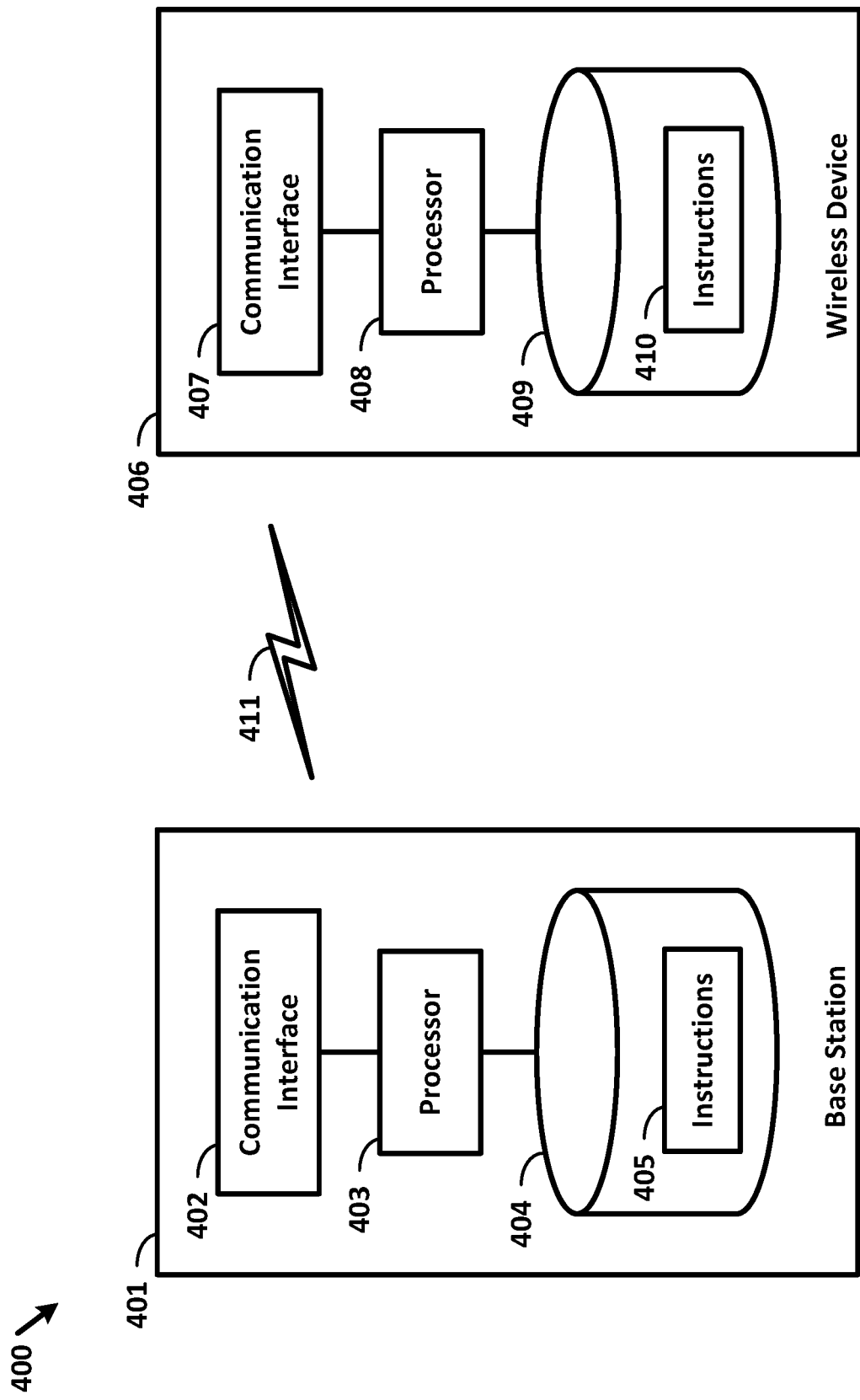
FIG. 4 is a block diagram of a base station and a wireless device as per an aspect of an embodiment of the present disclosure.

FIG. 4 is an example block diagram of a base station 401 and a wireless device 406, as per an aspect of an embodiment of the present disclosure. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

Figure 10A:
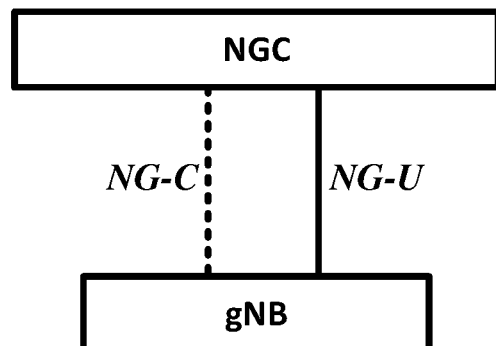
FIG. 10A and FIG. 10B are example diagrams for interfaces between a 5G core network (e.g. NGC) and base stations (e.g. gNB and eLTE eNB) as per an aspect of an embodiment of the present disclosure.
Figure 10B:
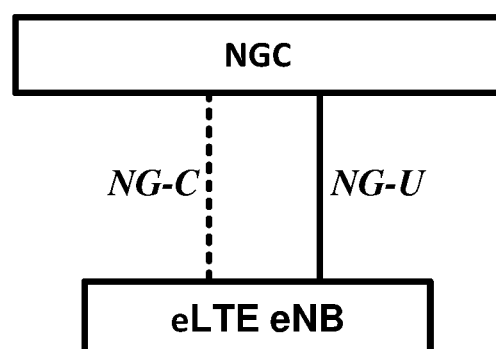

According to some of the various aspects of embodiments, a 5G network may include a multitude of base stations, providing a user plane NR PDCP/NR RLC/NR MAC/NR PHY and control plane (NR RRC) protocol terminations towards the wireless device. The base station(s) may be interconnected with other base station(s) (e.g. employing an Xn interface). The base stations may also be connected employing, for example, an NG interface to an NGC. FIG. 10A and FIG. 10B are example diagrams for interfaces between a 5G core network (e.g. NGC) and base stations (e.g. gNB and eLTE eNB) as per an aspect of an embodiment of the present disclosure. For example, the base stations may be interconnected to the NGC control plane (e.g. NG CP) employing the NG-C interface and to the NGC user plane (e.g. UPGW) employing the NG-U interface. The NG interface may support a many-to-many relation between 5G core networks and base stations.

A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

Figure 6:
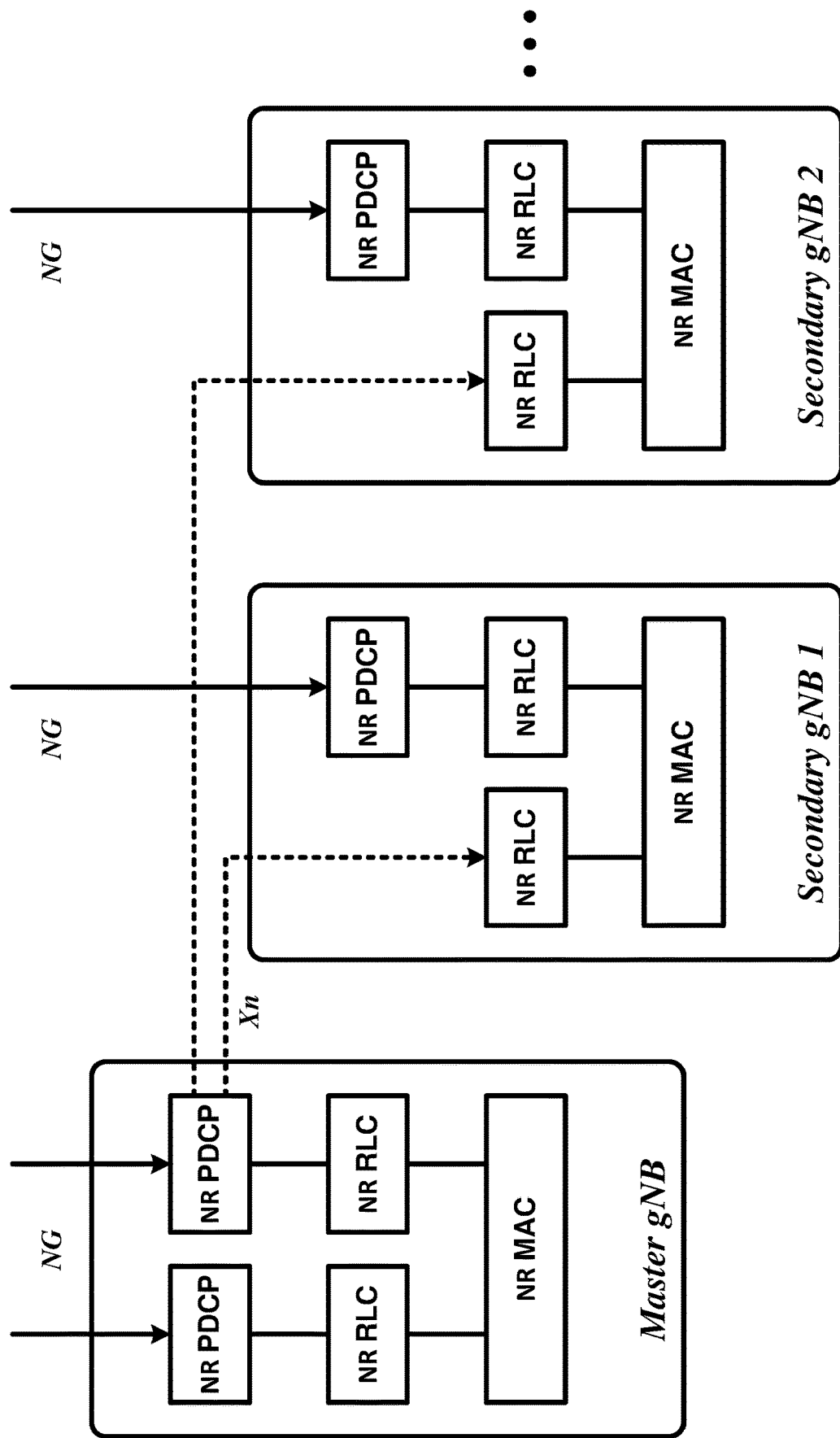
FIG. 6 is an example diagram for a protocol structure with multi-connectivity as per an aspect of an embodiment of the present disclosure.
Figure 7:
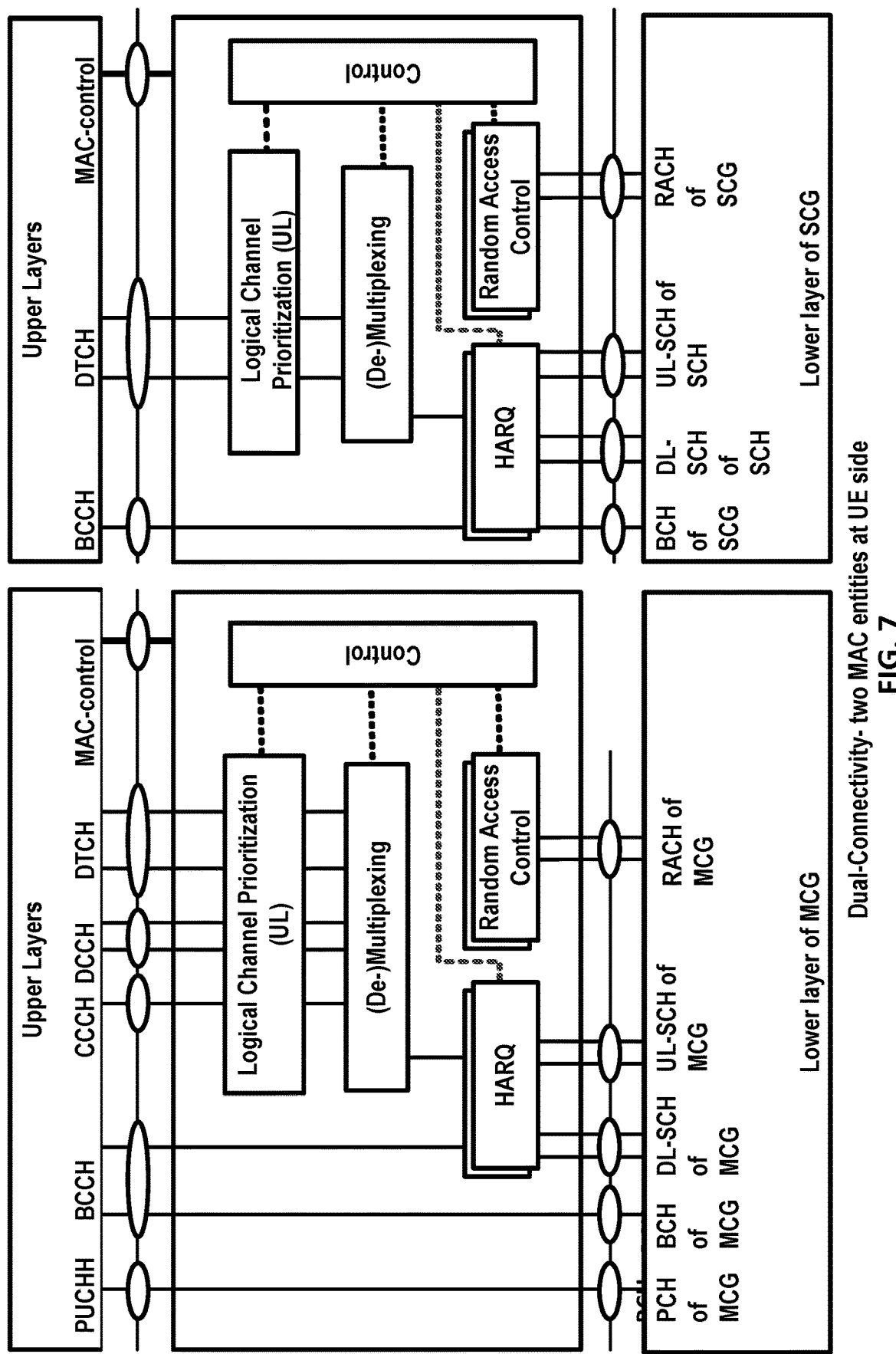
FIG. 7 is an example diagram for a protocol structure with CA and DC as per an aspect of an embodiment of the present disclosure.

FIG. 6 and FIG. 7 are example diagrams for protocol structure with CA and multi-connectivity as per an aspect of an embodiment of the present disclosure. NR may support multi-connectivity operation whereby a multiple RX/TX UE in RRC_CONNECTED may be configured to utilize radio resources provided by multiple schedulers located in multiple gNBs connected via a non-ideal or ideal backhaul over the Xn interface. gNBs involved in multi-connectivity for a certain UE may assume two different roles: a gNB may either act as a master gNB or as a secondary gNB. In multi-connectivity, a UE may be connected to one master gNB and one or more secondary gNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In multi-connectivity, the radio protocol architecture that a particular bearer uses may depend on how the bearer is setup. Three examples of bearers, including, an MCG bearer, an SCG bearer and a split bearer as shown in FIG. 6. NR RRC may be located in master gNB and SRBs may be configured as a MCG bearer type and may use the radio resources of the master gNB. Multi-connectivity may also be described as having at least one bearer configured to use radio resources provided by the secondary gNB. Multi-connectivity may or may not be configured/implemented in example embodiments of the disclosure.

In the case of multi-connectivity, the UE may be configured with multiple NR MAC entities: one NR MAC entity for master gNB, and other NR MAC entities for secondary gNBs. In multi-connectivity, the configured set of serving cells for a UE may comprise of two subsets: the Master Cell Group (MCG) containing the serving cells of the master gNB, and the Secondary Cell Groups (SCGs) containing the serving cells of the secondary gNBs. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of NR RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master gNB may be informed by the UE of a SCG failure type, for split bearer, the DL data transfer over the master gNB is maintained; the NR RLC AM bearer may be configured for the split bearer; like PCell, PSCell may not be de-activated; PSCell may be changed with a SCG change (e.g. with security key change and a RACH procedure); and/or a direct bearer type change between a Split bearer and a SCG bearer or simultaneous configuration of a SCG and a Split bearer may or may not supported.

With respect to the interaction between a master gNB and secondary gNBs for multi-connectivity, one or more of the following principles may be applied: the master gNB may maintain the RRM measurement configuration of the UE and may, (e.g., based on received measurement reports or traffic conditions or bearer types), decide to ask a secondary gNB to provide additional resources (serving cells) for a UE; upon receiving a request from the master gNB, a secondary gNB may create a container that may result in the configuration of additional serving cells for the UE (or decide that it has no resource available to do so); for UE capability coordination, the master gNB may provide (part of) the AS configuration and the UE capabilities to the secondary gNB; the master gNB and the secondary gNB may exchange information about a UE configuration by employing of NR RRC containers (inter-node messages) carried in Xn messages; the secondary gNB may initiate a reconfiguration of its existing serving cells (e.g., PUCCH towards the secondary gNB); the secondary gNB may decide which cell is the PSCell within the SCG; the master gNB may or may not change the content of the NR RRC configuration provided by the secondary gNB; in the case of a SCG addition and a SCG SCell addition, the master gNB may provide the latest measurement results for the SCG cell(s); both a master gNB and secondary gNBs may know the SFN and subframe offset of each other by OAM, (e.g., for the purpose of DRX alignment and identification of a measurement gap). In an example, when adding a new SCG SCell, dedicated NR RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

Figure 8:
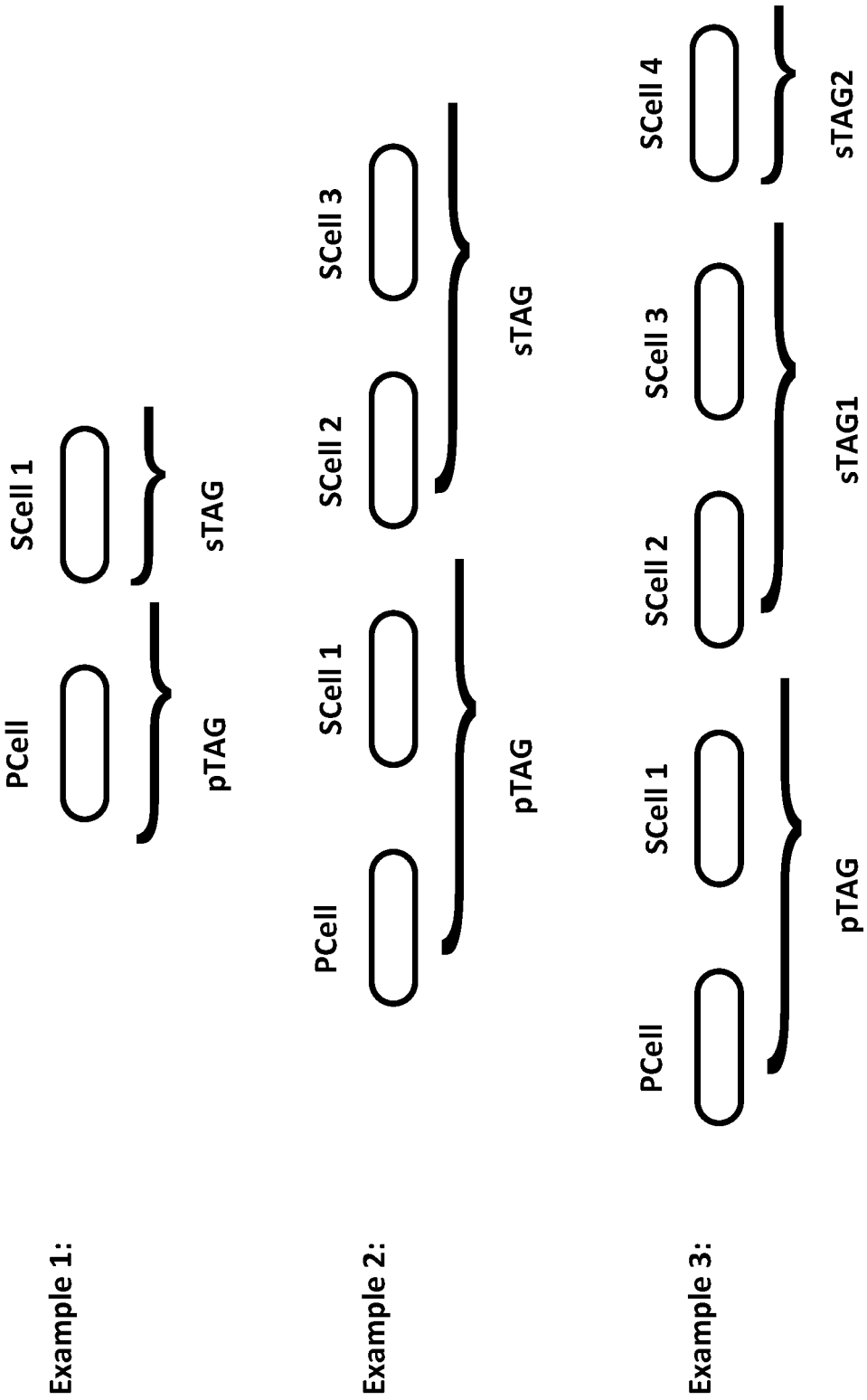
FIG. 8 shows example TAG configurations as per an aspect of an embodiment of the present disclosure.

FIG. 8 shows example TAG configurations as per an aspect of an embodiment of the present disclosure. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
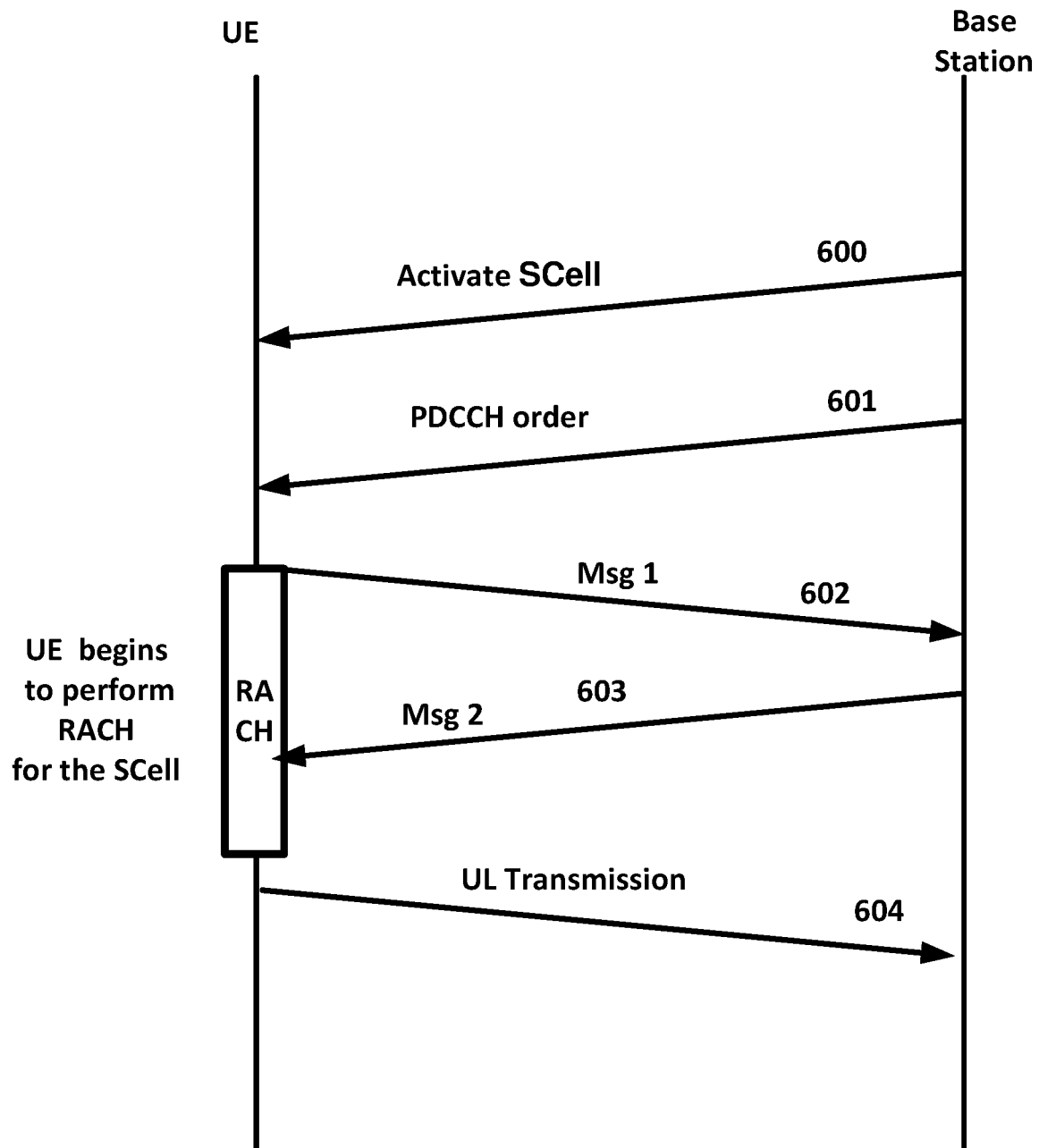
FIG. 9 is an example message flow in a random access process in a secondary TAG as per an aspect of an embodiment of the present disclosure.

FIG. 9 is an example message flow in a random access process in a secondary TAG as per an aspect of an embodiment of the present disclosure. An eNB transmits an activation command 900 to activate an SCell. A preamble 902 (Msg1) may be sent by a UE in response to a PDCCH order 901 on an SCell belonging to an sTAG. In an example embodiment, preamble transmission for SCells may be controlled by the network using PDCCH format 1A. Msg2 message 903 (RAR: random access response) in response to the preamble transmission on the SCell may be addressed to RA-RNTI in a PCell common search space (CSS). Uplink packets 904 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding(configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may be a member of the pTAG.

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the disclosure may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

FIG. 11A, FIG. 11B, FIG. 11C, FIG. 11D, FIG. 11E, and FIG. 11F are example diagrams for architectures of tight interworking between 5G RAN and LTE RAN as per an aspect of an embodiment of the present disclosure. The tight interworking may enable a multiple RX/TX UE in RRC_CONNECTED to be configured to utilize radio resources provided by two schedulers located in two base stations (e.g. (e)LTE eNB and gNB) connected via a non-ideal or ideal backhaul over the Xx interface between LTE eNB and gNB or the Xn interface between eLTE eNB and gNB. Base stations involved in tight interworking for a certain UE may assume two different roles: a base station may either act as a master base station or as a secondary base station. In tight interworking, a UE may be connected to one master base station and one secondary base station. Mechanisms implemented in tight interworking may be extended to cover more than two base stations.

In FIG. 11A and FIG. 11B, a master base station may be an LTE eNB, which may be connected to EPC nodes (e.g. to an MME via the S1-C interface and to an S-GW via the S1-U interface), and a secondary base station may be a gNB, which may be a non-standalone node having a control plane connection via an Xx-C interface to an LTE eNB. In the tight interworking architecture of FIG. 11A, a user plane for a gNB may be connected to an S-GW through an LTE eNB via an Xx-U interface between LTE eNB and gNB and an S1-U interface between LTE eNB and S-GW. In the architecture of FIG. 11B, a user plane for a gNB may be connected directly to an S-GW via an S1-U interface between gNB and S-GW.

In FIG. 11C and FIG. 11D, a master base station may be a gNB, which may be connected to NGC nodes (e.g. to a control plane core node via the NG-C interface and to a user plane core node via the NG-U interface), and a secondary base station may be an eLTE eNB, which may be a non-standalone node having a control plane connection via an Xn-C interface to a gNB. In the tight interworking architecture of FIG. 11C, a user plane for an eLTE eNB may be connected to a user plane core node through a gNB via an Xn-U interface between eLTE eNB and gNB and an NG-U interface between gNB and user plane core node. In the architecture of FIG. 11D, a user plane for an eLTE eNB may be connected directly to a user plane core node via an NG-U interface between eLTE eNB and user plane core node.

In FIG. 11E and FIG. 11F, a master base station may be an eLTE eNB, which may be connected to NGC nodes (e.g. to a control plane core node via the NG-C interface and to a user plane core node via the NG-U interface), and a secondary base station may be a gNB, which may be a non-standalone node having a control plane connection via an Xn-C interface to an eLTE eNB. In the tight interworking architecture of FIG. 11E, a user plane for a gNB may be connected to a user plane core node through an eLTE eNB via an Xn-U interface between eLTE eNB and gNB and an NG-U interface between eLTE eNB and user plane core node. In the architecture of FIG. 11F, a user plane for a gNB may be connected directly to a user plane core node via an NG-U interface between gNB and user plane core node.

Figure 12A:
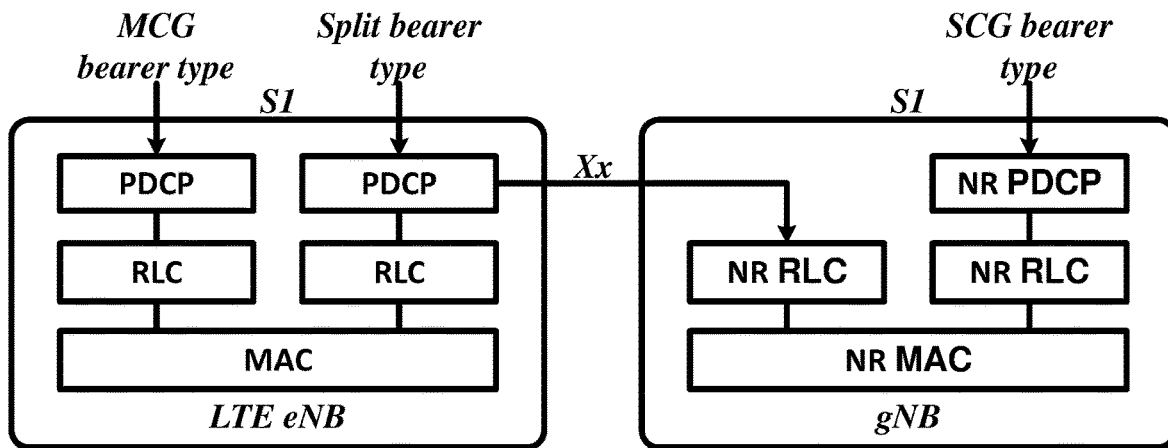
FIG. 12A, FIG. 12B, and FIG. 12C are example diagrams for radio protocol structures of tight interworking bearers as per an aspect of an embodiment of the present disclosure.
Figure 12B:
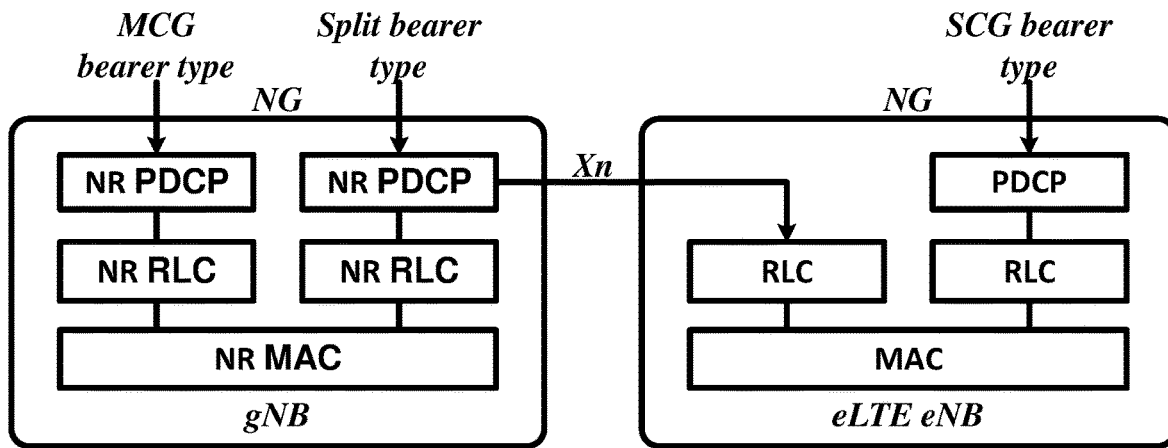
Figure 12C:
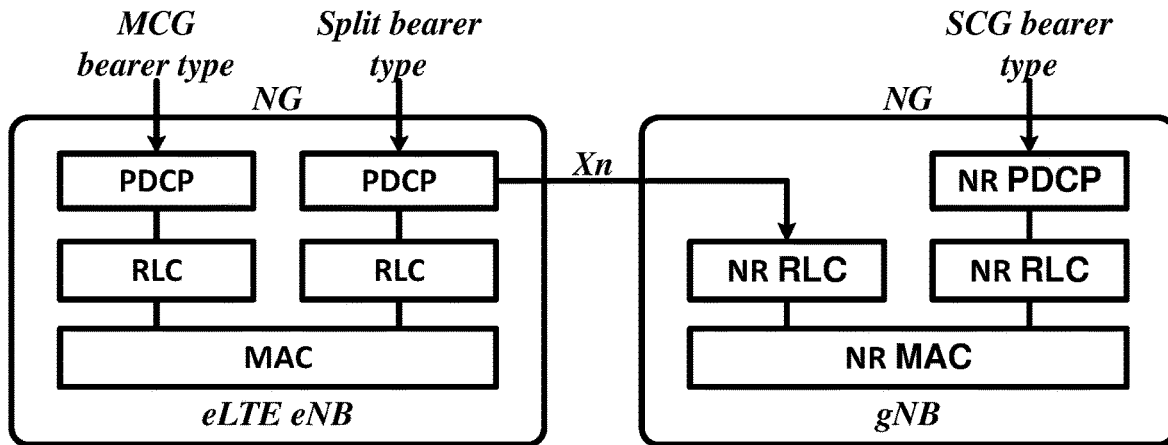

FIG. 12A, FIG. 12B, and FIG. 12C are example diagrams for radio protocol structures of tight interworking bearers as per an aspect of an embodiment of the present disclosure. In FIG. 12A, an LTE eNB may be a master base station, and a gNB may be a secondary base station. In FIG. 12B, a gNB may be a master base station, and an eLTE eNB may be a secondary base station. In FIG. 12C, an eLTE eNB may be a master base station, and a gNB may be a secondary base station. In 5G network, the radio protocol architecture that a particular bearer uses may depend on how the bearer is setup. Three example bearers including an MCG bearer, an SCG bearer, and a split bearer as shown in FIG. 12A, FIG. 12B, and FIG. 12C. NR RRC may be located in master base station, and SRBs may be configured as an MCG bearer type and may use the radio resources of the master base station. Tight interworking may also be described as having at least one bearer configured to use radio resources provided by the secondary base station. Tight interworking may or may not be configured/implemented in example embodiments of the disclosure.

In the case of tight interworking, the UE may be configured with two MAC entities: one MAC entity for master base station, and one MAC entity for secondary base station. In tight interworking, the configured set of serving cells for a UE may comprise of two subsets: the Master Cell Group (MCG) containing the serving cells of the master base station, and the Secondary Cell Group (SCG) containing the serving cells of the secondary base station. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one split bearer; upon detection of a physical layer problem or a random access problem on a PSCell, or the maximum number of (NR) RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master base station may be informed by the UE of a SCG failure type, for split bearer, the DL data transfer over the master base station is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a master base station and a secondary base station, one or more of the following principles may be applied: the master base station may maintain the RRM measurement configuration of the UE and may, (e.g., based on received measurement reports, traffic conditions, or bearer types), decide to ask a secondary base station to provide additional resources (serving cells) for a UE; upon receiving a request from the master base station, a secondary base station may create a container that may result in the configuration of additional serving cells for the UE (or decide that it has no resource available to do so); for UE capability coordination, the master base station may provide (part of) the AS configuration and the UE capabilities to the secondary base station; the master base station and the secondary base station may exchange information about a UE configuration by employing of RRC containers (inter-node messages) carried in Xn or Xx messages; the secondary base station may initiate a reconfiguration of its existing serving cells (e.g., PUCCH towards the secondary base station); the secondary base station may decide which cell is the PSCell within the SCG; the master base station may not change the content of the RRC configuration provided by the secondary base station; in the case of a SCG addition and a SCG SCell addition, the master base station may provide the latest measurement results for the SCG cell(s); both a master base station and a secondary base station may know the SFN and subframe offset of each other by OAM, (e.g., for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

Figure 13A:
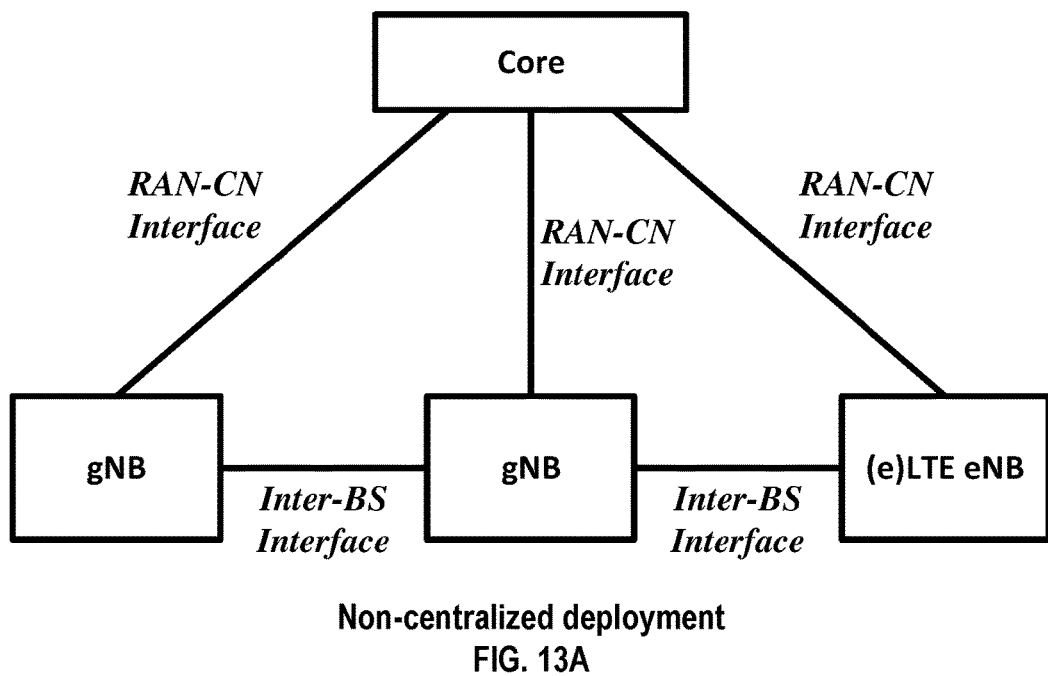
FIG. 13A and FIG. 13B are example diagrams for gNB deployment scenarios as per an aspect of an embodiment of the present disclosure.
Figure 13B:
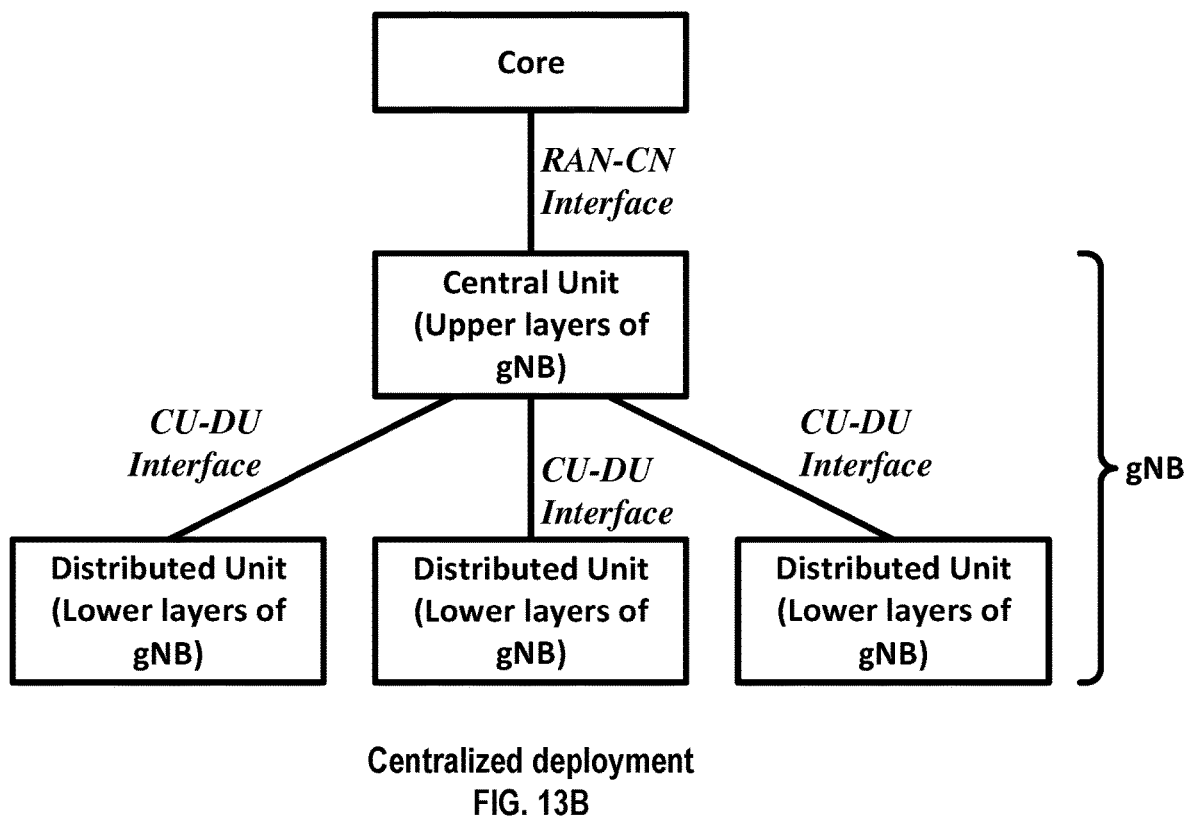

FIG. 13A and FIG. 13B are example diagrams for gNB deployment scenarios as per an aspect of an embodiment of the present disclosure. In the non-centralized deployment scenario in FIG. 13A, the full protocol stack (e.g. NR RRC, NR PDCP, NR RLC, NR MAC, and NR PHY) may be supported at one node. In the centralized deployment scenario in FIG. 13B, upper layers of gNB may be located in a Central Unit (CU), and lower layers of gNB may be located in Distributed Units (DU). The CU-DU interface (e.g. Fs interface) connecting CU and DU may be ideal or non-ideal. Fs-C may provide a control plane connection over Fs interface, and Fs-U may provide a user plane connection over Fs interface. In the centralized deployment, different functional split options between CU and DUs may be possible by locating different protocol layers (RAN functions) in CU and DU. The functional split may support flexibility to move RAN functions between CU and DU depending on service requirements and/or network environments. The functional split option may change during operation after Fs interface setup procedure, or may change only in Fs setup procedure (i.e. static during operation after Fs setup procedure).

Figure 14:
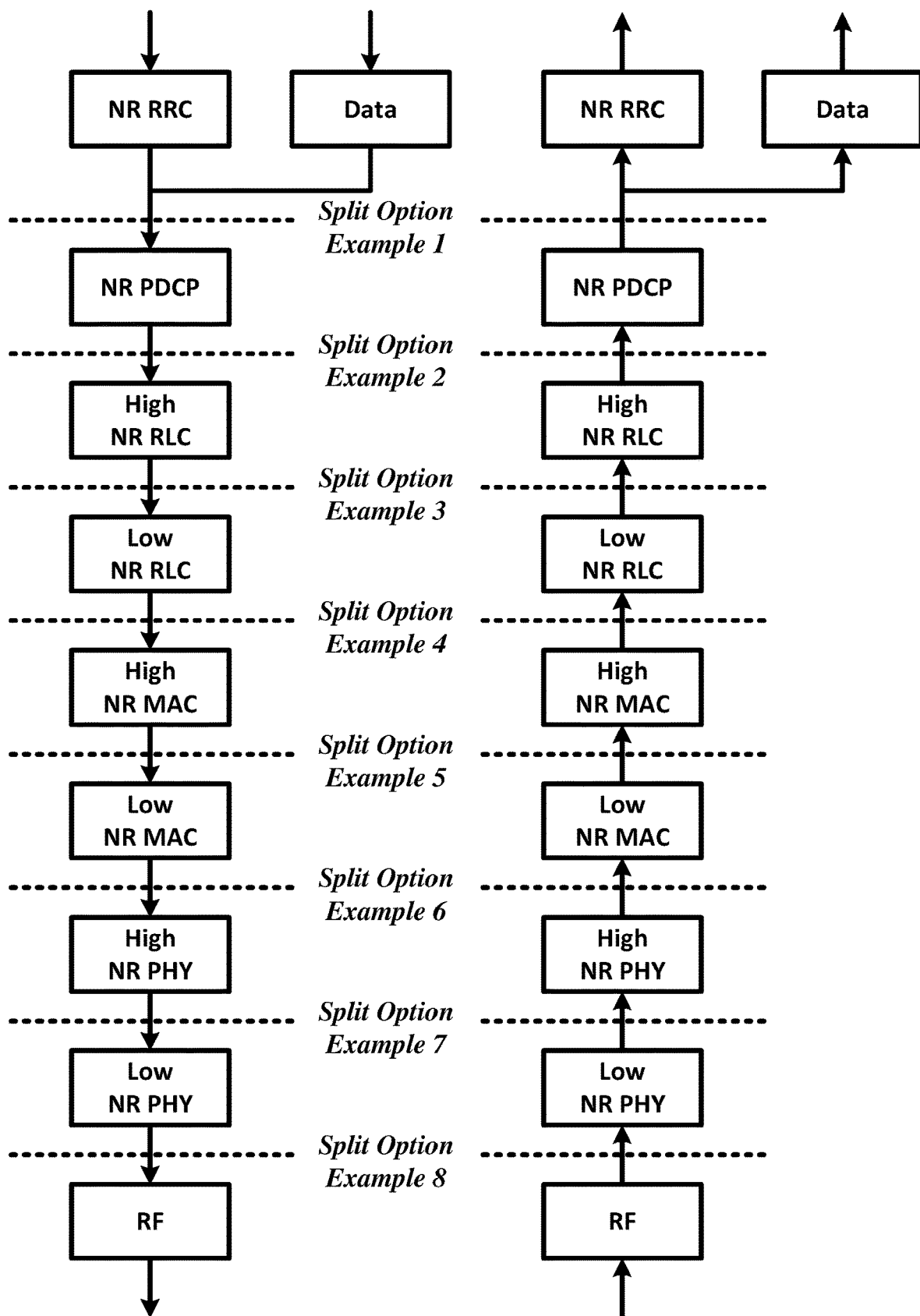
FIG. 14 is an example diagram for functional split option examples of the centralized gNB deployment scenario as per an aspect of an embodiment of the present disclosure.

FIG. 14 is an example diagram for different functional split option examples of the centralized gNB deployment scenario as per an aspect of an embodiment of the present disclosure. In the split option example 1, an NR RRC may be in CU, and NR PDCP, NR RLC, NR MAC, NR PHY, and RF may be in DU. In the split option example 2, an NR RRC and NR PDCP may be in CU, and NR RLC, NR MAC, NR PHY, and RF may be in DU. In the split option example 3, an NR RRC, NR PDCP, and partial function of NR RLC may be in CU, and the other partial function of NR RLC, NR MAC, NR PHY, and RF may be in DU. In the split option example 4, an NR RRC, NR PDCP, and NR RLC may be in CU, and NR MAC, NR PHY, and RF may be in DU. In the split option example 5, an NR RRC, NR PDCP, NR RLC, and partial function of NR MAC may be in CU, and the other partial function of NR MAC, NR PHY, and RF may be in DU. In the split option example 6, an NR RRC, NR PDCP, NR RLC, and NR MAC may be in CU, and NR PHY and RF may be in DU. In the split option example 7, an NR RRC, NR PDCP, NR RLC, NR MAC, and partial function of NR PHY may be in CU, and the other partial function of NR PHY and RF may be in DU. In the split option example 8, an NR RRC, NR PDCP, NR RLC, NR MAC, and NR PHY may be in CU, and RF may be in DU.

The functional split may be configured per CU, per DU, per UE, per bearer, per slice, or with other granularities. In per CU split, a CU may have a fixed split, and DUs may be configured to match the split option of CU. In per DU split, a DU may be configured with a different split, and a CU may provide different split options for different DUs. In per UE split, a gNB (CU and DU) may provide different split options for different UEs. In per bearer split, different split options may be utilized for different bearer types. In per slice splice, different split options may be applied for different slices.

In an example embodiment, the new radio access network (new RAN) may support different network slices, which may allow differentiated treatment customized to support different service requirements with end to end scope. The new RAN may provide a differentiated handling of traffic for different network slices that may be pre-configured, and may allow a single RAN node to support multiple slices. The new RAN may support selection of a RAN part for a given network slice, by one or more slice ID(s) or NSSAI(s) provided by a UE or a NGC (e.g. NG CP). The slice ID(s) or NSSAI(s) may identify one or more of pre-configured network slices in a PLMN. For initial attach, a UE may provide a slice ID and/or an NSSAI, and a RAN node (e.g. gNB) may use the slice ID or the NSSAI for routing an initial NAS signaling to an NGC control plane function (e.g. NG CP). If a UE does not provide any slice ID or NSSAI, a RAN node may send a NAS signaling to a default NGC control plane function. For subsequent accesses, the UE may provide a temporary ID for a slice identification, which may be assigned by the NGC control plane function, to enable a RAN node to route the NAS message to a relevant NGC control plane function. The new RAN may support resource isolation between slices. The RAN resource isolation may be achieved by avoiding that shortage of shared resources in one slice breaks a service level agreement for another slice.

The amount of data traffic carried over cellular networks is expected to increase for many years to come. The number of users/devices is increasing and each user/device accesses an increasing number and variety of services, e.g. video delivery, large files, images. This requires not only high capacity in the network, but also provisioning very high data rates to meet customers' expectations on interactivity and responsiveness. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, may be an effective complement to licensed spectrum for cellular operators to help addressing the traffic explosion in some scenarios, such as hotspot areas. LAA offers an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA utilizes at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by wireless devices; time & frequency synchronization of wireless devices.

In an example embodiment, DL LAA design may employ subframe boundary alignment according to LTE-A carrier aggregation timing relationships across serving cells aggregated by CA. This may not imply that the base station transmissions may start only at the subframe boundary. LAA may support transmitting PDSCH when not all OFDM symbols are available for transmission in a subframe according to LBT. Delivery of necessary control information for the PDSCH may also be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example Category 4 LBT mechanism or other type of LBT mechanisms may be implemented.

Various example LBT mechanisms may be implemented. In an example, for some signals, in some implementation scenarios, in some situations, and/or in some frequencies no LBT procedure may performed by the transmitting entity. In an example, Category 2 (e.g. LBT without random back-off) may be implemented. The duration of time that the channel is sensed to be idle before the transmitting entity transmits may be deterministic. In an example, Category 3 (e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

LAA may employ uplink LBT at the wireless device. The UL LBT scheme may be different from the DL LBT scheme (e.g. by using different LBT mechanisms or parameters) for example, since the LAA UL is based on scheduled access which affects a wireless device's channel contention opportunities. Other considerations motivating a different UL LBT scheme include, but are not limited to, multiplexing of multiple wireless devices in a single subframe.

In an example, a DL transmission burst may be a continuous transmission from a DL transmitting node with no transmission immediately before or after from the same node on the same CC. An UL transmission burst from a wireless device perspective may be a continuous transmission from a wireless device with no transmission immediately before or after from the same wireless device on the same CC. In an example, UL transmission burst is defined from a wireless device perspective. In an example, an UL transmission burst may be defined from a base station perspective. In an example, in case of a base station operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

A New Radio (NR) system may support both single beam and multi-beam operations. In a multi-beam system, a base station (e.g., gNB) may perform a downlink beam sweeping to provide coverage for downlink Synchronization Signals (SSs) and common control channels. A User Equipment (UE) may perform an uplink beam sweeping for uplink direction to access a cell. In a single beam scenario, a gNB may configure time-repetition transmission for one SS block, which may comprise at least Primary Synchronization Signal (PSS), Secondary Synchronization Signal (SSS), and Physical Broadcast Channel (PBCH), with a wide beam. In a multi-beam scenario, a gNB may configure at least some of these signals and physical channels in multiple beams. A UE may identify at least OFDM symbol index, slot index in a radio frame and radio frame number from an SS block.

Figure 15:
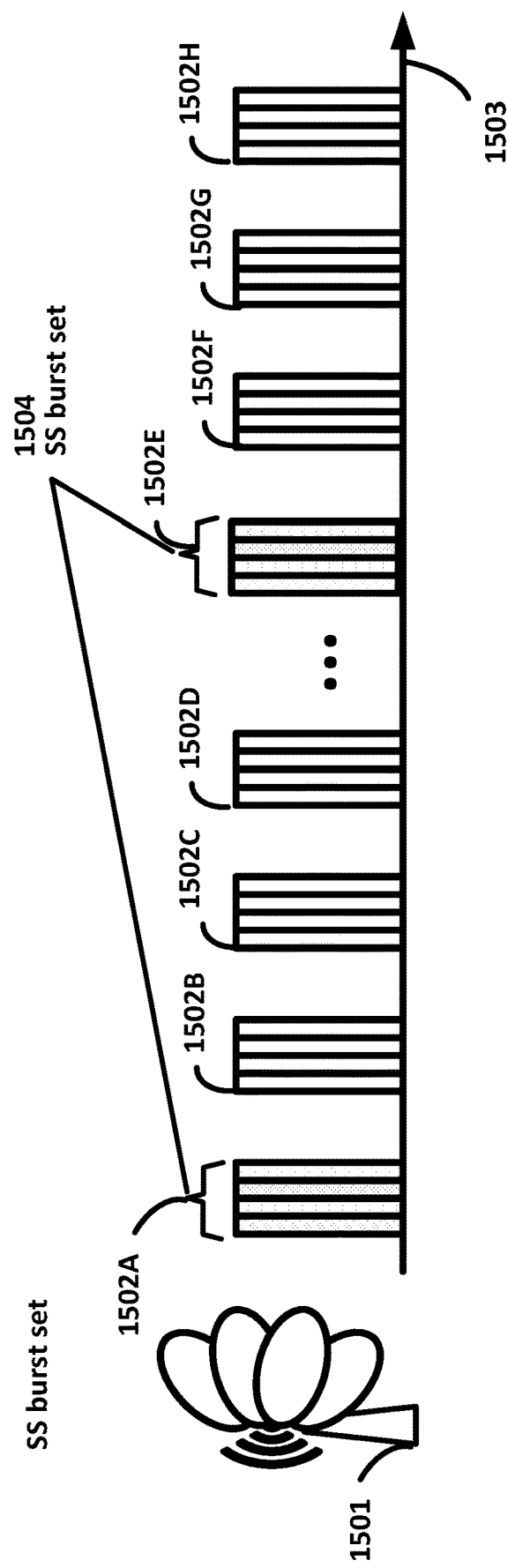
FIG. 15 is an example diagram for synchronization signal block transmissions as per an aspect of an embodiment of the present disclosure.

In an example, in an RRC_INACTIVE state or RRC_IDLE state, a UE may assume that SS blocks form an SS burst, and an SS burst set. An SS burst set may have a given periodicity. In multi-beam scenarios, SS blocks may be transmitted in multiple beams, together forming an SS burst. One or more SS blocks may be transmitted on one beam. A beam has a steering direction. If multiple SS bursts are transmitted with beams, these SS bursts together may form an SS burst set as shown in FIG. 15. A base station 1501 (e.g., a gNB in NR) may transmit SS bursts 1502A to 1502H during time periods 1503. A plurality of these SS bursts may comprise an SS burst set, such as an SS burst set 1504 (e.g., SS bursts 1502A and 1502E). An SS burst set may comprise any number of a plurality of SS bursts 1502A to 1502H. Each SS burst within an SS burst set may transmitted at a fixed or variable periodicity during time periods 1503.

An SS may be based on Cyclic Prefix-Orthogonal Frequency Division Multiplexing (CP-OFDM). The SS may comprise at least two types of synchronization signals; NR-PSS (Primary synchronization signal) and NR-SSS (Secondary synchronization signal). NR-PSS may be defined at least for initial symbol boundary synchronization to the NR cell. NR-SSS may be defined for detection of NR cell ID or at least part of NR cell ID. NR-SSS detection may be based on the fixed time/frequency relationship with NR-PSS resource position irrespective of duplex mode and beam operation type at least within a given frequency range and CP overhead. Normal CP may be supported for NR-PSS and NR-SSS.

The NR may comprise at least one physical broadcast channel (NR-PBCH). When a gNB transmit (or broadcast) the NR-PBCH, a UE may decode the NR-PBCH based on the fixed relationship with NR-PSS and/or NR-SSS resource position irrespective of duplex mode and beam operation type at least within a given frequency range and CP overhead. NR-PBCH may be a non-scheduled broadcast channel carrying at least a part of minimum system information with fixed payload size and periodicity predefined in the specification depending on carrier frequency range.

In single beam and multi-beam scenarios, NR may comprise an SS block that may support time (frequency, and/or spatial) division multiplexing of NR-PSS, NR-SSS, and NR-PBCH. A gNB may transmit NR-PSS, NR-SSS and/or NR-PBCH within an SS block. For a given frequency band, an SS block may correspond to N OFDM symbols based on the default subcarrier spacing, and N may be a constant. The signal multiplexing structure may be fixed in NR. A wireless device may identify, e.g., from an SS block, an OFDM symbol index, a slot index in a radio frame, and a radio frame number from an SS block.

A NR may support an SS burst comprising one or more SS blocks. An SS burst set may comprise one or more SS bursts. For example, a number of SS bursts within a SS burst set may be finite. From physical layer specification perspective, NR may support at least one periodicity of SS burst set. From UE perspective, SS burst set transmission may be periodic, and UE may assume that a given SS block is repeated with an SS burst set periodicity.

Within an SS burst set periodicity, NR-PBCH repeated in one or more SS blocks may change. A set of possible SS block time locations may be specified per frequency band in an RRC message. The maximum number of SS-blocks within SS burst set may be carrier frequency dependent. The position(s) of actual transmitted SS-blocks may be informed at least for helping CONNECTED/IDLE mode measurement, for helping CONNECTED mode UE to receive downlink (DL) data/control in one or more SS-blocks, or for helping IDLE mode UE to receive DL data/control in one or more SS-blocks. A UE may not assume that the gNB transmits the same number of physical beam(s). A UE may not assume the same physical beam(s) across different SS-blocks within an SS burst set. For an initial cell selection, UE may assume default SS burst set periodicity which may be broadcast via an RRC message and frequency band-dependent. At least for multi-beams operation case, the time index of SS-block may be indicated to the UE.

For CONNECTED and IDLE mode UEs, NR may support network indication of SS burst set periodicity and information to derive measurement timing/duration (e.g., time window for NR-SS detection). A gNB may provide (e.g., via broadcasting an RRC message) one SS burst set periodicity information per frequency carrier to UE and information to derive measurement timing/duration if possible. In case that one SS burst set periodicity and one information regarding timing/duration are indicated, a UE may assume the periodicity and timing/duration for all cells on the same carrier. If a gNB does not provide indication of SS burst set periodicity and information to derive measurement timing/duration, a UE may assume a predefined periodicity, e.g., 5 ms, as the SS burst set periodicity. NR may support set of SS burst set periodicity values for adaptation and network indication.

For initial access, a UE may assume a signal corresponding to a specific subcarrier spacing of NR-PSS/SSS in a given frequency band given by a NR specification. For NR-PSS, a Zadoff-Chu (ZC) sequence may be employed as a sequence for NR-PSS. NR may define at least one basic sequence length for a SS in case of sequence-based SS design. The number of antenna port of NR-PSS may be 1. For NR-PBCH transmission, NR may support a fixed number of antenna port(s). A UE may not be required for a blind detection of NR-PBCH transmission scheme or number of antenna ports. A UE may assume the same PBCH numerology as that of NR-SS. For the minimum system information delivery, NR-PBCH may comprise a part of minimum system information. NR-PBCH contents may comprise at least a part of the SFN (system frame number) or CRC. A gNB may transmit the remaining minimum system information in shared downlink channel via NR-PDSCH.

In a multi-beam example, one or more of PSS, SSS, or PBCH signals may be repeated for a cell, e.g., to support cell selection, cell reselection, and/or initial access procedures. For an SS burst, an associated PBCH or a physical downlink shared channel (PDSCH) scheduling system information may be broadcasted by a base station to multiple wireless devices. The PDSCH may be indicated by a physical downlink control channel (PDCCH) in a common search space. The system information may comprise a physical random access channel (PRACH) configuration for a beam. For a beam, a base station (e.g., a gNB in NR) may have a RACH configuration which may include a PRACH preamble pool, time and/or frequency radio resources, and other power related parameters. A wireless device may use a PRACH preamble from a RACH configuration to initiate a contention-based RACH procedure or a contention-free RACH procedure. A wireless device may perform a 4-step RACH procedure, which may be a contention-based RACH procedure or a contention-free RACH procedure. The wireless device may select a beam associated with an SS block that may have the best receiving signal quality. The wireless device may successfully detect a cell identifier associated with the cell and decode system information with a RACH configuration. The wireless device may use one PRACH preamble and select one PRACH resource from RACH resources indicated by the system information associated with the selected beam. A PRACH resource may comprise at least one of: a PRACH index indicating a PRACH preamble, a PRACH format, a PRACH numerology, time and/or frequency radio resource allocation, power setting of a PRACH transmission, and/or other radio resource parameters. For a contention-free RACH procedure, the PRACH preamble and resource may be indicated in a DCI or other high layer signaling.

In an example, a UE may detect one or more PSS/SSS/PBCH for cell selection/reselection and/or initial access procedures. PBCH, or a Physical Downlink Shared Channel (PDSCH), indicated by a Physical Downlink Control Channel (PDCCH) in common search space, scheduling a system information, such as System Information Block type 2 (SIB2), may be broadcasted to multiple UEs. In an example, SIB2 may carry one or more Physical Random Access Channel (PRACH) configuration. In an example, a gNB may have one or more Random Access Channel (RACH) configuration which may include PRACH preamble pool, time/frequency radio resources, and other power related parameters. A UE may select a PRACH preamble from a RACH configuration to initiate a contention-based RACH procedure, or a contention-free RACH procedure.

Figure 16B:
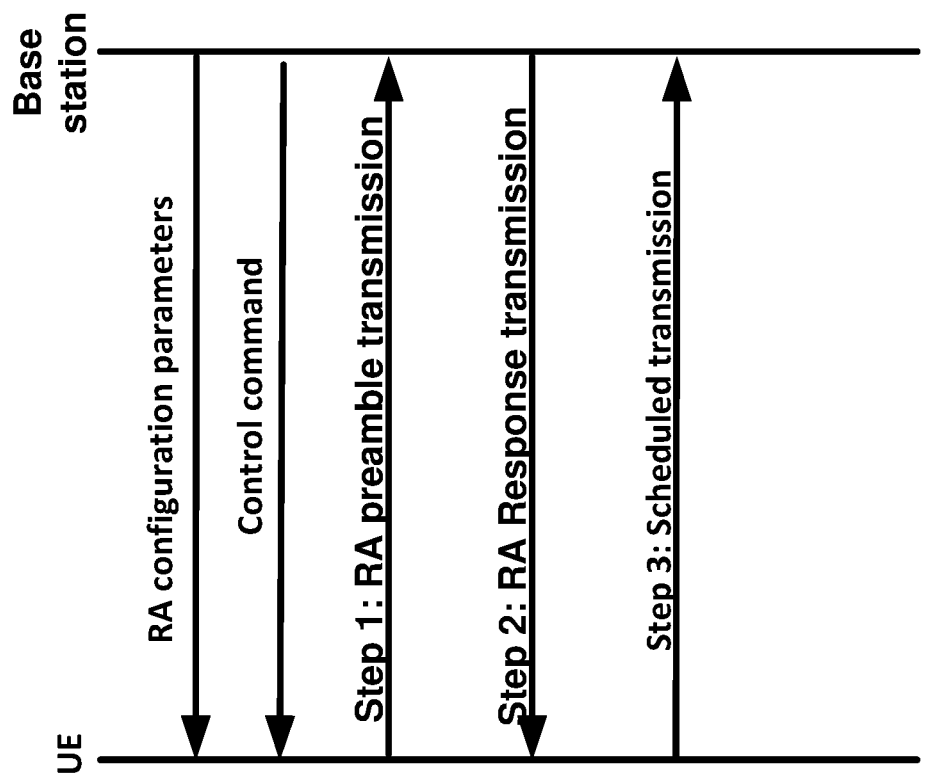
FIG. 16A and FIG. 16B are example diagrams of random access procedures as per an aspect of an embodiment of the present disclosure.
Figure 16A:
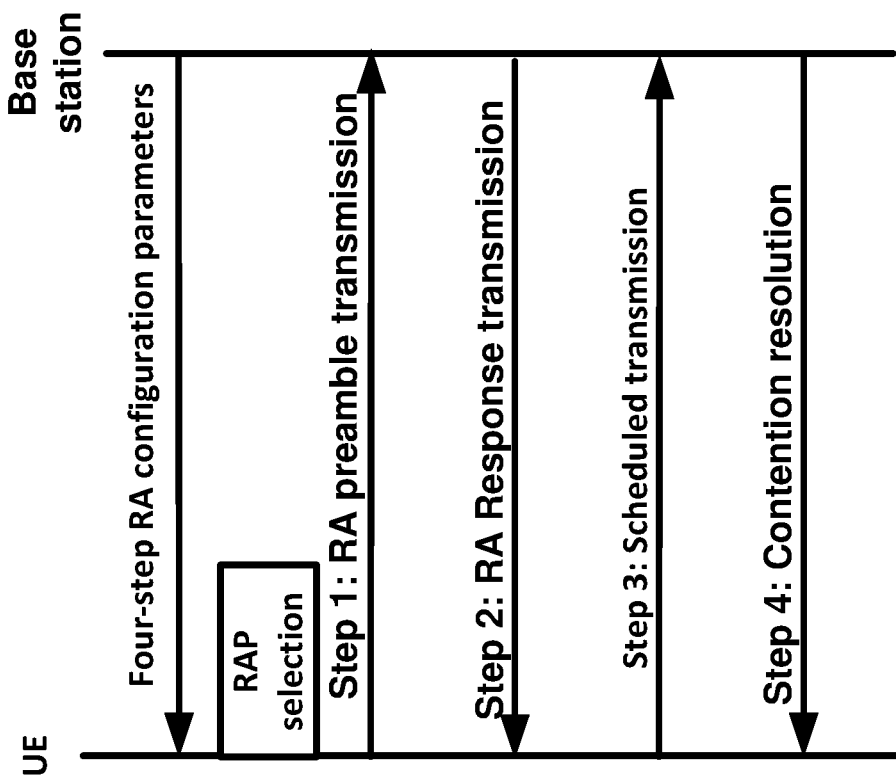

In an example, a UE may perform a 4-step RACH procedure, which may be a contention-based or contention-free RACH procedure. A four-step random access (RA) procedure may comprise RA preamble (RAP) transmission in the first step, random access response (RAR) transmission in the second step, scheduled transmission of one or more transport blocks (TBs) in the third step, and contention resolution in the fourth step as shown in FIG. 16. Specifically, FIG. 16A shows a contention-based 4-step RA procedure, and FIG. 16B shows a contention-free RA procedure.

In the first step, a UE may transmit a RAP using a configured RA preamble format with a Tx beam. RA channel (RACH) resource may be defined as a time-frequency resource to transmit a RAP. Broadcast system information may inform whether a UE needs to transmit one or multiple/repeated preamble within a subset of RACH resources.

A base station may configure an association between DL signal/channel, and a subset of RACH resources and/or a subset of RAP indices, for determining the downlink (DL) transmission in the second step. Based on the DL measurement and the corresponding association, a UE may select the subset of RACH resources and/or the subset of RAP indices. In an example, there may be two RAP groups informed by broadcast system information and one may be optional. If a base station configures the two groups in the four-step RA procedure, a UE may determine which group the UE selects a RAP from, based on the pathloss and a size of the message to be transmitted by the UE in the third step. A base station may use a group type to which a RAP belongs as an indication of the message size in the third step and the radio conditions at a UE. A base station may broadcast the RAP grouping information along with one or more thresholds on system information.

In the second step of the four-step RA procedure, a base station may transmit a RA response (RAR) to the UE in response to reception of a RAP that the UE transmits. A UE may monitor the PDCCH carrying a DCI, to detect RAR transmitted on a PDSCH in a RA Response window. The DCI may be CRC-scrambled by the RA-RNTI (Random Access-Radio Network Temporary Identifier). RA-RNTI may be used on the PDCCH when Random Access Response messages are transmitted. It may unambiguously identify which time-frequency resource is used by the MAC entity to transmit the Random Access preamble. The RA Response window may start at the subframe that contains the end of a RAP transmission plus three subframes. The RA Response window may have a length indicated by ra-ResponseWindowSize. A UE may compute the RA-RNTI associated with the PRACH in which the UE transmits a RAP as: RA-RNTI=1+t_id+10*f_id, where t_id is an index of a first subframe of a specified PRACH (0≤t_id<10), and f_id is an index of a specified PRACH within the subframe, in ascending order of frequency domain (0≤f_id<6). In an example, different types of UEs, e.g. NB-IoT, BL-UE, or UE-EC may employ different formulas for RA-RNTI calculations.

A UE may stop monitoring for RAR(s) after decoding of a MAC packet data unit (PDU) for RAR comprising a RAP identifier (RAPID) that matches the RAP transmitted by the UE. The MAC PDU may comprise one or more MAC RARs and a MAC header that may comprise a subheader having a backoff indicator (BI) and one or more subheader that comprises RAPIDs.

Figure 17:
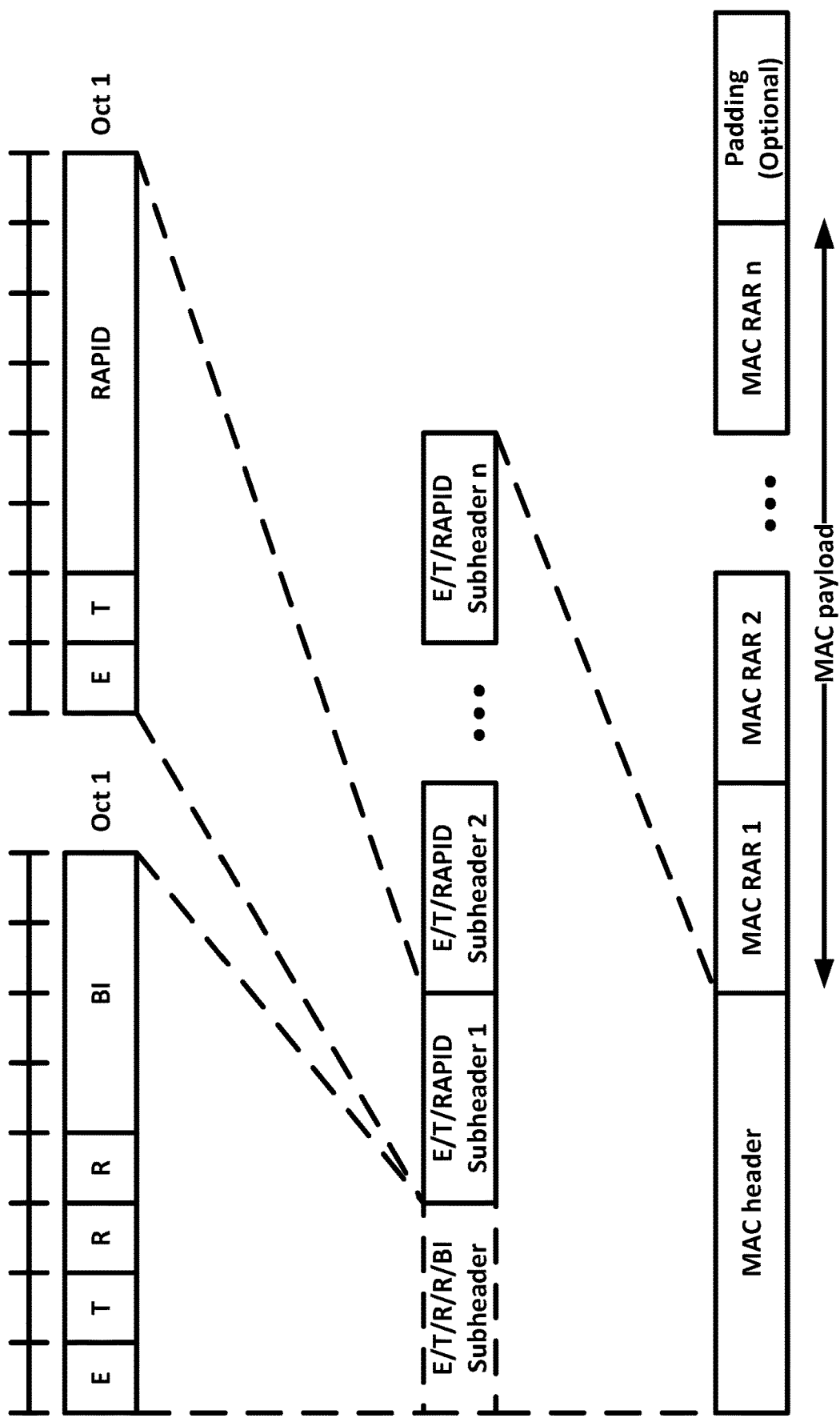
FIG. 17 is an example diagram of a MAC PDU comprising a RAR as per an aspect of an embodiment of the present disclosure.

FIG. 17 illustrates an example of a MAC PDU comprising a MAC header and MAC RARs for a four-step RA procedure. If a RAR comprises a RAPID corresponding to a RAP that a UE transmits, the UE may process the data, such as a timing advance (TA) command, a UL grant, and a Temporary C-RNTI (TC-RNTI), in the RAR.

Figure 18A:
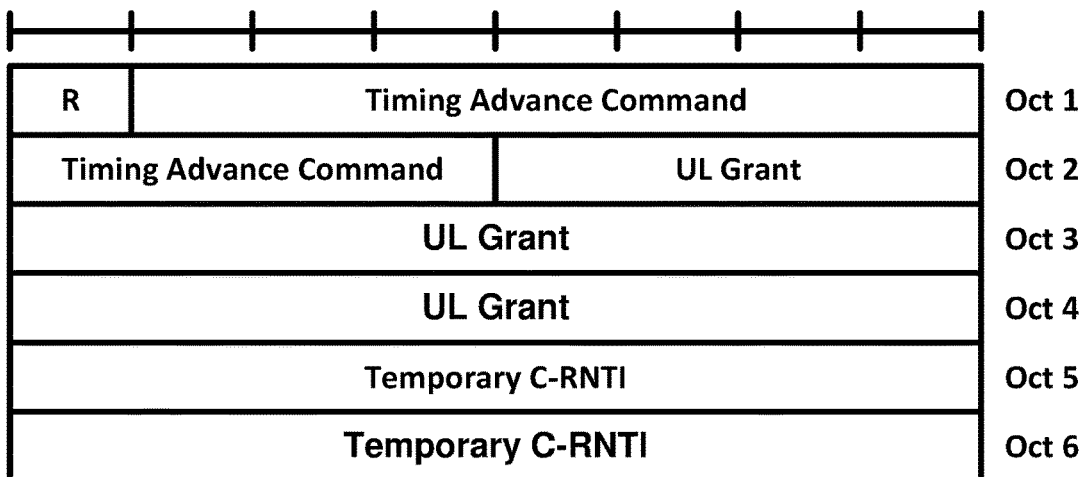
FIG. 18A, FIG. 18B and FIG. 18C are example diagrams of RAR MAC CEs as per an aspect of an embodiment of the present disclosure.
Figure 18B:
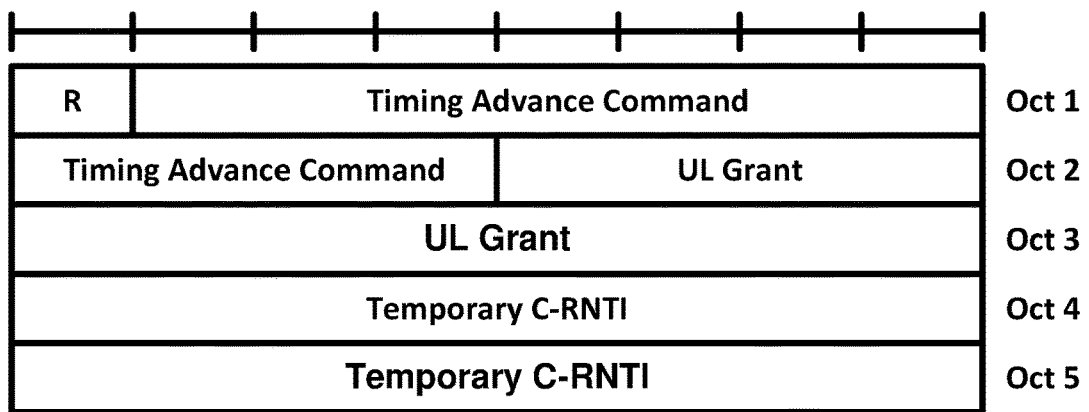
Figure 18C:
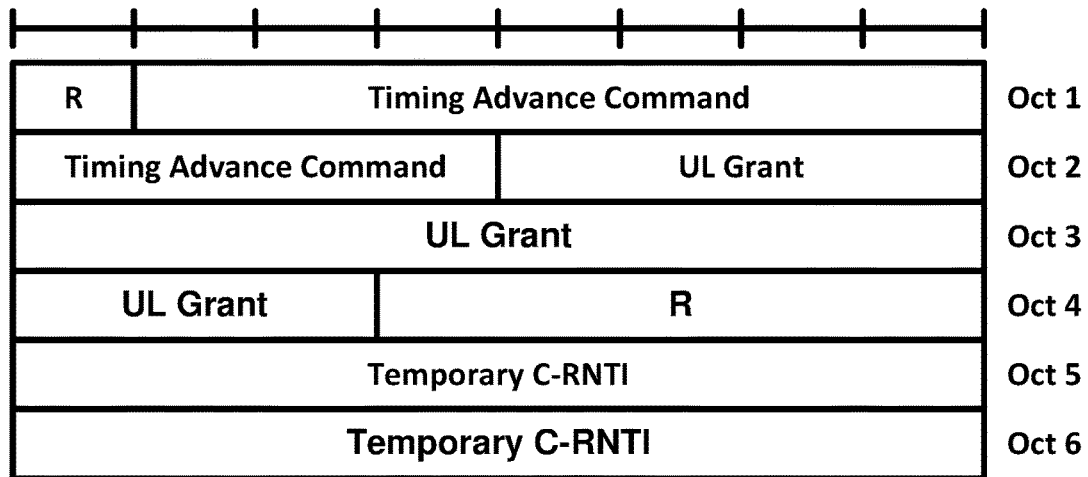

FIG. 18A, FIG. 18B and FIG. 18C show contents of a MAC RAR. Specifically, FIG. 18A shows the contents of a MAC RAR of a normal UE, FIG. 18B shows the contents of a MAC RAR of a MTC UE, and FIG. 18C shows the contents of MAC RAR of a NB-IOT UE.

In the third step of the four-step RA procedure, a UE may adjust UL time alignment by using the TA value corresponding to the TA command in the received RAR in the second step and may transmit the one or more TBs to a base station using the UL resources assigned in the UL grant in the received RAR. The TBs that a UE transmits in the third step may comprise RRC signaling, such as RRC connection request, RRC connection Re-establishment request, or RRC connection resume request, and a UE identity. The identity transmitted in the third step is used as part of the contention-resolution mechanism in the fourth step.

The fourth step in the four-step RA procedure may comprise a DL message for contention resolution. In an example, one or more UEs may perform simultaneous RA attempts selecting the same RAP in the first step and receive the same RAR with the same TC-RNTI in the second step. The contention resolution in the fourth step may be to ensure that a UE does not incorrectly use another UE Identity. The contention resolution mechanism may be based on either C-RNTI on PDCCH or UE Contention Resolution Identity on DL-SCH, depending on whether a UE has a C-RNTI or not. If a UE has C-RNTI, upon detection of C-RNTI on the PDCCH, the UE may determine the success of RA procedure. If a UE does not have C-RNTI pre-assigned, the UE may monitor DL-SCH associated with TC-RNTI that a base station transmits in a RAR of the second step and compare the identity in the data transmitted by the base station on DL-SCH in the fourth step with the identity that the UE transmits in the third step. If the two identities are identical, the UE may determine the success of RA procedure and promote the TC-RNTI to the C-RNTI.

The forth step in the four-step RA procedure may allow HARQ retransmission. A UE may start mac-Contention- ResolutionTimer when the UE transmits one or more TBs to a base station in the third step and may restart mac-ContentionResolutionTimer at each HARQ retransmission. When a UE receives data on the DL resources identified by C-RNTI or TC-RNTI in the fourth step, the UE may stop the mac-ContentionResolutionTimer. If the UE does not detect the contention resolution identity that matches to the identity transmitted by the UE in the third step, the UE may determine the failure of RA procedure and discard the TC-RNTI. If mac-ContentionResolutionTimer expires, the UE may determine the failure of RA procedure and discard the TC-RNTI. If the contention resolution is failed, a UE may flush the HARQ buffer used for transmission of the MAC PDU and may restart the four-step RA procedure from the first step. The UE may delay the subsequent RAP transmission by the backoff time randomly selected according to a uniform distribution between 0 and the backoff parameter value corresponding the BI in the MAC PDU for RAR.

In a four-step RA procedure, the usage of the first two steps may be to obtain UL time alignment for a UE and obtain an uplink grant. The third and fourth steps may be used to setup RRC connections, and/or resolve contention from different UEs.

Figure 19:
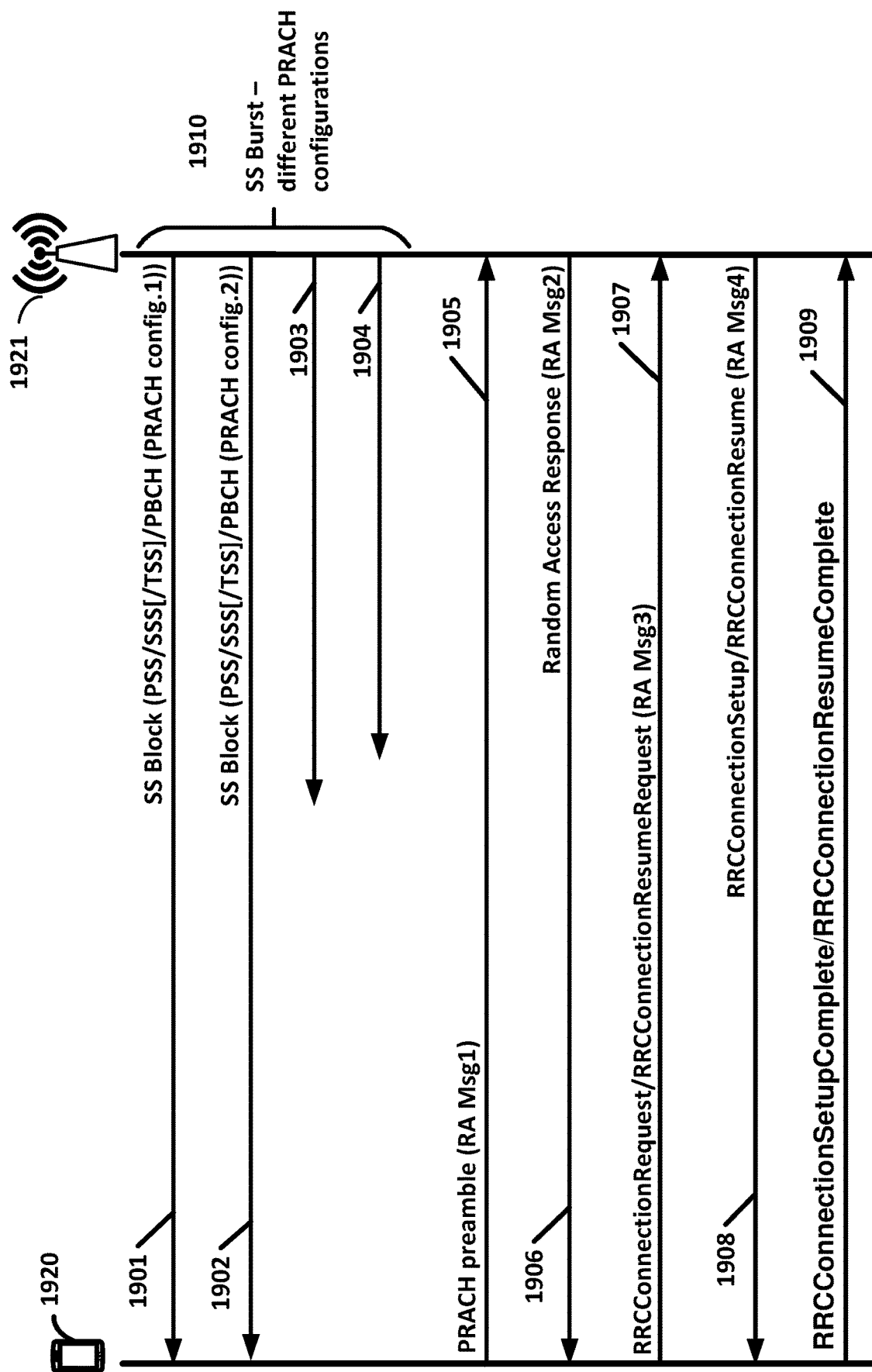
FIG. 19 is an example diagram for random access procedure when configured with multiple beams as per an aspect of an embodiment of the present disclosure.

FIG. 19 shows an example of a random access procedure (e.g., via a RACH) that may include sending, by a base station, one or more SS blocks. A wireless device 1920 (e.g., a UE) may transmit one or more preambles to a base station 1921 (e.g., a gNB in NR). Each preamble transmission by the wireless device may be associated with a separate random access procedure, such as shown in FIG. 19. The random access procedure may begin at step 1901 with a base station 1921 (e.g., a gNB in NR) sending a first SS block to a wireless device 1921 (e.g., a UE). Any of the SS blocks may comprise one or more of a PSS, SSS, tertiary synchronization signal (TSS), or PBCH signal. The first SS block in step 1901 may be associated with a first PRACH configuration. At step 1902, the base station 1921 may send to the wireless device 1920 a second SS block that may be associated with a second PRACH configuration. At step 1903, the base station 1921 may send to the wireless device 1920 a third SS block that may be associated with a third PRACH configuration. At step 1904, the base station 1921 may send to the wireless device 1920 a fourth SS block that may be associated with a fourth PRACH configuration. Any number of SS blocks may be sent in the same manner in addition to, or replacing, steps 1903 and 1904. An SS burst may comprise any number of SS blocks. For example, SS burst 1910 comprises the three SS blocks sent during steps 1902-1904.

The wireless device 1920 may send to the base station 1921 a preamble, at step 1905, e.g., after or in response to receiving one or more SS blocks or SS bursts. The preamble may comprise a PRACH preamble, and may be referred to as RA Msg 1. The PRACH preamble may be transmitted in step 1905 according to or based on a PRACH configuration that may be received in an SS block (e.g., one of the SS blocks from steps 1901-1904) that may be determined to be the best SS block beam. The wireless device 1920 may determine a best SS block beam from among SS blocks it may receive prior to sending the PRACH preamble. The base station 1921 may send a random access response (RAR), which may be referred to as RA Msg2, at step 1906, e.g., after or in response to receiving the PRACH preamble. The RAR may be transmitted in step 1906 via a DL beam that corresponds to the SS block beam associated with the PRACH configuration. The base station 1921 may determine the best SS block beam from among SS blocks it previously sent prior to receiving the PRACH preamble. The base station 1621 may receive the PRACH preamble according to or based on the PRACH configuration associated with the best SS block beam.

The wireless device 1920 may send to the base station 1921 an RRCConnectionRequest and/or RRCConnectionResumeRequest message, which may be referred to as RA Msg3, at step 1907, e.g., after or in response to receiving the RAR. The base station 1921 may send to the wireless device 1920 an RRCConnectionSetup and/or RRCConnectionResume message, which may be referred to as RA Msg4, at step 1908, e.g., after or in response to receiving the RRCConnectionRequest and/or RRCConnectionResumeRequest message. The wireless device 1920 may send to the base station 1921 an RRCConnectionSetupComplete and/or RRCConnectionResumeComplete message, which may be referred to as RA Msg5, at step 1909, e.g., after or in response to receiving the RRCConnectionSetup and/or RRCConnectionResume. An RRC connection may be established between the wireless device 1920 and the base station 1921, and the random access procedure may end, e.g., after or in response to receiving the RRCConnectionSetupComplete and/or RRCConnectionResumeComplete message.

A best beam, including but not limited to a best SS block beam, may be determined based on a channel state information reference signal (CSI-RS). A wireless device may use a CSI-RS in a multi-beam system for estimating the beam quality of the links between the wireless device and a base station. For example, based on a measurement of a CSI-RS, a wireless device may report CSI for downlink channel adaption. A CSI parameter may include a precoding matrix index (PMI), a channel quality index (CQI) value, and/or a rank indicator (RI). A wireless device may report a beam index based on a reference signal received power (RSRP) measurement on a CSI-RS. The wireless device may report the beam index in a CSI resource indication (CRI) for downlink beam selection. A base station may transmit a CSI-RS via a CSI-RS resource, such as via one or more antenna ports, or via one or more time and/or frequency radio resources. A beam may be associated with a CSI-RS. A CSI-RS may comprise an indication of a beam direction. Each of a plurality of beams may be associated with one of a plurality of CSI-RSs. A CSI-RS resource may be configured in a cell-specific way, e.g., via common RRC signaling. Additionally or alternatively, a CSI-RS resource may be configured in a wireless device-specific way, e.g., via dedicated RRC signaling and/or layer 1 and/or layer 2 (L1/L2) signaling. Multiple wireless devices in or served by a cell may measure a cell-specific CSI-RS resource. A dedicated subset of wireless devices in or served by a cell may measure a wireless device-specific CSI-RS resource. A base station may transmit a CSI-RS resource periodically, using aperiodic transmission, or using a multi-shot or semi-persistent transmission. In a periodic transmission, a base station may transmit the configured CSI-RS resource using a configured periodicity in the time domain. In an aperiodic transmission, a base station may transmit the configured CSI-RS resource in a dedicated time slot. In a multi-shot or semi-persistent transmission, a base station may transmit the configured CSI-RS resource in a configured period. A base station may configure different CSI-RS resources in different terms for different purposes. Different terms may include, e.g., cell-specific, device-specific, periodic, aperiodic, multi-shot, or other terms. Different purposes may include, e.g., beam management, CQI reporting, or other purposes.

Figure 20:
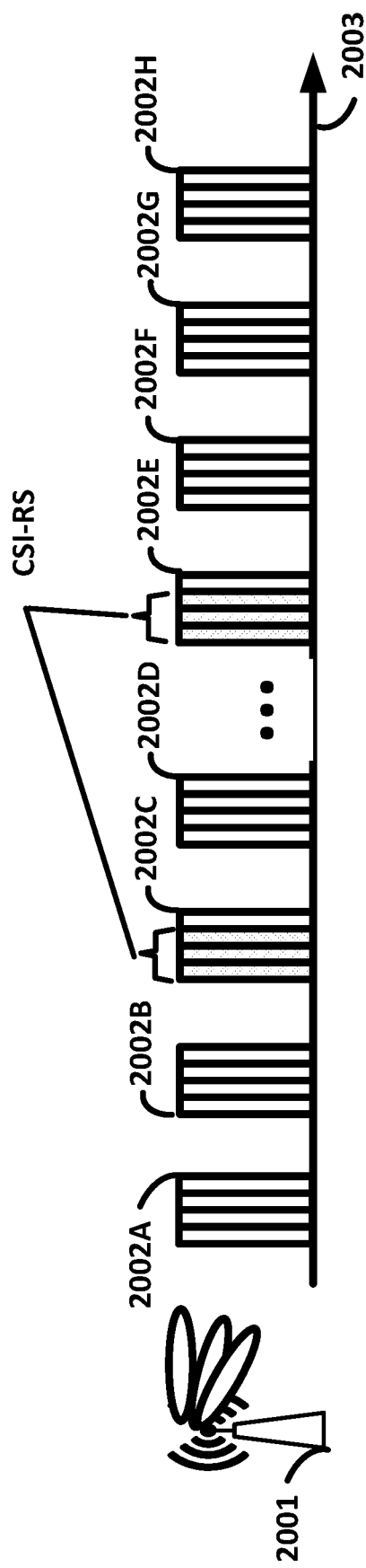
FIG. 20 is an example of channel state information reference signal transmissions when configured with multiple beams as per an aspect of an embodiment of the present disclosure.

FIG. 20 shows an example of transmitting CSI-RSS periodically for a beam. A base station 2001 may transmit a beam in a predefined order in the time domain, such as during time periods 2003. Beams used for a CSI-RS transmission, such as for CSI-RS 2004 in transmissions 2002C and/or 2003E, may have a different beam width relative to a beam width for SS-blocks transmission, such as for SS blocks 2002A, 2002B, 2002D, and 2002F-2002H. Additionally or alternatively, a beam width of a beam used for a CSI-RS transmission may have the same value as a beam width for an SS block. Some or all of one or more CSI-RSS may be included in one or more beams. An SS block may occupy a number of OFDM symbols (e.g., 4), and a number of subcarriers (e.g., 240), carrying a synchronization sequence signal. The synchronization sequence signal may identify a cell.

Figure 21:
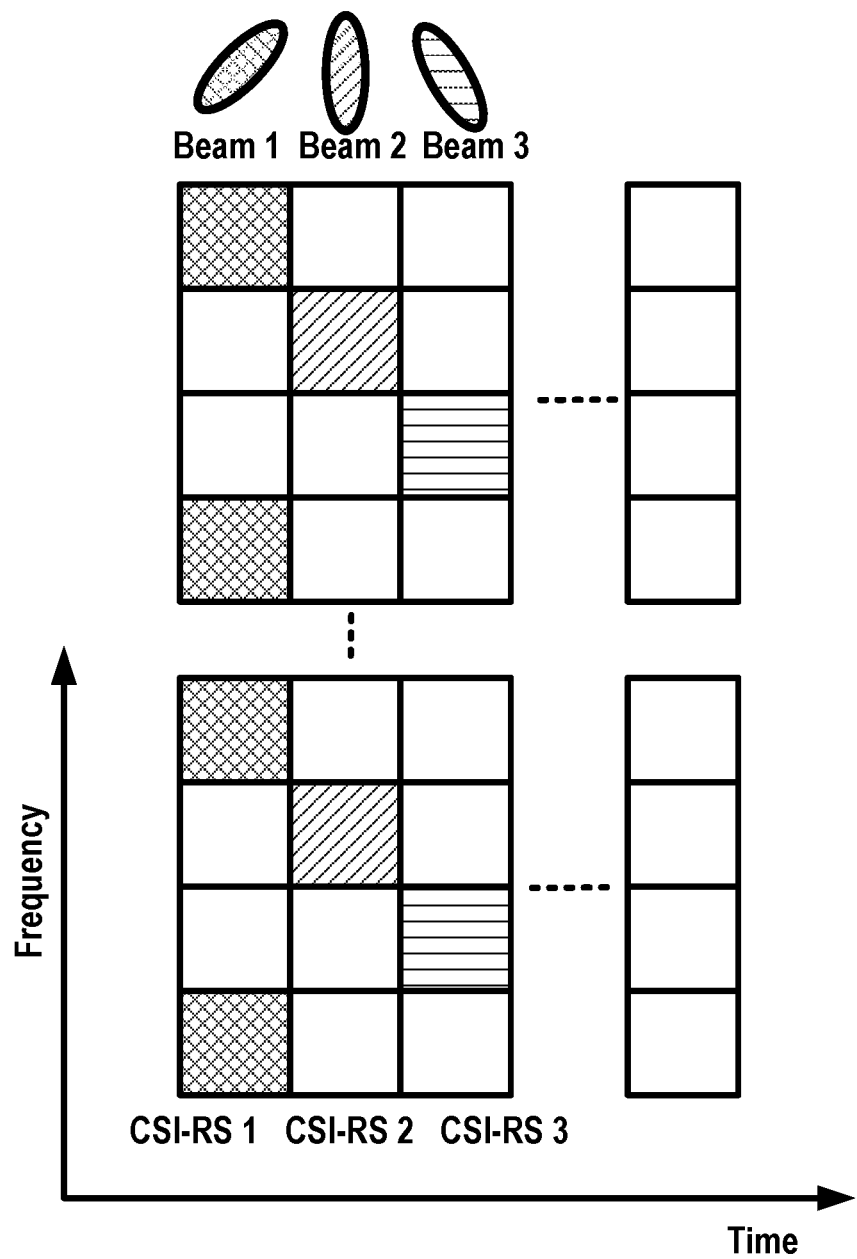
FIG. 21 is an example of channel state information reference signal transmissions when configured with multiple beams as per an aspect of an embodiment of the present disclosure.

FIG. 21 shows an example of a CSI-RS that may be mapped in time and frequency domains. Each square shown in FIG. 21 may represent a resource block within a bandwidth of a cell. Each resource block may comprise a number of subcarriers. A cell may have a bandwidth comprising a number of resource blocks. A base station (e.g., a gNB in NR) may transmit one or more Radio Resource Control (RRC) messages comprising CSI-RS resource configuration parameters for one or more CSI-RS. One or more of the following parameters may be configured by higher layer signaling for each CSI-RS resource configuration: CSI-RS resource configuration identity, number of CSI-RS ports, CSI-RS configuration (e.g., symbol and RE locations in a subframe), CSI-RS subframe configuration (e.g., subframe location, offset, and periodicity in a radio frame), CSI-RS power parameter, CSI-RS sequence parameter, CDM type parameter, frequency density, transmission comb, QCL parameters (e.g., QCL-scramblingidentity, crs-portscount, mbsfn-subframeconfiglist, csi-rs-configZPid, qcl-csi-rs-configNZPid), and/or other radio resource parameters.

FIG. 21 shows three beams that may be configured for a wireless device, e.g., in a wireless device-specific configuration. Any number of additional beams (e.g., represented by the column of blank squares) or fewer beams may be included. Beam 1 may be allocated with CSI-RS 1 that may be transmitted in some subcarriers in a resource block (RB) of a first symbol. Beam 2 may be allocated with CSI-RS 2 that may be transmitted in some subcarriers in an RB of a second symbol. Beam 3 may be allocated with CSI-RS 3 that may be transmitted in some subcarriers in a RB of a third symbol. All subcarriers in an RB may not necessarily be used for transmitting a particular CSI-RS (e.g., CSI-RS 1) on an associated beam (e.g., beam 1) for that CSI-RS. By using frequency division multiplexing (FDM), other subcarriers, not used for beam 1 for the wireless device in the same RB, may be used for other CSI-RS transmissions associated with a different beam for other wireless devices. Additionally or alternatively, by using time domain multiplexing (TDM), beams used for a wireless device may be configured such that different beams (e.g., beam 1, beam 2, and beam 3) for the wireless device may be transmitted using some symbols different from beams of other wireless devices.

Beam management may use a device-specific configured CSI-RS. In a beam management procedure, a wireless device may monitor a channel quality of a beam pair link comprising a transmitting beam by a base station (e.g., a gNB in NR) and a receiving beam by the wireless device (e.g., a UE). When multiple CSI-RSs associated with multiple beams are configured, a wireless device may monitor multiple beam pair links between the base station and the wireless device.

A wireless device may transmit one or more beam management reports to a base station. A beam management report may indicate one or more beam pair quality parameters, comprising, e.g., one or more beam identifications, RSRP, PMI, CQI, and/or RI, of a subset of configured beams.

Figure 23A:
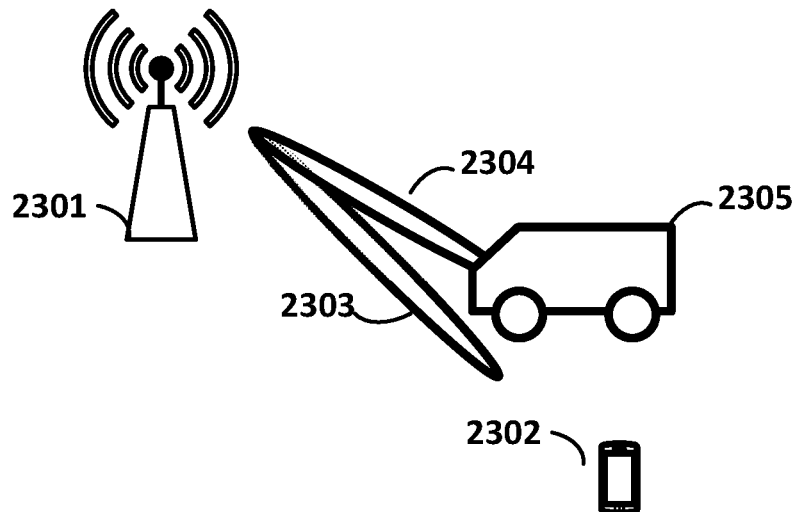
FIG. 23A is an example diagram for downlink beam failure scenario in a transmission receiving point (TRP) as per an aspect of an embodiment of the present disclosure.
Figure 23B:
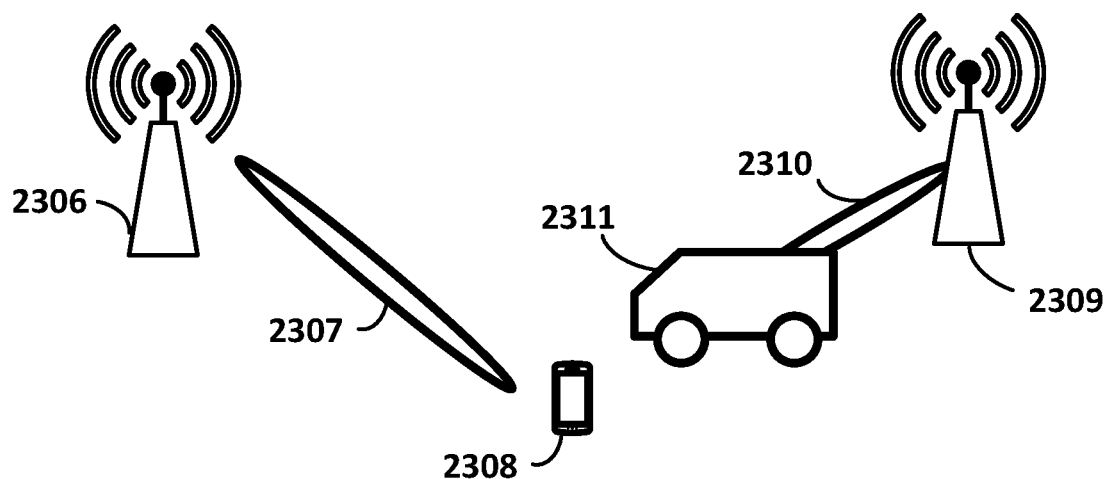
FIG. 23B is an example diagram for downlink beam failure scenario in multiple TRPs as per an aspect of an embodiment of the present disclosure.

A base station and/or a wireless device may perform a downlink L1/L2 beam management procedure. One or more downlink L1/L2 beam management procedures may be performed within one or multiple transmission and receiving points (TRPs), such as shown in FIG. 23A and FIG. 23B, respectively.

Figure 22:
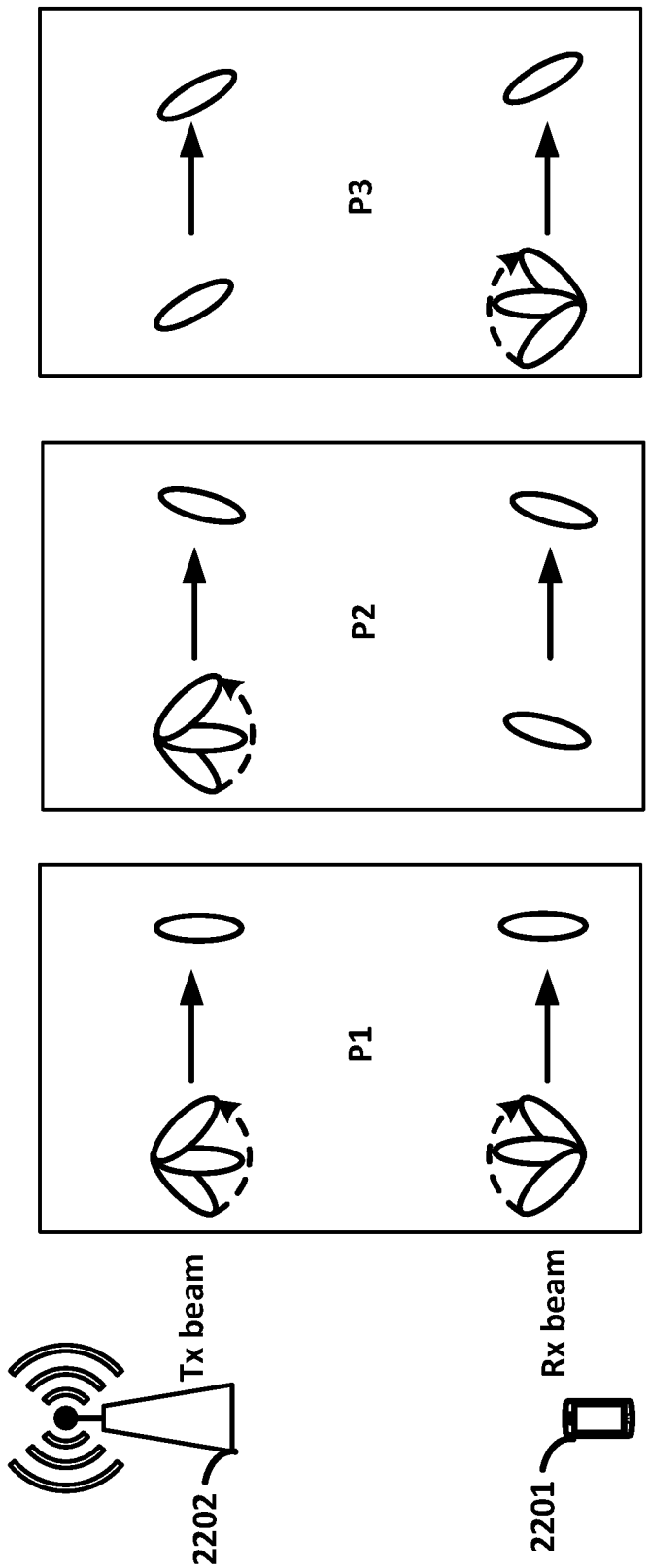
FIG. 22 is an example of various beam management procedures as per an aspect of an embodiment of the present disclosure.

FIG. 22 shows examples of three beam management procedures, P1, P2, and P3. Procedure P1 may be used to enable a wireless device measurement on different transmit (Tx) beams of a TRP (or multiple TRPs), e.g., to support a selection of Tx beams and/or wireless device receive (Rx) beam(s) (shown as ovals in the top row and bottom row, respectively, of P1). Beamforming at a TRP (or multiple TRPs) may include, e.g., an intra-TRP and/or inter-TRP Tx beam sweep from a set of different beams (shown, in the top rows of P1 and P2, as ovals rotated in a counter-clockwise direction indicated by the dashed arrow). Beamforming at a wireless device 2201, may include, e.g., a wireless device Rx beam sweep from a set of different beams (shown, in the bottom rows of P1 and P3, as ovals rotated in a clockwise direction indicated by the dashed arrow). Procedure P2 may be used to enable a wireless device measurement on different Tx beams of a TRP (or multiple TRPs) (shown, in the top row of P2, as ovals rotated in a counter-clockwise direction indicated by the dashed arrow), e.g., which may change inter-TRP and/or intra-TRP Tx beam(s). Procedure P2 may be performed, e.g., on a smaller set of beams for beam refinement than in procedure P1. P2 may be a particular example of P1. Procedure P3 may be used to enable a wireless device measurement on the same Tx beam (shown as oval in P3), e.g., to change a wireless device Rx beam if the wireless device 2201 uses beamforming.

A wireless device 2201 (e.g., a UE) and/or a base station 2202 (e.g., a gNB) may trigger a beam failure recovery mechanism. The wireless device 2201 may trigger a beam failure recovery (BFR) request transmission, e.g., if a beam failure event occurs. A beam failure event may include, e.g., a determination that a quality of beam pair link(s) of an associated control channel is unsatisfactory. A determination of an unsatisfactory quality of beam pair link(s) of an associated channel may be based on the quality falling below a threshold and/or an expiration of a timer.

The wireless device 2201 may measure a quality of beam pair link(s) using one or more reference signals (RS). One or more SS blocks, one or more CSI-RS resources, and/or one or more demodulation reference signals (DM-RSs) of a PBCH may be used as a RS for measuring a quality of a beam pair link. Each of the one or more CSI-RS resources may be associated with a CSI-RS resource index (CRI). A quality of a beam pair link may be based on one or more of an RSRP value, reference signal received quality (RSRQ) value, and/or CSI value measured on RS resources. The base station 2202 may indicate that an RS resource, e.g., that may be used for measuring a beam pair link quality, is quasi-co-located (QCLed) with one or more DM-RSs of a control channel. The RS resource and the DM-RSs of the control channel may be QCLed when the channel characteristics from a transmission via an RS to the wireless device 2201, and the channel characteristics from a transmission via a control channel to the wireless device, are similar or the same under a configured criterion.

FIG. 23A shows an example of a beam failure event involving a single TRP. A single TRP such as at a base station 2301 may transmit, to a wireless device 2302, a first beam 2303 and a second beam 2304. A beam failure event may occur if, e.g., a serving beam, such as the second beam 2304, is blocked by a moving vehicle 2305 or other obstruction (e.g., building, tree, land, or any object) and configured beams (e.g., the first beam 2303 and/or the second beam 2304), including the serving beam, are received from the single TRP. The wireless device 2302 may trigger a mechanism to recover from beam failure when a beam failure occurs.

FIG. 23B shows an example of a beam failure event involving multiple TRPs. Multiple TRPs, such as at a first base station 2306 and at a second base station 2309, may transmit, to a wireless device 2308, a first beam 2307 (e.g., from the first base station 2306) and a second beam 2310 (e.g., from the second base station 2309). A beam failure event may occur when, e.g., a serving beam, such as the second beam 2310, is blocked by a moving vehicle 2311 or other obstruction (e.g., building, tree, land, or any object) and configured beams (e.g., the first beam 2307 and/or the second beam 2310) are received from multiple TRPs. The wireless device 2008 may trigger a mechanism to recover from beam failure when a beam failure occurs.

A wireless device may monitor a PDCCH, such as a New Radio PDCCH (NR-PDCCH), on M beam pair links simultaneously, where M≥1 and the maximum value of M may depend at least on the wireless device capability. Such monitoring may increase robustness against beam pair link blocking. A base station may transmit, and the wireless device may receive, one or more messages configured to cause the wireless device to monitor NR-PDCCH on different beam pair link(s) and/or in different NR-PDCCH OFDM symbol.

A base station may transmit higher layer signaling, and/or a MAC control element (MAC CE), that may comprise parameters related to a wireless device Rx beam setting for monitoring NR-PDCCH on multiple beam pair links. A base station may transmit one or more indications of a spatial QCL assumption between a first DL RS antenna port(s) and a second DL RS antenna port(s). The first DL RS antenna port(s) may be for one or more of a cell-specific CSI-RS, device-specific CSI-RS, SS block, PBCH with DM-RSs of PBCH, and/or PBCH without DM-RSs of PBCH. The second DL RS antenna port(s) may be for demodulation of a DL control channel. Signaling for a beam indication for a NR-PDCCH (e.g., configuration to monitor NR-PDCCH) may be via MAC CE signaling, RRC signaling, DCI signaling, or specification-transparent and/or an implicit method, and any combination thereof.

For reception of unicast DL data channel, a base station may indicate spatial QCL parameters between DL RS antenna port(s) and DM-RS antenna port(s) of DL data channel. A base station may transmit DCI (e.g., downlink grants) comprising information indicating the RS antenna port(s). The information may indicate the RS antenna port(s) which may be QCLed with DM-RS antenna port(s). A different set of DM-RS antenna port(s) for the DL data channel may be indicated as a QCL with a different set of RS antenna port(s).

If a base station transmits a signal indicating a spatial QCL parameters between CSI-RS and DM-RS for PDCCH, a wireless device may use CSI-RSs QCLed with DM-RS for a PDCCH to monitor beam pair link quality. If a beam failure event occurs, the wireless device may transmit a beam failure recovery request, such as by a determined configuration.

If a wireless device transmits a beam failure recovery request, e.g., via an uplink physical channel or signal, a base station may detect that there is a beam failure event, for the wireless device, by monitoring the uplink physical channel or signal. The base station may initiate a beam recovery mechanism to recover the beam pair link for transmitting PDCCH between the base station and the wireless device. The base station may transmit one or more control signals, to the wireless device, e.g., after or in response to receiving the beam failure recovery request. A beam recovery mechanism may be, e.g., an L1 scheme, or a higher layer scheme.

A base station may transmit one or more messages comprising, e.g., configuration parameters of an uplink physical channel and/or a signal for transmitting a beam failure recovery request. The uplink physical channel and/or signal may be based on at least one of the following: a non-contention based PRACH (e.g., a beam failure recovery PRACH or BFR-PRACH), which may use a resource orthogonal to resources of other PRACH transmissions; a PUCCH (e.g., beam failure recovery PUCCH or BFR-PUCCH); and/or a contention-based PRACH resource. Combinations of these candidate signal and/or channels may be configured by a base station.

A gNB may respond a confirmation message to a UE after receiving one or multiple BFR request. The confirmation message may include the CRI associated with the candidate beam the UE indicates in the one or multiple BFR request. The confirmation message may be a L1 control information.

In carrier aggregation (CA), two or more component carriers (CCs) may be aggregated. A wireless device may simultaneously receive or transmit on one or more CCs, depending on capabilities of the wireless device, using the technique of CA. In an example, a wireless device may support CA for contiguous CCs and/or for non-contiguous CCs. CCs may be organized into cells. For example, CCs may be organized into one primary cell (PCell) and one or more secondary cells (SCells).

When configured with CA, a wireless device may have one RRC connection with a network. During an RRC connection establishment/re-establishment/handover, a cell providing NAS mobility information may be a serving cell. During an RRC connection re-establishment/handover procedure, a cell providing a security input may be a serving cell. In an example, the serving cell may denote a PCell. In an example, a gNB may transmit, to a wireless device, one or more messages comprising configuration parameters of a plurality of one or more SCells, depending on capabilities of the wireless device.

When configured with CA, a base station and/or a wireless device may employ an activation/deactivation mechanism of an SCell to improve battery or power consumption of the wireless device. When a wireless device is configured with one or more SCells, a gNB may activate or deactivate at least one of the one or more SCells. Upon configuration of an SCell, the SCell may be deactivated unless an SCell state associated with the SCell is set to "activated" or "dormant".

In an example, a wireless device may activate/deactivate an SCell in response to receiving an SCell Activation/Deactivation MAC CE.

In an example, a gNB may transmit, to a wireless device, one or more messages comprising an SCell timer (e.g., sCellDeactivationTimer). In an example, a wireless device may deactivate an SCell in response to an expiry of the SCell timer.

When a wireless device receives an SCell Activation/Deactivation MAC CE activating an SCell, the wireless device may activate the SCell. In response to the activating the SCell, the wireless device may perform operations comprising: SRS transmissions on the SCell; CQI/PMI/RI/CRI reporting for the SCell; PDCCH monitoring on the SCell; PDCCH monitoring for the SCell; and/or PUCCH transmissions on the SCell.

In an example, in response to the activating the SCell, the wireless device may start or restart a first SCell timer (e.g., sCellDeactivationTimer) associated with the SCell. The wireless device may start or restart the first SCell timer in the slot when the SCell Activation/Deactivation MAC CE activating the SCell has been received. In an example, in response to the activating the SCell, the wireless device may (re-)initialize one or more suspended configured uplink grants of a configured grant Type 1 associated with the SCell according to a stored configuration. In an example, in response to the activating the SCell, the wireless device may trigger PHR.

When a wireless device receives an SCell Activation/Deactivation MAC CE deactivating an activated SCell, the wireless device may deactivate the activated SCell. In an example, when a first SCell timer (e.g., sCellDeactivationTimer) associated with an activated SCell expires, the wireless device may deactivate the activated SCell. In response to the deactivating the activated SCell, the wireless device may stop the first SCell timer associated with the activated SCell. In an example, in response to the deactivating the activated SCell, the wireless device may clear one or more configured downlink assignments and/or one or more configured uplink grants of a configured uplink grant Type 2 associated with the activated SCell. In an example, in response to the deactivating the activated SCell, the wireless device may: suspend one or more configured uplink grants of a configured uplink grant Type 1 associated with the activated SCell; and/or flush HARQ buffers associated with the activated SCell.

In an example, when an SCell is deactivated, a wireless device may not perform operations comprising: transmitting SRS on the SCell; reporting CQI/PMI/RI/CRI for the SCell; transmitting on UL-SCH on the SCell; transmitting on RACH on the SCell; monitoring at least one first PDCCH on the SCell; monitoring at least one second PDCCH for the SCell; and/or transmitting a PUCCH on the SCell.

In an example, when at least one first PDCCH on an activated SCell indicates an uplink grant or a downlink assignment, a wireless device may restart a first SCell timer (e.g., sCellDeactivationTimer) associated with the activated SCell. In an example, when at least one second PDCCH on a serving cell (e.g. a PCell or an SCell configured with PUCCH, i.e. PUCCH SCell) scheduling the activated SCell indicates an uplink grant or a downlink assignment for the activated SCell, a wireless device may restart the first SCell timer (e.g., sCellDeactivationTimer) associated with the activated SCell.

In an example, when an SCell is deactivated, if there is an ongoing random access procedure on the SCell, a wireless device may abort the ongoing random access procedure on the SCell.

Figure 24A:
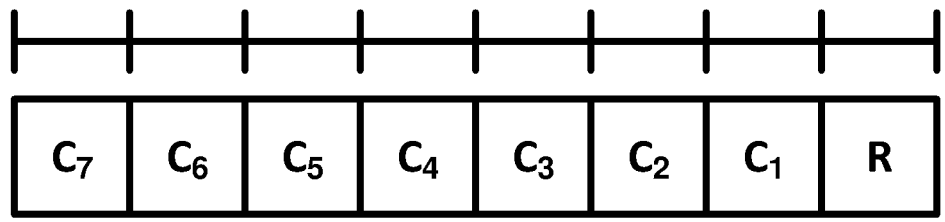
FIG. 24A is an example diagram for a secondary activation/deactivation medium access control control element (MAC CE) as per an aspect of an embodiment of the present disclosure.

FIG. 24A shows an example of an SCell Activation/Deactivation MAC CE of one octet. A first MAC PDU subheader with a first LCID (e.g., '111010') may identify the SCell Activation/Deactivation MAC CE of one octet. The SCell Activation/Deactivation MAC CE of one octet may have a fixed size. The SCell Activation/Deactivation MAC CE of one octet may comprise a single octet. The single octet may comprise a first number of C-fields (e.g. seven) and a second number of R-fields (e.g., one).

Figure 24B:
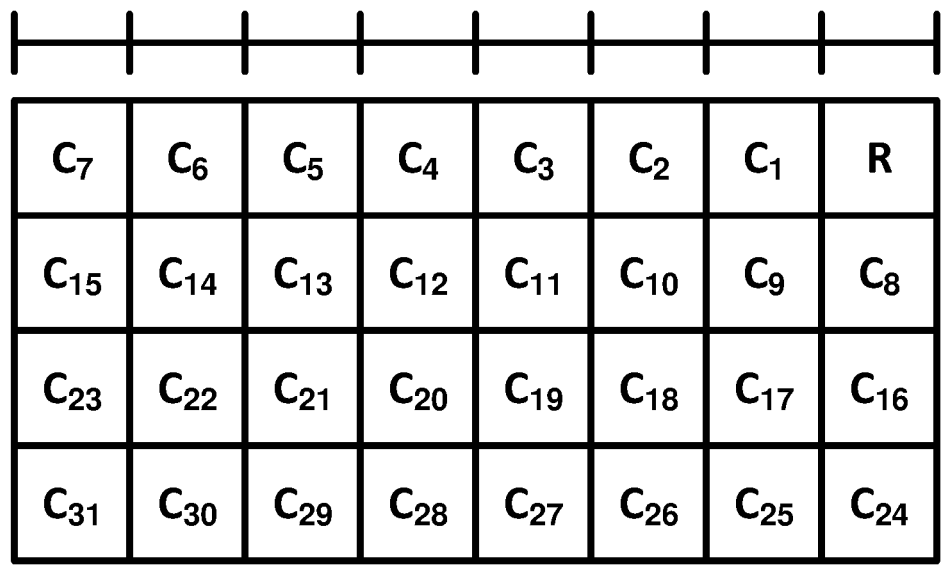
FIG. 24B is an example diagram for a secondary activation/deactivation MAC CE as per an aspect of an embodiment of the present disclosure.

FIG. 24B shows an example of an SCell Activation/Deactivation MAC CE of four octets. A second MAC PDU subheader with a second LCID (e.g., '111001') may identify the SCell Activation/Deactivation MAC CE of four octets. The SCell Activation/Deactivation MAC CE of four octets may have a fixed size. The SCell Activation/Deactivation MAC CE of four octets may comprise four octets. The four octets may comprise a third number of C-fields (e.g., 31) and a fourth number of R-fields (e.g., 1).

In FIG. 24A and/or FIG. 24B, a $C_i$ field may indicate an activation/deactivation status of an SCell with an SCell index i if an SCell with SCell index i is configured. In an example, when the $C_i$ field is set to one, an SCell with an SCell index i may be activated. In an example, when the $C_i$ field is set to zero, an SCell with an SCell index i may be deactivated. In an example, if there is no SCell configured with SCell index i, the wireless device may ignore the $C_i$ field. In FIG. 24A and FIG. 24B, an R field may indicate a reserved bit. The R field may be set to zero.

FIG. 25A and FIG. 25B show timeline when a UE receives a MAC activation command. When a UE receives a MAC activation command for a secondary cell in subframe n, the corresponding actions in the MAC layer shall be applied no later than the minimum requirement defined in 3GPP TS 36.133 or TS 38.133 and no earlier than subframe n+8, except for the following: the actions related to CSI reporting and the actions related to the sCellDeactivationTimer associated with the secondary cell, which shall be applied in subframe n+8. When a UE receives a MAC deactivation command for a secondary cell or the sCellDeactivationTimer associated with the secondary cell expires in subframe n, the corresponding actions in the MAC layer shall apply no later than the minimum requirement defined in 3GPP TS 36.133 or TS 38.133, except for the actions related to CSI reporting which shall be applied in subframe n+8.

When a UE receives a MAC activation command for a secondary cell in subframe n, the actions related to CSI reporting and the actions related to the sCellDeactivationTimer associated with the secondary cell, are applied in subframe n+8. When a UE receives a MAC deactivation command for a secondary cell or other deactivation conditions are met (e.g. the sCellDeactivationTimer associated with the secondary cell expires) in subframe n, the actions related to CSI reporting are applied in subframe n+8. The UE starts reporting invalid or valid CSI for the Scell at the $(n+8)^{th}$ subframe, and start or restart the sCellDeactivationTimer when receiving the MAC CE activating the SCell in the $n^{th}$ subframe. For some UE having slow activation, it may report an invalid CSI (out-of-range CSI) at the $(n+8)^{th}$ subframe, for some UE having a quick activation, it may report a valid CSI at the $(n+8)^{th}$ subframe.

When a UE receives a MAC activation command for an SCell in subframe n, the UE starts reporting CQI/PMI/RI/PTI for the SCell at subframe n+8 and starts or restarts the sCellDeactivationTimer associated with the SCell at subframe n+8. It is important to define the timing of these actions for both UE and eNB. For example, sCellDeactivationTimer is maintained in both eNB and UE and it is important that both UE and eNB stop, start and/or restart this timer in the same TTI. Otherwise, the sCellDeactivationTimer in the UE may not be in-sync with the corresponding sCellDeactivationTimer in the eNB. Also, eNB starts monitoring and receiving CSI (CQI/PMI/RI/PTI) according to the predefined timing in the same TTI and/or after UE starts transmitting the CSI. If the CSI timings in UE and eNB are not coordinated based on a common standard or air interface signaling the network operation may result in inefficient operations and/or errors.

FIG. 26 shows DCI formats for an example of 20 MHz FDD operation with 2 Tx antennas at the base station and no carrier aggregation in an LTE system. In a NR system, the DCI formats may comprise at least one of: DCI format 0_0/0_1 indicating scheduling of PUSCH in a cell; DCI format 1_0/1_1 indicating scheduling of PDSCH in a cell; DCI format 2_0 notifying a group of UEs of slot format; DCI format 2_1 notifying a group of UEs of PRB(s) and OFDM symbol(s) where a UE may assume no transmission is intended for the UE; DCI format 2_2 indicating transmission of TPC commands for PUCCH and PUSCH; and/or DCI format 2_3 indicating transmission of a group of TPC commands for SRS transmission by one or more UEs. In an example, a gNB may transmit a DCI via a PDCCH for scheduling decision and power-control commends. More specifically, the DCI may comprise at least one of: downlink scheduling assignments, uplink scheduling grants, power-control commands. The downlink scheduling assignments may comprise at least one of: PDSCH resource indication, transport format, HARQ information, and control information related to multiple antenna schemes, a command for power control of the PUCCH used for transmission of ACK/NACK in response to downlink scheduling assignments. The uplink scheduling grants may comprise at least one of: PUSCH resource indication, transport format, and HARQ related information, a power control command of the PUSCH.

In an example, different types of control information may correspond to different DCI message sizes. For example, supporting spatial multiplexing with noncontiguous allocation of RBs in the frequency domain may require a larger scheduling message in comparison with an uplink grant allowing for frequency-contiguous allocation only. DCIs may be categorized into different DCI formats, where a format corresponds to a certain message size and usage.

In an example, a UE may monitor one or more PDCCH to detect one or more DCI with one or more DCI format. The one or more PDCCH may be transmitted in common search space or UE-specific search space. A UE may monitor PDCCH with only a limited set of DCI format, to save power consumption. For example, a normal UE may not be required to detect a DCI with DCI format 6 which is used for an eMTC UE. The more DCI format to be detected, the more power be consumed at the UE.

In an example, a UE may monitor one or more PDCCH candidates to detect one or more DCI with one or more DCI format. The one or more PDCCH may be transmitted in common search space or UE-specific search space. A UE may monitor PDCCH with only a limited set of DCI format, to save power consumption. For example, a normal UE may not be required to detect a DCI with DCI format 6 which is used for an eMTC UE. The more DCI format to be detected, the more power be consumed at the UE.

In an example, the one or more PDCCH candidates that a UE monitors may be defined in terms of PDCCH UE-specific search spaces. A PDCCH UE-specific search space at CCE aggregation level $L \in \{1, 2, 4, 8\}$ may be defined by a set of PDCCH candidates for CCE aggregation level L. In an example, for a DCI format, a UE may be configured per serving cell by one or more higher layer parameters a number of PDCCH candidates per CCE aggregation level L.

In an example, in non-DRX mode operation, a UE may monitor one or more PDCCH candidate in control resource set q according to a periodicity of $W_{PDCCH, q}$ symbols that may be configured by one or more higher layer parameters for control resource set q.

In an example, if a UE is configured with higher layer parameter, e.g., cif-InSchedulingCell, the carrier indicator field value may correspond to cif-InSchedulingCell.

In an example, for the serving cell on which a UE may monitor one or more PDCCH candidate in a UE-specific search space, if the UE is not configured with a carrier indicator field, the UE may monitor the one or more PDCCH candidates without carrier indicator field. In an example, for the serving cell on which a UE may monitor one or more PDCCH candidates in a UE-specific search space, if a UE is configured with a carrier indicator field, the UE may monitor the one or more PDCCH candidates with carrier indicator field.

In an example, a UE may not monitor one or more PDCCH candidates on a secondary cell if the UE is configured to monitor one or more PDCCH candidates with carrier indicator field corresponding to that secondary cell in another serving cell. For example, for the serving cell on which the UE may monitor one or more PDCCH candidates, the UE may monitor the one or more PDCCH candidates at least for the same serving cell.

In an example, the information in the DCI formats used for downlink scheduling can be organized into different groups, with the field present varying between the DCI formats, including at least one of: resource information, consisting of: carrier indicator (0 or 3 bits), RB allocation; HARQ process number; MCS, NDI, and RV (for the first TB); MCS, NDI and RV (for the second TB); MIMO related information; PDSCH resource-element mapping and QCI; Downlink assignment index (DAI); TPC for PUCCH; SRS request (1 bit), triggering one-shot SRS transmission; ACK/NACK offset; DCI format 0/1A indication, used to differentiate between DCI format 1A and 0; and padding if necessary. The MIMO related information may comprise at least one of: PMI, precoding information, transport block swap flag, power offset between PDSCH and reference signal, reference-signal scrambling sequence, number of layers, and/or antenna ports for the transmission.

In an example, the information in the DCI formats used for uplink scheduling can be organized into different groups, with the field present varying between the DCI formats, including at least one of: resource information, consisting of: carrier indicator, resource allocation type, RB allocation; MCS, NDI (for the first TB); MCS, NDI (for the second TB); phase rotation of the uplink DMRS; precoding information; CSI request, requesting an aperiodic CSI report; SRS request (2 bit), used to trigger aperiodic SRS transmission using one of up to three preconfigured settings; uplink index/DAI; TPC for PUSCH; DCI format 0/1A indication; and padding if necessary.

In an example, a gNB may perform CRC scrambling for a DCI, before transmitting the DCI via a PDCCH. The gNB may perform CRC scrambling by bit-wise addition (or Modulo-2 addition or exclusive OR (XOR) operation) of multiple bits of at least one wireless device identifier (e.g., C-RNTI, CS-RNTI, TPC-CS-RNTI, TPC-PUCCH-RNTI, TPC-PUSCH-RNTI, SP CSI C-RNTI, SRS-TPC-RNTI, INT-RNTI, SFI-RNTI, P-RNTI, SI-RNTI, RA-RNTI, and/or MCS-C-RNTI) with the CRC bits of the DCI. The wireless device may check the CRC bits of the DCI, when detecting the DCI. The wireless device may receive the DCI when the CRC is scrambled by a sequence of bits that is the same as the at least one wireless device identifier.

In a NR system, in order to support wide bandwidth operation, a gNB may transmit one or more PDCCH in different control resource sets. A gNB may transmit one or more RRC message comprising configuration parameters of one or more control resource sets. At least one of the one or more control resource sets may comprise at least one of: a first OFDM symbol; a number of consecutive OFDM symbols; a set of resource blocks; a CCE-to-REG mapping; and a REG bundle size, in case of interleaved CCE-to-REG mapping.

Figure 27:
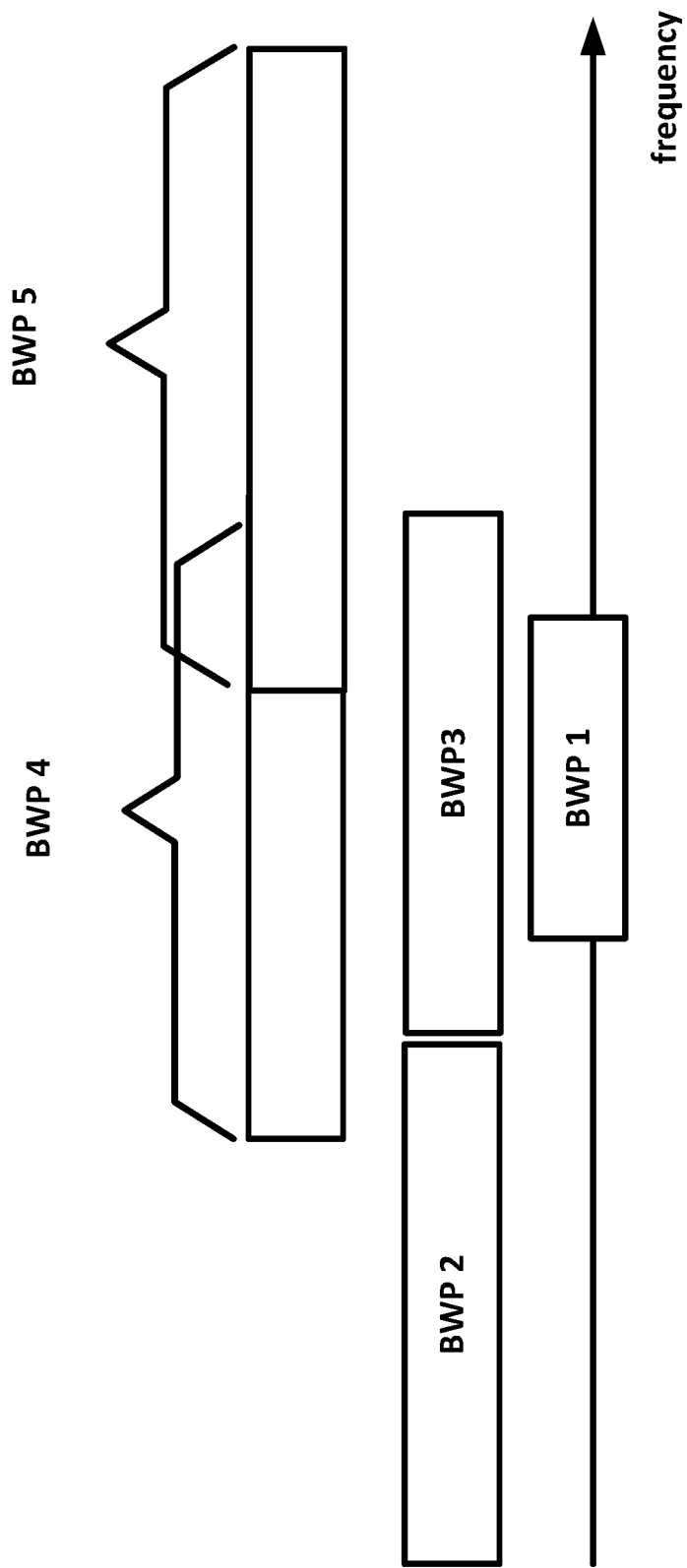
FIG. 27 is an example diagram for bandwidth part (BWP) configurations as per an aspect of an embodiment of the present disclosure.

FIG. 27 shows example of multiple BWPs configuration. A gNB may transmit one or more message comprising configuration parameters of one or more bandwidth parts (BWP) of a cell. The cell may be a PCell or a SCell. The one or more BWPs may have different numerologies. A gNB may transmit one or more control information for cross-BWP scheduling to a UE. One BWP may overlap with another BWP in frequency domain.

In an example, a gNB may transmit one or more messages comprising configuration parameters of one or more DL and/or UL BWPs for a cell, with at least one BWP as the active DL or UL BWP, and zero or one BWP as the default DL or UL BWP. For the PCell, the active DL BWP may be the DL BWP on which the UE may monitor one or more PDCCH, and/or receive PDSCH. The active UL BWP is the UL BWP on which the UE may transmit uplink signal. For a secondary cell (SCell) if configured, the active DL BWP may be the DL BWP on which the UE may monitor one or more PDCCH and receive PDSCH when the SCell is activated by receiving a MAC activation/deactivation CE. The active UL BWP is the UL BWP on which the UE may transmit PUCCH (if configured) and/or PUSCH when the SCell is activated by receiving a MAC activation/deactivation CE. Configuration of multiple BWPs may be used to save UE's power consumption. When configured with an active BWP and a default BWP, a UE may switch to the default BWP if there is no activity on the active BWP. For example, a default BWP may be configured with narrow bandwidth, an active BWP may be configured with wide bandwidth. If there is no signal transmitting or receiving, the UE may switch the BWP to the default BWP, which may reduce power consumption.

In an example, for each DL BWP or UL BWP in a set of DL BWPs or UL BWPs, respectively, the wireless device may be configured the following parameters for the serving cell: a subcarrier spacing provided by a higher layer parameter (e.g., subcarrierSpacing); a cyclic prefix provided by a higher layer parameter (e.g., cyclicPrefix); a first PRB and a number of contiguous PRBs indicated by a higher layer parameter (e.g., locationAndBandwidth) that is interpreted as RIV, and the first PRB is a PRB offset relative to the PRB indicated by higher layer parameters (e.g., offsetToCarrier and subcarrierSpacing); an index in the set of DL BWPs or UL BWPs by respective a higher layer parameter (e.g., bwp-Id); a set of BWP-common and a set of BWP-dedicated parameters by higher layer parameters (e.g., bwp-Common and bwp-Dedicated).

In an example, switching BWP may be triggered by a DCI or a timer. When a UE receives a DCI indicating DL BWP switching from an active BWP to a new BWP, the UE may monitor PDCCH and/or receive PDSCH on the new BWP. When the UE receives a DCI indicating UL BWP switching from an active BWP to a new BWP, the UE may transmit PUCCH (if configured) and/or PUSCH on the new BWP. A gNB may transmit one or more messages comprising a BWP inactivity timer to a UE. The UE starts the timer when it switches its active DL BWP to a DL BWP other than the default DL BWP. The UE may restart the timer to the initial value when it successfully decodes a DCI to schedule PDSCH(s) in its active DL BWP. The UE may switch its active DL BWP to the default DL BWP when the BWP timer expires.

In an example, a BWP may be configured with: a subcarrier spacing, a cyclic prefix, a number of contiguous PRBs, an offset of the first PRB in the number of contiguous PRBs relative to the first PRB, or Q control resource sets if the BWP is a DL BWP.

In an example, on a SCell, there may be no initial active BWP since the initial access is performed on the Pcell. For example, the initially activated DL BWP and/or UL BWP, when the Scell is activated, may be configured or reconfigured by RRC signaling. In an example, the default BWP of the SCell may also be configured or reconfigured by RRC signaling.

In an example, gNB may configure UE-specific default DL BWP other than initial active BWP after RRC connection, e.g., for the purpose of load balancing. The default BWP may support other connected mode operations (besides operations supported by initial active BWP), e.g., fall back and/or connected mode paging. In this case, the default BWP may comprise common search space, e.g., at least a search space needed for monitoring a pre-emption indication.

In an example, a DL BWP other than the initial active DL BWP may be configured to a UE as the default DL BWP. The reconfiguring the default DL BWP may be due to load balancing and/or different numerologies employed for active DL BWP and initial active DL BWP.

In an example, for a paired spectrum, DL and UL BWPs may be independently activated while, for an unpaired spectrum DL and UL BWPS are jointly activated. In case of bandwidth adaptation, where the bandwidth of the active downlink BWP may be changed, there may, in case of an unpaired spectrum, be a joint activation of a new downlink BWP and new uplink BWP. For example, a new DL/UL BWP pair where the bandwidth of the uplink BWPs may be the same (e.g., no change of uplink BWP).

In an example embodiment, making an association between DL BWP and UL BWP may allow that one activation/deactivation command may switch both DL and UL BWPs at once. Otherwise, separate BWP switching commands may be necessary.

In an example, PUCCH resources may be configured in a configured UL BWP, in a default UL BWP and/or in both. For instance, if the PUCCH resources are configured in the default UL BWP, UE may retune to the default UL BWP for transmitting an SR. for example, the PUCCH resources are configured per BWP or a BWP other than the default BWP, the UE may transmit an SR in the current active BWP without retuning.

In an example, there may be at most one active DL BWP and at most one active UL BWP at a given time for a serving cell. A BWP of a cell may be configured with a specific numerology/TTI. In an example, a logical channel and/or logical channel group that triggers SR transmission while the wireless device operates in one active BWP, the corresponding SR may remain triggered in response to BWP switching.

In an example, when a new BWP is activated, a configured downlink assignment may be initialized (if not active) or re-initialized (if already active) using PDCCH. In an example, via one or more RRC messages/signaling, a wireless device may be configured with at least one UL BWP, at least one DL BWP, and one or more configured grants for a cell. The one or more configured grants may be semi-persistent scheduling (SPS), Type 1 grant-free (GF) transmission/scheduling, and/or Type 2 GF transmission/scheduling. In an example, one or more configured grants may be configured per UL BWP. For example, one or more radio resources associated with one or more configured grants may not be defined/assigned/allocated across two or more UL BWPs.

In an example, an BWP may be in active during a period of time when a BWP inactivity timer is running. For example, a base station may transmit a control message to a wireless device to configure a first timer value of an BWP inactivity timer. The first timer value may determine how long a BWP inactivity timer runs, e.g., a period of time that a BWP inactivity timer runs. For example, the BWP inactivity timer may be implemented as a count-down timer from a first timer value down to a value (e.g., zero). In an example embodiment, the BWP inactivity timer may be implemented as a count-up timer from a value (e.g., zero) up to a first timer value down. In an example embodiment, the BWP inactivity timer may be implemented as a down-counter from a first timer value down to a value (e.g., zero). In an example embodiment, the BWP inactivity timer may be implemented as a count-up counter from a value (e.g., zero) up to a first timer value down. For example, a wireless device may restart a BWP inactivity timer (e.g., UL BWP and/or DL BWP inactivity timers) when the wireless device receives (and/or decodes) a DCI to schedule PDSCH(s) in its active BWP (e.g., its active UL BWP, its active DL BWP, and/or UL/DL BWP pair).

Figure 28:
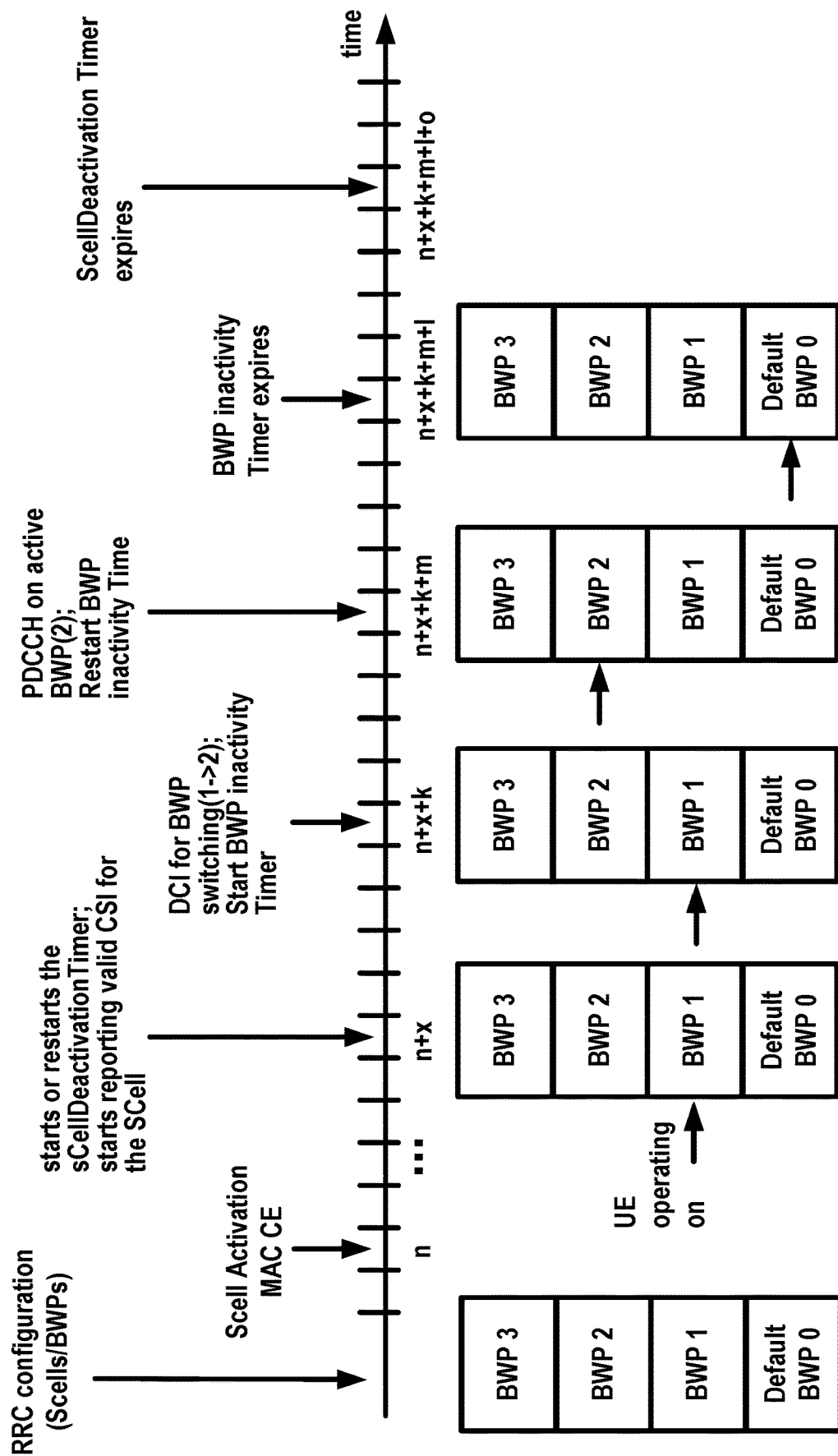
FIG. 28 is an example diagram for BWP operation in a secondary cell as per an aspect of an embodiment of the present disclosure.

FIG. 28 shows example of BWP switching mechanism. A UE may receive RRC message comprising parameters of a SCell and one or more BWP configuration associated with the SCell. Among the one or more BWPs, at least one BWP may be configured as the first active BWP (e.g., BWP 1 in FIG. 28), one BWP as the default BWP (e.g., BWP 0 in FIG. 28). The UE may receive a MAC CE to activate the SCell at the $n^{th}$ slot. The UE may start the sCellDeactivationTimer, and start CSI related actions for the SCell, and/or start CSI related actions for the first active BWP of the SCell at the $(n+x)^{th}$ slot. The UE may start the BWP inactivity timer at the $(n+x+k)^{th}$ slot in response to receiving a DCI indicating switching BWP from BWP 1 to BWP 2. When receiving a PDCCH indicating DL scheduling on BWP 2, for example, at the $(n+x+k+m)^{th}$ slot, the UE may restart the BWP inactivity timer. The UE may switch back to the default BWP (e.g., BWP 0) as an active BWP when the BWP inactivity timer expires, at the $(n+x+k+m+1)^{th}$ slot. The UE may deactivate the SCell when the sCellDeactivationTimer expires. Employing the BWP inactivity timer may further reduce UE's power consumption when the UE is configured with multiple cells with each cell having wide bandwidth (e.g., 1 GHz). The UE may only transmit on or receive from a narrow-bandwidth BWP (e.g., 5 MHz) on the PCell or SCell when there is no activity on an active BWP.

In an example, a wireless device may initiate a contention-based random access procedure (as shown in FIG. 16A) on an initial uplink BWP. The initial uplink BWP may be configured using an RRC message. The wireless device may initiate a contention-free random access procedure (as shown in FIG. 16B) on an uplink BWP. The uplink BWP may be an active uplink BWP. The wireless device may initiate the contention-free random access procedure in response to receiving a PDCCH order. The PDCCH order may be transmitted on a downlink control information (DCI). The DCI may comprise a preamble index and one or more random access channel resource parameters. The wireless device may initiate the contention-free random access procedure in response to receiving a handover command indicating a preamble index and one or more random access channel resource parameters. The wireless device may transmit a preamble in response to initiating the contention-based random access procedure or initiating the contention-free random access procedure.

In an example, a wireless device may transmit a preamble on a random access channel resource comprising a subframe and a frequency location. The wireless device may monitor a PDCCH for a random access response corresponding to a RA-RNTI. For example, the random access response may be identified by the RA-RNTI. In existing technologies, the wireless device may determine a RA-RNTI value as RA-RNTI=1+t_id+10*f_id. In an example, t_id (e.g., $0 \leq t\_id<10$) may be an index of the subframe when the wireless device transmitted the preamble. In an example, f_id may be an index of the frequency location on which the wireless device transmitted the preamble, in ascending order of frequency domain (e.g., $0 \leq f\_id<6$). As long as different wireless devices select different random access channel resources, RA-RNTI may be different for the different wireless devices, therefore reducing collision of receiving RARs.

In an NR system, a wireless device may transmit a preamble on a random access channel resource of an UL BWP among UL BWPs of a cell. Different wireless devices may transmit preambles on different UL BWPs in a cell.

Figure 29:
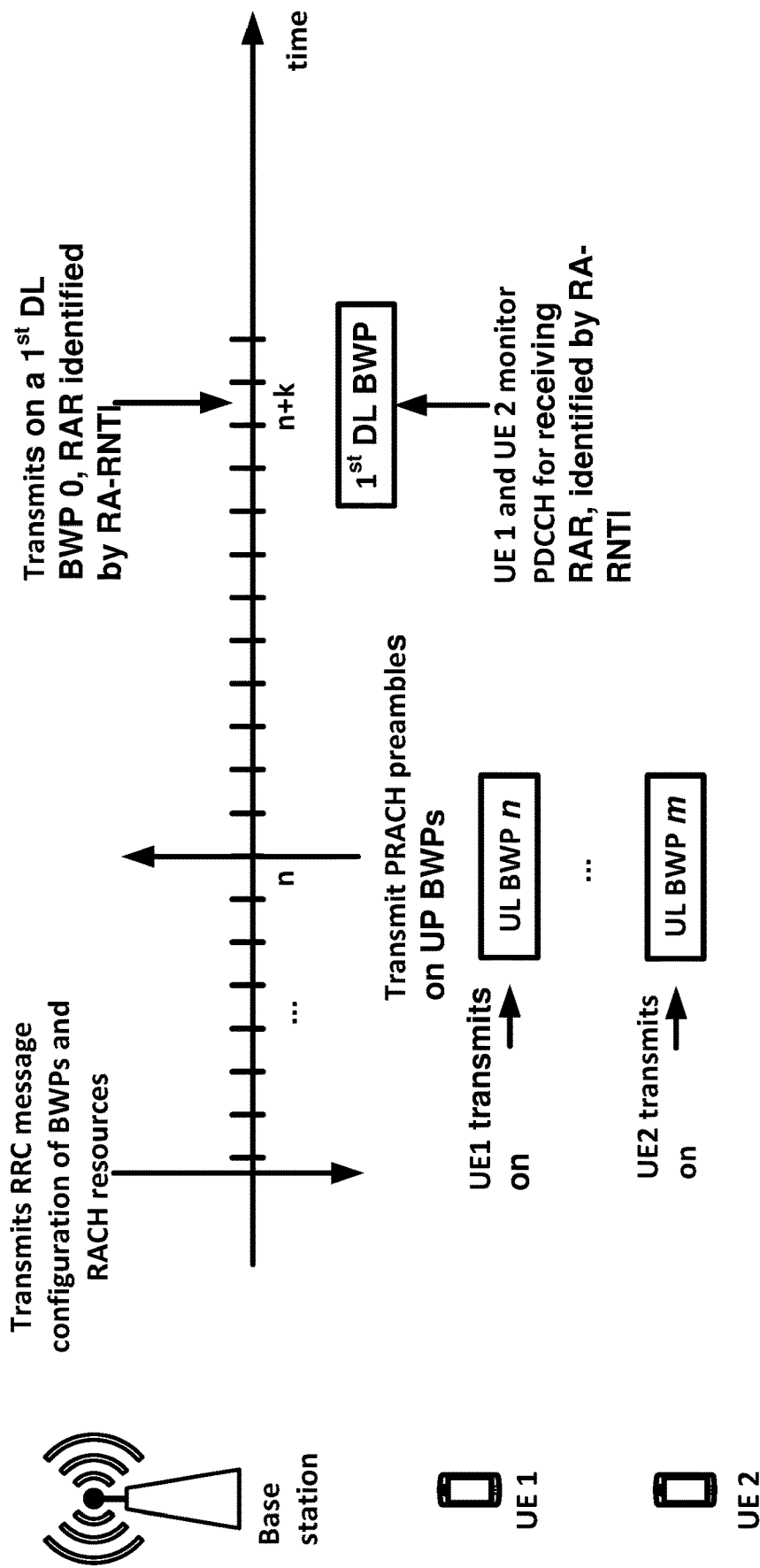
FIG. 29 is an example diagram for a random access procedure when configured with multiple UL BWPs as per an aspect of an embodiment of the present disclosure.

FIG. 29 shows example of random access procedure of multiple UEs when configured with multiple UL BWPs. A first wireless device (e.g., UE 1 in FIG. 29) may transmit a first preamble on a first RACH resource of a first UL BWP (e.g., UL BWP n in FIG. 29). A second wireless device (e.g., UE 2 in FIG. 29) may transmit second preamble on a second RACH resource of a second UL BWP (e.g., UL BWP m in FIG. 29). The preamble transmitted on UL BWP n and UL BWP m may be same or different.

In an example, a gNB may detect multiple PRACH preamble transmissions on multiple UL BWPs (e.g., UL BWP n and UL BWP m). The gNB may transmit one or more RARs from a DL BWP (e.g., $1^{st}$ DL BWP in FIG. 29) for UE 1 and UE 2. The one or more RARs may comprise at least: RAPID (RA Preamble Index) corresponding to a preamble that UE1 and/or UE2 transmits. The one or more RARs may be scheduled by a DCI carried by a PDCCH, identified by RA-RNTI of UE 1 and/or UE 2. The DCI may be CRC-scrambled by a RA-RNTI of UE 1 and/or UE 2. The RA-RNTI of UE 1 or UE 2 may be calculated based on a time and frequency location on which UE 1 or UE 2 transmit the preamble. In an example, by using existing RA-RNTI calculation mechanism, RA-RNTI of UE 1 and UE 2 may be the same RA-RNTI if RACH resources, identified by t_id (e.g., $0 \leq t\_id<10$) and f_id (e.g., $0 \leq f\_id<6$), used for preamble transmission of UL BWP m and UL BWP n are the same, although the resources are in different BWPs. In this case, UE1 and UE 2 may fail in detecting PDCCH for receiving a RAR. Therefore, existing technologies may not be able to differentiate RA-RNTIs for different UEs, when the different UEs select a same preamble and a same resource (time and frequency) on different UL BWPs. Implementation of existing technologies may result in increased preamble collision, extra random access process completion time and may increase transmission power consumption for UE 1 and UE 2 for the RACH process. In an example, implementation of existing RACH procedures when the number of UEs increase, may result in increased collisions (e.g., especially RA-RNTI collisions) of multiple RACH procedures from multiple UEs. There is a need to enhance RA-RNTI calculation to reduce RACH collision for preamble transmission on different UL BWPs from different UEs.

In an example, when existing RA-RNTI calculation is implemented for multiple active bandwidth parts, the wireless device may not be able to determine which RACH procedure the RAR may correspond to. In this case, implementation of existing technologies may require additional time and battery power for the RACH procedure. There is a need for differentiating the response for different preamble transmission on different UL BWPs.

In an example, example embodiments may improve time delay for a random access procedure when multiple UL BWPs are configured in a cell. Example embodiments may improve power consumption for a random access procedure when multiple UL BWPs are configured in a cell. Example embodiments may enhance RA-RNTI determination (or calculation) mechanism for reducing RACH collision (e.g., especially RA-RNTI collision) when multiple UL BWPs are configured. Example embodiments may comprise determining a value of RA-RNTI based on one or more configuration parameters of UL BWP on which a wireless device transmits a preamble.

Figure 30:
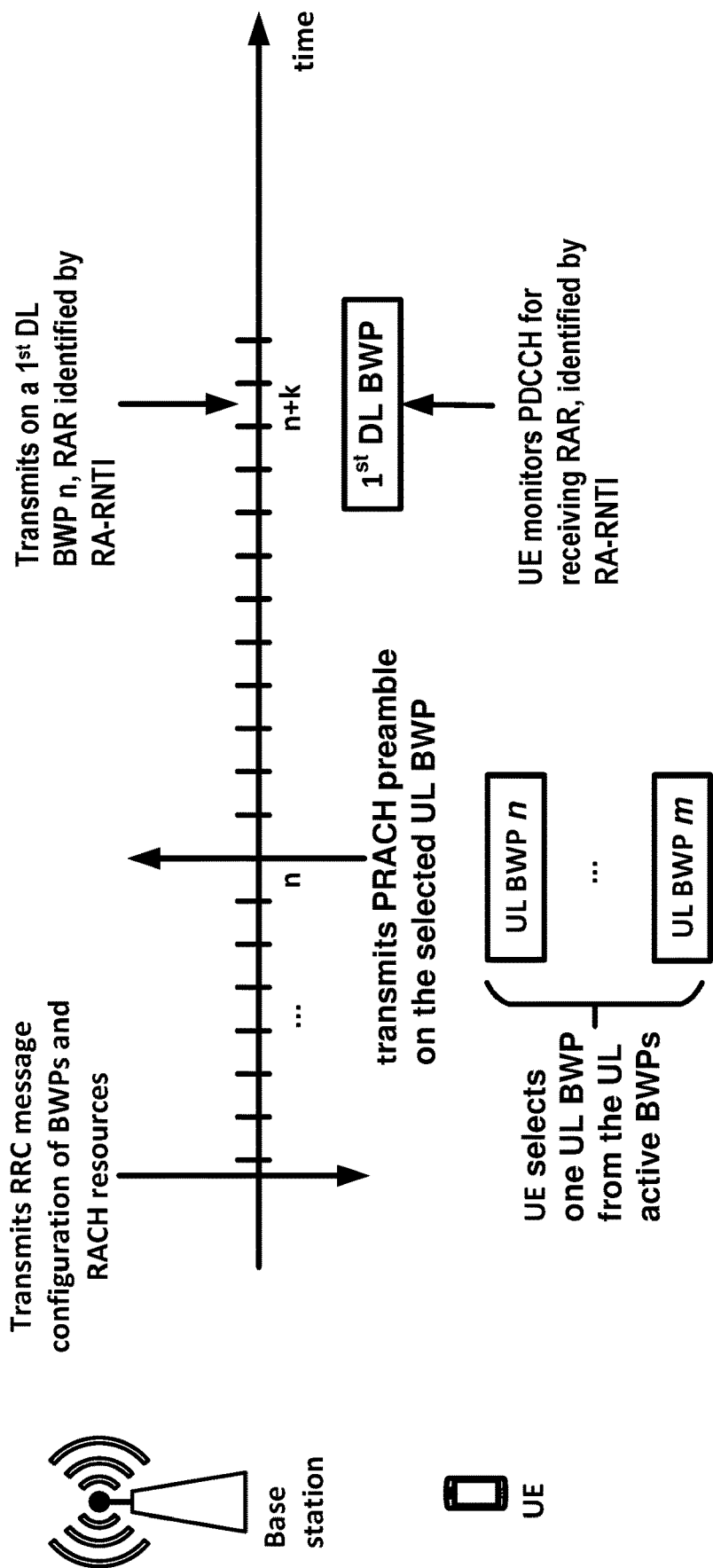
FIG. 30 is an example diagram for a random access procedure when configured with multiple UL BWPs as per an aspect of an embodiment of the present disclosure.

In an example, a wireless device may maintain multiple UL BWPs of a cell in active state. The wireless device may transmit a preamble on one of the multiple active UL BWPs. FIG. 30 shows an example RACH procedure when multiple UL BWPs are in active state. A wireless device (e.g., UE in FIG. 30) may transmit a preamble on RACH resource indicated in RACH resource configuration of one of a plurality of UL BWPs comprising UL BWP m and UL BWP n. In an example, the wireless device may autonomously select UL BWP m or UL BWP n for preamble transmission based on service type, UE's capability, and/or link quality between the wireless device and a base station. In an example, the wireless device may switch UL BWP from m to n, or from n to m, when transmitting RACH preambles, for a RACH procedure. In an example, the UE may determine a RA-RNTI value, based on parameters of the one or more PRACH resources and the one or more BWP parameters associated with the selected UL BWP on which the UE transmits the preamble. The UE may monitor a PDCCH for a DCI scrambled by the determined RA-RNTI.

Figure 31:
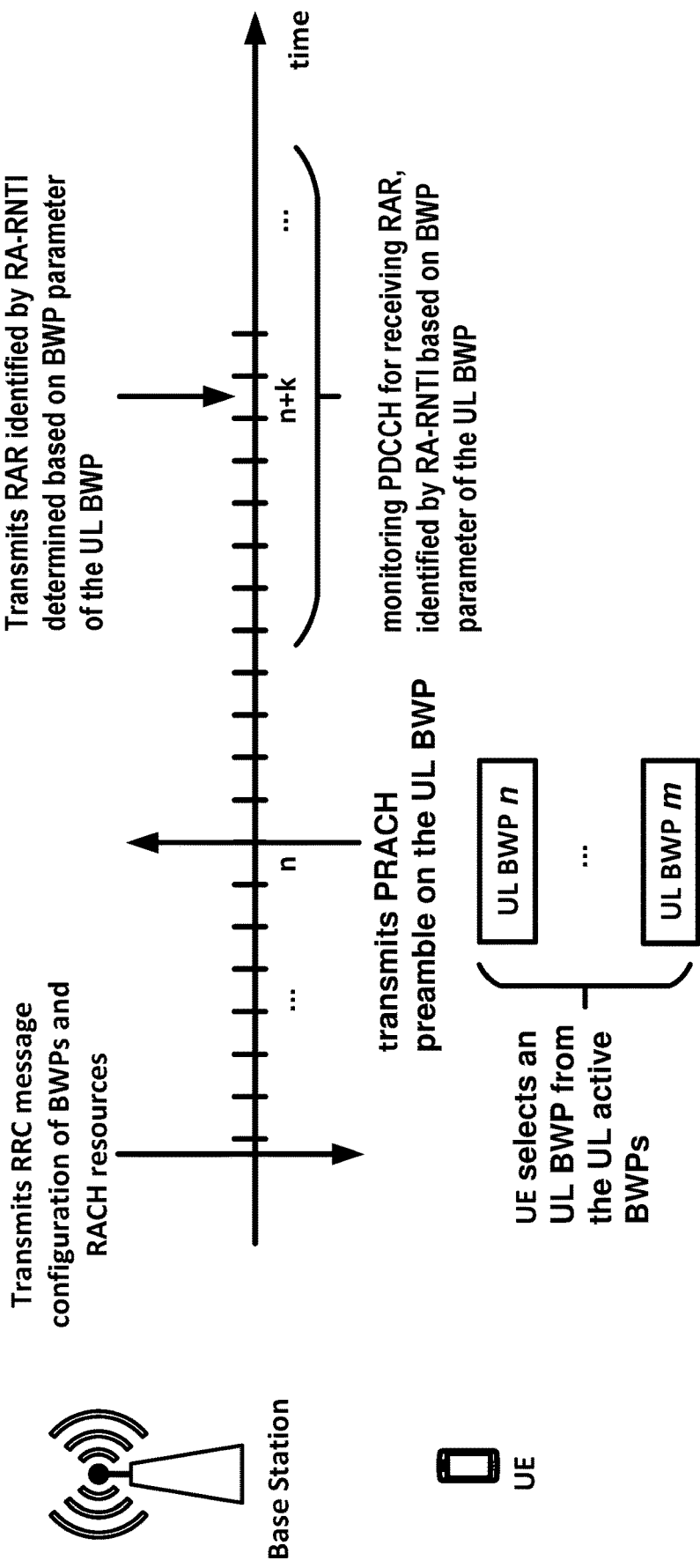
FIG. 31 is an example diagram for a RA-RNTI determination when configured with multiple UL BWPs as per an aspect of an embodiment of the present disclosure.

FIG. 31 shows an example embodiment of enhanced RA-RNTI determination mechanism. In an example, a gNB (e.g., Base Station in FIG. 31) may transmit to a wireless device (e.g., UE in FIG. 31) one or more RRC messages comprising configuration parameters of a plurality of cells. The one or more RRC messages may comprise: RRC connection reconfiguration message (e.g., RRCReconfiguration); RRC connection reestablishment message (e.g., RRCRestablishment); and/or RRC connection setup message (e.g., RRCSetup). The configuration parameters of at least one of the plurality of cells may comprise one or more BWP parameters of UL BWPs. The one or more RRC messages may be one or more system information. One or more BWP parameters of an UL BWP may comprise at least one of: an UL BWP identifier (or index); one or more radio resource configuration parameters; one or more PRACH configurations. The UL BWP identifier (or index) may be a value of 0, 1, 2, or 3. The UL BWP identifier (or index) may be a value of 1, 2, 3, or 4. The one or more radio resource configuration parameters may comprise at least one of: a frequency location; a bandwidth; a subcarrier spacing; and/or a cyclic prefix. The frequency location of an UL BWP may be a frequency offset (e.g., in unit of PRB(s)) of a first (or a last) PRB of the UL BWP from a (frequency) reference location. The (frequency) reference location may be indicated in one message.

In an example, one or more UL BWPs may be configured as initial active UL BWP(s). The initial active UL BWPs may be configured with the one or more RACH configurations. The one or more RACH configurations may comprise at least one of: one or more preambles with each preamble associated a preamble index; a preamble format; a preamble numerology; time or frequency radio resource allocation for RACH; and/or power setting of PRACH transmission.

In an example, one or more preambles allocated to a first initial active UL BWP may be same as the one or more preambles allocated to a second initial active UL BWP, if more than one initial UL BWPs configured. In an example, the power setting of PRACH transmission on a first initial active UL BWP may be different from the power setting of PRACH transmission on a second initial active UL BWP. In an example, the radio resource configuration (time and/or frequency) for RACH of a first active UL BWP may be different from the radio resource configuration for RACH of a second initial active UL BWP. Configuration of different PRACH parameters for different UL BWPs may reduce RACH transmission collision, and/or meet the target received power of RACH transmission with different numerologies on different UL BWPs.

In an example, a wireless device may transmit a PRACH preamble on an initial active UL BWP(s) when performing a random access procedure. The random access procedure may be a contention-based random access procedure (e.g., as shown in FIG. 16A). The random access may be a contention-free random access procedure (e.g., as shown in FIG. 16B).

In an example, more than one initial active UL BWPs may be configured to support different kinds of services, UE types/capabilities, and/or gNB's capabilities, or to reduce collision of preamble transmissions when multiple UEs performing random access procedures simultaneously.

In an example, more than one initial active UL BWPs may be configured to support one or more Supplementary UL (SUL) carriers, in addition to normal UL carriers, when SUL is applied for a NR TDD or a NR FDD carrier, one DL carrier can be associated with multiple UL carriers. In an example, a first initial active UL BWP may be configured on a normal UL carrier of a cell, and a second initial active UL BWP may be configured on a SUL carrier of the cell.

In an example, as shown in FIG. 31, a UE may select an active (e.g., initial active) UL BWP from one or more active (e.g., initial active) UL BWPs, and select a preamble from one or more preambles configured on the active UL BWP. The UE may transmit the preamble on the selected active UL BWP. In an example, the UE may determine a RA-RNTI value, based on parameters of the one or more PRACH resources and the one or more BWP parameters associated with the selected active UL BWP on which the UE transmits the preamble. The UE may monitor a PDCCH for a DCI scrambled by the determined RA-RNTI.

In an example, a UE may determine the RA-RNTI as a function of a time parameter and a frequency parameter of a RACH resource on which the UE transmits the preamble. The frequency parameter may comprise a frequency location of transmission of the preamble in the selected active UL BWP, and a relative frequency location (e.g., offset) of the selected active UL BWP compared with a (frequency) reference location. The relative frequency location may be indicated in the one or more BWP parameters of the selected active UL BWP. The reference location may be configured in an RRC message or a system information message.

In an example, a UE may determine a RA-RNTI value as: RA-RNTI=function(t_id, f_id, N, f_offset). In an example, N may be determined based on a number of slots in a radio frame. In an example, N, depending on a numerology of an UL BWP, may be equal to 80, when a SCS with 120 kHz is configured for the UL BWP. In an example, N may be fixed as a default value (e.g., N=10), independent of a numerology. f_offset may be a frequency offset between a first PRB of the selected active UL BWP and a reference location. t_id may be an index of a subframe/slot/symbol in which the UE transmits the preamble. f_id may be an index of a frequency location on which the UE transmits the preamble within the subframe/slot/symbol on the selected active UL BWP. In an example, f_id may be an indication of frequency location on which the UE transmits the preamble on the selected active UL BWP.

In an example, a UE may determine a RA-RNTI value as RA-RNTI=1+t_id+N*(f_id+f_offset/M). In an example, N may be a parameter which is determined based on a number of slots in a radio frame. In an example, N, depending on a numerology of an UL BWP, may be equal to 80, when a SCS with 120 kHz is configured for the UL BWP. In an example, N may be fixed as a default value (e.g., N=10), independent of a numerology. In an example, M (e.g., M=6) may be a maximum number of PRBs a PRACH preamble may occupy. In an example, N, M may be indicated in one or more parameters in an RRC message, or be fixed as a predefined value.

In an example, a UE may determine a RA-RNTI value as RA-RNTI=1+t_id+N*(f_id+ceil(f_offset/M)), where ceil (f_offset/M) is a smallest integral value not less than f_offset/M.

In an example embodiment, two UEs may select a same preamble and transmit the preamble with a RACH resource identified by a same t_id and f_id on different UL BWPs. Implementing the example embodiment may determine RA-RNTIs for the two UEs. The determined RA-RNTIs based on f_offset values of different UL BWPs may be different, since f_offset values of different UL BWPs are different. In an example, determining RA-RNTI based on f_offset values of different UL BWPs may result in having different RA-RNTI values. The enhanced RA-RNTI determination may reduce collision when receiving PDCCH and/or RAR for the two UEs. The enhanced RA-RNTI determination mechanism may reduce delay for RACH procedure.

In an example, in response to transmitting a preamble on an selected active UL BWP, a UE may determine a RA-RNTI value as RA-RNTI=function(t_id, f_id, N, UL_BWP_index), where UL_BWP_index may be an index of the selected active UL BWP. In an example, t_id may be an index of a subframe/slot/symbol in which the UE transmits the preamble. In an example, fid may be an index of a frequency location on which the UE transmits the preamble within the subframe/slot/symbol on the selected active UL BWP. In an example, f_id may be an indication of frequency location on which the UE may transmit the preamble in the UL BWP.

In an example, in response to transmitting a preamble on a selected active UL BWP, a UE may determine a RA-RNTI as RA-RNTI=1+t_id+N*(f_id+UL_BWP_index*K), where N may be a parameter which may be determined based on a number of slots in a radio frame. In an example, N, depending on a numerology of an UL BWP, may be equal to 80, when a SCS with 120 kHz is configured for the UL BWP. In an example, N may be fixed as a default value (e.g., N=10), independent of a numerology. In an example, K (e.g., K=6) may be a maximum number of frequency locations on which a UE may transmit a preamble in an UL BWP. In an example, N, K may be indicated in one or more parameters in an RRC message or be fixed as predefined values.

In an example embodiment, two UEs may select a same preamble and transmit the preamble with a RACH resource identified by a same t_id and f_id on different UL BWPs. Implementing the example embodiment may determine RA-RNTIs for the two UEs. The determined RA-RNTIs based on UL_BWP_index values of different UL BWPs may be different, since UL_BWP_index values of different UL BWPs are different. In an example, enhanced RA-RNTI determination based on UL_BWP_index values of different UL BWPs may result in having different RA-RNTI values. The enhanced RA-RNTI determination may reduce collision when receiving PDCCH and/or RAR for the two UEs. The enhanced RA-RNTI determination mechanism may reduce delay for RACH procedure.

In an example, example embodiments may improve time delay for a random access procedure when multiple UL BWPs are configured in a cell. Example embodiments may improve power consumption of a wireless device for a random access procedure when multiple UL BWPs are configured in a cell. Example embodiments may enhance RA-RNTI determination (or calculation) mechanism for reducing RACH collisions when multiple UL BWPs are configured. Example embodiments may comprise determining a value of RA-RNTI based on one or more configuration parameters of UL BWP on which a wireless device transmits a preamble.

Figure 32:
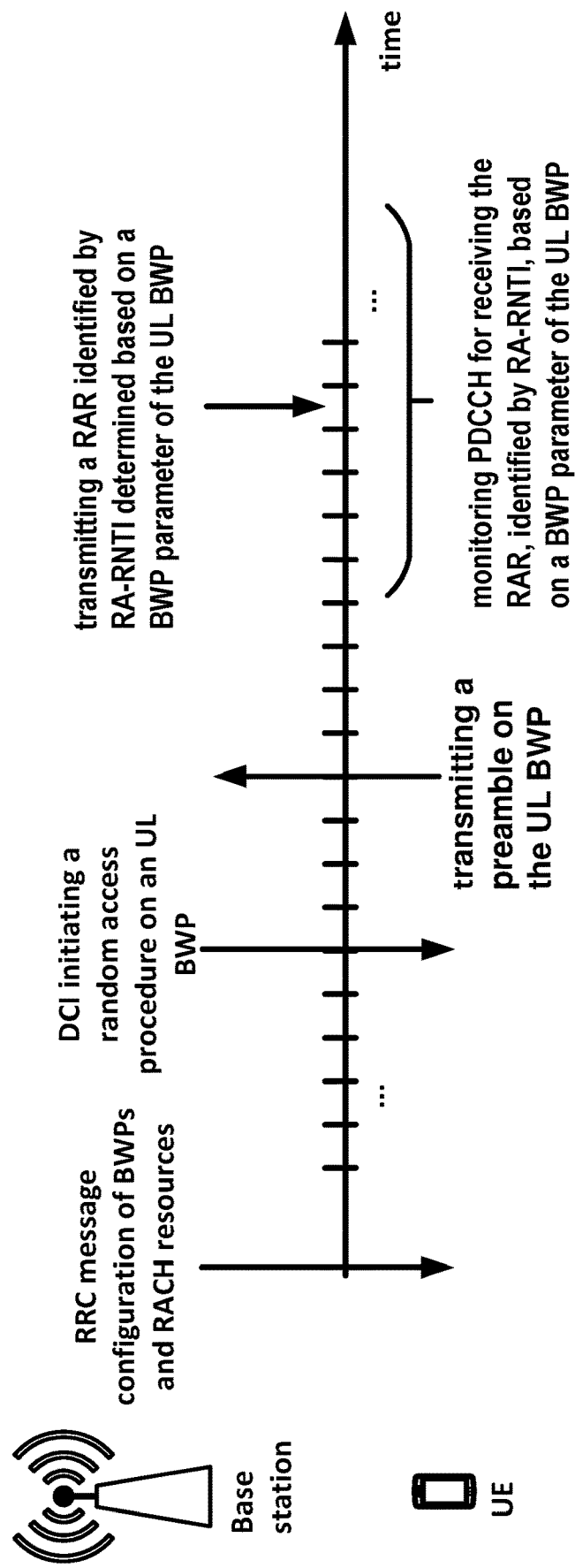
FIG. 32 is an example diagram for a RA-RNTI determination when configured with multiple UL BWPs as per an aspect of an embodiment of the present disclosure.

FIG. 32 shows an example embodiment of enhanced RA-RNTI determination mechanism. In an example, a gNB (e.g., Base Station in FIG. 32) may transmit to a wireless device (e.g., UE in FIG. 32) one or more RRC messages comprising configuration parameters of a plurality of cells. The configuration parameters of at least one of the plurality of cells may comprise one or more BWP parameters of UL BWPs. The one or more RRC messages may be one or more system information. One or more BWP parameters of an UL BWP may comprise at least one of: an UL BWP identifier (or index); one or more radio resource configuration parameters; one or more PRACH configurations. The UL BWP identifier (or index) may be a value of 0, 1, 2, or 3. The UL BWP identifier (or index) may be a value of 1, 2, 3, or 4. The one or more radio resource configuration parameters may comprise at least one of: a frequency location; a bandwidth; a subcarrier spacing; and/or a cyclic prefix. The frequency location of an UL BWP may be a frequency offset (e.g., in unit of PRB(s)) of a first (or a last) PRB of the UL BWP from a (frequency) reference location. The (frequency) reference location may be indicated in one message.

In an example, a wireless device may activate a first UL BWP of a cell. The wireless device may activate the first UL BWP in response to an RRC message, a MAC CE, and/or a first DCI. In an example, the wireless device may transmit uplink data packet(s) on the first UL BWP in response to the first UL BWP being in active state.

In an example, as shown in FIG. 32, the wireless device may receive a DCI indicating a random access procedure on a second UL BWP of a cell. The first UL BWP and the second UL BWP may be on a same cell. The DCI may comprise a preamble index and/or one or more radio resource parameters of a random access channel on the second UL BWP. In response to receiving the DCI, the wireless device may transmit a preamble identified by the preamble index via the random access channel on the second UL BWP.

In an example, in response to the transmitting the preamble on the second UL BWP, the wireless device may determine a RA-RNTI value based on a frequency parameter of the second UL BWP and one or more radio resource parameters of the random access channel on the second UL BWP. In an example, the frequency parameter of the second UL BWP may comprise at least one of: a frequency offset (e.g., f_offset) between a first PRB of the second UL BWP and a reference location; and/or an UL BWP index of the second UL BWP. The one or more radio resource parameters of the random access channel may comprise at least one of: an index (e.g., t_id) of a subframe/slot/symbol in which the UE transmits the preamble; and/or an index (e.g., fid) of a frequency location on which the UE transmits the preamble on the second UL BWP.

In an example embodiment, a UE may select a same preamble and transmit the preamble with a RACH resource identified by a same t_id and f_id on different UL BWPs. Implementing the example embodiment may determine RA-RNTIs for the UE. The determined RA-RNTIs based on f_offset values of different UL BWPs may be different, since f_offset values of different UL BWPs are different. In an example, enhanced RA-RNTI determination based on f_offset values of different UL BWPs may result in having different RA-RNTI values. The enhanced RA-RNTI determination may reduce collision when receiving PDCCH and/or RAR for the UE. The enhanced RA-RNTI determination mechanism may reduce delay for RACH procedure.

In an example, example embodiments may improve time delay for a random access procedure when multiple UL BWPs are configured in a cell. Example embodiments may improve power consumption for a random access procedure when multiple UL BWPs are configured in a cell. Example embodiments may enhance RA-RNTI determination (or calculation) mechanism for reducing RACH collisions (e.g., especially RA-RNTI collisions) when multiple UL BWPs are configured.

Figure 33A:
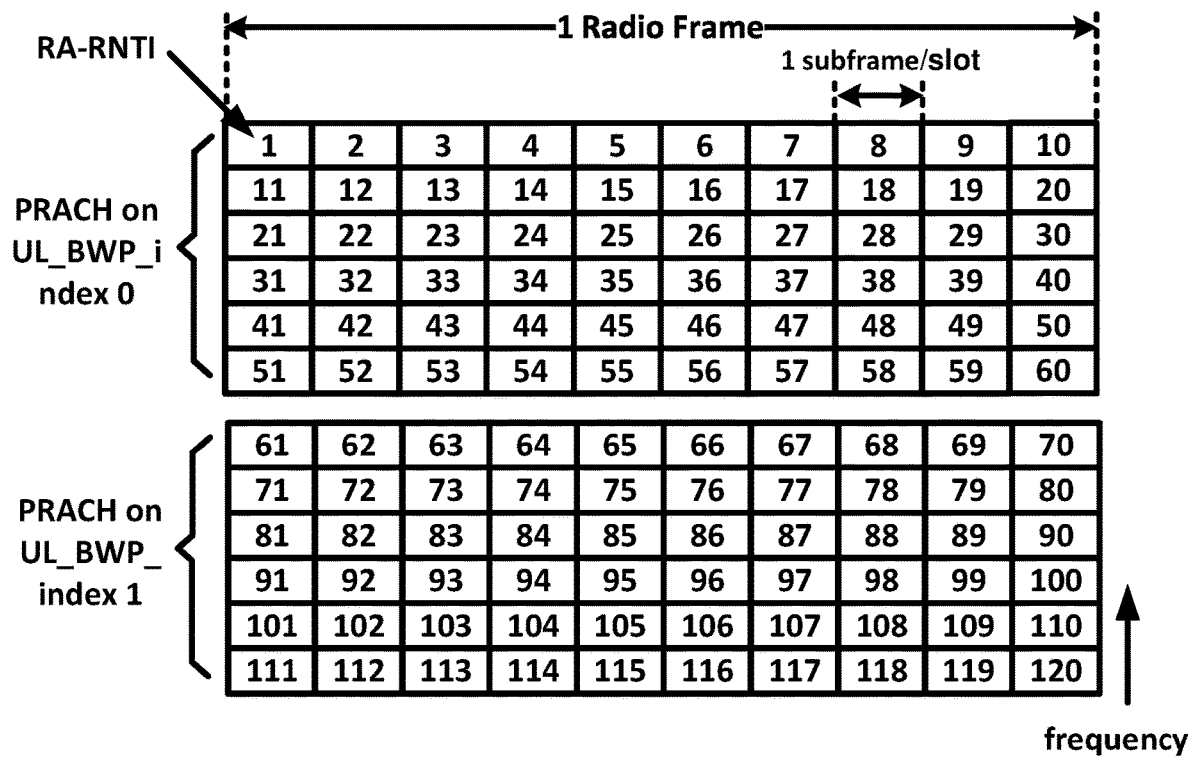
FIG. 33 A and FIG. 33B are example diagrams of RA-RNTI values as per an aspect of an embodiment of the present disclosure.

FIG. 33A shows an example of RA-RNTI values calculated based on one or more embodiments, for a 10-ms radio frame with 10 subframes, in which case, N is equal to 10. In an example, 6 frequency locations for PRACH transmission in one of two (initial) UL BWPs (e.g., identified by UL_BWP_index 0 and UL_BWP_index 1) may be configured. As shown in FIG. 33A, a number in the grid may be a RA-RNTI value calculated (according to one or more embodiments) based on a time and frequency location of transmission of a preamble, and an index of the UL BWP on which a wireless device may transmit the preamble. For example, RA-RNTIs corresponding to a first time and frequency location in UL BWP 0 and UL BWP 1 may be 1, and 61 respectively. In this case, although a same preamble and a same time/frequency location may be selected in different UL BWPs, the UE may correctly detect a DCI scrambled by its own RA-RNTI and receive RAR successfully. Example embodiments may enhance RA-RNTI determination (or calculation) mechanism for reducing RACH collisions (e.g., especially RA-RNTI collisions) when multiple UL BWPs are configured.

Figure 33B:
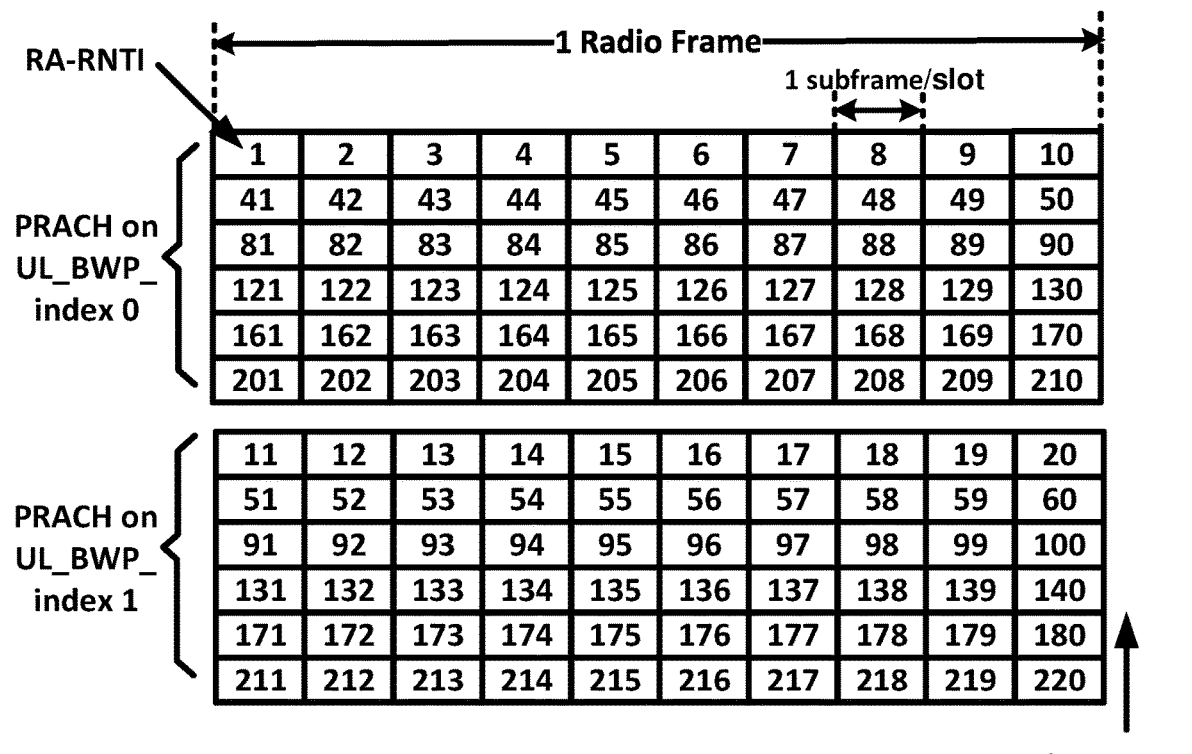
Figure 34:
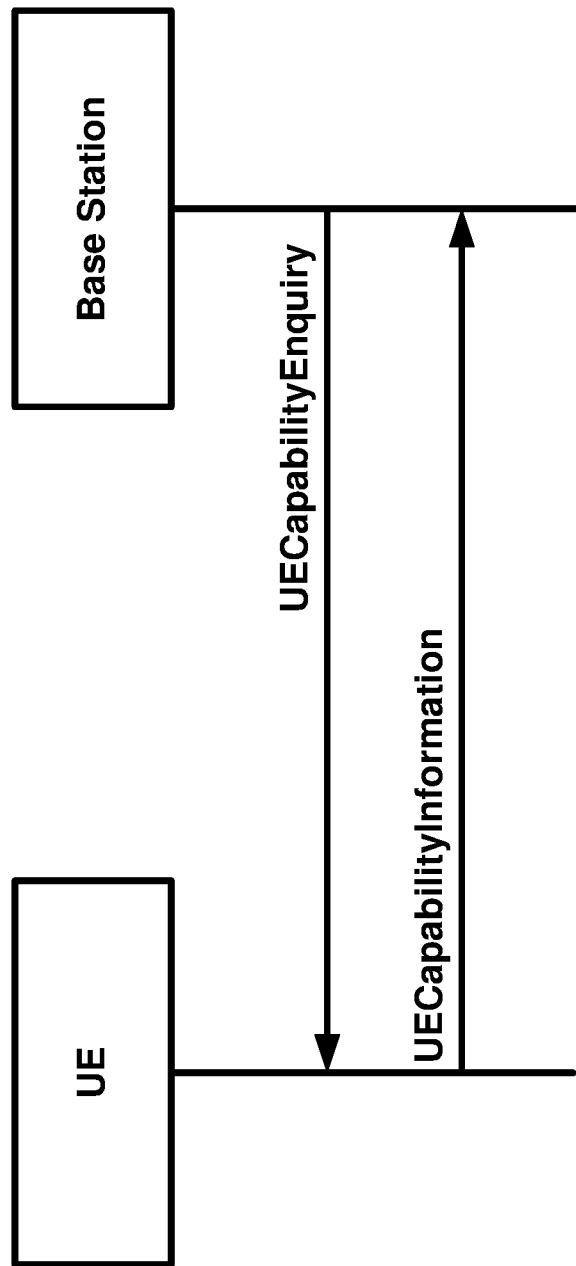
FIG. 34 is an example wireless device and base station message exchange as per an aspect of an embodiment of the present disclosure.
Figure 35:
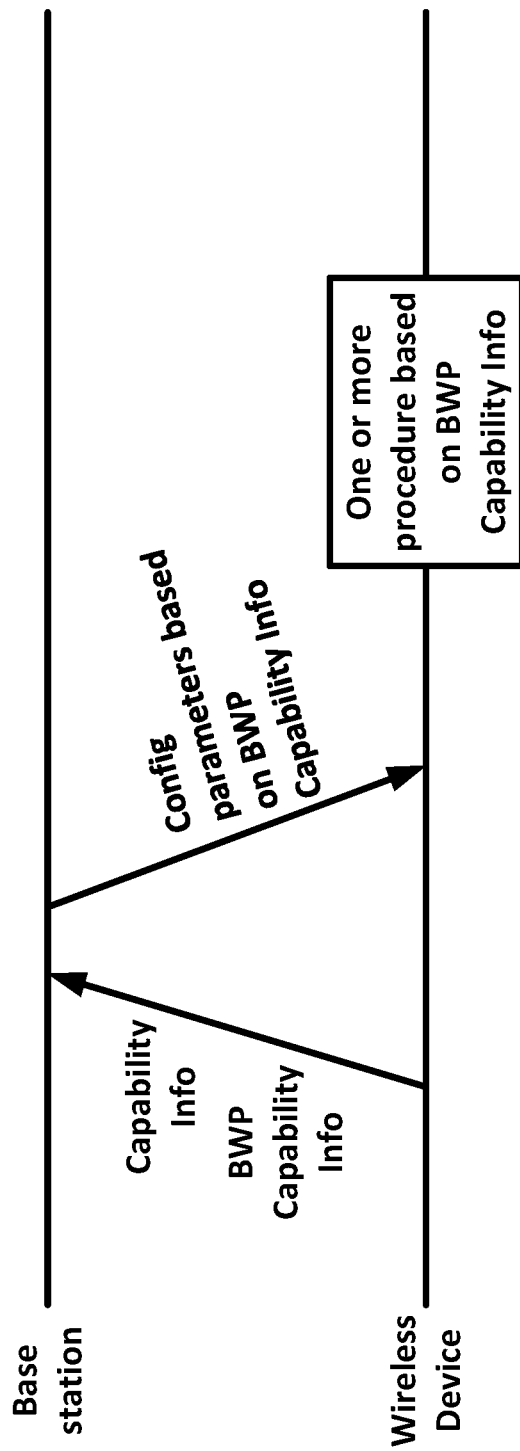
FIG. 35 is an example wireless device capability information transmission procedure as per an aspect of an embodiment of the present disclosure.

FIG. 33B shows an example of RA-RNTI values calculated based on one or more embodiments, for a 10-ms radio frame with 10 subframes, in which case N is equal to 10. In an example, 6 frequency locations for PRACH transmission in one of two (initial) UL BWPs (e.g., identified by UL_BWP_index 0 and UL_BWP_index 1) may be configured. In an example, a wireless device may determine a RA-RNTI value as RA-RNTI=1+t_id+N*(UL_BWP_index+f_id*Max_BWP). In an example, MAX_BWP may be a maximum number (e.g., 4) of UL BWPs a wireless device may support in a cell. UL_BWP_index may be an index of an UL BWP on which a wireless device may transmit a preamble. In this example, RA-RNTI values may be spread over different frequency locations of preamble transmissions in one UL BWP, to reduce RA-RNTI detection error. In an example, as shown in FIG. 33B, when Max_BWP=4, RA-RNTIs corresponding to a first and second frequency location of preamble transmissions in UL BWP index 0 may be 1 and 41, respectively. In this case, larger spread values of RA-RNTIs in frequency domain of an UL BWP may improve DCI detection probability. Example embodiments may enhance RA-RNTI determination (or calculation) mechanism for reducing RACH collisions (e.g., especially RA-RNTI collisions) when multiple UL BWPs are configured.

In an example, a UE may transmit a preamble on/for a SCell. In response to transmitting the preamble on/for the SCell, the UE may determine a RA-RNTI value as RA-RNTI=function(t_id, f_id, UL_BWP_index, SCell_id). In an example, SCell_id may be a cell index of the SCell the UE transmits the preamble on/for. t_id may be an index of a subframe/slot/symbol in which the UE transmits the preamble. f_id may be an index of a frequency location on which the UE transmits the preamble on an UL BWP identified by the UL_BWP_index. The UE may monitor a PDCCH of a PCell for detecting RAR, identified by the determined RA-RNTI, corresponding to the transmitted preamble.

In an example, a UE may transmit a preamble on/for a SCell. In response to transmitting the preamble on/for the SCell, the UE may determine a RA-RNTI value as RA-RNTI=1+t_id+N*(f_id+UL_BWP_index*K+Max_BWP*K*SCell index), where Max_BWP may be a number of UL BWPs the UE may support in the SCell identified by the SCell_index. In an example, SCell_id may be a cell index of the SCell the UE transmits the preamble on/for. t_id may be an index of a subframe/slot/symbol in which the UE transmits the preamble. f_id may be an index of a frequency location on which the UE transmits the preamble on an UL BWP identified by the UL_BWP_index. K (e.g., K=6) may be a maximum number of frequency locations on one of which a UE may transmit a preamble in an UL BWP. In an example, N, K and Max_BWP may be indicated in one or more parameters in one or more RRC messages or be fixed as predefined values.

In an example, a UE may transmit a preamble on/for a SCell. In response to transmitting the preamble on/for the SCell, the UE may calculate RA-RNTI as RA-RNTI=1+t_id+N*(UL_BWP_index+f_id*Max_BWP+Max_BWP*K*SCell index), where Max_BWP may be a number of UL BWPs the UE may support in the SCell identified by the SCell_index. In an example, SCell_id may be a cell index of the SCell the UE transmits the preamble on. t_id may be an index of a subframe/slot/symbol in which the UE transmits the preamble. f_id may be an index of a frequency location on which the UE transmits the preamble on an UL BWP identified by the UL_BWP_index. K (e.g., K=6) may be a maximum number of frequency locations on one of which a UE may transmit a preamble in one UL BWP. In an example, N, K and/or Max_BWP may be indicated in one or more parameters in one or more RRC messages or be fixed as predefined values.

In an example, a UE may transmit a preamble on an active (or initial) UL BWP in a cell when configured with multiple beams. In response to transmitting the preamble, the UE may determine a RA-RNTI value as RA-RNTI=function (t_id, f_id, UL_BWP_index, SSB_index). In an example, SSB_index may be an index of SSB associated with the preamble. In an example, SCell_id may be a cell index of the SCell the UE transmits the preamble on. t_id may be an index of a subframe/slot/symbol in which the UE transmits the preamble. f_id may be an index of a frequency location on which the UE transmits the preamble on an UL BWP identified by the UL BWP index.

In an example, a UE may transmit a preamble on an active UL BWP of a cell. In response to transmitting the preamble on the active UL BWP of the cell, the UE may determine a RA-RNTI value as RA-RNTI=1+t_id+N*(SSB_index+ Max_SSB*(f_id+UL_BWP_index*K)). In an example, Max_SSB may a maximum number of SSBs a gNB may transmit in the cell. In an example, SCell_id may be a cell index of the SCell the UE transmits the preamble on. t_id may be an index of a subframe/slot/symbol in which the UE transmits the preamble. f_id may be an index of a frequency location on which the UE transmits the preamble on an UL BWP identified by the UL_BWP_index.

In an example, a UE may transmit a preamble on an active UL BWP of a cell. In response to transmitting the preamble on the active UL BWP of the cell, the UE may determine a RA-RNTI value as RA-RNTI=1+t_id+N*(SSB_index+ Max_SSB*(UL_BWP_index+f_id*Max_BWP)). In an example, Max_SSB may be a maximum number of SSBs a gNB may transmit in the cell. Max_BWP may be a number of UL BWPs the UE may support in the cell. In an example, t_id may be an index of a subframe/slot/symbol in which the UE transmits the preamble. f_id may be an index of a frequency location on which the UE transmits the preamble on an UL BWP identified by the UL_BWP_index.

In an example, example embodiments may improve time delay for a random access procedure when multiple UL BWPs and/or multiple beams are configured in a cell. Example embodiments may improve power consumption for a random access procedure when multiple UL BWPs and/or multiple beams are configured in a cell. Example embodiments may enhance RA-RNTI determination (or calculation) mechanism for reducing RACH collision (e.g., especially RA-RNTI collision) when multiple UL BWPs and/or multiple beams are configured.

In an example, a UE may receive one or more RRC message comprising configuration parameters of a plurality of cells, wherein configuration parameters of at least one of the plurality of cells comprise one or more BWP parameters of one or more UL BWPs. One or more BWP parameters of an UL BWP of the one or more UL BWPs may comprise at least one of: an UL BWP identifier; one or more radio resource configuration (e.g., frequency location, bandwidth, subcarrier spacing, and/or cyclic prefix); parameters of one or more PRACH resources. In an example, the UE may transmit a preamble via one of the one or more PRACH resources on a first UL BWP of the one or more UL BWPs. In response to transmitting the preamble on the first UL BWP, the UE may determine a RA-RNTI value, based on the one of the one or more PRACH resources and the one or more BWP parameters of the first UL BWP. The UE may monitor PDCCH for a DCI scrambled by the determined RA-RNTI, for detecting a RAR corresponding to the transmitted preamble.

In an example, the parameters of the one or more PRACH resources may comprise at least one of: one or more preambles identified by one or more preamble indexes; a PRACH format; a PRACH numerology; time or frequency radio resource configuration parameters; and/or power setting of PRACH transmission.

In an example, a wireless device may receive one or more messages comprising one or more radio resource configuration (RRC) messages from one or more base stations (e.g., one or more NR gNBs and/or one or more LTE eNBs and/or one or more eLTE eNBs, etc.). In an example, the one or more messages may comprise configuration parameters for a plurality of logical channels. In an example, the one or more messages may comprise a logical channel identifier for each of the plurality of logical channels. In an example, the logical channel identifier may be one of a plurality of logical channel identifiers. In an example, the plurality of logical channel identifiers may be pre-configured. In an example, the logical channel identifier may be one of a plurality of consecutive integers.

In an example, the plurality of logical channels configured for a wireless device may correspond to one or more bearers. In an example, there may be one-to-one mapping/correspondence between a bearer and a logical channel. In an example, there may be one-to-many mapping/correspondence between one or more bearers and one or more logical channels. In an example, a bearer may be mapped to a plurality of logical channels. In an example, data from a packet data convergence protocol (PDCP) entity corresponding to a bearer may be duplicated and mapped to a plurality of radio link control (RLC) entities and/or logical channels. In an example, scheduling of the plurality of logical channels may be performed by a single medium access control (MAC) entity. In an example, scheduling of the plurality of logical channels may be performed by a two or more MAC entities. In an example, a logical channel may be scheduled by one of a plurality of MAC entities. In an example, the one or more bearers may comprise one or more data radio bearers. In an example, the one or more bearers may comprise one or more signaling radio bearers. In an example, the one or more bearers may correspond to one or more application and/or quality of service (QoS) requirements. In an example, one or more bearers may correspond to ultra reliable low latency communications (URLLC) applications and/or enhanced mobile broadband (eMBB) applications and/or massive machine to machine communications (mMTC) applications.

In an example, a first logical channel of the plurality of logical channels may be mapped to one or more of a plurality of transmission time intervals (TTIs)/numerologies. In an example, a logical channel may not be mapped to one or more of the plurality of TTIs/numerologies. In an example, a logical channel corresponding to a URLLC bearer may be mapped to one or more first TTIs and a logical corresponding to an eMBB application may be mapped to one or more second TTIs, wherein the one or more first TTIs may have shorter duration than the one or more second TTIs. In an example, the plurality of TTIs/numerologies may be pre-configured at the wireless device. In an example, the one or more messages may comprise the configuration parameters of the plurality of TTIs/numerologies. In an example, a base station may transmit a grant/DCI to a wireless device, wherein the grant/DCI may comprise indication of a cell and/or a TTI/numerology that the wireless device may transmit data. In an example, a first field in the grant/DCI may indicate the cell and a second field in the grant/DCI may indicate the TTI/numerology. In an example, a field in the grant/DCI may indicate both the cell and the TTI/numerology.

In an example, the one or more messages may comprise a logical channel group identifier for one or more of the plurality of the logical channels. In an example, one or more of the plurality of logical channels may be assigned a logical channel group identifier n, $0 \leq n \leq N$ (e.g., N=3, 6 or 5, or 7, or 11 or 15, etc.). In an example, the one or more of the plurality of logical channels with the logical channel group identifier may be mapped to a same one or more TTIs/numerologies. In an example, the one or more of the plurality of logical channels with the logical channel group identifier may only be mapped to a same one or more TTIs/numerologies. In an example, the one more of the plurality of logical channels may correspond to a same application and/or QoS requirements. In an example, a first one or more logical channels may be assigned logical channel identifier(s) and logical channel group identifier(s) and a second one or more logical channels may be assigned logical channel identifier(s). In an example, a logical channel group may comprise of one logical channel.

In an example, the one or more messages may comprise one or more first fields indicating mapping between the plurality of logical channels and the plurality of TTIs/numerologies and/or cells. In an example, the one or more first fields may comprise a first value indicating a logical channel is mapped to one or more first TTI duration shorter than or equal to the first value. In an example, the one or more first fields may comprise a second value indicating a logical channel is mapped to one or more second TTI durations longer than or equal to the second value. In an example, the one or more first fields may comprise and/or indicate one or more TTIs/numerologies and/or cells that a logical channel is mapped to. In an example, the mapping may be indicated using one or more bitmaps. In an example, if a value of 1 in a bitmap associated with a logical channel may indicate that the logical channel is mapped to a corresponding TTI/numerology and/or cell. In an example, if a value of 0 in the bitmap associated with a logical channel may indicate that the logical channel is not mapped to a corresponding TTI/numerology and/or cell. In an example, the one or more messages may comprise configuration parameters for the plurality of the logical channels. In an example, the configuration parameters for a logical channel may comprise an associated bitmap for the logical channel wherein the bitmap may indicate the mapping between the logical channel and the plurality of TTIs/numerologies and/or cells.

In an example, a first logical channel may be assigned at least a first logical channel priority. In an example, the first logical channel may be assigned one or more logical channel priorities for one or more TTIs/numerologies. In an example, the first logical channel may be assigned a logical channel priority for each of the plurality of TTIs/numerologies. In an example, a logical channel may be assigned a logical channel priority for each of one or more of the plurality of TTIs/numerologies. In an example, a logical channel may be assigned a logical channel priority for each of one or more TTIs/numerologies wherein the logical channel is mapped to the each of the one or more TTIs/numerologies. In an example, the one or more messages may comprise one or more second fields indicating priorities of a logical channel on one or more TTIs/numerologies. In an example, the one or more second fields may comprise one or more sequences indicating priorities of a logical channel on one or more TTIs/numerologies. In an example, the one or more second fields may comprise a plurality of sequences for the plurality of logical channels. A sequence corresponding to a logical channel may indicate the priorities of the logical channel on the plurality of TTIs/numerologies/cells or one or more of the plurality of TTIs/numerologies/cells. In an example, the priorities may indicate mapping between a logical channel and one or more TTIs/numerologies. In an example, a priority of a logical channel with a given value (e.g., zero or minus infinity or a negative value) for a TTI/numerology may indicate that the logical channel is not mapped to the TTI/numerology. In an example, sizes of the sequence may be variable. In an example, a size of a sequence associated with a logical channel may be a number of TTIs/numerologies to which the logical channel is mapped. In an example, the sizes of the sequence may be fixed, e.g., the number of TTIs/numerologies/cells.

In an example, a TTI/numerology for a grant (e.g., as indicated by the grant/DCI) may not accept data from one or more logical channels. In an example, the one or more logical channels may not be mapped to the TTI/numerology indicated in the grant. In an example, a logical channel of the one or more logical channels may be configured to be mapped to one or more TTIs/numerologies and the TTI/numerology for the grant may not be among the one or more TTIs/numerologies. In an example, a logical channel of the one or more logical channels may be configured with a max-TTI parameter indicating that the logical channel may not be mapped to a TTI longer than max-TTI, and the grant may be for a TTI longer than max-TTI. In an example, a logical channel may be configured with a min-TTI parameter indicating that the logical channel may not be mapped to a TTI shorter than min-TTI, and the grant may be for a TTI shorter than min-TTI. In an example, a logical channel may not be allowed to be transmitted on a cell and/or one or more numerologies and/or one or more numerologies of a cell. In an example, a logical channel may contain duplicate data and the logical channel may be restricted so that the logical channel is not mapped to a cell/numerology. In an example, the logical channel may not be configured with an upper layer configuration parameter laa-allowed and the cell may be an LAA cell.

In an example, a MAC entity and/or a multiplexing and assembly entity of a MAC entity may perform a logical channel prioritization (LCP) procedure to allocate resources of one or more grants, indicated to a wireless device by a base station using one or more DCIs, to one or more logical channel. In an example, the timing between a grant/DCI reception time at the wireless device and transmission time may be dynamically indicated to the wireless device (e.g., at least using a parameter in the grant/DCI). In an example, timing between a grant/DCI reception time at the wireless device and transmission time may be fixed/preconfigured and/or semi-statically configured. In an example, the LCP procedure for NR may consider the mapping of a logical channel to one or more numerologies/TTIs, priorities of a logical channel on the one or more numerologies/TTIs, the numerology/TTI indicated in a grant, etc. The LCP procedure may multiplex data from one or more logical channels to form a MAC PDU. The amount of data from a logical channel included in a MAC PDU may depend on the QoS parameters of a bearer and/or service associated with the logical channel, priority of the logical channel on the numerology/TTI indicated in the grant, etc. In an example, one or more grants may be processed jointly at a wireless device (e.g., resources of the one or more grants are allocated substantially at a same time). In an example, one or more first grants of the one or more grants may be grouped into a grouped grant with capacity equal to sum of the capacities of the one or more first grants and the resources of the grouped grant may be allocated to one or more logical channels.

In an example embodiment, a UE configured for operation in bandwidth parts (BWPs) of a serving cell, may be configured by higher layers for the serving cell a set of bandwidth parts (BWPs) for receptions by the UE (DL BWP set) or a set of BWPs for transmissions by the UE (UL BWP set). In an example, for a DL BWP or UL BWP in a set of DL BWPs or UL BWPs, respectively, the UE may be configured at least one of following for the serving cell: a subcarrier spacing for DL and/or UL provided by higher layer parameter, a cyclic prefix for DL and/or UL provided by higher layer parameter, a number of contiguous PRBs for DL and/or UL provided by higher layer parameter, an offset of the first PRB for DL and/or UL in the number of contiguous PRBs relative to the first PRB by higher layer, or Q control resource sets if the BWP is a DL BWP.

In an example embodiment, a UE may receive PDCCH and PDSCH in a DL BWP according to a configured subcarrier spacing and CP length for the DL BWP. A UE may transmit PUCCH and PUSCH in an UL BWP according to a configured subcarrier spacing and CP length for the UL BWP.

In an example embodiment, a UE may be configured, by one or more higher layer parameters, a DL BWP from a configured DL BWP set for DL receptions. A UE may be configured by one or more higher layer parameters, an UL BWP from a configured UL BWP set for UL transmissions. If a DL BWP index field is configured in a DCI format scheduling PDSCH reception to a UE, the DL BWP index field value may indicate the DL BWP, from the configured DL BWP set, for DL receptions. If an UL-BWP index field is configured in a DCI format scheduling PUSCH transmission from a UE, the UL-BWP index field value may indicate the UL BWP, from the configured UL BWP set, for UL transmissions.

In an example embodiment, for a UE, gNB may configure a set of BWPs by RRC. The UE may transmit or receive in an active BWP from the configured BWPs in a given time instance. For example, an activation/deactivation of DL bandwidth part by means of timer for a UE to switch its active DL bandwidth part to a default DL bandwidth part may be supported. In this case, when the timer at the UE side expires, e.g. the UE has not received scheduling DCI for X ms, the UE may switch to the default DL BWP.

In an example, a new timer, e.g., BWPDeactivationTimer, may be defined to deactivate the original BWP and switch to the default BWP. The BWPDeactivationTimer may be started when the original BWP is activated by the activation/deactivation DCI. If PDCCH on the original BWP is received, a UE may restart the BWPDeactivationTimer associated with the original BWP. For example, if the BWPDeactivationTimer expires, a UE may deactivate the original BWP and switch to the default BWP, may stop the BWPDeactivationTimer for the original BWP, and may (or may not) flush all HARQ buffers associated with the original BWP.

In an example embodiment, on a Scell, there may be no initial active BWP since the initial access is performed on the Pcell. For example, the initially activated DL BWP and/or UL BWP when the Scell is activated may be configured or reconfigured by RRC signaling. In an example, the default BWP of the Scell may also be configured or reconfigured by RRC signaling. To strive for a unified design for both Pcell and Scell, the default BWP may be configured or reconfigured by the RRC signalling, and the default BWP may be one of the configured BWPs of the UE.

In an example, the initial active DL/UL BWP may be set as default DL/UL BWP. In an example, a UE may return to default DL/UL BWP in some cases. For example, if a UE does not receive control for a long time, the UE may fallback to default BWP.

In an example embodiment, a DL BWP other than the initial active DL BWP may be configured to a UE as the default DL BWP. The reconfiguring the default DL BWP may be due to load balancing and/or different numerologies employed for active DL BWP and initial active DL BWP.

In an example embodiment, a default BWP on Pcell may be an initial active DL BWP for transmission of RMSI, comprising RMSI CORESET with CSS. The RMSI CORESET may comprise USS. The initial active/default BWP may remain active BWP for the user also after UE becomes RRC connected.

In an example embodiment, for a paired spectrum, downlink and uplink bandwidth parts may be independently activated while, for an unpaired spectrum downlink and uplink bandwidth parts are jointly activated. In case of bandwidth adaptation, where the bandwidth of the active downlink BWP may be changed, there may, in case of an unpaired spectrum, be a joint activation of a new downlink BWP and new uplink BWP. For example, a new DL/UL BWP pair where the bandwidth of the uplink BWPs may be the same (e.g., no change of uplink BWP).

In an example embodiment, there may be an association of DL BWP and UL BWP in RRC configuration. For example, in case of TDD, a UE may not retune the center frequency of channel BW between DL and UL. In this case, since the RF is shared between DL and UL in TDD, a UE may not retune the RF BW for every alternating DL-to-UL and UL-to-DL switching.

In an example embodiment, a DL BWP and a UL BWP may be configured to the UE separately. Pairing of the DL BWP and the UL BWP may impose constrains on the configured BWPs, e.g., the paired DL BWP and UL BWP may be activated simultaneously. For example, gNB may indicate a DL BWP and a UL BWP to a UE for activation in a FDD system. In an example, gNB may indicate a DL BWP and a UL BWP with the same center frequency to a UE for activation in a TDD system. Since the activation/deactivation of the BWP of the UE is instructed by gNB, no paring or association of the DL BWP and UL BWP may be mandatory even for TDD system. It may be up to gNB implementation In an example embodiment, UE may identify a BWP identity from DCI to simplify the indication process. The total number of bits for BWP identity may depend on the number of bits that may be employed within the scheduling DCI (or switching DCI) and the UE minimum BW. The number of BWPs may be determined by the UE supported minimum BW along with the network maximum BW. For instance, in a similar way, the maximum number of BWP may be determined by the network maximum BW and the UE minimum BW. In an example, if 400 MHz is the network maximum BW and 50 MHz is the UE minimum BW, 8 BWP may be configured to the UE which means that 3 bits may be needed within the DCI to indicate the BWP. In an example, such a split of the network BW depending on the UE minimum BW may be useful for creating one or more default BWPs from the network side by distributing UEs across the entire network BW, e.g., load balancing purpose.

In an example embodiment, different sets of BWPs may be configured for different DCI formats/scheduling types respectively. For example, some larger BWPs may be configured for non-slot-based scheduling than that for slot-based scheduling. If different DCI formats are defined for slot-based scheduling and non-slot-based scheduling, different BWPs may be configured for different DCI formats. This may provide flexibility between different scheduling types without increasing DCI overhead. The 2-bit bitfield may be employed to indicate a BWP among the four for the DCI format. For example, 4 DL BWPs or [2 or 4] UL BWPs may be configured for each DCI formats. Same or different BWPs may be configured for different DCI formats.

In an example embodiment, NR may support group-common search space (GCSS). For example, the GCSS may be employed as an alternative to CSS for certain information. In an example, gNB may configure GCSS within a BWP for a UE, and information such as RACH response and paging control may be transmitted on GCSS. For example, the UE may monitor GCSS instead of switching to the BWP containing the CSS for such information.

In an example embodiment, a center frequency of the activated DL BWP may not be changed. In an example, the center frequency of the activated DL BWP may be changed. For example, For TDD, if the center frequency of the activated DL BWP and deactivated DL BWP is not aligned, the active UL BWP may be switched implicitly.

In an example embodiment, BWPs with different numerologies may be overlapped, and rate matching for CSI-RS/SRS of another BWP in the overlapped region may be employed to achieve dynamic resource allocation of different numerologies in FDM/TDM fashion. In an example, for the CSI measurement within one BWP, if the CSI-RS/SRS is collided with data/RS in another BWP, the collision region in another BWP may be rate matched. For example, CSI information over the two BWPs may be known at a gNB side by UE reporting. Dynamic resource allocation with different numerologies in a FDM manner may be achieved by gNB scheduling.

In an example embodiment, PUCCH resources may be configured in a configured UL BWP, in a default UL BWP and/or in both. For instance, if the PUCCH resources are configured in the default UL BWP, UE may retune to the default UL BWP for transmitting an SR. for example, the PUCCH resources are configured per BWP or a BWP other than the default BWP, the UE may transmit an SR in the current active BWP without retuning.

In an example embodiment, if a configured SCell is activated for a UE, a DL BWP may be associated with an UL BWP at least for the purpose of PUCCH transmission, and a default DL BWP may be activated. If the UE is configured for UL transmission in same serving cell, a default UL BWP may be activated.

In an example, for the case of a presence of periodic gap for RACH response monitoring on Pcell, for Pcell, one of configured DL bandwidth parts may comprise one CORESET with CSS type for RMSI, OSI, RACH response & paging control for system information update. For a serving cell, a configured DL bandwidth part may comprise one CORESET with the CSS type for pre-emption indication and other group-based commands.

In an example embodiment, BWPs may be configured with respect to common reference point (PRB 0) on a NW carrier. In an example, the BWPs may be configured using TYPE1 RA as a set of contiguous PRBs, with PRB granularity for the START and LENGTH, and the minimum length may be determined by the minimum supported size of a CORESET.

In an example embodiment, to monitor (group) common channel for RRC CONNECTED UE, an initial DL BWP may comprise control channel for RMSI, OSI and paging and UE switches BWP to monitor such channel. In an example, a configured DL BWP may comprise control channel for Msg2. In an example, a configured DL BWP may comprise control channel for SFI. In an example, a configured DL BWP may comprise pre-emption indication and other group common indicators like power control.

In an example embodiment, a DCI may explicitly indicate activation/deactivation of BWP. For example, a DCI without data assignment may comprise an indication to activate/deactivate BWP. In an example, UE may receive a first indication via a first DCI to activate/deactivate BWP. In order for the UE to start receiving data, a second DCI with a data assignment may be transmitted by the gNB. A UE may receive the first DCI in a target CORESET in a target BWP. In an example, until there is CSI feedback provided to a gNB, the gNB scheduler may make conservative scheduling decisions.

In an example, a DCI without scheduling for active BWP switching may be transmitted to measure the CSI before scheduling. It may be taken as an implementation issue of DCI with scheduling, for example, the resource allocation field may be set to zero, which means no data may be scheduled. Other fields in this DCI may comprise one or more CSI/SRS request fields.

In an example embodiment, a SCell activation and deactivation may trigger the corresponding action for its configured BWP. In an example, a SCell activation and deactivation may not trigger the corresponding action for its configured BWP.

In an example embodiment, a DCI with data assignment may comprise an indication to activate/deactivate BWP along with a data assignment. For example, a UE may receive a combined data allocation and BWP activation/deactivation message. For example, a DCI format may comprise a field to indicate BWP activation/deactivation along with a field indicating UL/DL grant. In this case, the UE may start receiving data with a single DCI. In this case, the DCI may need indicate one or more target resources of a target BWP. A gNB scheduler may have little knowledge of the CSI in the target BW and may have to make conservative scheduling decisions.

In an example embodiment, for the DCI with data assignment, the DCI may be transmitted on a current active BWP and scheduling information may be for a new BWP. For example, there may be a single active BWP. There may be one DCI in a slot for scheduling the current BWP or scheduling another BWP. The same CORESET may be employed for the DCI scheduling the current BWP and the DCI scheduling another BWP. For example, to reduce the number of blind decoding, the DCI payload size for the DCI scheduling current BWP and the scheduling DCI for BWP switching may be the same.

In an example embodiment, to support the scheduling DCI for BWP switching, a BWP group may be configured by gNB, in which a numerology in one group may be the same. In an example, the BWP switching for the BWP group may be configured, in which BIF may be present in the CORESETs for one or more BWPs in the group. For example, scheduling DCI for BWP switching may be configured per BWP group, in which an active BWP in the group may be switched to any other BWP in the group.

In an example, embodiment, a DCI comprising scheduling assignment/grant may not comprise active-BWP indicator. For a paired spectrum, a scheduling DCI may switch UEs active BWP for the transmission direction that the scheduling is valid for. For an unpaired spectrum, a scheduling DCI may switch the UEs active DL/UL BWP pair regardless of the transmission direction that the scheduling is valid for. There may be a possibility for downlink scheduling assignment/grant with "zero" assignment, in practice allowing for switch of active BWP without scheduling downlink or uplink transmission In an example embodiment, a timer-based activation/deactivation BWP may be supported. For example, a timer for activation/deactivation of DL BWP may reduce signalling overhead and may enable UE power savings. The activation/deactivation of a DL BWP may be based on an inactivity timer (referred to as a BWP inactive (or inactivity) timer). For example, a UE may start and reset a timer upon reception of a DCI. When the UE is not scheduled for the duration of the timer, the timer may expire. In this case, the UE may activate/deactivate the appropriate BWP in response to the expiry of the timer. For example, the UE may activate for example the Default BWP and may deactivate the source BWP.

For example, a BWP inactive timer may be beneficial for power saving for a UE switching to a default BWP with smaller BW and fallback for a UE missing DCI based activation/deactivation signaling to switch from one BWP to another BWP In an example embodiment, for fallback, the BWP inactive timer may start once the UE switches to a new DL BWP. The timer may restart when a UE-specific PDCCH is successfully decoded, wherein the UE-specific PDCCH may be associated with a new transmission, a retransmission or some other purpose, e.g., SPS activation/deactivation if supported.

In an example embodiment, a UE may switch to a default BWP if the UE does not receive any control/data from the network during a BWP inactive timer running. The timer may be reset upon reception of any control/data. For example, the timer may be triggered when UE receives a DCI to switch its active DL BWP from the default BWP to another. For example, the timer may be reset when a UE receives a DCI to schedule PDSCH(s) in the BWP other than the default BWP.

In an example embodiment, a DL BWP inactive timer may be defined separately from a UL BWP inactive timer. For example, there may be some ways to set the timer, e.g., independent timer for DL BWP and UL BWP, or a joint timer for DL and UL BWP. In an example, for the separate timers, assuming both DL BWP and UL BWP are activated, if there is DL data and UL timer expires, UL BWP may not be deactivated since PUCCH configuration may be affected. For example, for the uplink, if there is UL feedback signal related to DL transmission, the timer may be reset (Or, UL timer may not be set if there is DL data). On the other hand, if there is UL data and the DL timer expires, there may be no issue if the DL BWP is deactivated since UL grant is transmitted in the default DL BWP.

In an example embodiment, a BWP inactivity-timer may enable the fall-back to default BWP on Pcell and Scell.

In an example embodiment, with a DCI explicit activation/deactivation of BWP, a UE and a gNB may not be synchronized with respect to which BWP is activated/deactivated. The gNB scheduler may not have CSI information related to a target BWP for channel-sensitive scheduling. The gNB may be limited to conservative scheduling for one or more first several scheduling occasions. The gNB may rely on periodic or aperiodic CSI-RS and associated CQI report to perform channel-sensitive scheduling. Relying on periodic or aperiodic CSI-RS and associated CQI report may delay channel-sensitive scheduling and/or lead to signaling overhead (e.g. in the case where we request aperiodic CQI). To mitigate a delay in acquiring synchronization and channel state information, a UE may transmit an acknowledgement upon receiving an activation/deactivation of BWP. For example, a CSI report based on the provided CSI-RS resource may be transmitted after activation of a BWP and is employed as acknowledgment of activation/deactivation.

In an example embodiment, a gNB may provide a sounding reference signal for a target BWP after a UE tunes to a new bandwidth. In an example, the UE may report the CSI, which is employed as an acknowledgement by the gNB to confirm that the UE receive an explicit DCI command and activates/deactivates the appropriate BWPs. In an example, for the case of an explicit activation/deactivation via DCI with data assignment, a first data assignment may be carried out without a CSI for the target BWP In an example embodiment, a guard period may be defined to take RF retuning and the related operations into account. For example, a UE may neither transmit nor receive signals in the guard period. A gNB may need to know the length of the guard period. For example, the length of the guard period may be reported to the gNB as a UE capability. The length of the guard period may be closely related on the numerologies of the BWPs and the length of the slot. For example, the length of the guard period for RF retuning may be reported as a UE capability. In an example, the UE may report the absolute time in μs. in an example, the UE may report the guard period in symbols.

In an example embodiment, after the gNB knows the length of the guard period by UE reporting, the gNB may want to keep the time domain position of guard period aligned between the gNB and the UE. For example, the guard period for RF retuning may be predefined for time pattern triggered BWP switching. In an example, for the BWP switching triggered by DCI and timer, the guard period for DCI and timer-based BWP switching may be an implementation issue. In an example, for BWP switching following some time pattern, the position of the guard period may be defined. For example, if the UE is configured to switch periodically to a default BWP for CSS monitoring, the guard period may not affect the symbols carrying CSS.

In an example embodiment, a single DCI may switch the UE's active BWP form one to another (of the same link direction) within a given serving cell. A separate field may be employed in the scheduling DCI to indicate the index of the BWP for activation, such that UE may determine the current DL/UL BWP according to a detected DL/UL grant without requiring any other control information. In case the BWP change does not happen during a certain time duration, the multiple scheduling DCIs transmitted in this duration may comprise the indication to the same BWP. During the transit time when potential ambiguity may happen, gNB may send scheduling grants in the current BWP or together in the other BWPs containing the same target BWP index, such that UE may obtain the target BWP index by detecting the scheduling DCI in either one of the BWPs. The duplicated scheduling DCI may be transmitted K times. When UE receive one of the K times transmissions, UE may switch to the target BWP and start to receive or transmit (UL) in the target BWP according to the BWP indication field.

In an example embodiment, a frequency location of UE RF bandwidth may be indicated by gNB. For example, considering the UE RF bandwidth capability, the RF bandwidth of the UE may be usually smaller than the carrier bandwidth. The supported RF bandwidth for a UE is usually a set of discrete values (e.g., 10 MHz, 20 MHz, 50 MHz and so on), for energy saving purpose, the UE RF bandwidth may be determined as the minimum available bandwidth supporting the BWP bandwidth. But the granularity of BWP bandwidth is PRB level, which is decoupled with UE RF bandwidth and more flexible. As a result, in most cases the UE RF bandwidth is larger than the BWP bandwidth. The UE may receive the signal outside the carrier bandwidth, especially if the configured BWP is configured near the edge of the carrier bandwidth. And the inter-system interference or the interference from the adjacent cell outside the carrier bandwidth may impact the receiving performance of the BWP. Thus, to keep the UE RF bandwidth in the carrier bandwidth, it may be necessary to indicate the frequency location of the UE RF bandwidth by gNB.

In an example embodiment, in terms of measurement gap configuration, the gap duration may be determined based on the measurement duration and necessary retuning gap. For example, different retuning gap may be needed depending on the cases. For example, if a UE does not need to switch its center, the retuning may be small such as 20 us. For the case that the network may not know whether the UE needs to switch its center or not to perform measurement, a UE may indicate the necessary retuning gap for a measurement configuration.

In an example embodiment, the necessary gap may depend on the current active BWP which may be dynamically switched via switching mechanism. In this case, for example, UEs may need to dynamically indicate the necessary gap.

In an example embodiment, the measurement gap may be implicitly created, wherein the network may configure a certain gap (which may comprise the smallest retuning latency, for example, the network may assume small retuning gap is necessary if both measurement bandwidth and active BWP may be included within UE maximum RF capability assuming center frequency of current active BWP is not changed). In this case, for example, if a UE needs more gap than the configured, the UE may skip receiving or transmitting.

In an example embodiment, different measurement gap and retuning latency may be assumed for RRM and CSI respectively. For CSI measurement, if periodic CSI measurement outside of active BWP is configured, a UE may need to perform its measurement periodically per measurement configuration. For RRM, it may be up to UE implementation where to perform the measurement as long as it satisfies the measurement requirements. In this case, for example, the worst case retuning latency for a measurement may be employed. In an example, as the retuning latency may be different between intra-band and inter-band retuning, separate measurement gap configuration between intra-band and inter-band measurement may be considered.

In an example embodiment, when there is a BWP switching, a DCI in the current BWP may need to indicate resource allocation in the next BWP that the UE is expected to switch. For example, the resource allocation may be based on the UE-specific PRB indexing, which may be per BWP. A range of the PRB indices may change as the BWP changes. In an example, the DCI to be transmitted in current BWP may be based on the PRB indexing for the current BWP. The DCI may need to indicate the RA in the new BWP, which may arouse a conflict. To resolve the conflict without significantly increasing UEs blind detection overhead, the DCI size and bit fields may not change per BWP for a given DCI type.

In an example embodiment, as the range of the PRB indices may change as the BWP changes, one or more employed bits among the total bit field for RA may be dependent on the employed BWP. For example, UE may employ the indicated BWP ID that the resource allocation is intended to identify the resource allocation bit field.

In an example embodiment, if a UE is configured with multiple DL or UL BWPs in a serving cell, an inactive DL/UL BWP may be activated by a DCI scheduling a DL assignment or UL grant respectively in this BWP. As the UE is monitoring the PDCCH on the currently active DL BWP, the DCI may comprise an indication to a target BWP that the UE may switch to for PDSCH reception or UL transmission. A BWP indication may be inserted in the UE-specific DCI format for this purpose. The bit width of this field may depend on either the maximum possible or presently configured number of DL/UL BWPs. Similar to CIF, it may be simpler to set the BWP indication field to a fixed size based on the maximum number of configured BWPs.

In an example embodiment, DCI format(s) may be configured user-specifically per cell, e.g., not per BWP. For example, after the UE syncs to the new BWP, the UE may start to monitor pre-configured search-space on the CORESET. If the DCI formats may be configured per cell to keep the number of DCI formats, the corresponding header size in DCI may be small.

In an example embodiment, for a UE-specific serving cell, one or more DL BWPs and one or more UL BWPs may be configured by dedicated RRC for a UE. For the case of PCell, this may be done as part of the RRC connection establishment procedure. For the SCell, this may be done via RRC configuration which may indicate the SCell parameters.

In an example embodiment, when a UE receives SCell activation command, there may be a default DL and/or UL BWP which may be activated since there may be at least one DL and/or UL BWP which may be monitored by the UE depending on the properties of the SCell (DL only or UL only or both). This BWP which may be activated upon receiving SCell activation command, may be informed to the UE via the a RRC configuration which configured the BWP on this serving cell.

For example, for SCell, RRC signalling for SCell configuration/reconfiguration may be employed to indicate which DL BWP and/or which UL BWP may be activated when the SCell activation command is received by the UE. The indicated BWP may be the initially active DL/UL BWP on the SCell. Therefore, SCell activation command may activate DL and/or UL BWP.

In an example embodiment, for a SCell, RRC signaling for the SCell configuration/reconfiguration may be employed for indicating a default DL BWP on the SCell which may be employed for fall back purposes. For example, the default DL BWP may be same or different from the initially activated DL/UL BWP which is indicated to UE as part of the SCell configuration. In an example, a default UL BWP may be configured to UE for the case of transmitting PUCCH for SR (as an example), in case the PUCCH resources are not configured in every BWP for the sake of SR.

In an example, a Scell may be for DL only. For the Scell for DL only, UE may keep monitoring an initial DL BWP (initial active or default) until UE receives SCell deactivation command.

In an example, a Scell may be for UL only. For the Scell for UL only, when UE receives a grant, UE may transmit on the indicated UL BWP. In an example, the UE may not maintain an active UL BWP if UE does not receive a grant. In an example, not mainlining the active UL BWP due to no grant receive may not deactivate the SCell.

In an example, a Scell may be for UL and DL. For the Scell for UL and DL, a UE may keep monitoring an initial DL BWP (initial active or default) until UE receives SCell deactivation command and. The UL BWP may be employed when there is a relevant grant or an SR transmission.

In an example, a BWP deactivation may not result in a SCell deactivation. For example, when the UE receives the SCell deactivation command, the active DL and/or UL BWPs may be considered deactivated.

In an example embodiment, one or more BWPs are semi-statically configured via UE-specific RRC signaling. In a CA system, if a UE maintains RRC connection with the primary component carrier (CC), the BWP in secondary CC may be configured via RRC signaling in the primary CC.

In an example embodiment, one or more BWPs may be semi-statically configured to a UE via RRC signaling in PCell. A DCI transmitted in SCell may indicate a BWP among the one or more configured BWP, and grant detailed resource based on the indicated BWP.

In an example embodiment, for a cross-CC scheduling, a DCI transmitted in PCell may indicate a BWP among the one or more configured BWPs, and grants detailed resource based on the indicated BWP.

In an example embodiment, when a SCell is activated, a DL BWP may be initially activated for configuring CORE-SET for monitoring the first PDCCH in Scell. The DL BWP may serve as a default DL BWP in the SCell. In an example, since the UE performs initial access via a SS block in PCell, the default DL BWP in SCell may not be derived from SS block for initial access. The default DL BWP in Scell may be configured by RRC signaling in the PCell.

In an example embodiment, a BWP on Scell may be activated by means of cross-cell scheduling DCI, if cross-cell scheduling is configured to a UE. In this case, the gNB may activate a BWP on the Scell by indicating CIF and BWPI in the scheduling DCI.

In an example embodiment, SS-block based RRM measurements may be decoupled with BWP framework. For example, measurement configurations for each RRM and CSI feedback may be independently configured from bandwidth part configurations. CSI and SRS measurements/transmissions may be performed within the BWP framework.

In an example embodiment, for a MCS assignment of the first one or more DL data packets after active DL BWP switching, the network may assign robust MCS to a UE for the first one or more DL data packets based on RRM measurement reporting. In an example, for a MCS assignment of the first one or more DL data packets after active DL BWP switching, the network may signal to a UE by active DL BWP switching DCI to trigger aperiodic CSI measurement/reporting to speed up link adaptation convergence. For a UE, periodic CSI measurement outside the active BWP in a serving cell may not supported. For a UE, RRM measurement outside active BWP in a serving cell may be supported. For a UE, RRM measurement outside configured BWPs in a serving cell may be supported.

In an example embodiment, the RRM measurements may be performed on a SSB and/or CSI-RS. The RRM/RLM measurements may be independent of BWPs.

In an example embodiment, UE may not be configured with aperiodic CSI reports for non-active DL BWPs. For example, the CSI measurement may be obtained after the BW opening and the wide-band CQI of the previous BWP may be employed as starting point for the other BWP on the NW carrier.

In an example embodiment, UE may perform CSI measurements on the BWP before scheduling. For example, before scheduling on a new BWP, the gNB may intend to find the channel quality on the potential new BWPs before scheduling the user on that BWP. In this case, the UE may switch to a different BWP and measure channel quality on the BWP and then transmit the CSI report. There may be no scheduling needed for this case.

In an example embodiment, One or multiple bandwidth part configurations for each component carrier may be semi-statically signalled to a UE. A bandwidth part may comprise a group of contiguous PRBs, wherein one or more reserved resources may be be configured within the bandwidth part. The bandwidth of a bandwidth part may be equal to or be smaller than the maximal bandwidth capability supported by a UE. The bandwidth of a bandwidth part may be at least as large as the SS block bandwidth. The bandwidth part may or may not contain the SS block. A Configuration of a bandwidth part may comprise at lease one of following properties: Numerology, Frequency location (e.g. center frequency), or Bandwidth (e.g. number of PRBs).

In an example embodiment, a bandwidth part may be associated with one or more numerologies, wherein the one or more numerologies may comprise sub-carrier spacing, CP type, or slot duration indication. In an example, an UE may expect at least one DL bandwidth part and at least one UL bandwidth part being active among a set of configured bandwidth parts for a given time instant. A UE may be assumed to receive/transmit within active DL/UL bandwidth part(s) using the associated numerology, for example, at least PDSCH and/or PDCCH for DL and PUCCH and/or PUSCH for UL, or combination thereof.

In an example, multiple bandwidth parts with same or different numerologies may be active for a UE simultaneously. The active multiple bandwidth parts may not imply that it is required for UE to support different numerologies at the same instance. The active DL/UL bandwidth part may not span a frequency range larger than the DL/UL bandwidth capability of the UE in a component carrier.

In an example embodiment, NR may support single and multiple SS block transmissions in wideband CC in the frequency domain. For example, for non-CA UE with a smaller BW capability and potentially for CA UE, NR may support a measurement gap for RRM measurement and potentially other purposes (e.g., path loss measurement for UL power control) using SS block (if it is agreed that there is no SS block in the active BW part(s)). UE may be informed of the presence/parameters of the SS block(s) and parameters necessary for RRM measurement via at least one of following: RMSI, other system information, and/or RRC signaling In an example embodiment, Common PRB indexing may be employed at least for DL BWP configuration in RRC connected state. For example, a reference point may be PRB 0, which may be common to one or more UEs sharing a wideband CC from network perspective, regardless of whether they are NB, CA, or WB UEs. In an example, an offset from PRB 0 to the lowest PRB of the SS block accessed by a UE may be configured by high layer signaling, e.g., via RMSI and/or UE-specific signaling. In an example, a common PRB indexing may be for maximum number of PRBs for a given numerology, wherein the common PRB indexing may be for RS generation for UE-specific PDSCH and/or may be for UL.

In an example embodiment, there may be an initial active DL/UL bandwidth part pair to be valid for a UE until the UE is explicitly (re)configured with bandwidth part(s) during or after RRC connection is established. For example, the initial active DL/UL bandwidth part may be confined within the UE minimum bandwidth for the given frequency band. NR may support activation/deactivation of DL and UL bandwidth part by explicit indication at least in DCI. MAC CE based approach may be employed for the activation/deactivation of DL and UL bandwidth part. In an example, NR may support an activation/deactivation of DL bandwidth part by means of timer for a UE to switch its active DL bandwidth part to a default DL bandwidth part. For example, a default DL bandwidth part may be the initial active DL bandwidth part defined above. The default DL bandwidth part may be reconfigured by the network.

In an example embodiment, when a UE performs measurement or transmit SRS outside of its active BWP, it may be considered as a measurement gap. For example, during the measurement gap, UE may not monitor CORESET.

In an example embodiment, for paired spectrum, gNB may configure DL and UL BWPs separately and independently for a UE-specific serving cell for a UE. For example, for active BWP switching using at least scheduling DCI, a DCI for DL may be employed for DL active BWP switching and a DCI for UL may be employed for UL active BWP switching. For example, NR may support a single DCI switching DL and UL BWP jointly.

In an example, embodiment, for unpaired spectrum, gNB may jointly configure a DL BWP and an UL BWP as a pair, with the restriction that the DL and UL BWPs of a DL/UL BWP pair may share the same center frequency but may be of different bandwidths for a UE-specific serving cell for a UE. For example, for active BWP switching using at least scheduling DCI, a DCI for either DL or UL may be employed for active BWP switching from one DL/UL BWP pair to another pair. This may apply to at least the case where both DL & UL are activated to a UE in the corresponding unpaired spectrum. In an example, there may not be a restriction on DL BWP and UL BWP pairing.

In an example embodiment, for a UE, a configured DL (or UL) BWP may overlap in frequency domain with another configured DL (or UL) BWP in a serving cell.

In an example embodiment, for a serving cell, a maximal number of DL/UL BWP configurations may be for paired spectrum, for example, 4 DL BWPs and 4 UL BWPs. In an example, a maximal number of DL/UL BWP configurations may be for unpaired spectrum, for example, 4 DL/UL BWP pairs. In an example, a maximal number of DL/UL BWP configurations may be for SUL, for example, 4 UL BWPs.

In an example embodiment, for paired spectrum, NR may support a dedicated timer for timer-based active DL BWP switching to the default DL BWP. For example, a UE may start the timer when it switches its active DL BWP to a DL BWP other than the default DL BWP. In an example, a UE may restart the timer to the initial value when it successfully decodes a DCI to schedule PDSCH(s) in its active DL BWP. For example, a UE may switch its active DL BWP to the default DL BWP when the timer expires.

In an example embodiment, for unpaired spectrum, NR may support a dedicated timer for timer-based active DL/UL BWP pair switching to the default DL/UL BWP pair. For example, a UE may start the timer when it switches its active DL/UL BWP pair to a DL/UL BWP pair other than the default DL/UL BWP pair. For example, a UE may restart the timer to the initial value when it successfully decodes a DCI to schedule PDSCH(s) in its active DL/UL BWP pair. In an example, a UE may switch its active DL/UL BWP pair to the default DL/UL BWP pair when the timer expires.

In an example embodiment, for an Scell, RRC signaling for Scell configuration/reconfiguration may indicate a first active DL BWP and/or a first active UL BWP when the Scell is activated. In an example, NR may support a Scell activation signaling that doesn't contain any information related to the first active DL/UL BWP. In an example, for an Scell, an active DL BWP and/or UL BWP may be deactivated when the Scell is deactivated. In an example, the Scell may be deactivated by an Scell deactivation timer.

In an example embodiment, for an Scell, a UE may be configured with at least one of following: a timer for timer-based active DL BWP (or DL/UL BWP pair) switching, and/or a default DL BWP (or the default DL/UL BWP pair) which may be employed when the timer is expired, wherein the default DL BWP may be different from the first active DL BWP.

In an example, for Pcell, a default DL BWP (or DL/UL BWP pair) may be configured/reconfigured to a UE. In an example, if no default DL BWP is configured, the default DL BWP may be an initial active DL BWP.

In an example embodiment, in a serving cell where PUCCH is configured, a configured UL BWP may comprise PUCCH resources.

In an example embodiment, for a UE in Pcell, a common search space for at least RACH procedure may be configured in one or more BWPs. For example, for a UE in a serving cell, a common search space for group-common PDCCH (e.g. SFI, pre-emption indication, etc.) may be configured in one or more BWPs In an example embodiment, a DL (or UL) BWP may be configured to a UE by resource allocation Type 1 with 1PRB granularity of starting frequency location and 1PRB granularity of bandwidth size, wherein the granularity may not imply that a UE may adapt its RF channel bandwidth accordingly.

In an example embodiment, for a UE, DCI format size itself may not be a part of RRC configuration irrespective of BWP activation & deactivation in a serving cell. For example, the DCI format size may depend on different operations and/or configurations (if any) of different information fields in the DCI. In an example embodiment, a UE may be configured with PRB bundling size(s) per BWP.

In an example embodiment, NR may support configuring CSI-RS resource on BWP with a transmission BW equal to or smaller than the BWP. For example, when the CSI-RS BW is smaller than the BWP, NR may support at least the case that CSI-RS spans contiguous RBs in the granularity of N RBs. When CSI-RS BW is smaller than the corresponding BWP, it may be at least larger than X RBs, wherein value of X is predefined. For example, the value of X may be the same or different for beam management and CSI acquisition. For example, the value of X may or may not be numerology-dependent.

In an example embodiment, for a UE with a RRC connected mode, RRC signalling may support to configure one or more BWPs (both for DL BWP and UL BWP) for a serving cell (PCell, PSCell). For example, RRC signalling may support to configure 0, 1 or more BWPs (both for DL BWP and UL BWP) for a serving cell SCell (at least 1 DL BWP). In an example, for a UE, the PCell, PSCell and each SCell may have a single associated SSB in frequency. A cell defining SS block may be changed by synchronous reconfiguration for PCell/PSCell and SCell release/add for the SCell. For example, a SS block frequency which needs to be measured by the UE may be configured as individual measurement object (e.g., one measurement object corresponds to a single SS block frequency). the cell defining SS block may be considered as the time reference of the serving cell, and for RRM serving cell measurements based on SSB, for example, irrespective of which BWP is activated.

In an example embodiment, BWP switching and cell activation/deactivation may not interfere with the operation of the counter and timer. For example, when a BWP is deactivated, the UE may or may not stop using configured downlink assignments and/or configured uplink grants using resources of the BWP. In an example, the UE may suspend the configured grants of the or clear it. In an example, the UE may not suspend the configured grants of the or may not clears it.

In an example embodiment, a new timer (BWP inactivity timer) may be employed to switch active BWP to default BWP after a certain inactive time. The BWP inactivity timer may be independent from the DRX timers. In an example embodiment, on the BWP that is deactivated, UE may not transmit on UL-SCH on the BWP. In an example, on the BWP that is deactivated, UE may not monitor the PDCCH on the BWP. In an example, on the BWP that is deactivated, UE may not transmit PUCCH on the BWP. In an example, on the BWP that is deactivated, UE may not transmit on PRACH on the BWP. In an example, on the BWP that is deactivated, UE may not flush HARQ buffers when doing BWP switching.

In an example embodiment, for FDD, gNB may configure separate sets of bandwidth part (BWP) configurations for DL & UL per component carrier. In an example, a numerology of DL BWP configuration may be applied to at least PDCCH, PDSCH & corresponding DMRS. A numerology of UL BWP configuration may be applied to at least PUCCH, PUSCH & corresponding DMRS. In an example, for TDD, gNB may configure separate sets of BWP configurations for DL & UL per component carrier. In an example, a numerology of DL BWP configuration is applied to at least PDCCH, PDSCH & corresponding DMRS. A numerology of UL BWP configuration is applied to at least PUCCH, PUSCH & corresponding DMRS. For example, when different active DL and UL BWPs are configured, UE may not retune the center frequency of channel BW between DL and UL.

In an example, the bandwidth part (BWP) may consist of a group of contiguous PRBs in the frequency domain. The parameters for each BWP configuration may include numerology, frequency location, bandwidth size (e.g., in terms of PRBs), CORESET (e.g., required for each BWP configuration in case of single active DL bandwidth part for a given time instant). In an example, one or multiple BWPs may be configured for each component carrier when the UE is in RRC connected mode.

In an example, when a new BWP is activated, the configured downlink assignment may be initialized (if not active) or re-initialized (if already active) using PDCCH.

In an example, for uplink SPS, the UE may have to initialize or re-initialize the configured uplink grant when switching from one BWP to anther BWP. When a new BWP is activated, the configured uplink grant may be initialized (if not active) or re-initialized (if already active) using PDCCH.

In an example, for type 1 uplink data transmission without grant, there may be no L1 signaling to initialize or re-initialize the configured grant. The UE may not assume the type 1 configured uplink grant is active when the BWP is switched even if it's already active in the previous BWP. The type 1 configured uplink grant may be re-configured using RRC dedicated signaling when the BWP is switched. In an example, when a new BWP is activated, the type 1 configured uplink grant may be re-configured using dedicated RRC signaling.

In an example, if SPS is configured on the resources of a BWP and that BWP is subsequently deactivated, the SPS grants or assignments may not continue. In an example, when a BWP is deactivated, all configured downlink assignments and configured uplink grants using resources of this BWP may be cleared.

In an example, a wireless device may transmit one or more messages comprising UE capability information to a base station. The wireless device may use a UE capability transfer procedure to transmit the UE capability information. In an example, the UE capability transfer procedure may comprise receiving by the wireless device from a base station one or more UE Capability Enquiry messages and/or transmitting by the wireless device one or more UE Capability Information messages. An example procedure is shown in FIG. 15. In an example, if the wireless device has changed the radio access capabilities, the wireless device may request higher layers to initiate one or more NAS procedures that may result in the update of the UE radio access capabilities using a new RRC connection. In an example, the base station may initiate the UE capability transfer procedure to a UE in RRC CONNECTED state when it needs (e.g., additional) UE radio access capability information.

In an example, the UECapabilityEnquiry message may be used to request the transfer of UE radio access capabilities for E-UTRA as well as for other RATs. An example UE capability Enquiry message may comprise following information element. In an example, requestDiffFallbackCombList may indicate list of CA band combinations for which the UE may be requested to provide different capabilities for their fallback band combinations in conjunction with the capabilities supported for the CA band combinations in this list. The UE may exclude fallback band combinations for which their supported UE capabilities are the same as the CA band combination indicated in this list. In an example, requestReducedFormat may indicate that the UE if supported is requested to provide supported CA band combinations in the supportedBandCombinationReduced-r13 instead of the supportedBandCombination-r10. The E-UTRAN may include this field in response to requestSkipFallbackComb or requestDiffFallbackCombList being included in the message. In an example, requestSkipFallbackComb may indicate that the UE may explicitly exclude fallback CA band combinations in capability signalling. In an example, ue-CapabilityRequest may indicate list of the RATs for which the UE is requested to transfer the UE radio access capabilities e.g., E-UTRA, UTRA, GERAN-CS, GERAN-PS, CDMA2000. In an example, requestedFrequencyBands may indicate list of frequency bands for which the UE is requested to provide supported CA band combinations and non CA bands. In an example, requestedMaxCCsDL, and requestedMaxCCsUL may indicate the maximum number of CCs for which the UE may be requested to provide supported CA band combinations and non-CA bands. In an example, requestReducedIntNonContComb may indicate that the UE may explicitly exclude supported intra-band non-contiguous CA band combinations other than included in capability signaling. The above example UE capability Enquiry message may be enhanced by example embodiments to request UE radio access capabilities relate to bandwidth part. Other names for the enhanced UE capability Enquiry message may be used.

In an example, UECapabilityInformation message may be used to transfer of UE radio access capabilities requested by the base station. In an example, UECapabilityInformation message may comprise following information elements. In an example, ue-RadioPagingInfo may contain UE capability information for paging. The above example UE capability Information message may be enhanced by example embodiments to transfer UE radio access capabilities relate to bandwidth part. Other names for the enhanced UE capability Information message may be used.

Legacy UE procedures for requesting and transferring UE capability information do not involve capability information related to bandwidth part. In 5G wireless networks, a UE may be configured with very large operation bandwidths (e.g., in higher frequencies). A wireless device may not be capable to operate in very large bandwidths due to hardware constraints. The base station may configure a wireless device with a plurality of bandwidth parts on a cell/carrier bandwidth. A bandwidth part may be smaller than a carrier bandwidth for the wireless device. The base station needs to take into account the wireless device operation bandwidth capabilities when configuring bandwidth parts for the wireless device. Legacy UE capability procedure (e.g., UE capability request and transfer procedures) may need to be enhanced to enable a base station to configure bandwidth parts for a wireless device that is in accordance with the wireless device hardware capabilities. Example embodiments enhance the legacy UE capability information related messages and procedures.

In an example, a cell search procedure may be used by a UE to acquire time and frequency synchronization with a cell and detect a physical layer Cell ID of the cell. In an example, a UE may receive the following synchronization signals (SS) in order to perform cell search: a primary synchronization signal (PSS) and a secondary synchronization signal (SSS). A UE may assume that reception occasions of a physical broadcast channel (PBCH), PSS, and SSS are in consecutive OFDM symbols, and form a SS/PBCH block.

In an example, for a half frame with SS/PBCH blocks, the number and first OFDM symbol indexes for candidate SS/PBCH blocks may be as follows: 15 KHz subcarrier spacing: the first OFDM symbols of the candidate SS/PBCH blocks have indexes of $\{2, 8\}+14*n$. For carrier frequencies smaller than or equal to 3 GHz, n=0, 1. For carrier frequencies larger than 3 GHz and smaller than or equal to 6 GHz, n=0, 1, 2, 3. 30 KHz subcarrier spacing: the first OFDM symbols of the candidate SS/PBCH blocks have indexes $\{4, 8, 16, 20\}+28*n$. For carrier frequencies smaller than or equal to 3 GHz, n=0. For carrier frequencies larger than 3 GHz and smaller than or equal to 6 GHz, n=0, 1. 30 KHz subcarrier spacing: the first OFDM symbols of the candidate SS/PBCH blocks have indexes $\{2, 8\}+14*n$. For carrier frequencies smaller than or equal to 3 GHz, n=0, 1. For carrier frequencies larger than 3 GHz and smaller than or equal to 6 GHz, n=0, 1, 2, 3. 120 KHz subcarrier spacing: the first OFDM symbols of the candidate SS/PBCH blocks have indexes $\{4, 8, 16, 20\}+28*n$. For carrier frequencies larger than 6 GHz, n=0, 1, 2, 3, 5, 6, 7, 8, 10, 11, 12, 13, 15, 16, 17, 18. 240 KHz subcarrier spacing: the first OFDM symbols of the candidate SS/PBCH blocks have indexes $\{8, 12, 16, 20, 32, 36, 40, 44\}+56*n$. For carrier frequencies larger than 6 GHz, n=0, 1, 2, 3, 5, 6, 7, 8.

In an example, the candidate SS/PBCH blocks in a half frame may be indexed in an ascending order in time from 0 to L−1. In an example, for L=4 or for L>4, a UE may respectively determine the 2 or 3 LSB bits of a SS/PBCH block index per half frame from a one-to-one mapping with an index of the DMRS sequence transmitted in the PBCH. In an example, for L=64 the UE may determine the 3 MSB bits of the SS/PBCH block index per half frame from a higher layer parameter (e.g., SSB-index-explicit).

In an example, a UE may be configured by a parameter (e.g., SSB-transmitted-SIB1), indexes of SS/PBCH blocks for which the UE may not receive other signals or channels in REs that overlap with REs corresponding to the SS/PBCH blocks. In an example, a UE may be configured (e.g., per serving cell), by a higher layer parameter (e.g., SSB-transmitted), indexes of SS/PBCH blocks for which the UE may not receive other signals or channels in REs that overlap with REs corresponding to the SS/PBCH blocks. In an example, a configuration (e.g., by SSB-transmitted) may override a configuration by (e.g., by SSB-transmitted-SIB). A UE may be configured (e.g., by a higher layer parameter) per serving cell by (e.g., SSB-timing) a periodicity of the half frames for receptions of SS/PBCH blocks per serving cell. In an example, if the UE is not configured a periodicity of the half frames for receptions of SS/PBCH blocks, the UE may assume a periodicity of a half frame. A UE may assume that the periodicity is same for all SS/PBCH blocks in the serving cell. In an example, for initial cell selection, a UE may assume that half frames with SS/PBCH blocks occur with a periodicity of 2 frames.

In an example, in the time domain, an SS/PBCH block consists of 4 OFDM symbols, numbered in increasing order from 0 to 3 within the SS/PBCH block, where PSS, SSS, and PBCH with associated DM-RS occupy different symbols. In the frequency domain, an SS/PBCH block may comprise 288 contiguous subcarriers with the subcarriers numbered in increasing order from 0 to 287 within the SS/PBCH block. Subcarrier k in an SS/PBCH block may correspond to subcarrier $n_{PRB}^{SSB}N_{SC}^{RB}+k_0$ in resource block $n_{PRB}^{SSB}$ where $k_0 \in \{0, 1, 2, \ldots, 11\}$ and subcarriers are expressed in the subcarrier spacing used for the SS/PBCH block.

In an example embodiment, a wireless device may transmit, to a base station, one or more messages comprising the wireless device capability information. The one or more messages may comprise one or more fields indicating the wireless device capability information. In an example, the wireless device capability information may comprise capability information related to bandwidth parts. The base station may configure one or more parameters based on the wireless device capability information related to the bandwidth parts. An example procedure is shown in FIG. 16. In an example, the base station may configure one or more timer/counter values based on the UE capability information related to the bandwidth parts. In an example, the base station may configure one or more parameters related to one or more procedures (e.g., synchronization, random access, etc.) based on the UE capability information related to bandwidth parts. In an example, the base station may configure one or more cells in a plurality of cells for the wireless device based on the UE capability information related to bandwidth parts. In an example, the base station may configure bandwidth parts for one or more cells of the wireless device in a plurality of cells based on UE capability information related to bandwidth parts.

In an example embodiment, the wireless device may receive one or more messages comprising configuration parameters for one or more cells. In an example, the one or more cells may comprise a first cell. In an example, the first cell may be a primary cell. In an example, the first cell may be a secondary cell. The one or more messages may indicate configuration parameters for a plurality of BWPs on the first cell. In an example, the one or more messages may comprise a BWP inactivity timer value for a BWP inactivity timer and/or an initially active BWP and/or a default BWP. In an example, the initially active BWP of a cell may be the BWP that is initially activated upon activation of the cell. In an example, the base station may transmit an SS/PBCH block on a first BWP of the first cell based on the wireless device capability information (e.g., capability information related to bandwidth part). In an example, the base station may select a first BWP of the first cell in the plurality of BWPs of the first cell for transmission of SS/PBCH block based on the wireless device capability information (e.g., capability information related to bandwidth part). In an example, the wireless device may indicate, e.g., in a capability information message, e.g., in capability information related to bandwidth part, that the wireless device is capable of receiving a SS/PBCH block on a first BWP (e.g., default BWP) and simultaneously (e.g., in parallel) transmitting/receiving data/control signaling (e.g., PDSCH, PDCCH, PUSCH, PUCCH) on a second BWP (e.g., active BWP). The base station, considering the wireless device capability information, may transmit synchronization signals (e.g., SS/PBCH block) on a first BWP (e.g., default BWP) and a second BWP (e.g., active BWP) may be used for data/signaling transmission/reception. In an example, the one or more messages (e.g., a value of a field in the one or more messages) may indicate that the base station transmits synchronization signals (e.g., SS/PBCH block) on a first BWP (e.g., default BWP) and a second BWP (e.g., active BWP) is used for data/signaling transmission/reception. In an example, the wireless device capability related to bandwidth part may indicate that the wireless device is not capable of receiving a SS/PBCH block on a first BWP and simultaneously (e.g., in parallel) transmitting/receiving data/control signaling (e.g., PDSCH, PDCCH, PUSCH, PUCCH) on a second BWP (e.g., active BWP). The base station, considering the wireless device capability information may transmit the synchronization signals (e.g., SS/PBCH block) on a same BWP as the active BWP (e.g., BWP for transmission/reception of data/control signaling). In an example, the one or more messages (e.g., a value of a field in the one or more messages) may indicate that the base station transmits synchronization signals (e.g., SS/PBCH block) on a same BWP as the active BWP (e.g., BWP for transmission/reception of data/control signaling). The wireless device may decode the synchronization signals to determine/adjust timing of subframes/slots for transmission and reception of data (PDSCH/PUSCH) and/or signaling (e.g., PDCCH/EPDCCH/PUCCH). In an example embodiment, the wireless device may receive a downlink control information (DCI) (e.g., via PDCCH/EPDCCH) indicating an uplink grant. The uplink grant may comprise transmission parameters for one or more transport blocks (TBs). The wireless device may transmit the one or more TBs based on the transmission parameters.

In an example embodiment, an active BWP of a first cell may be switched in response to a firs DCI. In an example in response to the wireless device indicating in the capability message that the wireless device is capable of receiving SS/PBCH block on a first BWP (e.g., default BWP) and simultaneously/in parallel transmitting/receiving data/signaling on a second BWP (e.g., active BWP), the wireless device may continue receiving the SS/PBCH block on the first BWP in response to switching the BWP. In an example, in response to the wireless device indicating in the capability message that the wireless device is not capable of receiving SS/PBCH block and transmitting/receiving data/signaling on different BWPs (e.g., default BWP and active BWP) in parallel, the wireless device may receive the SS/PBCH block on a new BWP in response to the DCI switching the active BWP from an old BWP to the new BWP. In an example, the wireless may determine the location of OFDM symbol indexes for SS/PBCH block based on numerology/subcarrier spacing of the new numerology.

Figure 36:
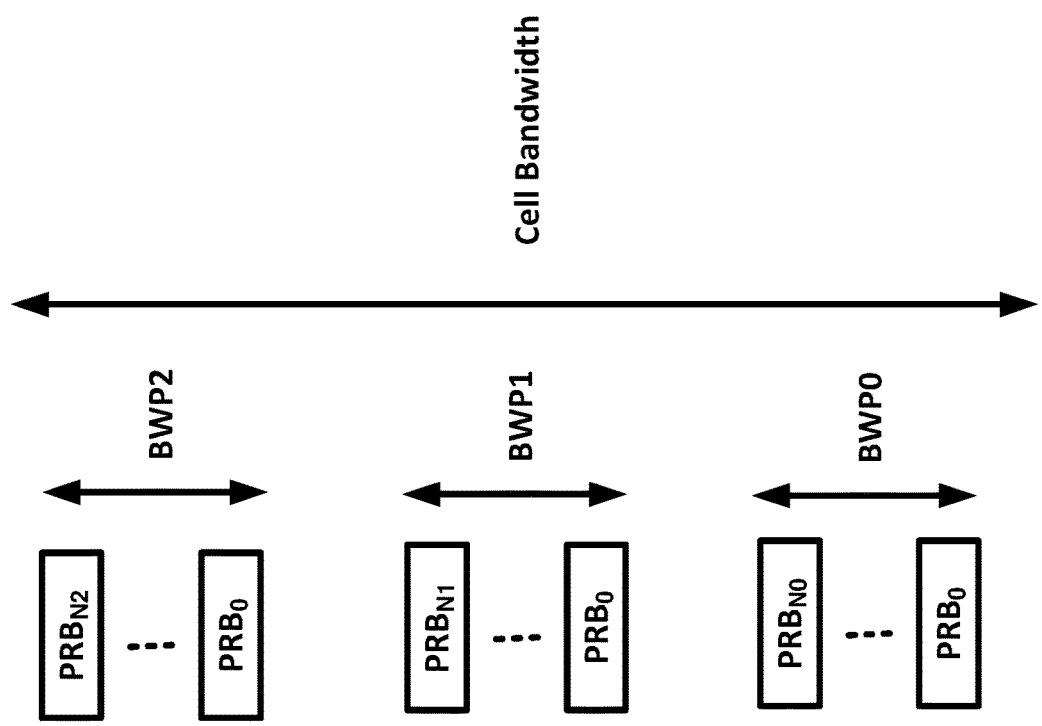
FIG. 36 is an example configuration of bandwidth parts of a cell as per an aspect of an embodiment of the present disclosure.

In new radio, a cell may comprise a plurality of bandwidth parts. A bandwidth part may comprise a plurality of contiguous frequency resources (e.g., PRBs). An example is shown in FIG. 36. radio access operation using multiple BWPs is different from carrier aggregation, wherein multiple cells are configured. In multiple BWPs operation, a single cell may comprise a plurality of BWPs. In an example, some of legacy UEs may support only one active bandwidth part from a plurality of bandwidth parts when the cell is in activated state. Some of the more advanced wireless devices may support multiple active bandwidth parts that are simultaneously active to provide enhanced performance in some scenarios. Example scenarios where multiple active bandwidth parts are beneficial include operation of new radio in unlicensed bands where one active bandwidth part may be unavailable temporarily due to channel occupancy and another active bandwidth part may be used as a fall back. Multiple active bandwidth parts for one cell may lead to increased complexity. Some wireless device may not have the hardware and/or software (e.g. in a radio transceiver, DSP, and/or radio amplifier) capabilities for multiple active bandwidth parts on a same cell. If the base station activates multiple bandwidth parts for a wireless device that does not have software and/or hardware capability for multiple active bandwidth parts, the wireless device may not properly operate on the activated bandwidth parts. This may lead to inefficiencies in the wireless device and network performance. There is a need to enhance the bandwidth part configuration processes at the wireless device and base station. Example embodiments enhance the legacy processes for wideband operation via multiple active bandwidth parts.

In an example embodiment, the wireless device may receive one or more messages comprising configuration parameters for one or more cells. In an example, the one or more cells may comprise a first cell. In an example, the first cell may be a primary cell. In an example, the first cell may be a secondary cell. The one or more messages may indicate configuration parameters for a plurality of BWPs on the first cell. In an example, the one or more messages may comprise a BWP inactivity timer value for a BWP inactivity timer and/or one or more initially active BWPs and/or one or more default BWPs.

In an example, a number of configured one or more initially active BWPs may be based on wireless device indication e.g., in capability information (e.g., capability information related to bandwidth part). In an example, the number of configured one or more initially active BWPs may be one in response to the wireless device capability information (e.g., capability information related to bandwidth part) indicating that the wireless device is not capable of multiple simultaneously/parallel active BWPs. In an example, the number of one or more initially active BWPs may be less than a first number. The first number may be a maximum number of simultaneous/parallel active BWPs. In an example the first number may be indicated by the wireless device to the base station, e.g., in a wireless device capability information message (e.g., capability information related to bandwidth part).

In an example embodiment, one or more first BWPs may be simultaneously/in parallel active for the wireless device. The number of the one or more first BWPs may be less than or equal to a first number based on the wireless device capability (e.g., as indicated by the wireless device capability information message). The wireless device may receive at least one DCI indicating deactivation of one or more BWPs in the one or more first BWPs and/or activation of one or more second BWPs in the plurality of BWPs. In an example, a single DCI may simultaneously indicate deactivation of one or more BWPs in the one or more first BWPs and/or indicate activation of one or more second BWPs in the plurality of BWPs. In an example, the DCI may comprise a field, the field comprising a bitmap that indicates which one or more BWPs in the one or more first BWPs are deactivated and/or which one or more second BWPs in the plurality of BWPs are activated. In an example, a DCI in the at least one DCI may comprise a field, the value of the field indicating an index of a BWP that is activated or deactivated. In an example, a DCI in the at least one DCI may comprise a field indicating whether the DCI indicates activation or deactivation. In an example, the DCI flips the activation/deactivation status of a BWP (e.g., an active BWP is deactivated and a non-active BWP is activated). There may be no explicit activation/deactivation field in the DCI. The number of simultaneously/in parallel active BWPs after receiving the at least one DCI may be less than or equal to the maximum number of simultaneously/in parallel active BWPs that the wireless device is capable of (e.g., as indicated by the wireless device capability information message). In an example, the base station may transmit the at least one DCI for deactivation/activation of BWPs considering the wireless device capability information, e.g., such that the number of simultaneously/in parallel active BWPs is less than a first number e.g., indicated by the wireless capability information.

In an example embodiment, the wireless device, e.g., wireless device capability information (e.g., wireless device capability related to bandwidth part) may indicate whether the wireless device is capable of multiple simultaneously/in parallel active BWPs that are contiguous in frequency domain or not. In an example embodiment, the wireless device capability information (e.g., wireless device capability related to bandwidth part) may indicate that the wireless device is capable of multiple simultaneously/in parallel active BWPs and the simultaneously/in parallel active BWPs may be non-contiguous in frequency domain (e.g., there may be a gap between an edge PRB of a first active BWP and an edge PRB of a second active BWP). In an example, the base station may configure a plurality of initially active BWPs that are non-contiguous in frequency domain in response to the wireless device capability information indicating that the wireless device is capable of multiple simultaneously/in parallel active BWPs that are non-contiguous in frequency domain. Otherwise, the plurality of initially active BWPs may be contiguous in the frequency domain.

In an example embodiment, one or more first BWPs may be simultaneously/in parallel active for the wireless device. The wireless device may receive at least one DCI indicating deactivation of one or more BWPs in the one or more first BWPs and/or activation of one or more second BWPs in the plurality of BWPs. The simultaneously/in parallel active BWPs in response to receiving the at least one DCI may be non-contiguous in frequency domain in response to the wireless device capability information indicating that the wireless device is capable of simultaneously/in parallel active BWPs that are non-contiguous in frequency domain. Otherwise, the simultaneously/in parallel active BWPs in response to receiving the at least one DCI may be contiguous in frequency domain.

In an example embodiment, the wireless device, e.g., wireless device capability information message (e.g., wireless device capability related to bandwidth part) may indicate whether the wireless device is capable of non-contiguous PRBs in a BWP or not. In an example embodiment, the wireless device capability information (e.g., wireless device capability related to bandwidth part) may indicate that the wireless device is capable of non-contiguous PRBs (e.g., non-contiguous in frequency domain) for a BWP. The base station, in response to receiving the capability information may configure a BWP with non-contiguous PRBs. An active BWP or a default BWP may comprise non-contiguous PRBs.

In an example embodiment, the wireless device, e.g., wireless device capability information message (e.g., wireless device capability related to bandwidth part), may indicate that the wireless device is not capable of non-contiguous PRBs (e.g., non-contiguous in frequency domain) for a BWP. The base station, in response to receiving the indication, e.g., in the capability information message, may configure a BWP with contiguous PRBs. An active BWP or a default BWP may comprise contiguous PRBs.

Figure 39:
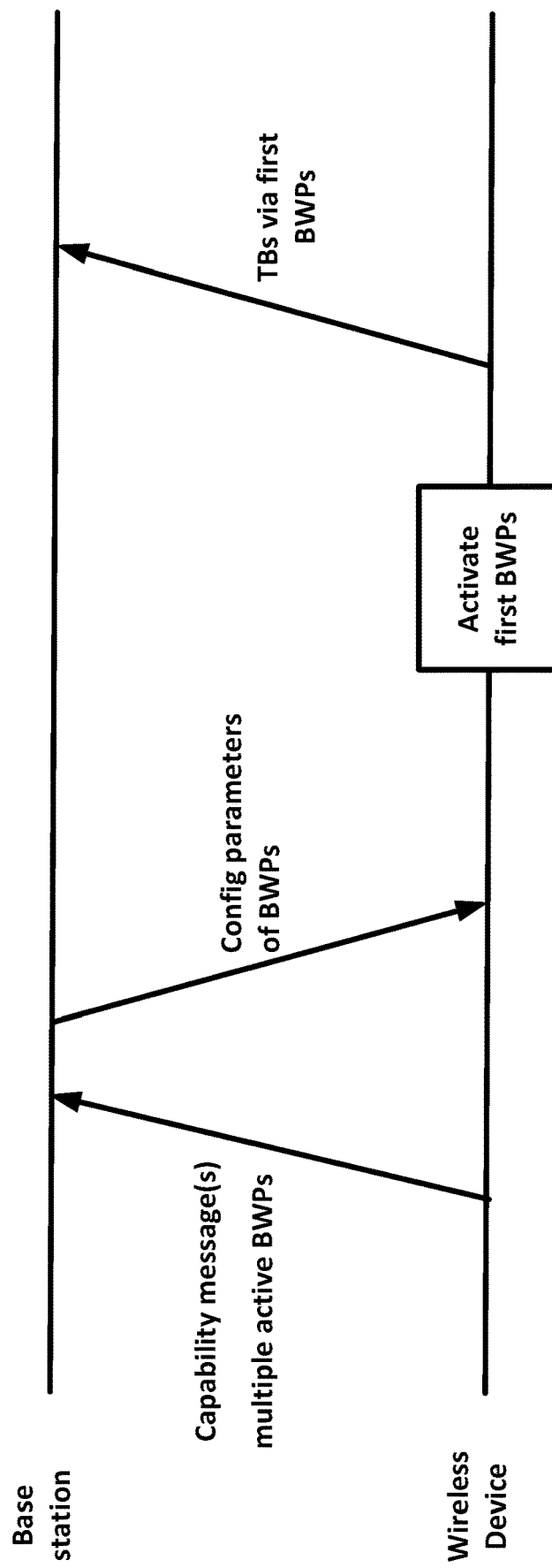
FIG. 39 is an example wireless device capability information transmission procedure as per an aspect of an embodiment of the present disclosure.

In an example embodiment as shown in FIG. 39, a wireless device may transmit one or more capability messages indicating that the wireless device supports multiple active bandwidth parts on a cell. The one or more capability messages may indicate that the wireless device supports multiple simultaneously active bandwidth parts on a cell. In an example, the one or more capability messages may further indicate a first number of active bandwidth parts of the cell. In an example, the first number of active bandwidth parts may be a maximum number of active bandwidth parts. In an example, the cell may be a primary cell or a secondary cell. In an example, the cell may be a primary cell. In an example, the cell may be a secondary cell. In an example, the cell may be a primary cell but not a secondary cell. In an example, the cell may be a secondary cell but not a primary cell. The one or more capability messages may be transmitted by the wireless device to a base station. The one or more capability messages may comprise RRC messages.

In an example, the wireless device may receive one or more second messages comprising configuration parameters of a plurality of bandwidth parts of the cell. The one or more second messages may comprise RRC messages. The configuration parameters of the plurality of bandwidth parts may indicate radio resources (e.g., PRBs and/or number of PRBs, frequency location, bandwidth etc.), numerology (e.g., subcarrier spacing, cyclic prefix), bandwidth part identifier, configuration parameters of signals and channels of the plurality of bandwidth parts and/or alike. In an example, the configuration parameters of the plurality of bandwidth parts may indicate one or more first bandwidth parts as initially active bandwidth part. In an example, the configuration parameters of the plurality of bandwidth parts may indicate one or more second bandwidth parts as default bandwidth parts.

In an example, based on and/or in response to the wireless device supporting multiple active bandwidth parts, the wireless device may activate a first plurality of bandwidth parts. In an example, a second number of the first plurality of bandwidth parts may be smaller than or equal to the first number. The first plurality of bandwidth parts may be of the plurality of bandwidth parts. In an example, the wireless device may activate the first plurality of bandwidth parts in response to receiving a command/message from the base station. The command/message may be a DCI and/or a MAC CE and/or one or more RRC messages. The base station may activate the first plurality of bandwidth parts for the wireless device that is capable (e.g., has software/hardware capability) of supporting multiple of active bandwidth parts. The base station may transmit a second command/message, indicating activation of at most one bandwidth part, to a second wireless device that supports at most one active bandwidth part and does not support multiple active bandwidth parts. The second wireless device may indicate to the base station, in a capability message, that the wireless device is capable (e.g., has hardware/software capability) of supporting at most one active bandwidth part. The base station may transmit a third command message, indicating activation of at most N bandwidth part, to a third wireless device that supports at most N active bandwidth part and does not support more than N active bandwidth parts.

In an example, the wireless device may activate the first plurality of bandwidth parts in response to/based on one or more RRC messages. In an example, the one or more RRC messages may be part of the one or more second messages indicating configuration parameters of the plurality of bandwidth parts. In an example, the one or more RRC messages may comprise one or more timing parameters indicating one or more timings for activating the first plurality of bandwidth parts. In an example, the one or more timing parameters may comprise one or more system frame numbers and/or one or more offset parameters (e.g., subframe/slot offset).

In an example, the wireless device may activate the first plurality of bandwidth parts in response to/based on one or more control elements (e.g., one or more MAC control elements). In an example, one or more activation times of the first plurality of bandwidth parts may be based on a pre-determined and/or configurable offset from reception times of the one or more control elements. In an example, in response to receiving an activation control element, the wires device may activate one or more bandwidth parts based on a pre-determined/configurable offset. In an example, the activation control element may activate a cell and the wireless device may activate one or more bandwidth parts (e.g., one or more initially active bandwidth parts) in response to receiving the control element. The one or more initially active bandwidth parts may be configured by RRC.

In an example, the wireless device may activate the first plurality of bandwidth parts in response to/based on one or more downlink control information. In an example, one or more activation times of the first plurality of bandwidth parts may be based on a pre-determined and/or configurable offset from reception times of the one or more downlink control information. In an example, in response to receiving a downlink control information, the wires device may activate one or more bandwidth parts based on a pre-determined/configurable offset. In an example, the downlink control information may activate a cell and the wireless device may activate one or more bandwidth parts (e.g., one or more initially active bandwidth parts) in response to receiving the downlink control information. The one or more initially active bandwidth parts may be configured by RRC.

In an example, the wireless device may receive one or more downlink control information indicating activation of a second plurality of bandwidth parts, wherein a third number of the second plurality of bandwidth parts is smaller than the first number. In an example, the one or more downlink control information may indicate bandwidth part switching.

In an example, the wireless device may transmit a plurality of transport blocks via the first plurality of bandwidth parts. In an example, the wireless device may transmit the plurality of transport blocks in response to receiving one or more second downlink control information indicating transmission of the plurality of transport blocks via the first plurality of bandwidth parts. In an example, the one or more second downlink control information may indicate transmission parameters of the plurality of transport blocks.

In an example, the one or more capability messages may further indicate that the wireless device supports multiple active bandwidth parts on a cell, wherein the multiple active bandwidth parts are contiguous in frequency domain. The first plurality of bandwidth parts may be contiguous in frequency domain.

In an example, the one or more capability messages may further indicate that the wireless device supports multiple active bandwidth parts on a cell, wherein the multiple active bandwidth parts are non-contiguous in frequency domain. In an example, the one or more capability messages may further indicate that the wireless device supports multiple active bandwidth parts on a cell, wherein the multiple active bandwidth parts may be contiguous or non-contiguous in frequency domain. The first plurality of bandwidth parts may be contiguous or non-con in frequency domain.

In an example embodiment, the wireless device, e.g., wireless device capability information message, may indicate whether numerology/subcarrier spacing/TTI of a DL BWP and an uplink BWP (e.g., for a DL/UL BWP pair) may be the same or the DL BWP and the UL BWP may have different numerology/subcarrier spacing/TTI. The base station may configure/activate the DL BWP and the UL BWP (e.g., for a DL/UL BWP pair) that have a same numerology/subcarrier spacing/TTI in response to the capability information indicating that the wireless device is not capable of different numerology/subcarrier spacing/TTI for DL and UL BWPs. The base station may configure/activate the DL BWP and the UL BWP (e.g., for a DL/UL BWP pair) that have different numerology/subcarrier spacing/TTI in response to the capability information indicating that the wireless device is capable of different numerology/subcarrier spacing/TTI for DL and UL BWPs.

In an example embodiment, the wireless device capability information may indicate whether a timing of a DL BWP and a timing of an UL BWP (e.g., for a DL/UL BWP) may be same or different. In an example, the UL BWP and the DL BWP may correspond to a paired or non-paired spectrum. The base station may configure/activate the DL BWP and the UL BWP (e.g., for a DL/UL BWP pair) that have a same timing in response to the capability information indicating that the wireless device is not capable of different timing for DL and UL BWPs. The base station may configure/activate the DL BWP and the UL BWP (e.g., for a DL/UL BWP pair) that have different timing in response to the capability information indicating that the wireless device is capable of different timing for DL and UL BWPs.

In an example embodiment, the wireless device may receive one or more messages comprising configuration parameters for one or more cells. In an example, the one or more cells may comprise a first cell. In an example, the first cell may be a primary cell. In an example, the first cell may be a secondary cell. The one or more messages may indicate configuration parameters for a plurality of BWPs on the first cell. In an example, the one or more messages may comprise a BWP inactivity timer value for a BWP inactivity timer and/or an initially active BWP and/or a default BWP.

In an example embodiment, the wireless device may indicate, e.g., in a capability information message (e.g., capability information message related to BWP), that the wireless device may continue operating on an active BWP in response to the base station reconfigures one or more BWP configuration parameters. In an example, the wireless device may indicate in a capability information (e.g., capability information related to BWP) that the wireless device may continue operating on an active BWP in response to the base station reconfiguring/changing the default BWP. In an example, the wireless device may indicate in a capability information (e.g., capability information related to BWP) that the wireless device may continue operating on an active BWP in response to the base station reconfiguring/changing the inactivity timer value.

In an example embodiment, the wireless device may indicate, e.g., in a capability information message, that the wireless device may continue operating on an active BWP in response to reconfiguring/changing the default BWP and/or reconfiguring/changing other BWP parameters. The base station may reconfigure/change (e.g., using an RRC message, e.g., an RRC reconfiguration message) the default BWP. The wireless device may continue operation on the active BWP in response to reconfiguration/change of the default BWP and/or other BWP parameters. The wireless device may not switch to another BWP (e.g., the new default BWP) in response to reconfiguring/changing the default BWP and/or other BWP parameters.

In an example embodiment, the wireless device may indicate, e.g., in a capability information message, that the wireless device may not, or is not capable of, continuing operating on an active BWP (e.g., may need to switch to another BWP, e.g., a default BWP) in response to reconfiguration/change of the default BWP and/or other BWP parameters. The wireless device may switch to another BWP, e.g., a default BWP, in response to the base station reconfiguring/changing (e.g., using an RRC message) the default BWP and/or other BWP parameters. In an example, the base station may transmit, to the wireless device, a DCI indicating switching the active BWP (e.g., to the new default BWP) in response to reconfiguring/changing the default BWP and/or other BWP parameters. In an example, the wireless device may switch the active BWP (e.g., to the new default BWP) in response to reconfiguring/changing the default BWP and/or other BWP parameters without receiving a DCI indicating switching the active BWP.

In an example, a slot format may include downlink symbols, uplink symbols, and flexible symbols. In an example, for a serving cell, if the UE is not configured with the higher layer parameter (e.g., SlotFormat-MainConfig), the UE may set the slot format per slot over a number of slots to be equal to the slot format per slot over the number of slots as indicated by higher layer parameter (e.g., SlotFormat-assignmentSIB1). In an example, if the UE is additionally provided higher layer parameter (e.g., SlotFormat-assignment) for the slot format per slot over the number of slots, the parameter (e.g., SlotFormat-assignment) may override flexible symbols per slot over the number of slots as provided by (e.g., SlotFormat-assignmentSIB1). In an example, the UE may set flexible symbols in a slot to downlink symbols in the slot or to uplink symbols in the slot when the UE detects a DCI format scheduling PDSCH reception or PUSCH transmission, respectively, by the UE in the flexible symbols of the slot. In an example, the UE may not receive or transmit in flexible symbols of a slot when the UE does not detect a DCI format scheduling PDSCH reception or PUSCH transmission, respectively, by the UE in the flexible symbols of the slot. In an example, if the UE is configured by higher layers with the parameter (e.g., SlotFormat-MainConfig), the UE may determine the slot format for each slot over a number of slots.

In an example, a wireless device may be configured to monitor SFI in group common PDCCH for a Scell on a different cell. In an example, for cross cell GC-PDCCH monitoring, RRC configuration may indicate that the same SFI may be applicable to more than once cell. In a n example, for cross cell GC-PDCCH monitoring, RRC configuration may indicate that different SFI fields in one GC-PDCCH may be applied to different cells. In an example, the UE may not be expected to have conflict on link (DL or UL) direction between that of dynamic SFI and that of UE specific data (e.g., UE specific DCI triggered PDSCH, PUSCH (grant-based), and PUCCH with A/N for a PDSCH). In an example, a link direction denoted as unknown in dynamic SFI may not be deemed as in conflict with DL or UL. In an example, base station may configure a per serving cell GC-PDCCH (for dynamic SFI) monitoring periodicity of K slots (e.g., based on GC-PDCCH numerology) up to 8 choices (e.g., K=1, 2, 5, 10, 20, etc.).

In an example, for the UE specific single-slot/multi-slot table configuration, each entry of the table may indicate a sequence of configured single-slot slot formats. In an example, if the sequence length is 1, the entry may be a single-slot slot format. In an example, if the sequence length is more than one, the entry may be a multi-slot slot format. In an example, it may be possible all the slots in a multi-slot slot-format have the same slot format. In an example, the entries in the table may be of different length including a mix of single slot SFI and multi-slot SFI. In an example, the length of an entry in the table may be multiple of configured GC-PDCCH monitoring period or a fraction of the configuration GC-PDCCH monitoring period.

In an example, for same cell GC-PDCCH monitoring, the UE may be required to monitor at most one GC-PDCCH per spatial QCL per configuration period carrying dynamic SFI in the active BWP in the cell. In an example, the coreset(s) may be located in the first 1/2/3 symbols in a slot. In an example, when configuring the GC-PDCCH monitoring for dynamic SFI, the gNB may configure the payload length. When configuring the GC PDCCH monitoring for dynamic SFI for a serving cell, the gNB may configure the location of the bits used for the dynamic SFI in the payload.

In an example, for blind decoding of GC-PDCCH carrying SFI, the GC-PDCCH blind decoding may be configured with one decoding candidate at a configured starting CCE with a configured aggregation level in a CSS or group-CSS in a configured coreset. In an example, states from semi-static DL/UL assignment may be overwritten by measurement, dynamic SFI, or UE specific data. In an example, state from measurement may be overwritten by dynamic SFI or UE specific data. In an example, dynamic SFI may be overwritten by UE specific data. In an example, "Unknown" in semi-static DL/UL assignment may be overwritten by measurement, dynamic SFI, and UE specific data. In an example, DL/UL in semi-static DL/UL assignment may not be overwritten to the other direction (DL to UL or UL to DL) by measurement, dynamic SFI and UE specific data. In an example, DL/UL in semi-static DL/UL assignment may not be overwritten by "unknown" by dynamic SFI. In an example, DL/UL direction implied by measurement may be overwritten by unknown in dynamic SFI. In an example, DL/UL direction implied by measurement may be overwritten by UL/DL from dynamic SFI. In an example, DL/UL direction implied by measurement may be overwritten by UE's own UE-specific data if the UE specific data implies the other direction. In an example, UL/DL in dynamic SFI may not be overwritten by UE specific data. Ina n example, Unknown in dynamic SFI may be overwritten by UE specific data (change to DL or UL). In an example, GC-PDCCH for SFI is associated with a SFI RNTI by configuration. In an example, in a serving cell, for a UE, common search space for group-common PDCCH (e.g. SFI, preemption indication, etc.) may be configured in a BWP.

In an example embodiment, the wireless device may indicate, e.g., in a capability message, to a base station, whether the wireless device may operate using different slot format indication (SFI) parameters on different BWPs of a first cell or different BWPs of a first cell may operate based on a same SFI. In an example, the wireless device may indicate in the capability message that the wireless device may operate using different SFI formats on different BWPs of a cell, e.g., a first SFI in a first BWP of the first cell and a second SFI in a second BWP of the first cell. The base station may configure the BWPs of the first cell based on the wireless device capability information (e.g., capability information related to bandwidth parts) to have different or same SFI formats.

In an example embodiment, the wireless may indicate, e.g., in a capability message, that wireless device is capable of operating on different BWPs of a first cell using different SFIs. The wireless device may receive one or more messages indicating configuration parameters for a plurality of BWPs on a first cell. The wireless device may receive, e.g., in a group common DCI, a first SFI for a first BWP of the first cell. The wireless device may receive, e.g., in a group common DCI, a second SFI for a second BWP of the first cell. The first SFI and the second SFI may indicate different slot formats for the first BWP and the second BWP.

In an example embodiment, the wireless may indicate, e.g., in a capability message, that wireless device is not capable of operating on different BWPs of a first cell using different SFIs. The wireless device may receive one or more messages indicating configuration parameters for a plurality of BWPs on a first cell. The wireless device may receive, e.g., in a group common DCI, a first SFI for a first BWP of the first cell. The wireless device may receive, e.g., in a group common DCI, a second SFI for a second BWP of the first cell. The first SFI and the second SFI may indicate same slot formats for the first BWP and the second BWP.

In an example embodiment, the wireless device may indicate, e.g., in a capability message to a base station, whether the wireless device may operate using different slot format indication (SFI) parameters on a DL BWP and an UL BWP (e.g., of a DL/UL BWP pair). In an example, the wireless device may indicate, e.g., in the capability message, that the wireless device may operate using different SFIs in DL and UL BWPs, e.g., using a first SFI in a DL BWP and using a second SFI in an UL BWP (e.g., of a DL/UL BWP pair). The base station may configure the DL and UL BWPs (e.g., of a DL/UL BWP pair) based on the wireless device capability information (e.g., capability information related to bandwidth parts) to have same or different SFI formats.

In an example embodiment, the wireless may indicate, e.g., in a capability message, that wireless device is capable of operating with different SFI formats in a DL BWP and UL BWP (e.g., of a DL/UL BWP pair) on a first cell. The wireless device may receive, e.g., in a group common DCI, a first SFI for a DL BWP (e.g., of a DL/UL BWP pair). The wireless device may receive, e.g., in a group common DCI, a second SFI for an UL BWP (e.g., of a DL/UL BWP pair). The first SFI and the second SFI may indicate different slot formats for the DL BWP and the UL BWP (e.g., of the DL/UL BWP pair).

In an example embodiment, the wireless may indicate, e.g., in a capability message, that wireless device is not capable of operating with different SFI formats in a DL BWP and UL BWP (e.g., of a DL/UL BWP pair) on a first cell. The wireless device may receive, e.g., in a group common DCI, a first SFI for a DL BWP (e.g., of a DL/UL BWP pair). The wireless device may receive, e.g., in a group common DCI, a second SFI for an UL BWP (e.g., of a DL/UL BWP pair). The first SFI and the second SFI may indicate same slot formats for the DL BWP and the UL BWP (e.g., of the DL/UL BWP pair).

In an example, the wireless device may indicate in a capability message (e.g., capability message related to bandwidth parts) whether the wireless is capable of switching both an UL BWP and a DL BWP (e.g., an UL BWP and a DL BWP corresponding to an UL/DL BWP pair) jointly and/or based on a single DCI (e.g., BWP switching DCI) or not.

In an example embodiment, the wireless device may indicate, e.g., in the capability message, that the wireless device is capable of switching both an UL BWP and a DL BWP (e.g., an UL BWP and a DL BWP corresponding to an UL/DL BWP pair) jointly and/or based on a single DCI. The base station, in response to receiving the indication, e.g., in the capability message, may transmit a single DCI to switch both the UL BWP and the DL BWP. In an example, the DCI may comprise one or more fields, the value(s) of the one or more fields indicating a first DL BWP and a first UL BWP. In an example, the value(s) of the one or more fields may indicate a first identifier for the first DL BWP and a second identifier for the first UL BWP. The wireless device may switch its DL BWP to the first DL BWP and its UL BWP to the first UL BWP. In an example, the DCI format may indicate that the DCI is used/employed for BWP switching. In an example, the DCI may comprise a field, the value of field indicating whether the DCI is used/employed for BWP switching. In an example, one or more field in the DCI may be used for a different function than BWP switching (e.g., resource allocation parameters for scheduling) or for BWP switching depending on whether the DCI is used/employed for BWP switching or a function different from BWP switching (e.g., scheduling).

In an example embodiment, the wireless device may indicate, e.g., in the capability message, that the wireless device is not capable of switching both an UL BWP and a DL BWP (e.g., an UL BWP and a DL BWP corresponding to an UL/DL BWP pair) jointly and/or based on a single DCI. The base station, in response to receiving the indication, e.g., in the capability message, may transmit independent DCIs for switching the UL BWP and the DL BWP.

In an example for BWP switching, time for RF retuning, baseband operation and/or AGC adjustment may be taken into account. A guard period may be at least based on RF retuning and/or the related operations. In an example, the wireless device may not transmit and/or receive signals in the guard period. In an example embodiment, the wireless device may indicate, e.g., in a capability message, the length of the guard period. The length of the guard period may be based on the numerologies of the BWPs, the length of the slot and so on. In an example, the length of the guard period may be indicated in the capability message as absolute time in µs. In an example, the length of the guard period may be indicated, e.g., in the capability message, as number of symbols (e.g., based on a default numerology). In an example, the wireless device may indicate a first guard period for BWP switching in response to receiving a BWP switching DCI and a second guard period in response to switching BWP due to expiration of an inactivity timer. In an example, the wireless device may indicate a first guard period and/or a first RF retuning time for switching a DL BWP and a second guard period and/or RF retuning time for switching an UL BWP.

In an example embodiment, the wireless device may indicate, e.g., in a capability message, one or more first cells that the wireless device may support and/or is capable of bandwidth part (BWP) configuration. In an example, the wireless device may indicate in the capability message one or more second cells that wireless may not support and/or is not capable of BWP configuration. In an example the capability information may comprise a list of cells. In an example, the list may indicate one or more first cells that the wireless device supports BWP configuration and/or one or more second cells that the wireless device does not support BWP configuration. In an example, the base station may, in response to receiving the capability message, transmit one or more message comprising configuration parameters for one or more cells. The base station may configure BWP for one or more first cells of the one or more cells that the wireless device indicates BWP configuration support. The base station may not configure BWP for one or more second cells of the one or more cells that the wireless device indicates no BWP configuration support.

In an example embodiment, the wireless device may indicate, e.g., in a capability message whether the wireless device supports timer based UL BWP switching or not.

In an example embodiment, the wireless device may indicate, e.g., in a capability message, that the wireless device supports timer based UL BWP switching. In an example, the wireless device may receive one or more messages comprising configuration parameters for one or more cells. The configuration parameters may comprise configuration parameters for a plurality of BWPs for a first cell in the one or more cells. The configuration parameters may comprise a timer value (e.g., for an inactivity timer) for an UL BWP switching. In an example, the timer value for UL BWP switching and the timer value for DL BWP switching may be separately and independently configured. In an example, the timer value for DL and UL BWP switching may be jointly configured and/or may have the same value. The configuration parameters may comprise a default UL BWP. In an example, the wireless device may start the timer (e.g., inactivity timer) for UL BWP switching with the timer value configured for UL BWP switching in response to switching to an UL BWP other than a default UL BWP. In an example, the wireless device may switch an active UL BWP to a first BWP (e.g., a default UL BWP) in response to the timer expiring.

In an example embodiment, the wireless device may indicate, e.g., in a capability message, that the wireless needs measurement gaps when operating on a first BWP and the wireless device measures a second BWP. In an example, the first BWP may be of a first cell and the second BWP may be of a second cell. In an example, the first BWP and the second BWP may be of the same cell. In an example, the first BWP may be one of one or more first BWPs. In an example, the one or more first BWPs may be indicated by one or more first lists (e.g., by the wireless device in a capability message). The one or more first list may be called and/or may comprise BWPList. In an example, a legacy bandListEUTRA IE may be enhanced to indicate the bands and the BWPs. The one or more first lists may be called other names. In an example, the second BWP may be one of one or more second BWPs. In an example, the one or more second BWPs may be indicated by one or more second lists (e.g., by the wireless device in a capability message). The one or more second lists may be called and/or may comprise interBWPList. In an example, a legacy interFreqBandList IE may be enhanced to indicate the bands and the BWPs.

In an example embodiment, a wireless device may indicate, e.g., in a capability message, a maximum number of spatial layers supported in a DL BWP of a cell and/or the maximum number of spatial layers in an UL BWP of a cell. In an example, the wireless device may indicate the maximum number of spatial layers in an DL BWP and/or UL BWP of a plurality DL/UL BWPs. In an example, the plurality of DL/UL BWPs may be indicated as a list. In example, the plurality of DL/UL BWPs may be of a first cell. In an example, the plurality of DL/UL BWPs may be of a plurality of cells.

Channel state information (CSI) reporting by a wireless device assists the base station in scheduling, link adaptation, beamforming and spatial multiplexing procedures. The CSI reporting may be dynamically requested by the base station (e.g., aperiodic CSI) or configured to be reported periodically (e.g., periodic CSI) or semi-persistently and based on physical layer and MAC layer activation (e.g., semi-persistent CSI). A base station may configure one or more CSI reporting configurations (e.g., CSI processes) for a wireless device and the wireless device may transmit the CSI reports for the configured CSI reporting configurations (e.g., CSI processes).

In new radio, a cell may comprise a plurality of bandwidth parts. A bandwidth part may comprise a plurality of contiguous frequency resources (e.g., PRBs). An example is shown in FIG. 36. radio access operation using multiple BWPs is different from carrier aggregation, wherein multiple cells are configured. In multiple BWPs operation, a single cell may comprise a plurality of BWPs. One or more bandwidth parts of a cell may be active when the cell is in activated state. In an example, more than one configured bandwidth part of the cell may be active when the cell is in activated state.

Different wireless device may have different hardware and software (e.g. in a radio transceiver, DSP, and/or radio amplifier) capabilities in terms of number of CSI reporting configurations (e.g., CSI processes) for which the wireless device may transmit CSI reports. In legacy channel state information reporting procedures, a wireless device may indicate a maximum number of CSI reporting configurations (e.g., CSI process per) cell for which the wireless device is capable of transmitting CSI reports. A base station may configure one or more channel state information processes and/or reporting configurations for a cell based on the wireless device capability. With configuration of bandwidth parts per cell in new radio, the maximum number of CSI reporting configurations (e.g., CSI processes) per cell may not provide to the base station required information for efficient CSI configuration. For example, in new radio, a cell may have a large bandwidth while a bandwidth part of the cell may have much smaller bandwidth. For example, by indicating the maximum number of bandwidth parts per cell, the base station may configure a conservative number of CSI reporting configurations (e.g., CSI processes) for a bandwidth part. For example, when a number of BWPs are activated, the number of needed CSI reporting configurations (e.g., CSI process) may depend on the number of active BWPs. A base station may not be able to efficiently configure a proper number of CSI reporting configurations (e.g., CSI processes) for a wireless device, when UE capability is reported in terms of a number of CSI reporting configurations (e.g., CSI processes) supported per a cell. There is a need to enhance the legacy processes for indicating capability information related to CSI reporting configuration. Example embodiments enhance the CSI configuration and reporting procedures when a cell is configured with a plurality of bandwidth parts.

Figure 37:
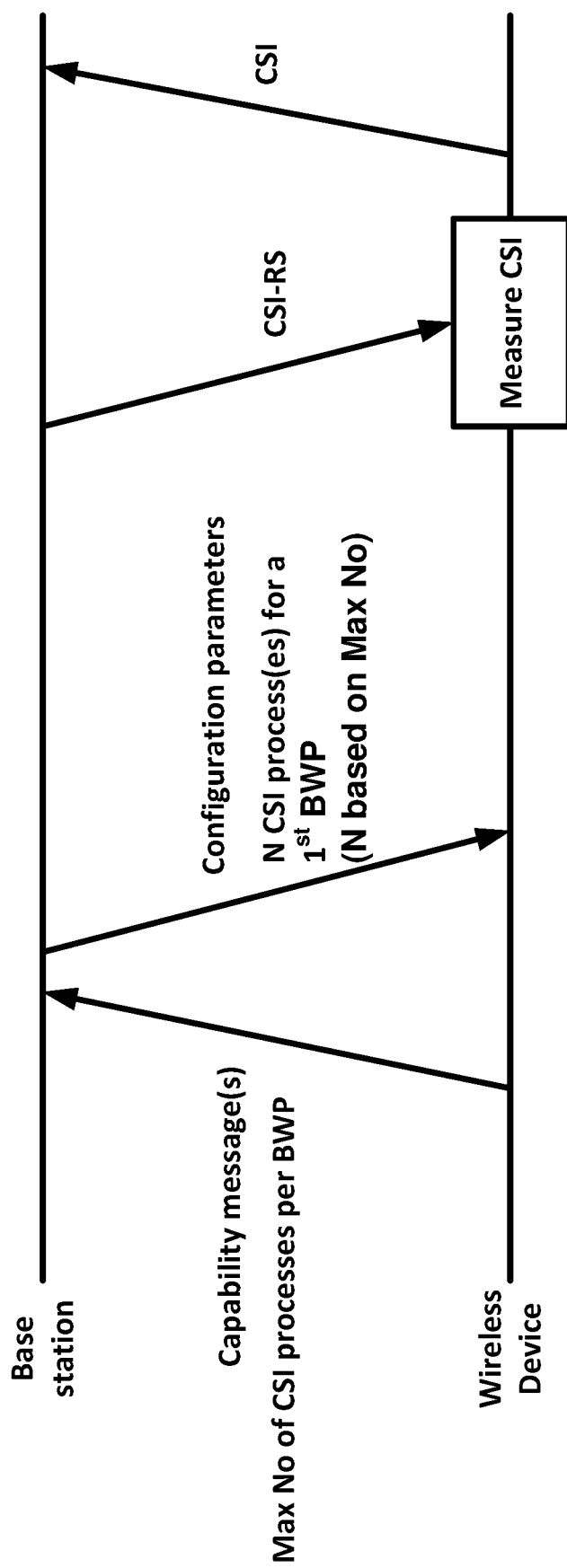
FIG. 37 is an example wireless device capability information transmission procedure as per an aspect of an embodiment of the present disclosure.

In an example embodiment as shown in FIG. 37, a wireless device may transmit to a base station one or more capability messages. The base station may configure one or more parameters for the wireless device based on the one or more capability messages transmitted by the wireless device to the base station. In an example, the base station may transmit one or more messages comprising a capability enquiry message. The capability enquiry message may be an RRC messages. The wireless device may transmit the one or more capability messages in repose to the capability enquiry message. The one or more capability messages may be transmitted via RRC messages.

The one or more capability messages may comprise one or more parameters indicating that the wireless device supports a first number of channel state information reporting configurations (e.g., CSI processes) per bandwidth parts of a cell. In an example, the first number of channel state information reporting configurations (e.g., CSI processes) may be a maximum number of channel state information reporting configurations (e.g., CSI processes) per BWP. Indicating a number of channel state information reporting configurations (e.g., CSI processes) per bandwidth parts of a cell provides additional benefits compared with reporting a number of channel state information reporting configurations per cell. Example embodiments implement an enhanced mechanism for a wireless device to report wireless device capability related to number of CSI reports per BWP and enable a base station to efficiently configure CSI reports for a wireless device per BWP.

In an example, the channel state information may comprise one or more channel state information types. In an example, the channel state information may comprise periodic channel state information. In an example, the channel state information may comprise aperiodic channel state information. In an example, the channel state information may comprise semi-persistent channel state information.

In an example, the base station may configure a wireless device with a number of channel state information reporting configurations (e.g., CSI processes). In an example, the base station may configure a wireless device with a number of channel state information reporting configurations per BWP. In an example, a channel state information reporting configuration may correspond to a channel state information process. Implementation of example embodiments enable a base station to determine a number of CSI reports for a BWP and efficiently configure CSI reports for a BWP.

The channel state information process and channel state information configuration process may be used interchangeably in this specification. In an example, an IE CSI-ReportConfig may be employed by a base station to configure a periodic or semi-persistent report sent on PUCCH on a cell in which the CSI-ReportConfig is included, or to configure a semi-persistent or aperiodic report sent on PUSCH triggered by DCI received on the cell in which the CSI-ReportConfig is included. In an example, the cell on which the report is sent may be determined by the received DCI. The CSI-ReportConfig may comprise a plurality of information elements.

In an example, carrier may indicate in which serving cell the CSI-ResourceConfig indicated are to be found. If the field is absent, the resources may be on the same serving cell as this report configuration. In an example codebookConfig may indicate codebook configuration for Type-1 or Type-II including codebook subset restriction. In an example, cqi-FormationIndicator may indicate whether the UE shall report a single (wideband) or multiple (subband) CQI. In an example, cqi-Table may indicate which CQI table to use for CQI calculation. In an example, csi-IM-ResourcesForinterference may indicate CSI IM resources for interference measurement. csi-ResourceConfigId of a CSI-ResourceConfig may be included in the configuration of the serving cell indicated with the field carrier. The CSI-ResourceConfig indicated here contains only CSI-IM resources. The bwp-Id in that CSI-ResourceConfig is the same value as the bwp-Id in the CSI-ResourceConfig indicated by resourcesForChannelMeasurement. In an example, csi-ReportingBand may indicate a contiguous or non-contiguous subset of subbands in the bandwidth part which CSI may be reported for. Each bit in the bit-string may represent one subband. The rightmost bit in the bit string may represent the lowest subband in the BWP. The choice may determine the number of subbands (subbands3 for 3 subbands, subbands4 for 4 subbands, and so on). This field may be absent if there are less than 24 PRBs (no sub band) and present otherwise, the number of sub bands may be from 3 (24 PRBs, sub band size 8) to 18 (72 PRBs, sub band size 4). In an example, groupBasedBeamReporting may indicate turning on/off group beam based reporting. In an example, non-PMI-PortIndication may indicate port indication for RI/CQI calculation. For each CSI-RS resource in the linked ResourceConfig for channel measurement, a port indication for each rank R, may indicate which R ports to use. This IE may be applicable only for non-PMI feedback. In an example, the nrofCQIsPerReport may indicate maximum number of CQIs per CSI report. Ina n example, nrofReportedRS may indicate the number (N) of measured RS resources to be reported per report setting in a non-group-based report. N<=N_max, where N_max is either 2 or 4 depending on UE capability. In an example, pucch-CSI-ResourceList may indicate which PUCCH resource to use for reporting on PUCCH. In an example, a CSI-ReportConfigId may be used to identify one CSI-ReportConfig.

In an example, the wireless device may receive one or more second messages. In an example, the wireless device may receive the one or more second messages in response to/based on the one or more capability messages. In an example, the wireless device may receive one or more configuration parameters of the one or more second messages in response to/based on the transmitting the one or more capability messages.

In an example, the one or more second messages may comprise first configuration parameters of a first plurality of bandwidth parts of a first cell. In an example, the wireless device may receive configuration parameters of the first cell. In an example, the first plurality of bandwidth parts may comprise a first bandwidth part. In an example, the configuration parameters of a bandwidth part may indicate radio resources (e.g., PRBs and/or number of PRBs, frequency location, bandwidth etc.), numerology (e.g., subcarrier spacing, cyclic prefix), bandwidth part identifier, configuration parameters of signals and channels of the plurality of bandwidth parts and/or alike. In an example, the configuration parameters of the plurality of bandwidth parts may indicate one or more first bandwidth parts as initially active bandwidth part. In an example, the configuration parameters of the plurality of bandwidth parts may indicate one or more second bandwidth parts as default bandwidth parts.

In an example, the one or more second messages may comprise second configuration. In an example, the second configuration parameters may comprise channel state information configuration parameters. In an example, the second configuration parameters may indicate a plurality of channel state information reference signal resources. The plurality of channel state information reference signal resources may be employed by the base station to transmit channel state information reference signals, wherein the channel state information reference signals are employed by the wireless device to measure channel state information.

In an example the one or more second messages may comprise third configuration parameters. The third configuration parameters may be for a second number of channel state information reporting configurations (e.g., CSI processes) for the first bandwidth part. In an example the second number may be smaller than or equal to the first number.

In an example, the base station may transmit a command to activate the first bandwidth part of the first cell. In an example, the command may be a control element (e.g., MAC control element). In an example, the command may be a control element indicating the activation of the first cell and the first bandwidth part may be an initial active bandwidth part of the first cell. In an example, the command may be a downlink control information. In an example, the downlink control information may indicate switching from a second bandwidth to the first bandwidth part. In an example, the downlink control information may indicate switching from a second bandwidth to the first bandwidth part wherein the first bandwidth part is activated in response to receiving the downlink control information and the second bandwidth part is deactivated in response to the receiving the downlink control information.

In an example, the base station may transmit channel state information reference signals via the plurality of channel state information reference signal resources. In an example, the wireless device may transmit channel state information reports for the second number of channel state information reporting configurations (CSI processes) based on the measuring. In an example, the one or more second messages may indicate uplink resources of an uplink control channel. The wireless device may transmit the channel state information reports via the uplink resources of the uplink control channel. In an example, the uplink control channel may be configured on a primary cell (e.g., PCell or PSCell). In an example, the uplink control channel may be configured o a secondary cell (e.g., secondary cell with uplink control channel, PUCCH SCell).

In an example embodiment, a wireless device may indicate, e.g., in a capability message, a maximum number of CSI processes supported in a BWP of a cell. In an example, the wireless device may indicate the maximum number of CSI processes in a BWP in a plurality of BWPs. In an example, the plurality of BWPs may be indicated as a list. In an example, the plurality of BWPs may be of a first cell. In an example, the plurality of BWPs may be of a plurality of cells. The base station, in response to receiving the indication, e.g., in the capability message may configure CSI processes for the wireless device e.g., on one or more cells and/or one or more BWPs. The number of configured CSI processes on a cell and/or a BWP may be less than the maximum number of CSI processes indicated by the wireless device. The wireless device may be configured with CSI-RS resources. The wireless device may measure CSI for the configured number of CSI processes and based on the configured CSI-RS resources. The wireless device may transmit the CSI for the configured number of CSI processes.

In an example embodiment, the wireless device may indicate, e.g., in a capability message, that the wireless may not simultaneously transmit PUCCH and PUSCH. In an example, the wireless device may indicate that the wireless device may not and/or is not capable of simultaneously transmitting PUCCH and PUSCH on one or more first cells of a plurality of cells. In an example, the one or more first cells may be indicated as a list. In an example, the wireless device may indicate that the wireless may not and/or is not capable of simultaneously transmitting PUCCH and PUSCH on one or more BWPs in a plurality of BWPs. In an example, the one or more BWPs may be indicated as a list. The base station, in response to receiving from the wireless device, the capability information message and/or information regarding the simultaneous transmission of PUCCH and PUSCH, may configure a wireless device with one or more parameters indicating that the wireless device may simultaneously transmit PUCCH and PUSCH. In an example, the base station may configure a wireless device with one or more parameters indicating that the wireless device may simultaneously transmit PUCCH and PUSCH in one or more first cells of a plurality of cells. In an example, the base station may configure a wireless device with one or more parameters indicating that the wireless device may simultaneously transmit PUCCH and PUSCH in one or more BWPs, in a plurality of BWPs in one or more first cells of a plurality of cells. In an example, the wireless device may transmit PUCCH on a first cell (e.g., PCell and/or SCell with PUCCH) and simultaneously transmit PUSCH on a BWP or on a cell if the base station indicates that PUSCH on the BWP or the cell may be simultaneously transmitted with PUCCH.

Channel state information (CSI) reporting by a wireless device assists the base station in scheduling, link adaptation, beamforming and spatial multiplexing procedures. The CSI reporting may be dynamically requested by the base station (e.g., aperiodic CSI) or configured to be reported periodically (e.g., periodic CSI) or semi-persistently and based on physical layer and MAC layer activation (e.g., semi-persistent CSI).

The aperiodic CSI reports comprise detailed CSI information and may be transmitted via physical uplink shared channel dynamically and in response to physical layer signaling specifically requesting the CSI report. The periodic CSI reports may be transmitted on a periodic basis. The Semi-persistent CSI (SP-CSI) is new CSI reporting process in new radio where the CSI reports are dynamically (e.g., via physical layer and MAC layer signaling) activated or deactivated and are transmitted periodically once activated. This type of CSI reporting requires more complex hardware and software requirements and not all wireless devices may be capable (e.g. in a radio transceiver, DSP, and/or radio amplifier) of supporting it. In existing technologies, a wireless device may provide multiple CSI capability parameters to a base station, such as a number of supported CSI processes per cell, support for MIMO related CSI parameters, capability information related to CSI measurement, capability information related to aperiodic CSI reporting, etc. Implementation of existing capability messages and capability fields related to CSI does not provide required information about semi-persistent CSI capability to a base station. The base station may configure SP-CSI for a wireless device that is not capable of transmitting SP-CSI reports via an uplink channel. The wireless device that is not capable of transmitting SP-CSI reports and is configured/activated by the base station to transmit the SP-CSI reports via the uplink channel may not transmit the SP-CSI reports via the configured SP-CSI resources. The base station may assume that CSI reports are not decoded, and the resources configured for SP-CSI resources may be wasted. This leads to inefficient wireless device and network operation. There is a need to enhance the SP-CSI signaling and configuration procedures. Example embodiments enhance the SP-CSI signaling, configuration and reporting processes at the wireless device and the base station.

Figure 38:
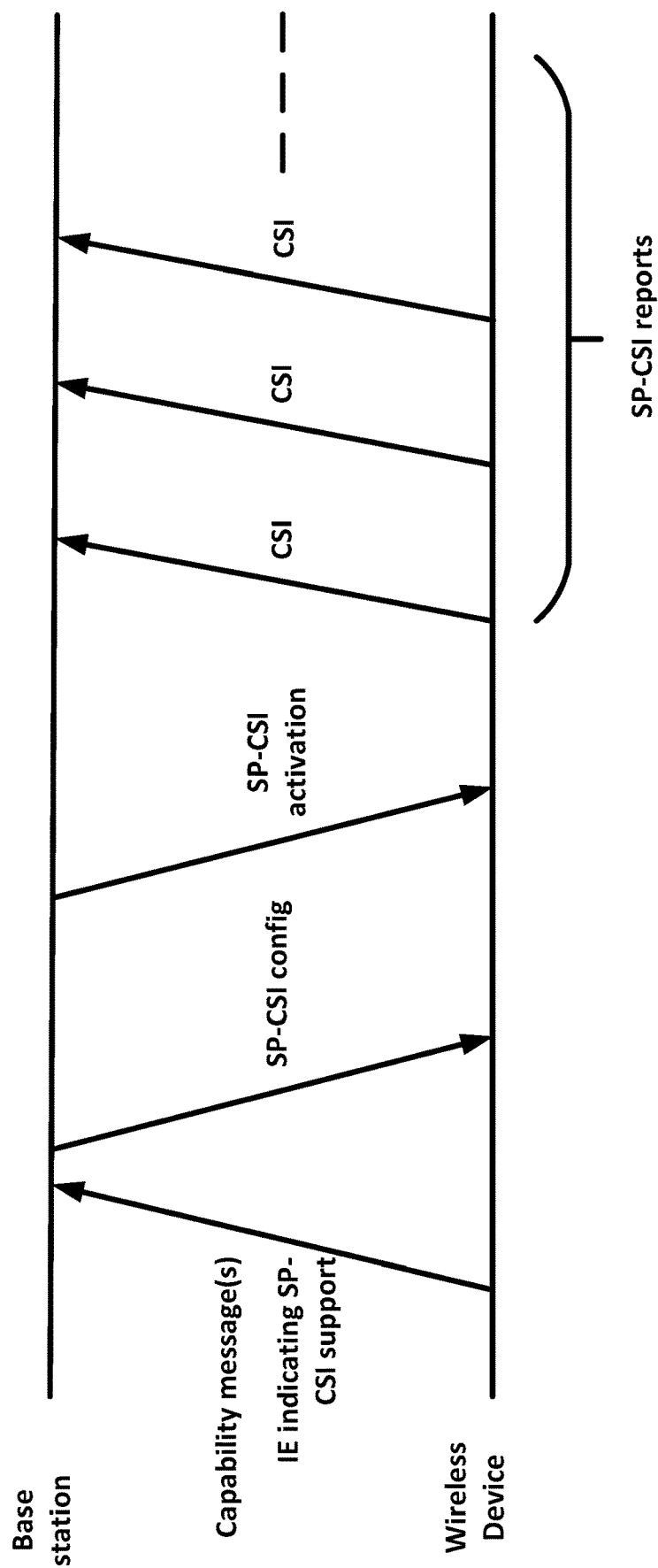
FIG. 38 is an example wireless device capability information transmission procedure as per an aspect of an embodiment of the present disclosure.

In an example embodiment as shown in FIG. 38, a wireless device may transmit to a base station one or more capability messages. The base station may configure one or more parameters for the wireless device based on the one or more capability messages transmitted by the wireless device to the base station. In an example, the base station may transmit one or more messages comprising a capability enquiry message. The capability enquiry message may be an RRC messages. The wireless device may transmit the one or more capability messages in repose to the capability enquiry message. The one or more capability messages may be transmitted via RRC messages. The one or more capability messages may indicate that the wireless device supports reporting semi-persistent channel state information via an uplink channel. In an example, the uplink channel may be a physical uplink control channel. In an example, the uplink channel may be a physical uplink shared channel. For example, the one or more capability messages may indicate that the wireless device supports reporting semi-persistent channel state information via PUSCH. For example, the one or more capability messages may indicate that the wireless device supports reporting semi-persistent channel state information via PUCCH. Transmitting one or more capability parameters indicating one or more SP CSI capabilities to the base station provide required information to a base station to efficiently configure SP CSI for a wireless device.

In an example, a UE may perform semi-persistent CSI reporting on the PUSCH upon successful decoding of a DCI format 0_1 which activates a semi-persistent CSI trigger state. In an example, DCI format 0_1 may contain a CSI request field which indicates the semi-persistent CSI trigger state to activate or deactivate. In an example, semi-persistent CSI reporting on the PUSCH supports Type I and Type II CSI with wideband, and sub-band frequency granularities. In an example, the PUSCH resources and MCS may be allocated semi-persistently by an uplink DCI.

In an example, a UE may perform semi-persistent CSI reporting on the PUCCH applied starting from slot n+ $3N_{slot}^{subframe,\mu}+1$ after the HARQ-ACK corresponding to the PDSCH carrying the selection command is transmitted in slot n. The selection command may contain one or more Reporting Settings where the associated CSI Resource Settings are configured. In an example, semi-persistent CSI reporting on the PUCCH may support Type I CSI. In an example, semi-persistent CSI reporting on the PUCCH format 2 may support Type I CSI with wideband frequency granularity. In an example, semi-persistent CSI reporting on PUCCH formats 3 or 4 may support Type I CSI with wideband and sub-band frequency granularities and Type II CSI Part 1.

In an example, the wireless device may receive one or more second messages comprising semi-persistent channel state information configuration parameters. In an example, the one or more second messages may be received in response to/based on the wireless supporting reporting semi-persistent channel state information. The semi-persistent channel state information may In an example, the wireless device may receive an activation command indicating activation of semi-persistent channel state information reports via the uplink channel. In an example, the activation command may be a downlink control channel. The downlink control information may comprise one or more fields with one or more values indicating activation of the semi-persistent channel state information reporting via the uplink channel. In an example, the one or fields may comprise a CSI request field. In an example, the wireless device may validate the downlink control information as a semi-persistent CSI reports activation command. In an example, the wireless device may validate the downlink control information based on values of the one or more fields and/or comparing the values of the one or more fields with one or more pre-defined values. In an example, the wireless device may validate the downlink control information based on a radio network temporary identifier corresponding to the downlink control information. In an example, the downlink control information may indicate resources for transmission of the semi-persistent channel state information reports.

In an example, a UE may validate, for semi-persistent CSI activation or release, a DL semi-persistent assignment PDCCH on a DCI if the following conditions are met: the CRC parity bits of the DCI format are scrambled with a SP-CSI-RNTI provided by higher layer parameter sp-csi-RNTI and special fields for the DCI format are set according to predefined values. For example, for semi-persistent CSI activation, a HARQ process number field of a DCI format 0_1 may be set to all '0's and a redundancy version field of the DCI format 0_1 may be set to '00'. For example, for semi-persistent CSI deactivation, the HARQ process number field of a DCI format 0_1 may be set to all '0's, the Modulation and Coding Scheme field of DCI format 0_1 may be set to all '1's, the redundancy version field of the DCI format 0_1 may be set to '00', and the Resource block assignment field set based on the RRC configuration of resource assignment type.

In an example, if validation is achieved, a UE may consider the information in the DCI format as a valid activation or valid release of semi-persistent CSI transmission on PUSCH. If validation is not achieved, the UE may consider the DCI format as having been detected with a non-matching CRC.

In an example, the activation command may be a control element (e.g., a MAC control element). The control element may comprise one or more fields with one or more values indicating activation of the semi-persistent channel state information reporting via the uplink channel.

In an example, the network may activate and deactivate the configured Semi-persistent CSI reporting on PUCCH of a Serving Cell by sending the SP CSI reporting on PUCCH Activation/Deactivation MAC CE. In an example, the configured Semi-persistent CSI reporting on PUCCH may be initially deactivated upon configuration and after a handover.

In an example, if the MAC entity receives an SP CSI reporting on PUCCH Activation/Deactivation MAC CE on a Serving Cell, the MAC entity may indicate to lower layers the information regarding the semi-persistent CSI reporting on PUCCH Activation/Deactivation MAC CE.

In an example, the wireless device may transmit, the semi-persistent channel state information reports in response to the activation and based on the semi-persistent channel state information configuration parameters via the uplink channel. In an example, the wireless device may transmit the semi-persistent channel state information via the physical uplink shared channel in response to the activation command being a downlink control information. In an example, the wireless device may transmit the semi-persistent channel state information via the physical uplink control channel in response to the activation command being a control element In an example, the wireless device may indicate, e.g., in a capability message, whether the wireless device is capable of semi-persistent CSI reporting (e.g., SP-CSI) or not. In an example, the wireless device may indicate, e.g., in a capability message, whether the wireless is capable of semi-persistent CSI reporting in one or more first cells of a plurality of cells or not. In an example, the one or more first cells may be indicated as a list. In an example, the wireless device may indicate, e.g., in a capability message, whether the wireless device is capable of semi-persistent CSI reporting in one or more first BWPs in a plurality of BWPs. In an example, the one or more first BWPs may be indicated as a list. The base station, in response to receiving the capability information, may transmit a DCI indicating SP-CSI transmission activation on a cell and/or a BWP of a cell. The DCI may comprise SP-CSI transmission parameters (e.g., resources, etc.). The base station my transmit CSI-RS signals for CSI measurement by the wireless device. The wireless device may measure the CSI based on the received CSI-RS signals and may report SP-CSI based on the SP-CSI information indicated by the DCI.

In an example embodiment, a base station may transmit a first message (e.g., UE Radio Paging Information message) to the core network. In an example, the message may comprise information related to frequency bands and/or BWPs. In an example, the information related to the frequency bands and/or BWPs may be derived from the wireless device capability information message transmitted by the wireless device to the base station. In an example, the first message (e.g., the UE Radio Paging Information message) may comprise a first IE indicating UE capability information used for paging. In an example, the base station may generate the first IE and the IE may be absent when not supported by the wireless device.

According to various embodiments, a device such as, for example, a wireless device, off-network wireless device, a base station, a core network device, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

FIG. 40 is a flow diagram of an aspect of an embodiment of the present disclosure. At 4010, a wireless device may transmit to a base station, one or more capability messages indicating that the wireless device supports a first number of channel state information processes per bandwidth part of a cell. At 4020, one or more second messages may be received. The one or more second messages may comprise first configuration parameters of a first plurality of bandwidth parts of a first cell, the first plurality of bandwidth parts comprising a first bandwidth part. The one or more second messages may comprise second configuration parameters indicating a plurality of channel state information reference signal resources. The one or more second messages may comprise third configuration parameters of a second number of channel state information processes for the first bandwidth part. The second number may be smaller than or equal to the first number. At 4030, first reference signals received via the plurality of channel state information reference signal resources may be measured. At 4040, channel state information for the second number of channel state information processes may be transmitted based on the measuring.

According to an example embodiment, the first number of channel state information processes may be a maximum number of channel state information processes. According to an example embodiment, a capability enquiry message may be received. The one or more capability messages may be transmitted in response to the receiving the capability enquiry message. According to an example embodiment, the channel state information may be a periodic channel state information. According to an example embodiment, the channel state information may comprise an aperiodic channel state information. According to an example embodiment, the channel state information may comprise semi-persistent channel state information. According to an example embodiment, the one or more second messages may indicate uplink resources of an uplink control channel. According to an example embodiment, the channel state information may be transmitted via the uplink control channel. According to an example embodiment, the uplink resources may be configured on a primary cell. According to an example embodiment, the uplink resources may be configured on a secondary cell. According to an example embodiment, a downlink control information may be received. The downlink control information may indicate activation of the first bandwidth part.

FIG. 41 is a flow diagram of an aspect of an embodiment of the present disclosure. At 4110, a wireless device may transmit one or more capability messages indicating that the wireless device supports a first number of channel state information (CSI) processes per bandwidth part of a cell. At 4120, CSI configuration parameters may be received based on the wireless device supporting the first number of CSI processes per bandwidth part. The CSI configuration parameters may indicate a second number of CSI processes for a first bandwidth part. The second number may be smaller than or equal to the first number. At 4130, CSI reports for the second number of CSI processes may be transmitted.

According to an example embodiment, configuration parameters of the first bandwidth part may be received. According to an example embodiment, the CSI configuration parameters may indicate a plurality of CSI reference signal resources. According to an example embodiment, first reference signals received via the plurality of CSI reference signal resources may be measured. According to an example embodiment, the transmitting of the CSI for the second number of CSI processes may be based on the configuration parameters and the measuring.

Figure 42:
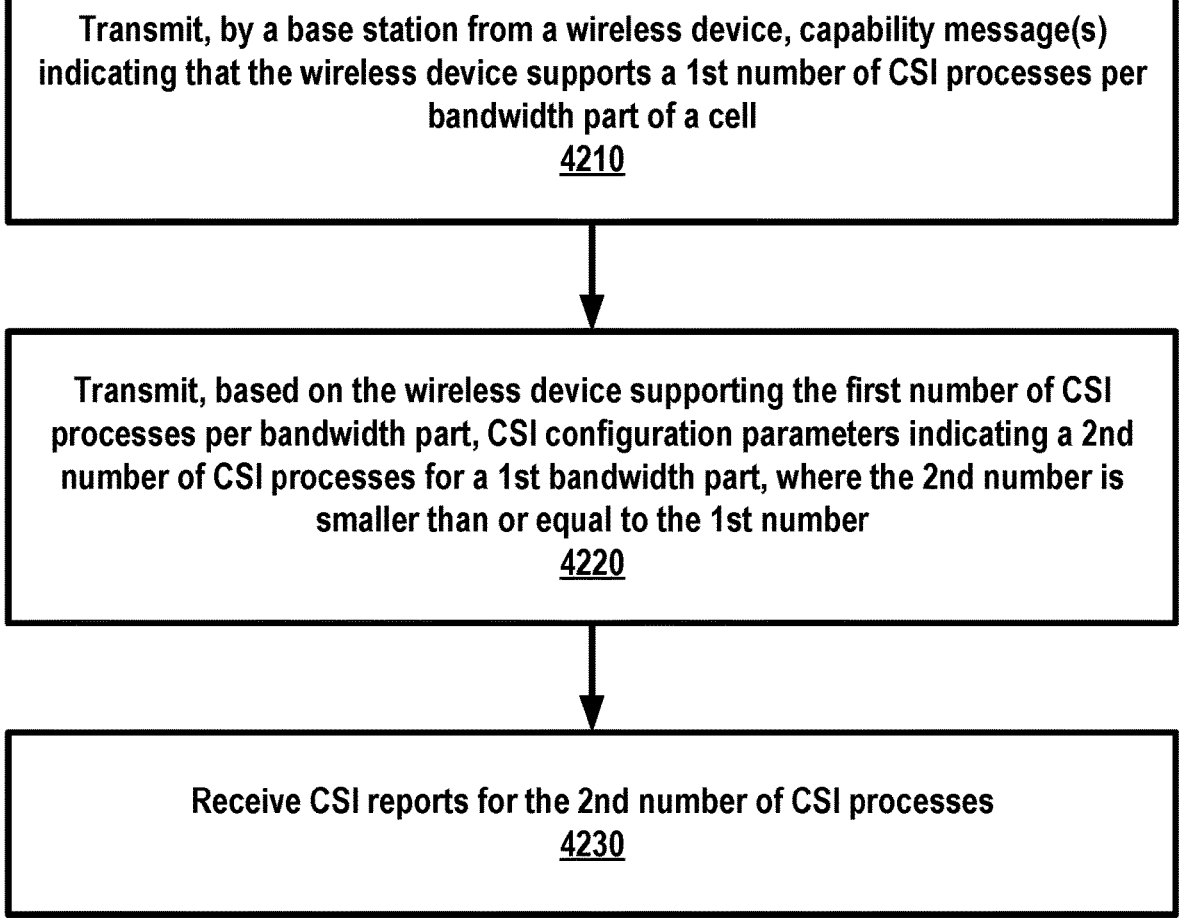
FIG. 42 is a flow diagram of an aspect of an embodiment of the present disclosure.

FIG. 42 is a flow diagram of an aspect of an embodiment of the present disclosure. At 4210, may receive a base station from a wireless device, one or more capability messages indicating that the wireless device supports a first number of channel state information (CSI) processes per bandwidth part of a cell. At 4220, CSI configuration parameters may be transmitted based on the wireless device supporting the first number of CSI processes per bandwidth part. The CSI configuration parameters may indicate a second number of CSI processes for a first bandwidth part. The second number may be smaller than or equal to the first number. At 4230, CSI reports for the second number of CSI processes may be received.

According to an example embodiment, configuration parameters of the first bandwidth part may be transmitted.

According to an example embodiment, the first number of CSI processes may be a maximum number of CSI processes. According to an example embodiment, a capability enquiry message may be transmitted. The one or more capability messages may be received in response to the transmitting the capability enquiry message. According to an example embodiment, the CSI may be a periodic CSI. According to an example embodiment, the CSI may be an aperiodic CSI. According to an example embodiment, the CSI may be semi-persistent CSI. According to an example embodiment, the CSI configuration parameters may indicate uplink resources of an uplink control channel. According to an example embodiment, the CSI reports may be received via the uplink control channel. According to an example embodiment, the uplink resources may be configured on a primary cell. According to an example embodiment, the uplink resources may be configured on a secondary cell. According to an example embodiment, a downlink control information indicating activation of the first bandwidth part may be transmitted.

FIG. 43 is a flow diagram of an aspect of an embodiment of the present disclosure.

At 4310, a wireless device may transmit one or more capability messages to a base station. The one or more capability messages may indicate that the wireless device supports reporting semi-persistent channel state information via an uplink channel. At 4320, one or more second messages may be received based on the wireless device supporting the reporting semi-persistent channel state information. The one or more second messages may comprise semi-persistent channel state information configuration parameters. At 4330, activation command may be received. The activation command may indicate activation of semi-persistent channel state information reports via the uplink channel. At 4340, the semi-persistent channel state information reports may be transmitted, via the uplink channel, in response to the activation and based on the semi-persistent channel state information configuration parameters.

According to an example embodiment, the activation command may be a downlink control information. According to an example embodiment, the activation commands may indicate one or more transmission parameters for transmission of the semi-persistent channel state information reports. According to an example embodiment, the activation of the plurality of semi-persistent channel state information reports may be based on a request field in the activation command. According to an example embodiment, the uplink channel may be a physical uplink shared channel. According to an example embodiment, the uplink channel may be a physical uplink control channel. According to an example embodiment, the activation command may indicate resources for transmission of the semi-persistent channel state information reports. According to an example embodiment, the semi-persistent channel state information reports may be employed by the base station for making scheduling decisions. According to an example embodiment, the semi-persistent channel state information configuration parameters may indicate a plurality of channel state information reference signal resources. According to an example embodiment, a first reference signal, received via the plurality of channel state information reference signal resources, may be measured. According to an example embodiment, the transmitting of the semi-persistent channel state information reports may be further based on the measuring. According to an example embodiment, the wireless device may receive a capability enquiry message from the base station. The one or more capability messages may be transmitted in response to the receiving the capability enquiry message.

Figure 44:
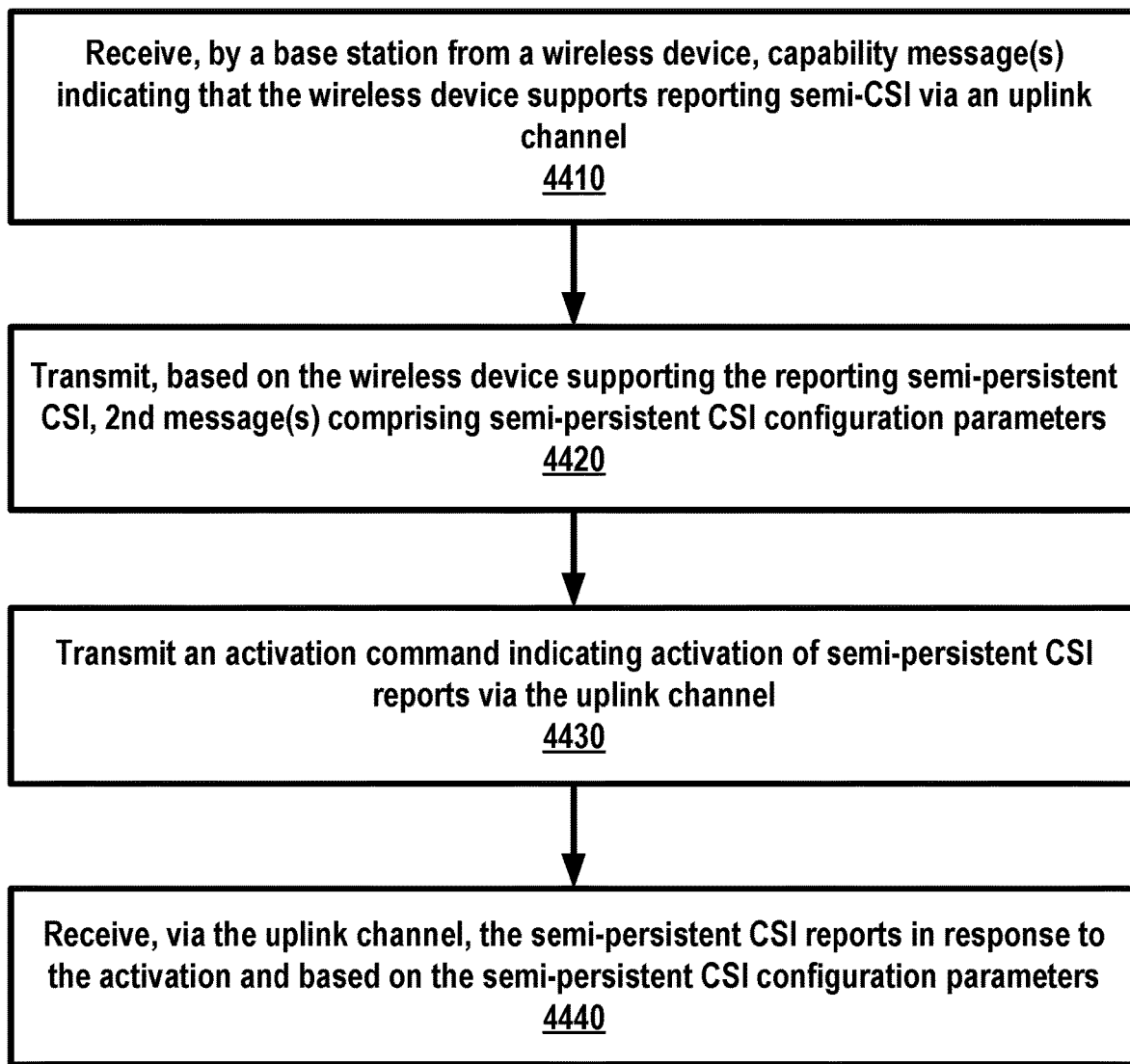
FIG. 44 is a flow diagram of an aspect of an embodiment of the present disclosure.

FIG. 44 is a flow diagram of an aspect of an embodiment of the present disclosure. At 4410, a base station may receive one or more capability messages from a wireless device. The one or more capability messages may indicate that the wireless device supports reporting semi-persistent channel state information via an uplink channel. At 4420, one or more second messages may be transmitted based on the wireless device supporting the reporting semi-persistent channel state information. The one or more second messages may comprise semi-persistent channel state information configuration parameters. At 4430, an activation command may be transmitted. The activation command may indicate activation of semi-persistent channel state information reports via the uplink channel. At 4440, the semi-persistent channel state information reports may be received, via the uplink channel, in response to the activation and based on the semi-persistent channel state information configuration parameters.

According to an example embodiment, the activation command may be a downlink control information. According to an example embodiment, the activation commands may indicates one or more transmission parameters for transmission of the semi-persistent channel state information reports. According to an example embodiment, the activation of the plurality of semi-persistent channel state information reports may be based on a request field in the activation command. According to an example embodiment, the uplink channel may be a physical uplink shared channel. According to an example embodiment, the uplink channel may be a physical uplink control channel. According to an example embodiment, the activation command may indicate resources for transmission of the semi-persistent channel state information reports. According to an example embodiment, the semi-persistent channel state information reports may be employed by the base station for making scheduling decisions. According to an example embodiment, the semi-persistent channel state information configuration parameters may indicate a plurality of channel state information reference signal resources. According to an example embodiment, the base station may transmit a capability enquiry message to the wireless device. The one or more capability messages may be received in response to the transmitting the capability enquiry message.

Figure 45:
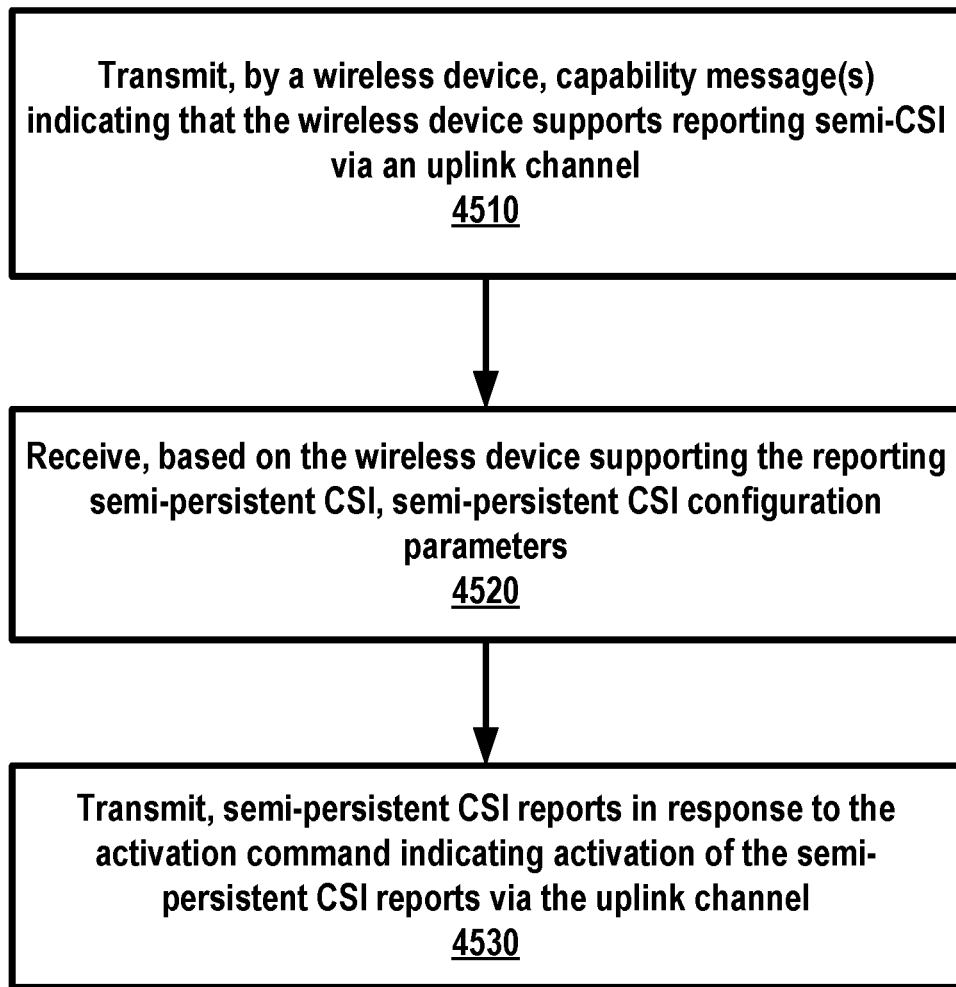
FIG. 45 is a flow diagram of an aspect of an embodiment of the present disclosure.

FIG. 45 is a flow diagram of an aspect of an embodiment of the present disclosure. At 4510, a wireless device may transmit one or more capability messages. The one or more capability messages may indicate that the wireless device supports reporting semi-persistent channel state information (CSI) via an uplink channel. At 4520, semi-persistent CSI configuration parameters may be received based on the wireless device supporting the reporting semi-persistent CSI. At 4530, semi-persistent CSI reports may be transmitted in response to an activation command indicating activation of the semi-persistent CSI reports via the uplink channel.

Figure 46:
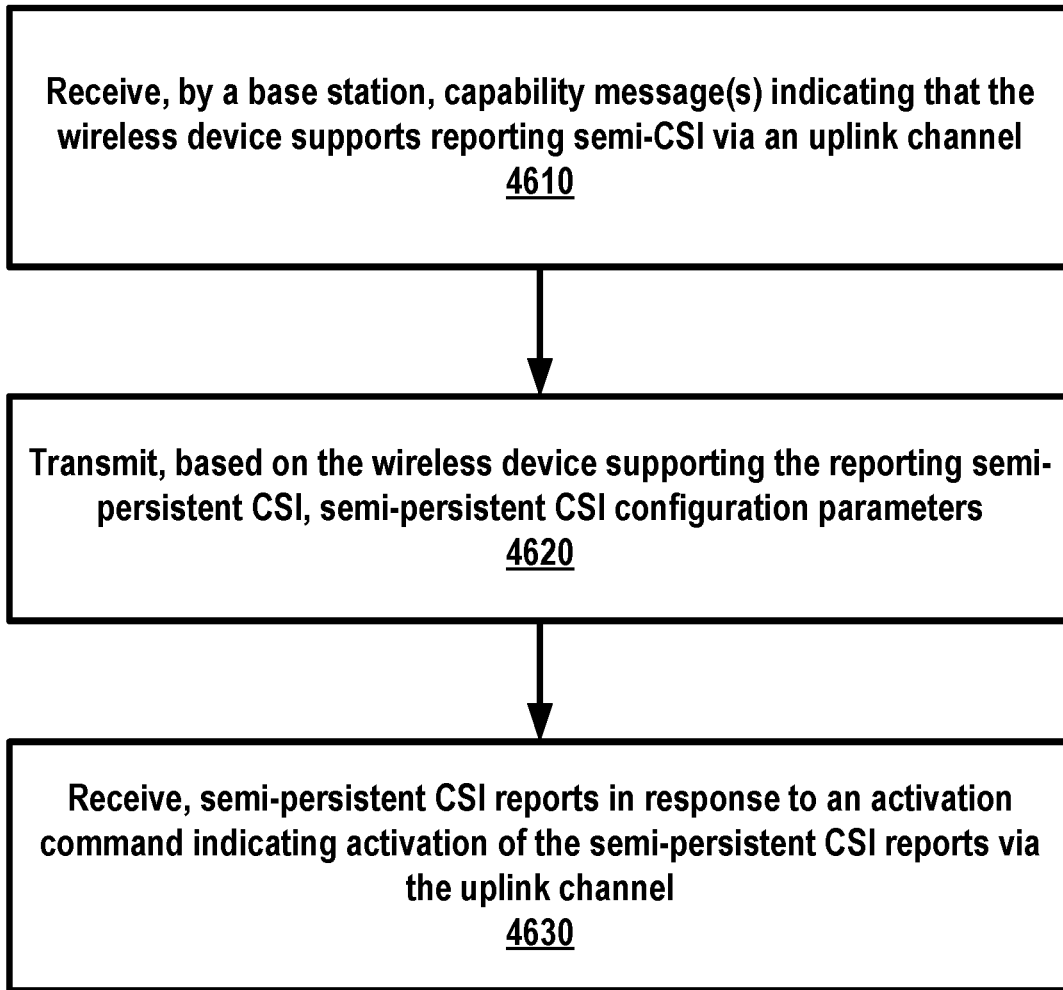
FIG. 46 is a flow diagram of an aspect of an embodiment of the present disclosure.

FIG. 46 is a flow diagram of an aspect of an embodiment of the present disclosure. At 4610, a base station may receive one or more capability messages. The one or more capability messages may indicate that the wireless device supports reporting semi-persistent channel state information (CSI) via an uplink channel. At 4620, semi-persistent CSI configuration parameters may be transmitted based on the wireless device supporting the reporting semi-persistent CSI. At 4630, semi-persistent CSI reports may be received in response to an activation command indicating activation of the semi-persistent CSI reports via the uplink channel.

Figure 47:
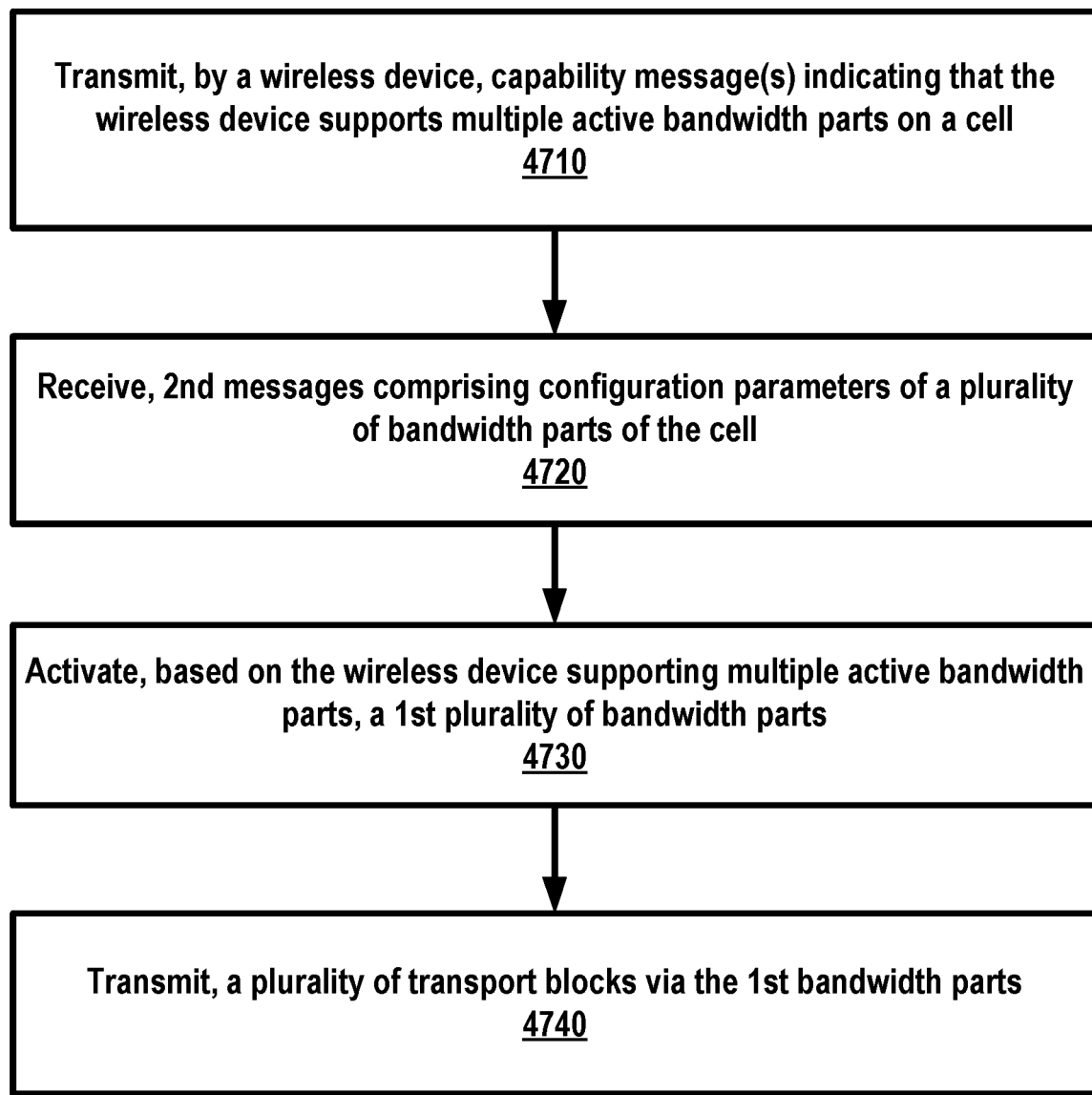
FIG. 47 is a flow diagram of an aspect of an embodiment of the present disclosure.

FIG. 47 is a flow diagram of an aspect of an embodiment of the present disclosure. At 4710, a wireless device may transmit one or more capability messages. The one or more capability messages may indicate that the wireless device supports multiple active bandwidth parts on a cell. At 4720, one or more second messages may be received. The one or more second messages may comprise configuration parameters of a plurality of bandwidth parts of the cell. At 4730, a first plurality of bandwidth parts may be activated based on the wireless device supporting multiple active bandwidth parts. At 4740, a plurality of transport blocks may be transmitted via the first plurality of bandwidth parts.

According to an example embodiment, the one or more capability messages may further indicate a first number of active bandwidth parts of the cell. According to an example embodiment, a second number of the first plurality of bandwidth parts may be smaller than or equal to the first number. According to an example embodiment, one or more downlink control information indicating activation of a second plurality of bandwidth parts may be received. A third number of the second plurality of bandwidth parts may be smaller than the first number. According to an example embodiment, one or more downlink control information indicating transmission of the plurality of transport blocks may be received via the first plurality of bandwidth parts. According to an example embodiment, the transmitting of the plurality of transport blocks may be based on transmission parameters indicated by the one or more downlink control information. According to an example embodiment, the one or more capability messages may further indicate that the wireless device supports multiple active bandwidth parts on a cell that are contiguous in frequency domain. According to an example embodiment, the first plurality of bandwidth parts may be contiguous in the frequency domain. According to an example embodiment, the one or more capability messages may further indicate that the wireless device supports multiple active bandwidth parts on a cell that are non-contiguous in frequency domain. According to an example embodiment, the first plurality of bandwidth parts may be contiguous or non-contiguous in the frequency domain. According to an example embodiment, the activating may be in response to receiving a control element. According to an example embodiment, the activating may be in response to receiving a downlink control information. According to an example embodiment, the activating may be in response to receiving a radio resource configuration message.

Figure 48:
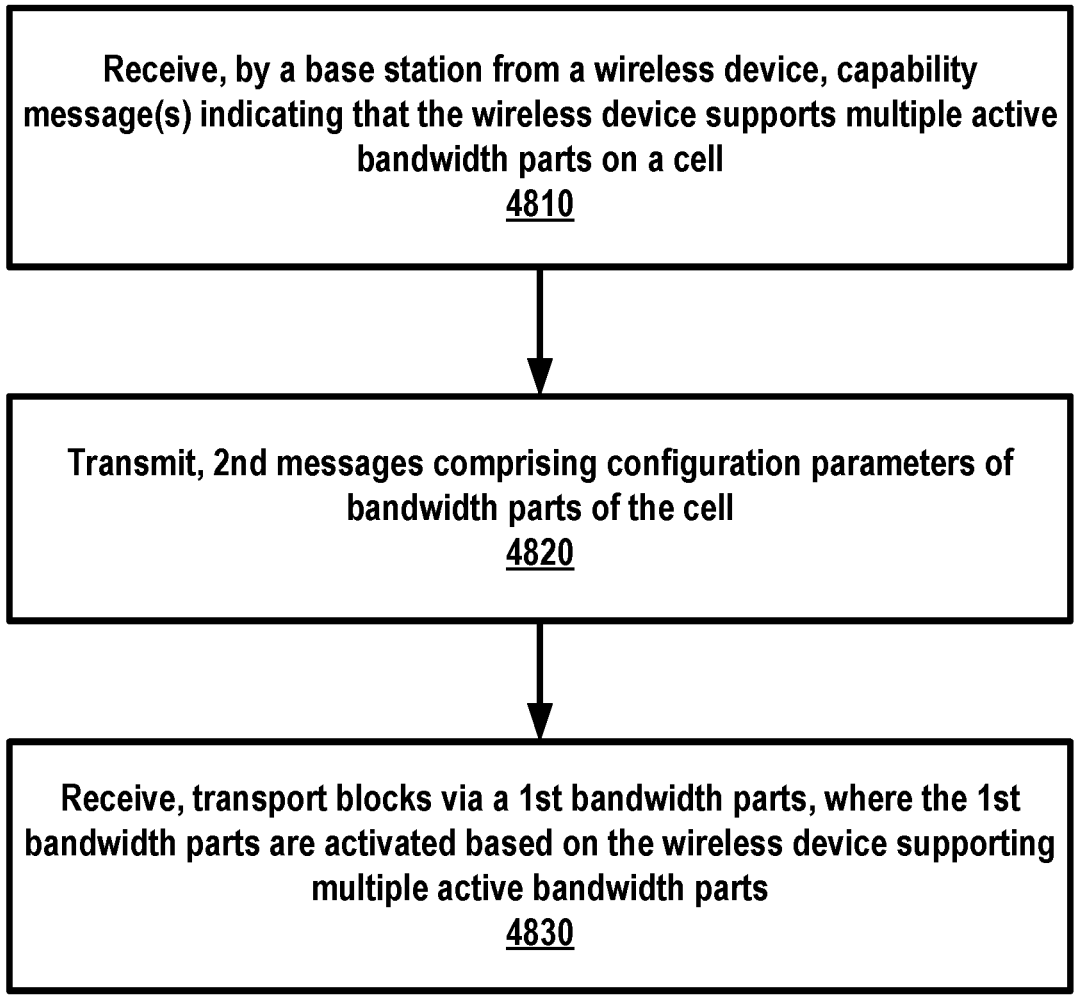
FIG. 48 is a flow diagram of an aspect of an embodiment of the present disclosure.

FIG. 48 is a flow diagram of an aspect of an embodiment of the present disclosure. At 4810, a base station may receive one or more capability messages from a wireless device. The one or more capability messages may indicate that the wireless device supports multiple active bandwidth parts on a cell. At 4820, one or more second messages may be transmitted. The one or more second messages may comprise configuration parameters of a plurality of bandwidth parts of the cell. At 4830, a plurality of transport blocks may be received via a first plurality of bandwidth parts. The first plurality of bandwidth parts may be activated based on the wireless device supporting multiple active bandwidth parts.

According to an example embodiment, the one or more capability messages may further indicate a first number of active bandwidth parts of the cell. According to an example embodiment, a second number of the first plurality of bandwidth parts may be smaller than or equal to the first number. According to an example embodiment, one or more downlink control information indicating activation of a second plurality of bandwidth parts may be transmitted. A third number of the second plurality of bandwidth parts may be smaller than the first number. According to an example embodiment, one or more downlink control information indicating transmission of the plurality of transport blocks may be transmitted via the first plurality of bandwidth parts. According to an example embodiment, the receiving of the plurality of transport blocks may be based on transmission parameters indicated by the one or more downlink control information. According to an example embodiment, the one or more capability messages may further indicate that the wireless device supports multiple active bandwidth parts on a cell that are contiguous in frequency domain. According to an example embodiment, the first plurality of bandwidth parts may be contiguous in the frequency domain. According to an example embodiment, the one or more capability messages may further indicate that the wireless device supports multiple active bandwidth parts on a cell that are non-contiguous in frequency domain. According to an example embodiment, the first plurality of bandwidth parts may be contiguous or non-contiguous in the frequency domain. According to an example embodiment, the activating may be in response to receiving a control element. According to an example embodiment, the activating may be in response to receiving a downlink control information. According to an example embodiment, the activating may be in response to receiving a radio resource configuration message.

Figure 49:
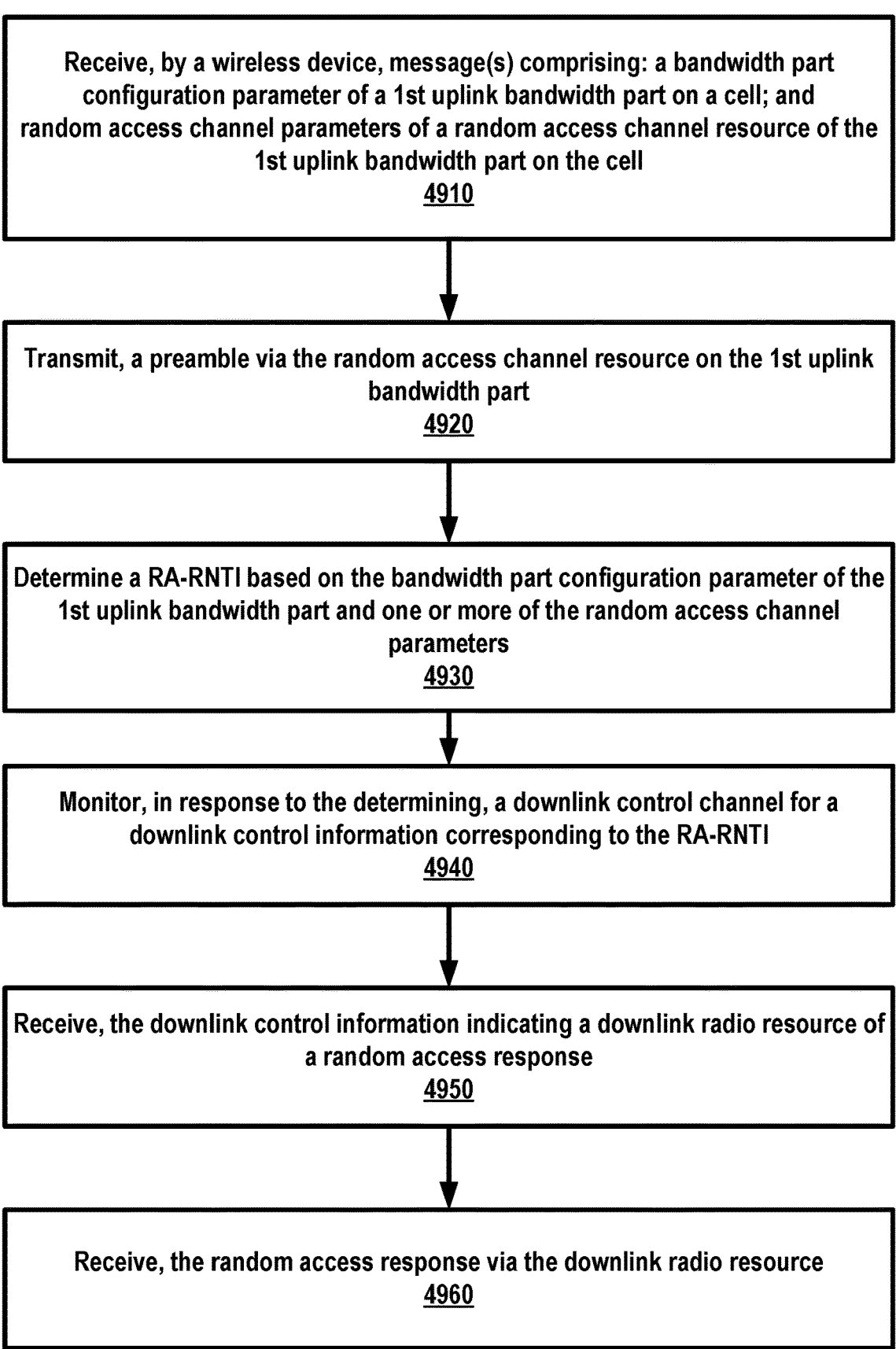
FIG. 49 is a flow diagram of an aspect of an embodiment of the present disclosure.

FIG. 49 is a flow diagram of an aspect of an embodiment of the present disclosure. At 4910, a wireless device may receive one or more messages. The one or more messages may comprise a bandwidth part configuration parameter of a first uplink bandwidth part on a cell. The one or more messages may comprise random access channel parameters of a random access channel resource of the first uplink bandwidth part on the cell. At 4920, a preamble may be transmitted via the random access channel resource on the first uplink bandwidth part. At 4930, a random access radio network temporary identifier (RA-RNTI) may be determined based on the bandwidth part configuration parameter of the first uplink bandwidth part and one or more of the random access channel parameters. At 4940, a downlink control channel may be monitored for a downlink control information corresponding to the RA-RNTI in response to the determining. At 4950, the downlink control information may be received. The downlink control information may indicate a downlink radio resource of a random access response. At 4960, the random access response may be received via the downlink radio resource.

According to an example embodiment, the cell may be a primary cell of a plurality of cells. According to an example embodiment, the cell may be a secondary cell of a plurality of cells. According to an example embodiment, the bandwidth part configuration parameter may comprise a bandwidth part index of the first uplink bandwidth part. According to an example embodiment, the bandwidth part configuration parameter may comprise a bandwidth value of the first uplink bandwidth part. According to an example embodiment, a random access procedure may be initiated on the first uplink bandwidth part. According to an example embodiment, the one or more of the random access channel parameters may comprise a time resource parameter and a frequency resource parameter. According to an example embodiment, the random access channel parameters of the random access channel resource may comprise a preamble index of a preamble. According to an example embodiment, the random access channel parameters of the random access channel resource may comprise a preamble format. According to an example embodiment, the random access channel parameters of the random access channel resource may comprise a preamble transmission numerology. According to an example embodiment, the random access channel parameters of the random access channel resource may comprise a time and radio resource parameter. According to an example embodiment, the random access channel parameters of the random access channel resource may comprise a frequency radio resource parameter. According to an example embodiment, the random access channel parameters of the random access channel resource may comprise parameters of power setting.

According to an example embodiment, the transmitting of the preamble may be in response to receiving a first downlink control information comprising a preamble index identifying the preamble. According to an example embodiment, the transmitting of the preamble may be in response to receiving a first downlink control information comprising a random access channel resource index identifying the random access channel resource. According to an example embodiment, the wireless device determining the RA-RANTI may be further based on a cell identifier of the cell. According to an example embodiment, the random access response may comprise a preamble index identifying the preamble. According to an example embodiment, the random access response may comprise an uplink grant on the first uplink bandwidth part. According to an example embodiment, the cell may comprise a plurality of uplink bandwidth parts comprising the first uplink bandwidth part and a second uplink bandwidth part. According to an example embodiment, the second uplink bandwidth part of the plurality of the uplink bandwidth parts may be configured with a first bandwidth part configuration parameter and first random access channel parameters of a first random access channel resource. According to an example embodiment, the bandwidth part configuration parameter may comprise a frequency location parameter of the first uplink bandwidth part. According to an example embodiment, the frequency location parameter may comprise a resource block starting position parameter of the first uplink bandwidth part. According to an example embodiment, the resource block starting position parameter may comprise an offset value in number of physical resource blocks between a frequency reference point of the cell and a first usable subcarrier of the first uplink bandwidth part. According to an example embodiment, the transmitting of the preamble may be in response to initiating a contention-based random access procedure. According to an example embodiment, the first uplink bandwidth part may be selected from the first uplink bandwidth part and the second uplink bandwidth part of the plurality of the uplink bandwidth parts. According to an example embodiment, the preamble and the random access channel resource may be associated with the first uplink bandwidth part.

Figure 50:
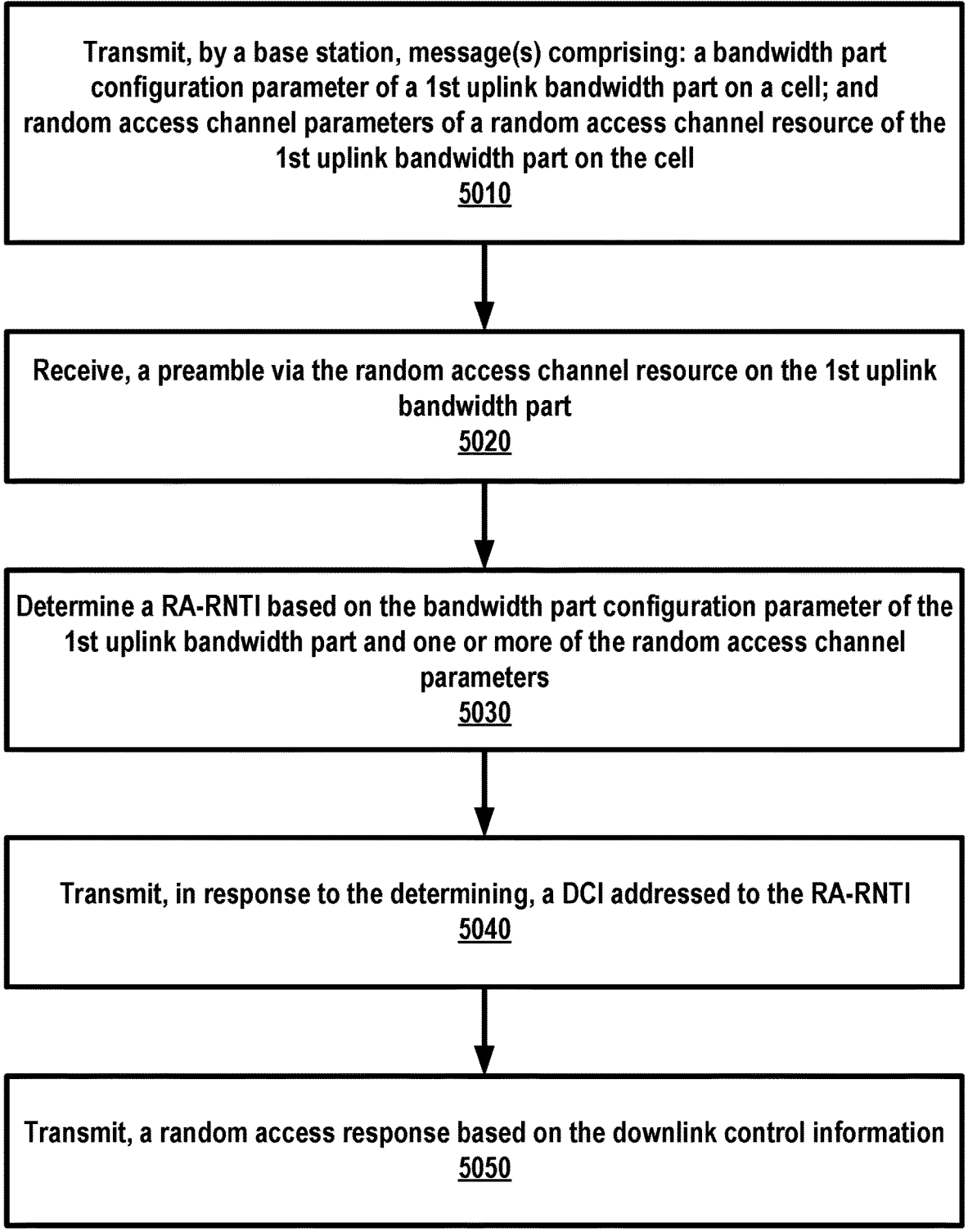
FIG. 50 is a flow diagram of an aspect of an embodiment of the present disclosure.

FIG. 50 is a flow diagram of an aspect of an embodiment of the present disclosure. At 5010, a base station may transmit one or more messages. The one or more messages may comprise a bandwidth part configuration parameter of a first uplink bandwidth part on a cell. The one or more messages may comprise random access channel parameters of a random access channel resource of the first uplink bandwidth part on the cell. At 5020, a preamble may be received via the random access channel resource on the first uplink bandwidth part. At 5030, a random access radio network temporary identifier (RA-RNTI) may be determined based on the bandwidth part configuration parameter of the first uplink bandwidth part and one or more of the random access channel parameters. At 5040, a downlink control information addressed to the RA-RNTI may be transmitted in response to the determining. At 5050, a random access response may be transmitted based on the downlink control information.

According to an example embodiment, the cell may be a primary cell of a plurality of cells. According to an example embodiment, the cell may be a secondary cell of a plurality of cells. According to an example embodiment, the bandwidth part configuration parameter may comprise a bandwidth part index of the first uplink bandwidth part. According to an example embodiment, the bandwidth part configuration parameter may comprise a bandwidth value of the first uplink bandwidth part.

According to an example embodiment, a random access procedure may be initiated on the first uplink bandwidth part. According to an example embodiment, the one or more of the random access channel parameters may comprise a time resource parameter and a frequency resource parameter. According to an example embodiment, the random access channel parameters of the random access channel resource may comprise a preamble index of a preamble. According to an example embodiment, the random access channel parameters of the random access channel resource may comprise a preamble format. According to an example embodiment, the random access channel parameters of the random access channel resource may comprise a preamble transmission numerology. According to an example embodiment, the random access channel parameters of the random access channel resource may comprise a time and radio resource parameter. According to an example embodiment, the random access channel parameters of the random access channel resource may comprise a frequency radio resource parameter. According to an example embodiment, the random access channel parameters of the random access channel resource may comprise parameters of power setting.

According to an example embodiment, the receiving of the preamble may be in response to transmitting a first downlink control information comprising a preamble index identifying the preamble. According to an example embodiment, the receiving of the preamble may be in response to transmitting a first downlink control information comprising a random access channel resource index identifying the random access channel resource. According to an example embodiment, the receiving of the preamble may be in response to transmitting a first downlink control information comprising the base station determines the RA-RANTI further based on a cell identifier of the cell. According to an example embodiment, the receiving of the preamble may be in response to transmitting a first downlink control information comprising the random access response comprising a preamble index identifying the preamble. According to an example embodiment, the receiving of the preamble may be in response to transmitting a first downlink control information comprising the random access response comprising an uplink grant on the first uplink bandwidth part. According to an example embodiment, the cell may comprise a plurality of uplink bandwidth parts comprising the first uplink bandwidth part and a second uplink bandwidth part. According to an example embodiment, the second uplink bandwidth part of the plurality of the uplink bandwidth parts may be configured with a first bandwidth part configuration parameter and first random access channel parameters of a first random access channel resource. According to an example embodiment, the bandwidth part configuration parameter may comprise a frequency location parameter of the first uplink bandwidth part. According to an example embodiment, the frequency location parameter may be a resource block starting position parameter of the first uplink bandwidth part. According to an example embodiment, the resource block starting position parameter may comprise an offset value in number of physical resource blocks between a frequency reference point of the cell and a first usable subcarrier of the first uplink bandwidth part. According to an example embodiment, the receiving of the preamble may be in response to initiating a contention-based random access procedure.

Figure 51:
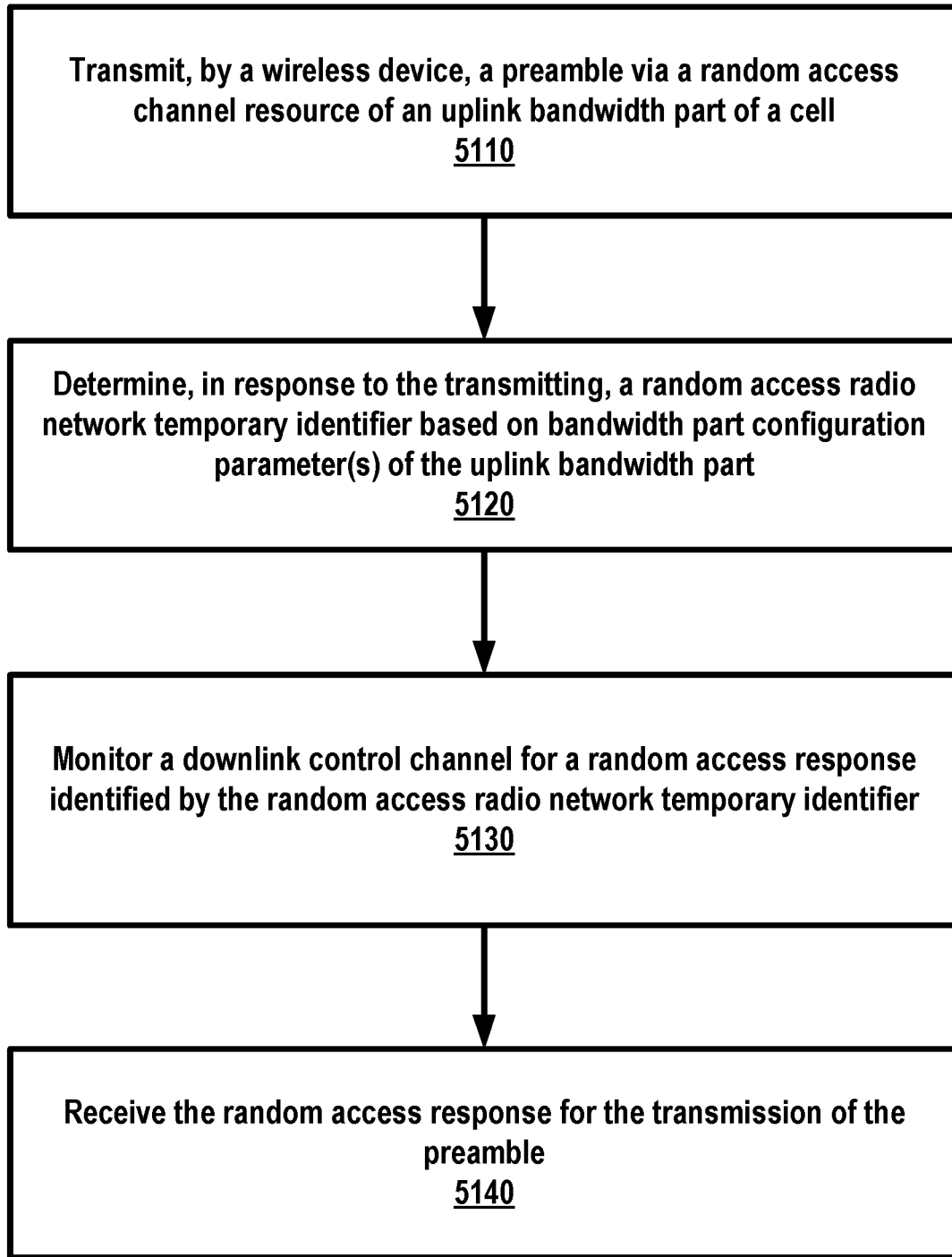
FIG. 51 is a flow diagram of an aspect of an embodiment of the present disclosure.

FIG. 51 is a flow diagram of an aspect of an embodiment of the present disclosure. At 5110, a wireless device may transmit a preamble via a random access channel resource of an uplink bandwidth part of a cell. At 5120, a random access radio network temporary identifier may be determined, in response to the transmitting, based on at least one bandwidth part configuration parameter of the uplink bandwidth part. At 5130, a downlink control channel may be monitored for a random access response identified by the random access radio network temporary identifier. At 5140, the random access response for the transmission of the preamble may be received. According to an example embodiment, the at least one bandwidth part configuration parameter may comprise a bandwidth part index of the uplink bandwidth part. According to an example embodiment, the at least one bandwidth part configuration parameter may comprise a frequency location parameter of the uplink bandwidth part.

Figure 52:
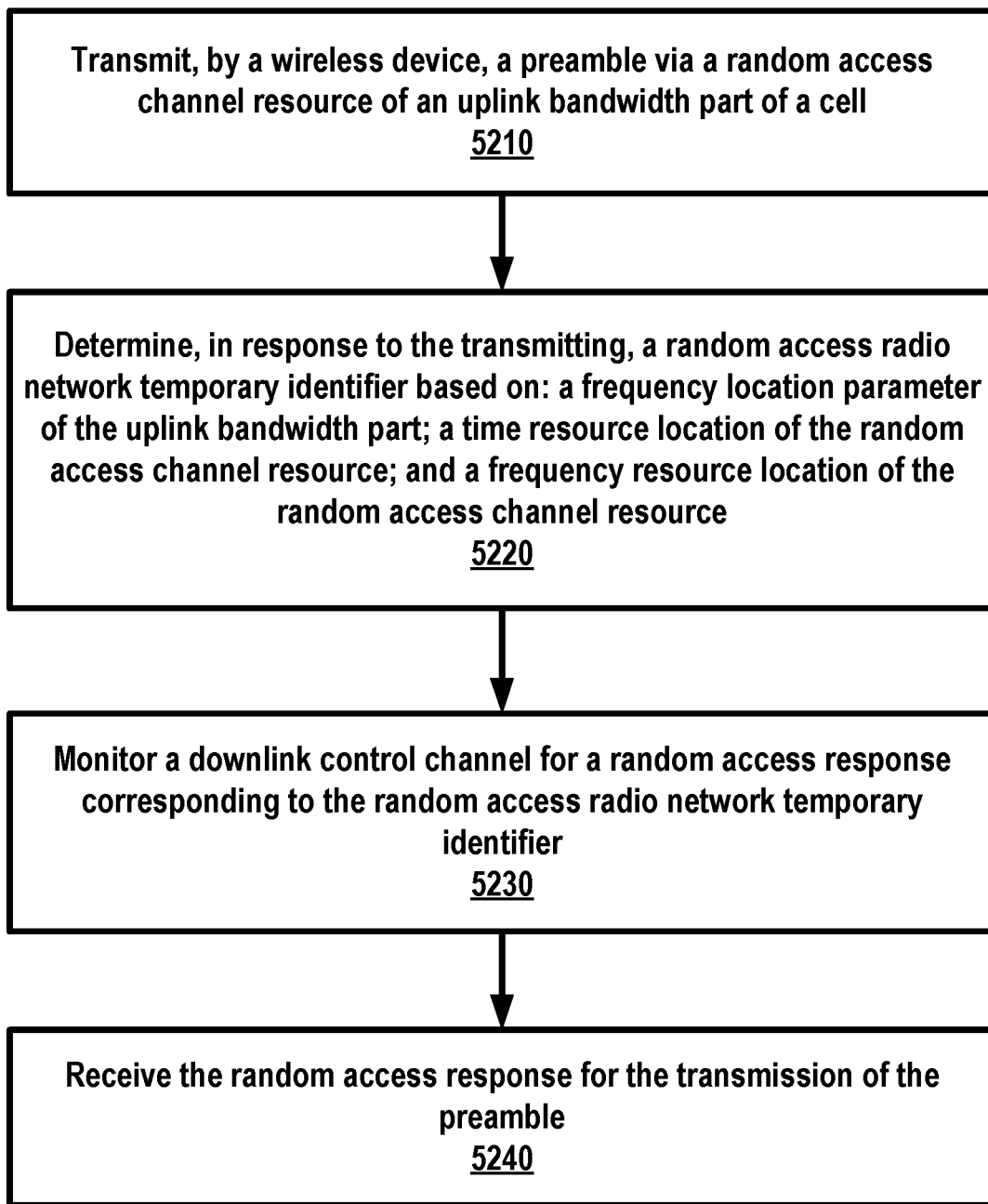
FIG. 52 is a flow diagram of an aspect of an embodiment of the present disclosure.

FIG. 52 is a flow diagram of an aspect of an embodiment of the present disclosure. At 5210, a wireless device may transmit a preamble via a random access channel resource on an uplink bandwidth part of a cell. At 5220, a random access radio network temporary identifier may be determined, in response to the transmitting. The determination may be based on a frequency location parameter of the uplink bandwidth part. The determination may be based on a time resource location of the random access channel resource. The determination may be based on a frequency resource location of the random access channel resource. At 5230, a downlink control channel may be monitored for a random access response corresponding to the random access radio network temporary identifier. At 5240, the random access response for the transmission of the preamble may be received.

Figure 53:
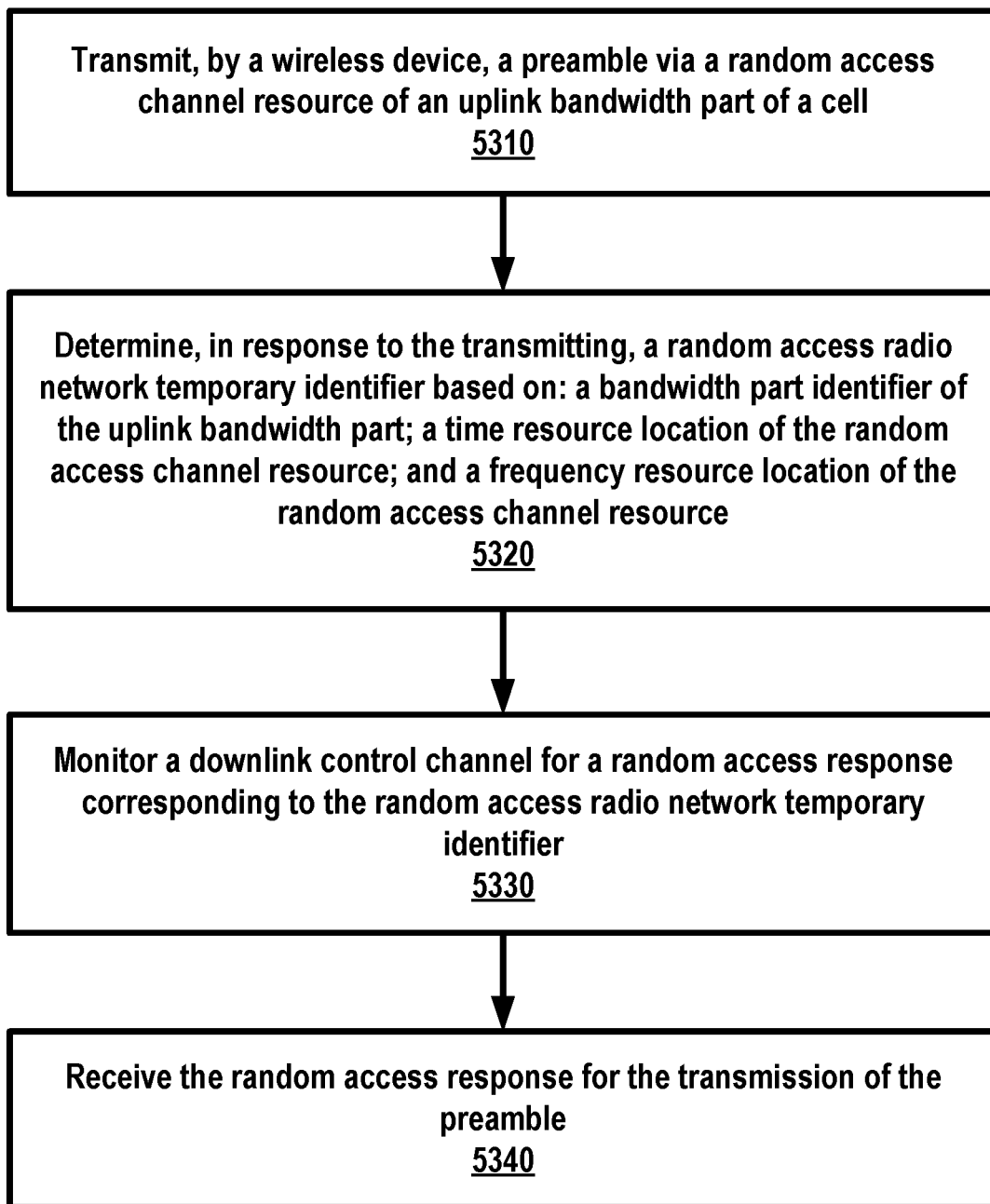
FIG. 53 is a flow diagram of an aspect of an embodiment of the present disclosure.

FIG. 53 is a flow diagram of an aspect of an embodiment of the present disclosure. At 5310, a wireless device may transmit a preamble via a random access channel resource on an uplink bandwidth part of a cell. At 5320, a random access radio network temporary identifier may be determined in response to the transmitting. The determination may be based on a bandwidth part identifier of the uplink bandwidth part. The determination may be based on a time resource location of the random access channel resource. The determination may be based on a frequency resource location of the random access channel resource. At 5330, a downlink control channel may be monitored for a random access response corresponding to the random access radio network temporary identifier. At 5340, the random access response for the transmission of the preamble may be received.

In this disclosure, "a" and "an" and similar phrases are to be interpreted as "at least one" or "one or more." Similarly, any term that ends with the suffix "(s)" is to be interpreted as "at least one" or "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" is indicative that the phrase following the term "based on" is an example of one of a multitude of suitable possibilities that may, or may not, be employed to one or more of the various embodiments. The phrase "in response to" is indicative that the phrase following the phrase "in response to" is an example of one of a multitude of suitable possibilities that may, or may not, be employed to one or more of the various embodiments. The terms "including" and "comprising" should be interpreted as meaning "including, but not limited to."

In this disclosure and the claims, differentiating terms like "first," "second," "third," identify separate elements without implying an ordering of the elements or functionality of the elements. Differentiating terms may be replaced with other differentiating terms when describing an embodiment.

In this disclosure, various embodiments are disclosed. Limitations, features, and/or elements from the disclosed example embodiments may be combined to create further embodiments within the scope of the disclosure.

In this disclosure, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
    transmitting, by a wireless device, a plurality of capability messages for a plurality of bandwidth parts of a cell, the plurality of capability messages indicating that the wireless device supports a first number of channel state information (CSI) processes per bandwidth part of the cell, the plurality of bandwidth parts comprising a first bandwidth part;
    receiving, based on the wireless device supporting the first number of CSI processes per bandwidth part, CSI configuration parameters indicating a second number of CSI processes for the first bandwidth part, wherein the CSI configuration parameters comprise: parameters configuring a semi-persistent report sent on PUCCH, or a semi-persistent report sent on PUSCH, parameters indicating in which serving cell CSI resource configuration indicated are to be found, and parameters indicating a plurality of CSI reference signal resources, wherein the first number of CSI processes and the second number of CSI processes are different; and
    transmitting CSI reports for the second number of CSI processes.

2. The method of claim 1, further comprising receiving configuration parameters of the plurality of bandwidth parts of the cell.

3. The method of claim 1, further comprising receiving a downlink control information indicating switching from a second bandwidth part of the cell to the first bandwidth part as an active bandwidth part of the cell, wherein the first bandwidth part is activated in response to receiving the downlink control information and the second bandwidth part is deactivated in response to receiving the downlink control information, wherein the wireless device monitors Physical Downlink Control Channel (PDCCH) to detect the downlink control information.

4. The method of claim 3, wherein the transmitting the CSI reports is based on the first bandwidth part being the active bandwidth part of the cell.

5. The method of claim 1, further comprising receiving a downlink control information indicating activation of the first bandwidth part.

6. The method of claim 1, wherein the second number is smaller than or equal to the first number.

7. The method of claim 1, wherein the first number of CSI processes is a maximum number of channel state information processes.

8. The method of claim 1, further comprising receiving an indication of uplink resources of an uplink control channel, wherein the channel state information is transmitted via the uplink control channel.

9. The method of claim 8, wherein the uplink resources are configured on a primary cell.

10. The method of claim 1, wherein the channel state information is a periodic channel state information.

11. A wireless device comprising:
    one or more processors; and
    memory storing instructions that, when executed by the one or more processors, cause the wireless device to:
    transmit a plurality of capability messages for a plurality of bandwidth parts of a cell, the plurality of capability messages indicating that the wireless device supports a first number of channel state information (CSI) processes per bandwidth part of the cell, the plurality of bandwidth parts comprising a first bandwidth part;
    receive, based on the wireless device supporting the first number of CSI processes per bandwidth part, CSI configuration parameters indicating a second number of CSI processes for a first bandwidth part, wherein the CSI configuration parameters comprise: parameters configuring a semi-persistent report sent on PUCCH, or a semi-persistent report sent on PUSCH, parameters indicating in which serving cell CSI resource configuration indicated are to be found, and parameters indicating a plurality of CSI reference signal resources, wherein the first number of CSI processes and the second number of CSI processes are different; and
    transmit CSI reports for the second number of CSI processes.

12. The wireless device of claim 11, wherein the instructions, when executed by the one or more processors, further cause the wireless device to receive configuration parameters of the plurality of bandwidth parts of the cell.

13. The wireless device of claim 11, wherein the instructions, when executed by the one or more processors, further cause the wireless device to receive a downlink control information indicating switching from a second bandwidth part of the cell to the first bandwidth part as an active bandwidth part of the cell, wherein the first bandwidth part is activated in response to receiving the downlink control information and the second bandwidth part is deactivated in response to receiving the downlink control information, wherein the wireless device monitors Physical Downlink Control Channel (PDCCH) to detect the downlink control information.

14. The wireless device of claim 13, wherein the transmission of the CSI reports is based on the first bandwidth part being the active bandwidth part of the cell.

15. The wireless device of claim 11, wherein the instructions, when executed by the one or more processors, further cause the wireless device to receive a downlink control information indicating activation of the first bandwidth part.

16. The wireless device of claim 11, wherein the second number is smaller than or equal to the first number.

17. The wireless device of claim 11, wherein the first number of CSI processes is a maximum number of channel state information processes.

18. The wireless device of claim 11, wherein the instructions, when executed by the one or more processors, further cause the wireless device to receive an indication of uplink resources of an uplink control channel, wherein the channel state information is transmitted via the uplink control channel.

19. The wireless device of claim 18, wherein the uplink resources are configured on a secondary cell.

20. A system comprising:
a base station; and
a wireless device comprising: one or more processors; and memory storing instructions that, when executed by the one or more processors, cause the wireless device to:
transmit, to the base station, a plurality of capability messages for a plurality of bandwidth parts of a cell, the plurality of capability messages indicating that the wireless device supports a first number of channel state information (CSI) processes per bandwidth part of the cell, the plurality of bandwidth parts comprising a first bandwidth part;
receive, based on the wireless device supporting the first number of CSI processes per bandwidth part, CSI configuration parameters indicating a second number of CSI processes for the first bandwidth part, wherein the CSI configuration parameters comprise: parameters configuring a semi-persistent report sent on PUCCH, or a semi-persistent report sent on PUSCH, parameters indicating in which serving cell CSI resource configuration indicated are to be found, and parameters indicating a plurality of CSI reference signal resources, wherein the first number of CSI processes and the second number of CSI processes are different; and
transmit CSI reports for the second number of CSI processes.

* * * * *